(12) United States Patent
Han et al.

(10) Patent No.: US 11,016,187 B2
(45) Date of Patent: May 25, 2021

(54) APPARATUS AND METHOD FOR MEASURING DISTANCE AND LOCATION

(71) Applicant: Samsung Electronics Co., Ltd., Suwon-si (KR)

(72) Inventors: Kwanghoon Han, Suwon-si (KR); Taeyoung Lee, Seoul (KR); Seong-Hee Park, Seoul (KR); Chilyoul Yang, Anyang-si (KR); Myounghwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 15/086,920

(22) Filed: Mar. 31, 2016

(65) Prior Publication Data

US 2016/0291141 A1 Oct. 6, 2016

(30) Foreign Application Priority Data

Apr. 2, 2015 (KR) .................. 10-2015-0046900
Feb. 24, 2016 (KR) .................. 10-2016-0021754

(51) Int. Cl.
*G01S 11/14* (2006.01)
*G01S 3/808* (2006.01)
(Continued)

(52) U.S. Cl.
CPC ............ *G01S 11/14* (2013.01); *G01S 3/802* (2013.01); *G01S 3/8083* (2013.01);
(Continued)

(58) Field of Classification Search
CPC ... G01S 11/14; G01S 5/00; G01S 5/18; G01S 5/0072; G01S 3/802; G01S 3/8083; G01S 5/28; G01S 15/74
See application file for complete search history.

(56) References Cited

U.S. PATENT DOCUMENTS 6,680,688 B1 1/2004 Jiang et al.
7,180,580 B2 2/2007 Guruprasad
(Continued)

FOREIGN PATENT DOCUMENTS

CN 101194536 A 6/2008
CN 101730852 A 6/2010
(Continued)

OTHER PUBLICATIONS

Chinese Office Action dated Jul. 21, 2020, issued in Chinese Patent Application No. 201680028219.X.
(Continued)

*Primary Examiner* — Isam A Alsomiri
*Assistant Examiner* — Amie M Ndure
(74) *Attorney, Agent, or Firm* — Jefferson IP Law, LLP

(57) ABSTRACT

An apparatus and a method for measuring distance by using electronic devices are provided. The apparatus includes an output unit, an input unit, and a controller. The output unit may be configured to transmit the first sound wave, and the input unit may be configured to receive the second sound wave from another apparatus that receives the first sound wave. The controller may be configured to determine the distance between the apparatus and the another apparatus based on a first value and a second value. The first value may correspond to a difference between a timing of initiating a transmission of the first sound wave and a timing of receiving the second sound wave, and the second value may correspond to a difference between a timing when the another apparatus initiates the transmission of the second sound wave and the timing when the another apparatus receives the first sound wave.

18 Claims, 85 Drawing Sheets

(51) Int. Cl.
*G01S 5/28* (2006.01)
*G01S 15/74* (2006.01)
*G01S 3/802* (2006.01)
*G01S 5/00* (2006.01)
*G01S 5/18* (2006.01)

(52) U.S. Cl.
CPC .............. *G01S 5/0072* (2013.01); *G01S 5/18* (2013.01); *G01S 5/28* (2013.01); *G01S 15/74* (2013.01)

(56) References Cited

U.S. PATENT DOCUMENTS

| | | |
|---|---|---|
| 7,408,839 B2 | 8/2008 | McFarland |
| 7,710,826 B2 | 5/2010 | Jeong et al. |
| 8,793,776 B1* | 7/2014 | Jackson ................ H04W 4/023 726/7 |
| 8,867,313 B1 | 10/2014 | Rivlin et al. |
| 2002/0186167 A1* | 12/2002 | Anderson ................ G01S 5/02 342/465 |
| 2003/0017832 A1* | 1/2003 | Anderson ................ G01S 5/10 455/456.1 |
| 2006/0003775 A1* | 1/2006 | Bull ....................... G01S 5/0205 455/456.1 |
| 2007/0128899 A1* | 6/2007 | Mayer .................... G06F 9/4406 439/152 |
| 2007/0133813 A1 | 6/2007 | Morishima |
| 2007/0205886 A1 | 9/2007 | Huseth et al. |
| 2008/0133813 A1 | 6/2008 | Mori et al. |
| 2008/0177994 A1* | 7/2008 | Mayer .................... G06F 9/4418 713/2 |
| 2008/0259732 A1 | 10/2008 | Booij et al. |
| 2008/0304361 A1* | 12/2008 | Peng ........................ G01S 15/74 367/127 |
| 2009/0005061 A1* | 1/2009 | Ward ....................... G01S 5/021 455/456.1 |
| 2009/0207013 A1* | 8/2009 | Ayed ...................... G08B 13/1427 340/539.1 |
| 2010/0039326 A1* | 2/2010 | LeFever ................. G01S 5/0221 342/378 |
| 2010/0135118 A1 | 6/2010 | Van Leest et al. |
| 2011/0222373 A1 | 9/2011 | Lee |
| 2011/0275432 A1* | 11/2011 | Lutnick ................ G07F 17/3232 463/25 |
| 2012/0002025 A1* | 1/2012 | Bedingfield, Sr. .......................... H04N 13/0059 348/55 |
| 2012/0023518 A1* | 1/2012 | Meuninck ........ H04N 21/42203 725/25 |
| 2012/0023531 A1* | 1/2012 | Meuninck .......... H04N 21/4334 725/100 |
| 2013/0024018 A1* | 1/2013 | Chang .................... G08C 17/02 700/94 |
| 2013/0162480 A1* | 6/2013 | Gander ................. G01S 5/0215 342/387 |
| 2013/0225282 A1* | 8/2013 | Williams .............. A63F 13/216 463/29 |
| 2013/0337796 A1 | 12/2013 | Suhami |
| 2014/0045529 A1* | 2/2014 | Bolon ................... H04W 4/021 455/456.1 |
| 2014/0253389 A1 | 9/2014 | Beauregard |
| 2014/0355389 A1* | 12/2014 | Reunamaki ............ G08C 23/02 367/197 |
| 2015/0029880 A1 | 1/2015 | Burns et al. |
| 2015/0350820 A1* | 12/2015 | Son ........................ H04W 12/08 455/41.2 |

FOREIGN PATENT DOCUMENTS

| | | |
|---|---|---|
| CN | 102721944 A | 10/2012 |
| CN | 203151672 U | 8/2013 |
| CN | 104219784 A | 12/2014 |

OTHER PUBLICATIONS

Fan Li et al., "A New Two-Step Ranging Algorithm in NLOS Environment for UWB Systems", IEEE, Dec. 31, 2006, pp. 309-316.

Peng Yu et al., "A review: wireless sensor networks localization", Journal of Electronic Measurement and Instrument, May 31, 2011, vol. 25, No. 5, pp. 389-399.

Indian Office Action Dec. 29, 2020, issued in Indian Patent Application No. 201737038635.

Chinese Office Action dated Jan. 15, 2021, issued in Chinese Patent Application No. 201680028219.X.

\* cited by examiner

APPARATUS AND METHOD FOR MEASURING DISTANCE AND LOCATION

CROSS-REFERENCE TO RELATED APPLICATION(S)

This application claims the benefit under 35 U.S.C. § 119(a) of a Korean patent application filed on Apr. 2, 2015 and Feb. 24, 2016 in the Korean Intellectual Property Office and assigned Serial number 10-2015-0046900 and 10-2016-0021754, the entire disclosure of which is hereby incorporated by reference.

TECHNICAL FIELD

The present disclosure relates to an apparatus and a method for measuring distance and location. More particularly, the present disclosure relates to an apparatus and a method for accurately determining the distance between electronic devices.

BACKGROUND

The internet has evolved from a human-centered network, in which people create and use information, into an Internet of things (IoT) network in which distributed elements, such as things, transmit and receive information to be processed therebetween. Internet of everything (IoE) technology has been introduced, which is made by combining big data processing technology through the access to a cloud server with the IoT technology. In order to implement the IoT technology, technical factors are required, such as detection technology, wired/wireless communication and network infra-structure, service interface technology, or security technology. Thus, technology for creating a connection between things has recently been developed, such as a sensor network, machine-to-machine (M2M) communication, or machine type communication (MTC).

In the IoT environment, an intelligence Internet technology (IT) service may be provided, which collects and analyzes data that is generated by the connected things in order to thereby create a new value for the human life. The IoT may be applied to the fields of smart homes, smart buildings, smart cities, smart cars or connected cars, smart grids, healthcare, smart home appliances, or cutting-edge medical services, through the fusion and complex between existing information technology (IT) and various industries.

In addition, with the recent development of wireless communication technology, the usage of wireless devices has been growing. More particularly, users may transmit or receive signals through wireless devices or electronic devices (such as smart phones) that can be wirelessly connected, and the users may be provided with various services by transmitting and receiving a variety of data (e.g., multimedia data, such as videos, music, photos, or documents) according thereto.

In order to improve the usefulness of the electronic devices, technology that is able to more accurately determine the distance between the electronic devices may be required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for measuring distance by using electronic devices.

Another aspect of the present disclosure is to provide an apparatus and a method for measuring distance and direction by using electronic devices.

Another aspect of the present disclosure is to provide an apparatus and a method for measuring distance by using sound waves in electronic devices.

Another aspect of the present disclosure is to provide an apparatus and a method for measuring distance and direction by using sound waves in electronic devices.

Another aspect of the present disclosure is to provide an apparatus and a method for measuring distance by using speakers and microphones that are included in electronic devices.

Another aspect of the present disclosure is to provide an apparatus and a method for measuring distance and direction by using speakers and microphones that are included in electronic devices.

Another aspect of the present disclosure is to provide an apparatus and a method for calibrating sound waves in electronic devices.

Another aspect of the present disclosure is to provide an apparatus and a method for measuring distance by using the calibrated sound waves in electronic devices.

Another aspect of the present disclosure is to provide an apparatus and a method for measuring distance and direction by using the calibrated sound waves in electronic devices.

In accordance with an aspect of the present disclosure, a method for operating an apparatus is provided. The method includes transmitting the first sound wave by using an output unit, receiving, from another apparatus that receives the first sound wave, the second sound wave by using an input unit, and determining a distance between the apparatus and the another apparatus based on a first value and a second value. The first value may correspond to a difference between the timing of initiating the transmission of the first sound wave and a timing of receiving the second sound wave, and the second value may correspond to a difference between a timing when the another apparatus initiates the transmission of the second sound wave and a timing when the another apparatus receives the first sound wave.

In accordance with another aspect of the present disclosure, an apparatus is provided. The apparatus includes an output unit, an input unit, and a controller. The output unit may be configured to transmit the first sound wave, and the input unit may be configured to receive the second sound wave from another apparatus that receives the first sound wave. The controller may be configured to determine a distance between the apparatus and the another apparatus based on the first value and the second value. The first value may correspond to a difference between a timing of initiating the transmission of the first sound wave and a timing of receiving the second sound wave, and the second value may correspond to a difference between a timing when the another apparatus initiates the transmission of the second sound wave and the timing when the another apparatus receives the first sound wave.

According to various embodiments of the present disclosure, the distance between the electronic devices can be accurately measured by measuring the distance between the electronic devices.

Other aspects, advantages, and salient features of the disclosure will become apparent to those skilled in the art from the following detailed description, which, taken in

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
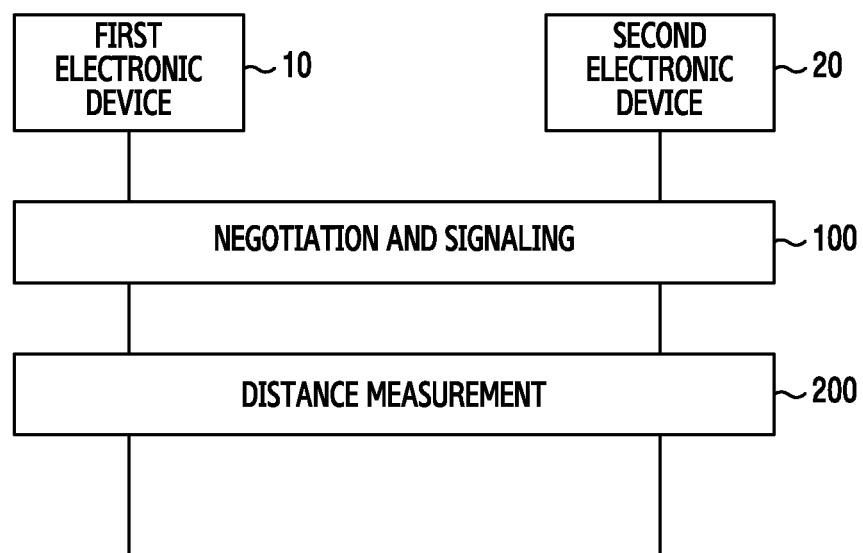
FIG. 1A illustrates an operation between electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used in various embodiments of the present disclosure, the expressions "include", "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, operation, element, component, or a combination thereof, and should not be construed to initially exclude the existence of or a possibility of addition of one or more other features, numerals, operations, elements, components, or combinations thereof.

Further, as used in various embodiments of the present disclosure, the expression "or" includes any or all combinations of words enumerated together. For example, the expression "A or B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and similarly, a second element may also be termed a first element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

The following description will be made of an apparatus and a method for measuring the distance or direction between wireless devices through signal transmission and reception in a wireless communication system.

The distance measuring apparatus measures the distance between the wireless devices (or electronic devices) by transmitting and receiving signals using two wireless devices (or electronic devices). For example, the wireless devices may be portable electronic devices that have a wireless access function, such as smart phones. As another example, the wireless device may be one of a portable terminal, a mobile phone, a mobile pad, a tablet computer, a handheld computer, or a personal digital assistant (PDA). As another example, the wireless device may be one of media devices that can be wirelessly connected, such as a media player, a camera, a speaker, a smart television (TV) set, and the like. As another example, the wireless device may be wearable devices, such as a smart watch or smart glasses. As another example, the wireless device may be a point of sales (POS) device or a beacon device. As another example, the wireless device may be a device that is made by a combination of two or more functions among the aforementioned devices. Hereinafter, the distance-measuring operation between two electronic devices will be representatively described for the convenience of explanation, and in some cases, the electronic devices may be referred to as different names, such as a user's mobile phone, speakers, TV sets, user computers, POS terminals, beacon terminals, or smart watches.

In an embodiment of the present disclosure, the wireless communication system may be a device to device (D2D) network for supporting wireless access, such as Bluetooth (BT) or Wi-Fi, between the electronic devices, or may be a wireless local area network (WLAN).

FIG. 1A illustrates an operation between electronic devices according to various embodiments of the present disclosure.

Referring to FIG. 1A, a first electronic device 10 and a second electronic device 20 perform a negotiation and signalling operation for a distance-measuring operation between the first electronic device 10 and the second electronic device 20 in operation 100. In operation 200, the first electronic device 10 and the second electronic device 20 select one measuring method from among a plurality of measuring methods based on the negotiation result, and measure the distance between the first electronic device 10 and the second electronic device 20 according to the one measuring method that is selected from the plurality of measuring methods. The plurality of measuring methods may include a measuring method that uses sound waves. The sound wave may be a wave that generates a pressure variation in a part of a medium, and moves from a high-pressure area to a low-pressure area. The medium may be air. In general, the sound wave may be referred to as a sound. In various embodiments of the present disclosure, the sound wave may include a longitudinal wave that uses a frequency other than the audible frequency (about 20~20,000 Hz) that people can hear. In various embodiments of the present disclosure, the sound wave may include a longitudinal wave that uses the frequency that people cannot hear. For example, the sound wave may include an infrasonic wave, an audible wave, and an ultrasonic wave.

The propagation speed of the sound wave may vary depending on the medium. In the general wireless communication system environment, when the electronic device radiates the sound wave, it may be transferred through the air. For example, the sound wave of the electronic device may use the air as the medium. In the case of using the air as the medium, the propagation speed of the sound wave is approximately 340 m/s. Since the transmission speed of the sound wave is less affected by the frequency or the atmospheric pressure, it may remain constant.

In various embodiments of the present disclosure, the first electronic device 10 and the second electronic device 20 may measure the distance without using feedback. For example, the first electronic device 10 and the second electronic device 20 may transmit or receive time information before measuring the distance. The time information may be transmitted or received in operation 100. As another example, the first electronic device 10 and the second electronic device 20 may have a certain time value before measuring the distance. In various embodiments of the present disclosure, the first electronic device 10 and the second electronic device 20 may measure the distance by using feedback. The first electronic device 10 and the second electronic device 20 may transmit or receive time information. The time information may be transmitted or received in operation 200.

Figure 1B:
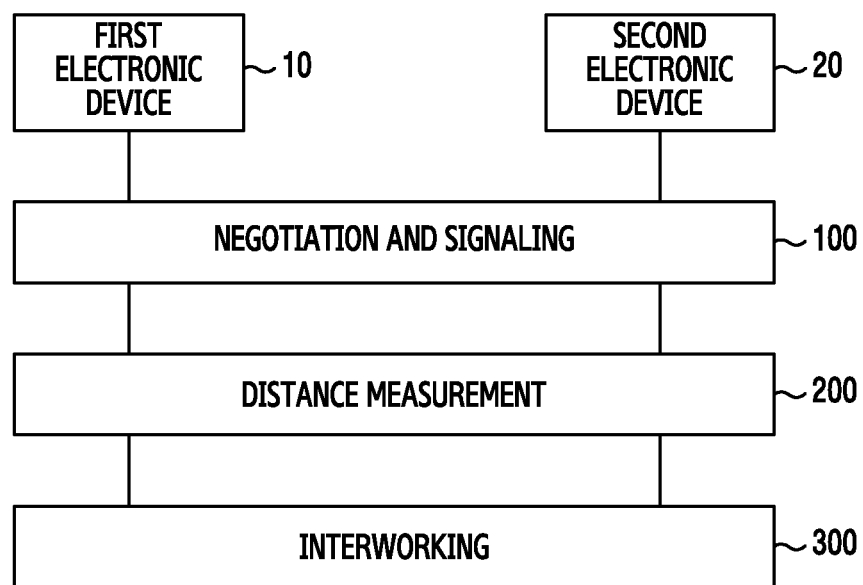
FIG. 1B illustrates an operation between electronic devices that interwork with each other according to various embodiments of the present disclosure.

FIG. 1B illustrates an operation between electronic devices that interwork with each other according to various embodiments of the present disclosure.

Referring to FIG. 1B, the first electronic device 10 and the second electronic device 20 perform a negotiation and signalling operation for the distance-measuring operation in operation 100. In operation 200, the first electronic device 10 and the second electronic device 20 select one measuring method from among a plurality of measuring methods based on the negotiation result, and measure the distance between the first electronic device 10 and the second electronic device 20 according to the one measuring method that is selected from among the plurality of measuring methods. The first electronic device 10 and the second electronic device 20 interwork with each other based on the distance measurement result in operation 300. The first electronic device 10 and the second electronic device 20 may transmit or receive time information through the interworking operation.

In various embodiments of the present disclosure, the operation in which the first electronic device 10 and the second electronic device 20 perform the negotiation and signalling operation may include an operation in which the first electronic device 10 and the second electronic device 20 exchange characteristics. In various embodiments of the present disclosure, the operation in which the first electronic device 10 and the second electronic device 20 perform the negotiation and signalling operation may include an operation in which the first electronic device 10 transfers distance measurement-related parameters to the second electronic device 20. In various embodiments of the present disclosure, the distance measurement-related parameters may contain at least one of a distance measurement cycle, a distance measurement start offset, the number of available speakers/ microphones, the required measurement accuracy, the required distance measurement lead time, the recording time of the sound signal, identifier information of the first electronic device 10, or a generating method of a sound wave (sound signal). In various embodiments of the present disclosure, the one measuring method selected from among the plurality of measuring methods may be selected based on at least one of the characteristics of the first electronic device 10 and the second electronic device 20, the distance measurement type, or the distance measurement scenario. In various embodiments of the present disclosure, the one measuring method selected from among the plurality of measuring methods may include a method for measuring the distance between the first electronic device 10 and the second electronic device 20 by using one or more wireless signals or sound waves (sound signal) that are generated by the first electronic device 10 or the second electronic device 20. In various embodiments of the present disclosure, the operation in which the first electronic device 10 and the second electronic device 20 interwork with each other may include an operation in which data related to services that are executed in the first electronic device 10 is provided to the second electronic device 20. In various embodiments of the present disclosure, the operation in which the first electronic device 10 and the second electronic device 20 interwork with each other may include an operation in which the first electronic device 10 is provided with data related to services that are executed in the second electronic device 20. In various embodiments of the present disclosure, the first electronic device 10 and the second electronic device 20 may include at least one of portable electronic devices, media devices, wearable electronic devices, POS devices, or beacon devices, which have a wireless access function. In another embodiment of the present disclosure, the wireless signal may include the low-power wireless communication type of signal, such as BT low energy (BLE).

Figure 2:
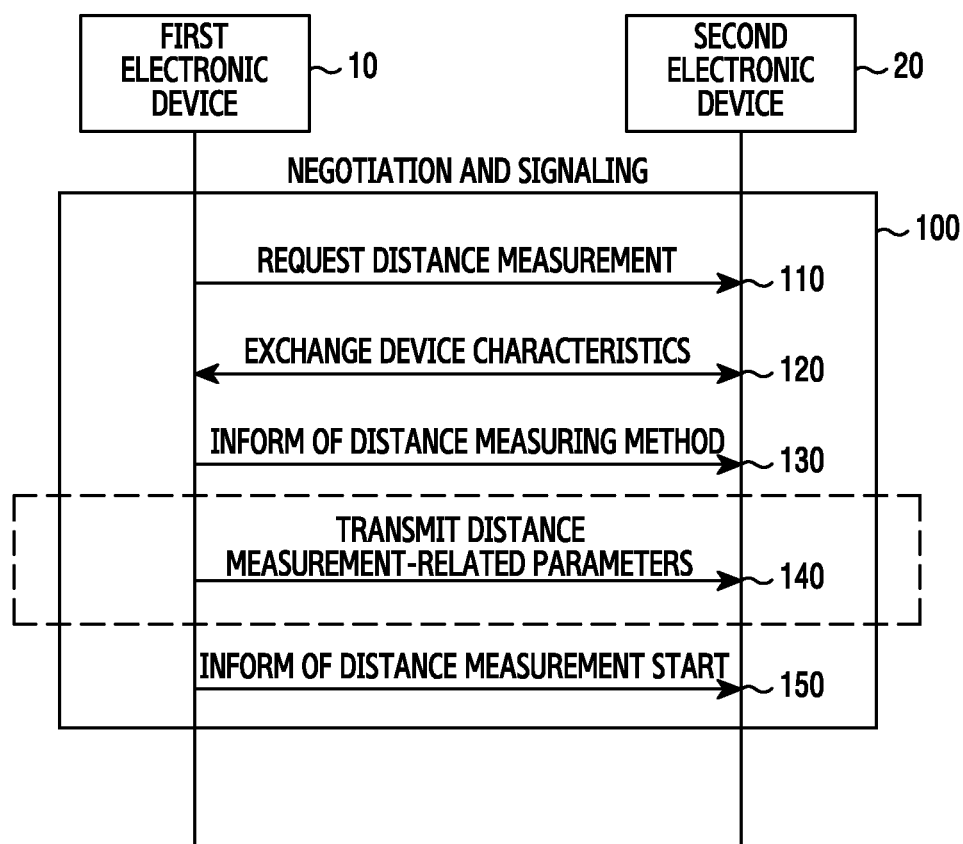
FIG. 2 illustrates a processing flow of a negotiation and signalling operation according to various embodiments of the present disclosure.

FIG. 2 illustrates a processing flow of a negotiation and signalling operation according to various embodiments of the present disclosure. The distance-measuring operation illustrated in FIG. 2 may be performed between the first electronic device 10 and the second electronic device 20 illustrated in FIGS. 1A and 1B.

Referring to FIG. 2, in operation 110, the first electronic device 10 transmits a distance measurement request to the second electronic device 20. In operation 120, the first electronic device 10 and the second electronic device 20 exchange the device characteristics. In an embodiment of the present disclosure, the device characteristics may include at least one of the type of electronic device, the presence or absence of microphones/speakers and the number of the same, the type of wireless connectivity, or the presence or absence of a power source. The type of electronic device may include at least one of a portable electronic device, a media device, a wearable electronic device, a POS device, or a beacon device. The presence or absence of microphones/ speakers and the number of the same show whether there are microphones or speakers that are mounted on the electronic device, and show the number of microphones or speakers if there are. The wireless connectivity may include a scheme for supporting the transmission and reception of low-power wireless signals, such as BT. The presence or absence of a power source shows whether there is a power source that is able to continue to transmit wireless signals. After exchanging the characteristics of the devices, the first electronic device 10 selects an optimal distance measuring method from among the plurality of distance measuring methods.

The plurality of distance measuring methods will be described with FIGS. 4A and 4B and subsequent drawings thereof.

In various embodiments of the present disclosure, the distance measuring method may be selected based on at least one of the characteristics of the first electronic device 10 and the second electronic device 20, the distance measurement type, or the distance measurement scenario. In another embodiment of the present disclosure, the distance measurement type may include at least one of one-to-one distance measurement, one-to-n distance measurement, one-time distance measurement, or periodic distance measurement. In another embodiment of the present disclosure, the distance measurement scenario may include at least one of TV screen mirroring, speaker music streaming, installation of room speaker, configuration of a TV/home theater, a payment trigger service, or a position-based service.

In operation 130, the first electronic device 10 informs the second electronic device 20 of the selected distance measuring method.

In operation 140, the first electronic device 10 transfers the distance measurement-related parameters to the second electronic device 20. In an embodiment of the present disclosure, the distance measurement-related parameters may contain at least one of a distance measurement cycle, a distance measurement start offset, the number of available speakers/microphones, the required measurement accuracy, the required distance measurement lead time, the recording time of a sound wave, identifier information of the first electronic device 10, or a generating method of the sound wave (sound signal). The distance measurement cycle represents whether the distance measurement is periodic (one-time or periodic), and represents a cycle value in the case of the periodic distance measurement. The distance measurement cycle may be determined according to the distance measurement scenario. The distance measurement start offset represents an actual distance measurement start offset value in consideration of the time for which the electronic device prepares for the measurement (for example, the on/off time of the microphone/speaker). The number of speakers/microphones shows how many microphone and speakers are available in the electronic device. The required measurement accuracy represents the accuracy of the measurement (for example, an error of less than 10 cm) that is required by the distance measurement scenario, and affects the complexity. The required distance measurement lead time represents the lead time that is required for the distance measurement. The required time for the distance measurement may vary depending on the distance measurement scenario, and may affect the complexity or the required accuracy. The performance of the electronic device represents the performance of the electronic device for the distance measurement. The performance may determine the calculation time for the operation of the distance measurement, and the required measurement accuracy or the required lead time may be influenced according thereto. The recording time of a sound wave represents the time to record a sound wave. The recording time may be configured in consideration of the deviation of the available power-on time of the speaker/microphone in the electronic device. The identifier information of the electronic device represents a user identification (ID) value for identifying a plurality of electronic devices. The creating method of the transmission sound wave, according to the ID, refers to a method in which the sound wave is determined through the user ID value.

In operation 150, the first electronic device 10 informs the second electronic device 20 of the start of the distance measurement. The first electronic device 10 may inform the second electronic device 20 of the distance measurement start through a wireless signal. The wireless signal may be in the form of a link layer (LL) data signal. The wireless signal may be in the form of a BLE advertising packet.

Referring to FIG. 2, the first electronic device 10 and the second electronic device 20 exchange the characteristics of the devices. The first electronic device 10 selects the distance measuring method based on the characteristics of the devices, and informs the second electronic device 20 of the same. The first electronic device 10 transfers the distance measurement-related parameters to the second electronic device 20. However, this embodiment is only an example, and may be modified without departing from the scope of the present disclosure. As an alternative example, the distance measurement-related parameters may be exchanged together in the course of exchanging the device characteristics.

Figure 3:
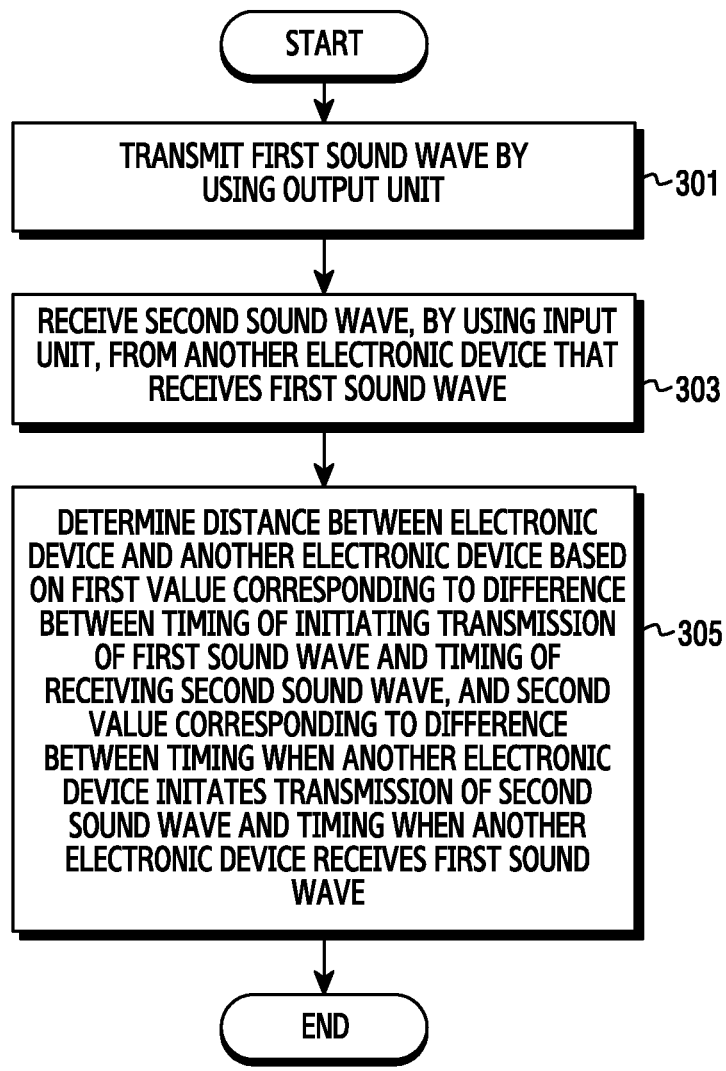
FIG. 3 is a flowchart illustrating a distance-measuring operation of an electronic device according to various embodiments of the present disclosure.

FIG. 3 is a flowchart illustrating a distance-measuring operation of an electronic device according to various embodiments of the present disclosure. The processing flow may be performed by the first electronic device 10 and the second electronic device 20 shown in FIGS. 1A and 1B.

Referring to FIG. 3, in operation 301, the electronic device may transmit the first sound wave by using an output unit. The first sound wave may be a sound signal. The output unit may be a speaker.

In operation 303, the electronic device may receive the second sound wave from another electronic device, which receives the first sound wave, by using an input unit. The another electronic device may be the second electronic device 20 of FIGS. 1A and 1B. The second sound wave may be a sound signal. The input unit may be a microphone.

In operation 305, the electronic device may determine the distance between the electronic device and the another electronic device based on the first value and the second value. The electronic device may determine the first value corresponding to the difference between the timing, in which the electronic device initiates the transmission of the first sound wave, and the timing of when the electronic device receives the second sound wave that is output from the another electronic device.

More specifically, the speaker included in the electronic device may output the first sound wave. The microphone included in the electronic device may receive the first sound wave and the second sound wave that is output from the another electronic device, respectively. In various embodiments of the present disclosure, the electronic device may record sounds detected by the microphone. The electronic device may create audio data through the recorded sounds. When the recording is performed upon the reception of the first sound wave and the second sound wave, the audio data may contain the first sound wave and the second sound wave. According to this, the electronic device may identify the timing of when the first sound wave is recorded and the timing of when the second sound wave is recorded from the audio data. For example, the electronic device may determine the recording timing of the first sound wave based on the positions of audio samples representing the first sound wave and a sampling rate of the audio data. For example, the electronic device may record the timing of when the first sound wave is received and the timing of when the second sound wave is received, respectively, in order to thereby recognize the timing of when the first sound wave is received and the timing of when the second sound wave is received, respectively. The electronic device may determine the time difference between the reception timing of the first sound wave and the reception timing of the second sound wave. The electronic device may include hardware or software for the record. The hardware may be a recorder or a voice recorder.

The first value may be determined by the sum of the first difference value and the second difference value. The first difference value may correspond to the difference between the timing of initiating the transmission of the first sound wave and the timing of receiving the first sound wave. The second difference value may correspond to the difference between the timing of receiving the first sound wave and the timing of receiving the second sound wave. The first sound wave may be transmitted by using the output unit of the electronic device, and may be received through the input unit of the electronic device. Therefore, the time difference between the output timing and reception timing of the first sound wave may be determined based on the physical distance between the output unit and the input unit and the transmission speed of a sound wave. For example, there is a difference between the timing of when the first sound wave is transmitted by the output unit included in the electronic device and the timing of when the first sound wave is received by the input unit included in the electronic device. The difference may be the first difference value. The first difference value may be determined by the distance between the output unit and the input unit and the transmission speed (340 m/s) of a sound wave. The first difference value may be determined by dividing the distance value between the output unit and the input unit by the transmission speed value of a sound wave. Since the distance value between the output unit and the input unit is fixed when designing and manufacturing the electronic device, it may be a predefined value. Therefore, the electronic device may pre-store the distance value between the output unit and the input unit. In addition, since the transmission speed of a sound wave is a constant value according to natural law, the electronic device may recognize the first difference value to be a predefined value.

As a result, the first value may be determined by the sum of the first difference value between the reception timing of the first sound wave and the reception timing of the second sound wave, and the second difference value between the timing of when the first sound wave is output by the output unit included in the electronic device and the timing of when the first sound wave is received by the input unit included in the electronic device.

The second value may correspond to the difference between the timing of when the another electronic device initiates the transmission of the second sound wave and the timing of when the another electronic device receives the first sound wave. The another electronic device may receive the first sound wave, and may initiate the transmission of the second sound wave after the elapse of time corresponding to the second value. Alternatively, the another electronic device may initiate the transmission of the second sound wave, and may receive the first sound wave after the elapse of time corresponding to the second value.

In various embodiments of the present disclosure, the electronic device may determine the second value without using feedback. In the case of not using feedback, it is assumed that the another electronic device receives the first sound wave and transmits the second sound wave after the elapse of a specific period of time. For example, the sequence between the reception timing of the first sound wave and the transmission timing of the second sound wave is considered. The specific period of time may be the time corresponding to the second value. The electronic device may require the second value in order to determine the distance between the electronic device and the another electronic device. Since the electronic device does not receive feedback from the another electronic device, the electronic device needs to know the second value in advance.

The electronic device may negotiate with the another electronic device for the second value before transmitting a wireless signal to the another electronic device. The wireless signal may be the wireless signal in operation 150 of FIG. 2. The electronic device may determine the second value in various ways in addition to the negotiation. For example, the electronic device may transmit the second value to the another electronic device. The electronic device may configure the second value randomly. The electronic device may transmit the first message that contains the second value to the another electronic device. The first message may be intended to control the timing of transmitting the second sound wave by the another electronic device. As another example, the electronic device may receive the second value from the another electronic device. The another electronic device may configure the second value randomly. The electronic device may receive the second message that contains the second value from the another electronic device. The second message may be intended to provide information that is necessary for the electronic device to determine the distance with respect to the another electronic device. As another example, the electronic device may determine the second value based on information that is related to the electronic device and the another electronic device. The related information may be at least one of the characteristics of the electronic device, the characteristics of the another electronic device, a distance measurement type between the electronic device and the another electronic device, or a distance measurement scenario. The device characteristics may be the device characteristic in operation 120 of FIG. 2. As another example, the electronic device may determine a certain value to be the second value. The another electronic device may recognize the certain value prior to performing the negotiation and signalling with the electronic device as described above. For example, the electronic device and the another electronic device may determine the certain value to be the second value before the negotiation and signalling for the distance measurement. The negotiation and signalling may be the negotiation and signalling in operation 110 of FIG. 2.

According to the various embodiments of the present disclosure above, in the case of not using feedback, even when the electronic device does not receive the second value from the another electronic device, the electronic device may determine the distance between the electronic device and the another electronic device. The electronic device may determine the second value before the another electronic device transmits the second sound wave.

In various embodiments of the present disclosure, the electronic device may determine the second value through feedback. The electronic device may receive the second value from the another electronic device through feedback. Unlike the case of not using feedback, in the case of using feedback, the another electronic device may transmit the second sound wave after receiving the first sound wave, or may receive the first sound wave after transmitting the second sound wave. The another electronic device may determine the second value after transmitting the second sound wave, or after receiving the first sound wave. The second value may correspond to the difference between the timing of initiating the transmission of the second sound wave and the timing of receiving the first sound wave. The sequence of the timing of initiating the transmission of the second sound wave and the timing of receiving the first sound wave is not considered.

The electronic device may receive the second value from the another electronic device. The electronic device may receive the third message, which contains the second value from the another electronic device. The third message may be intended to provide a value that is necessary for the electronic device to determine the distance with respect to the another electronic device. The another electronic device may determine the second value based on the first sound wave and the second sound wave. More specifically, the second value represents the difference between the timing of when the another electronic device initiates the transmission of the second sound wave and the timing of when the another electronic device receives the first sound wave. The another electronic device may determine the second value in a similar operation as the operation for determining the first value. For example, the second value may be determined by adding the third difference value to the fourth difference value. The third difference value may be the difference value between the timing of when the first sound wave is received by the input unit included in the another electronic device and the timing of when the second sound wave is received by the input unit included in the another electronic device. The fourth difference value may be the difference value between the timing of when the second sound wave is output by the speaker included in the second electronic device 20 and the timing of when the first sound wave is received. Afterwards, the another electronic device may transmit the second value to the electronic device. The electronic device may receive the second value from the another electronic device.

The electronic device may determine the distance between the electronic device and the another electronic device based on the first value and the second value. More specifically, the distance between the electronic device and the another electronic device may be determined by the product of an average time and the transmission speed of a sound wave. The average time may be determined by calculating an average value of a time value corresponding to the first value and a time value corresponding to the second value. The electronic device may determine the distance between the electronic device and the another electronic device by multiplying the average value and the transmission speed of a sound wave (340 m/s). For example, the sum of the first value and the second value may be a round trip time (RTT) value of a sound between the electronic device and the another electronic device.

Although it is not illustrated in FIG. 3, the another electronic device may determine the distance between the electronic device and the another electronic device as well. Considering the case of using feedback, the another electronic device measures the second value and receives the first value. The another electronic device may determine the distance between the electronic device and the another electronic device based on the first value and the second value.

The distance-measuring operation of the electronic device and the another electronic device will be described with reference to FIG. 4A or 4B, and the drawings following the same.

Figure 4A:
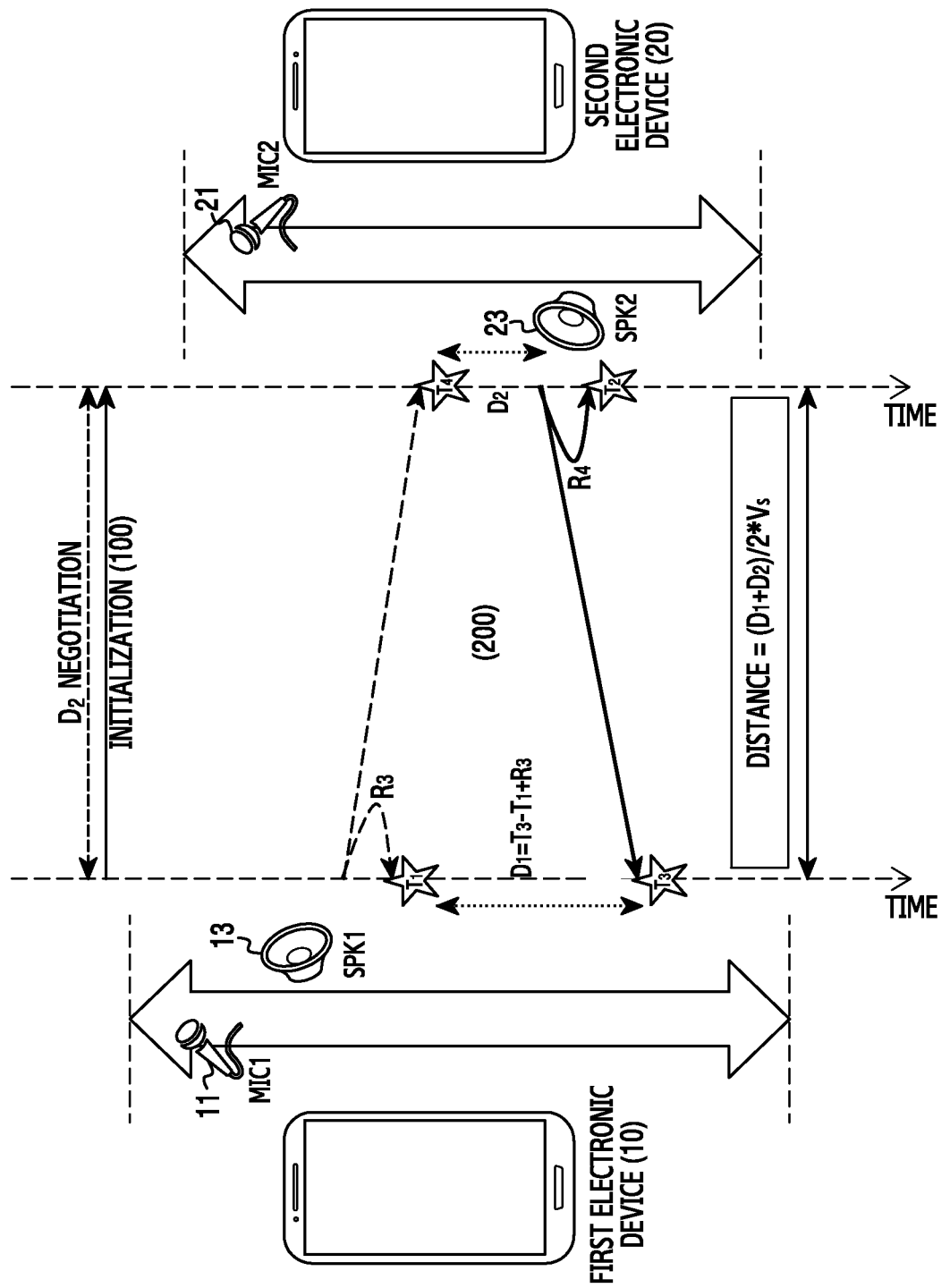
FIG. 4A illustrates a distance measuring method without using feedback according to various embodiments of the present disclosure.

FIG. 4A illustrates a distance measuring method that does not use feedback according to various embodiments of the present disclosure. FIG. 4A illustrates sound waves that are transmitted and received between the first electronic device 10 and the second electronic device 20.

Referring to FIG. 4A, the first electronic device 10 may include the first microphone (MIC1) 11 and the first speaker (SPK1) 13. The first microphone 11 may correspond to the output unit of the first electronic device 10. The first speaker 13 may correspond to the input unit of the first electronic device 10. The second electronic device 20 may include the second microphone (MIC2) 21 and the second speaker (SPK2) 23. The second microphone 21 may correspond to the output unit of the second electronic device 20. The second speaker 23 may correspond to the input unit of the second electronic device 20. Although the first electronic device 10 and the second electronic device are illustrated to include one microphone and speaker, respectively, in FIG. 4A, this is only an example. According to various embodiments of the present disclosure, the first electronic device 10 may include a plurality of microphones or a plurality of speakers. According to various embodiments of the present disclosure, the second electronic device may include a plurality of microphones or a plurality of speakers as well.

Referring to FIG. 4A, in operation 100, the first electronic device 10 and the second electronic device 20 may perform the initialization. The first electronic device 10 and the second electronic device 20 may perform the negotiation for the distance measurement by performing the signalling. In various embodiments of the present disclosure, the operation in which the first electronic device 10 and the second electronic device 20 perform the negotiation and signalling may include an operation in which the first electronic device 10 and the second electronic device 20 exchange characteristics. The characteristics may be the characteristics of the first electronic device 10 or the characteristics of the second electronic device 20. In various embodiments of the present disclosure, the operation in which the first electronic device 10 and the second electronic device 20 perform the negotiation and signalling may include an operation in which the first electronic device 10 transfers distance measurement-related parameters to the second electronic device 20. The distance measurement-related parameters may contain at least one of a cycle of a distance measurement, an offset for the distance measurement, a number of available speakers/microphones, the required measurement accuracy, the required distance measurement lead time, the recording time of a sound wave, identifier information of the first electronic device 10, or a generating scheme of a sound wave.

For example, the first electronic device 10 may exchange, with the second electronic device 20, information that informs of supportable measuring methods and information that indicates a measuring method to be used for the distance measurement. In the embodiment of FIG. 4A, the first electronic device 10 may select a measuring method using a sound wave. The first electronic device 10 may transmit, to the second electronic device 20, ID information on the first sound wave that is to be transmitted the second electronic device 20. The second electronic device 20 may transmit, to the first electronic device 10, ID information on the second sound wave that is to be transmitted to the first electronic device 10. The ID information may contain at least one of the duration of the sound wave, the pitch of sound constituting the sound wave, the loudness of sound, or a pattern of the sound wave.

In addition, the distance measurement-related parameters may contain information on the required measurement accuracy. The information on the required measurement accuracy may represent the accuracy of the measurement (for example, an error of less than 10 cm) that is required by the distance measurement scenario, and may affect the complexity. For example, as described in FIG. 3, the first electronic device 10 may record sound waves that are detected by the microphone included in the first electronic device 10. The electronic device may create audio data by recording the sound waves. The first electronic device 10 may record the first sound wave and the second sound wave upon the receipt of the same. At this time, the audio data may contain the first sound wave and the second sound wave. The first electronic device 10 may identify the timing of when the first sound wave is recorded and the timing of when the second sound wave is recorded from the audio data. For example, the first electronic device 10 may determine the recording timing of the first sound wave based on positions of audio samples representing the first sound wave and a sampling rate of the audio data. The first electronic device 10 may determine a detection rate for the audio samples that are related to the required measurement accuracy. For example, when the first electronic device 10 receives the first sound wave or the second sound wave, the first electronic device 10 may detect all of the audio samples that are currently recorded. In this case, since the first electronic device 10 can accurately recognize the timing of when the first sound wave or the second sound wave is received, it is possible to obtain the highest measurement accuracy, and an error of the distance measured between the first electronic device 10 and the second electronic device 20 may be determined to be equal to, or less than, 10 cm.

As another example, when receiving the first sound wave or the second sound wave, the first electronic device 10 may detect the audio samples for every 60th sample among the audio samples that are currently recorded. In the case where the first electronic device 10 does not reach the cycle of detecting the audio samples, even though the first sound wave or the second sound wave has already been received, the first electronic device 10 recognizes, as the reception timing of the first sound wave or the second sound wave, the detection timing of the audio data that comes first after the first sound wave or the second sound wave is received. Therefore, there may be a difference between the timing of when the first sound wave or the second sound wave arrives and the arrival timing that the first electronic device 10 recognizes. In this case, the first electronic device 10 may obtain a relatively low measurement accuracy. According to various embodiments of the present disclosure, the error of the distance measured between the first electronic device 10 and the second electronic device 20 may be determined to be equal to, or less than, 1 m.

The first electronic device 10 may start to detect the first sound wave or the second sound wave from the timing of when the microphone is activated or from the timing of when the specific number of audio samples is detected. In some cases, the first electronic device 10 may be configured to detect some audio data according to a specific sampling rate instead of detecting all of the audio data that is currently recorded. In this case, an electronic device that has no large storage space may detect the sound waves.

The first electronic device 10 may determine the distance between the first electronic device 10 and the second electronic device 20 based on the first value $D_1$ and the second value $D_2$. Referring to FIG. 4A, in operation 100, the first electronic device 10 may perform the negotiation with the second electronic device 20 for the second value $D_2$. The second value may be a value corresponding to the difference between the timing of when the second electronic device 20 receives the first sound wave that is output from the first electronic device 10 and the timing of when the second electronic device 20 receives the second sound wave. The first electronic device 10 may determine the distance between the first electronic device 10 and the second electronic device 20 by sharing the second value with the second electronic device 20. By sharing the second value with the second electronic device 20, even though the first electronic device 10 does not receive the second value from the second electronic device 20, the first electronic device 10 may determine the distance between the first electronic device 10 and the second electronic device 20. The first electronic device 10 may share the second value with the second electronic device 20 in a variety of ways.

For example, the first electronic device 10 may randomly configure the second value. The first electronic device 10 may transmit, to the second electronic device 20, the second value that is randomly configured. The second electronic device 20 may receive the first sound wave from the first electronic device 10, and may initiate an output of the second sound wave after the elapse of time corresponding to the second value. As another example, the second electronic device 20 may randomly configure the second value. The second electronic device 20 may transmit, to the first electronic device 10, the second value that is randomly configured. The second electronic device 20 may receive the first sound wave from the first electronic device 10, and may initiate an output of the second sound wave after the elapse of time corresponding to the second value.

As another example, the first electronic device 10 may determine the second value based on information that is related to the first electronic device 10 and the second electronic device 20. The information may be at least one of the characteristics of the first electronic device 10, the characteristics of the second electronic device 20, a distance measurement type between the first electronic device 10 and the second electronic device 20, or a distance measurement scenario. As another example, the first electronic device 10 may determine a certain value to be the second value. The second electronic device 20 may pre-recognize the certain value before performing the negotiation and signalling with the first electronic device 10. For example, the first electronic device 10 and the second electronic device 20 may determine the certain value to be the second value $D_2$ before the negotiation and signalling for the distance measurement. The second value $D_2$ may be a value that is predefined in common.

As another example, the first electronic device 10 may determine the second value in accordance with the execution of an application that is installed in the first electronic device. The application may determine the second value according to a specified rule. The specified rule may contain the characteristics of the first electronic device 10 or the characteristics of the second electronic device 20. As another example, the first electronic device 10 may determine the second value depending on the current temperature. Since the medium of a sound wave is the air, and since the transmission speed of a sound wave is dependent on the temperature, the first electronic device 10 may determine the second value to be an appropriate value according to the current temperature. As another example, the first electronic device 10 may determine the second value according to the current position. When the sound wave encounters an obstacle when travelling, it can go around the obstacle due to the nature of diffraction. Since the diffraction effect of the sound wave changes the travel path of the sound wave, a measurement error may occur. Considering such an error, the first electronic device 10 may determine the second value to be an appropriate value according to the current position.

After the negotiation and signalling operation 100, the first electronic device 10 and the second electronic device 20 may perform the distance measurement in operation 200. The first electronic device 10 may activate the first microphone 11 and the first speaker 13, which are included in the first electronic device 10, for a certain period of time prior to operation 100. In addition, after a message for the negotiation is received from the first electronic device 10, the second electronic device 20 may activate the second microphone 21 and the second speaker 23, which are included in the second electronic device 20, for a certain period of time. In addition, in response to the activation of the first microphone 11 for a certain period of time, the first recording device (not shown in FIG. 4A) included in the first electronic device 10 may be activated for the certain period of time. According to this, the first electronic device 10 may record sound waves that are received through the first microphone 11 for the certain period of time.

The first speaker 13 included in the first electronic device 10 may output the first sound wave. The first microphone 11 included in the first electronic device 10 may receive the first sound wave. In this case, the first electronic device 10 may identify the timing $T_1$ of when the first sound wave is received through the audio data that is recorded by the first recording device. In addition, the difference between the timing of when the first sound wave is output through the first speaker 13 and the timing $T_1$ may be referred to as $R_3$. $R_3$ may refer to a propagation delay of the sound wave between the first speaker 13 and the first microphone 11. The first electronic device 10 may determine the value $R_3$ based on the distance between the first speaker 13 and the first microphone 11 and the transmission speed of a sound wave ($V_s$, 340 m/s). More specifically, the first electronic device 10 may determine the value $R_3$ by dividing the distance value between the first speaker 13 and the first microphone 11 by the transmission speed (340 m/s) of a sound wave. Here, the distance value between the first speaker 13 and the first microphone 11 may be determined to be a fixed value, according to various embodiments. In addition, since the transmission speed of a sound wave is a constant value, the first electronic device 10 may recognize the value $R_3$ as a predefined value.

The first microphone 11 may receive the second sound wave that is output from the second speaker 23. In this case, the first electronic device 10 may identify the timing $T_3$ of when the second sound wave is received through the first recording device. According to this, the first electronic device 10 may determine the first value $D_1$ corresponding to the difference between the timing of when the first electronic device 10 outputs the first sound wave and the timing $T_3$ of when the first electronic device 10 receives the second sound wave that is output from the second electronic device 20. More specifically, the first electronic device 10 may determine the first value $D_1$ to be a value obtained by adding, to the value $R_3$, the difference value between the value $T_3$ and the value $T_1$.

The difference between the first value $D_1$ and the second value $D_2$ may correspond to an RTT value of the sound wave between the first electronic device 10 and the second electronic device 20. Generally, in the case where one of two devices transmits the first signal and the other device transmits the second signal immediately after receiving the first signal, the RTT may mean the difference between the transmission timing of the first signal and the reception timing of the second signal, which are measured by the one device. The second electronic device 20 cannot output the second sound wave without a delay after receiving the first sound wave. Therefore, the first electronic device 10 may determine the RTT value by subtracting the second value $D_2$ from the first value $D_1$. At this time, the second value may be a positive value.

The first electronic device 10 may determine a difference value between the first value, which has been directly determined by the first electronic device 10, and the second value. The first electronic device 10 may determine the second value without receiving the same from the second electronic device 20. The first electronic device 10 may determine the distance value between the first electronic device 10 and the second electronic device 20 by multiplying the difference value and the transmission speed (340 m/s) of a sound wave. For example, the first electronic device 10 may determine the first value to be 300 μs (microseconds). The first electronic device 10 may determine the second value to be 100 μs. In this case, the distance between the first electronic device 10 and the second electronic device 20 may be determined by multiplying '(300−100)/2=100 (μs)' and 340 m/s. For example, the distance between the first electronic device 10 and the second electronic device 20 may be 0.034 m (3.4 cm).

Unlike FIG. 4B, which will be described below, in FIG. 4A, the first electronic device 10 and the second electronic device 20 may not need to share the measurement result. The first electronic device 10 may determine the second value even without receiving the second value $D_2$ from the second electronic device 20.

Figure 4B:
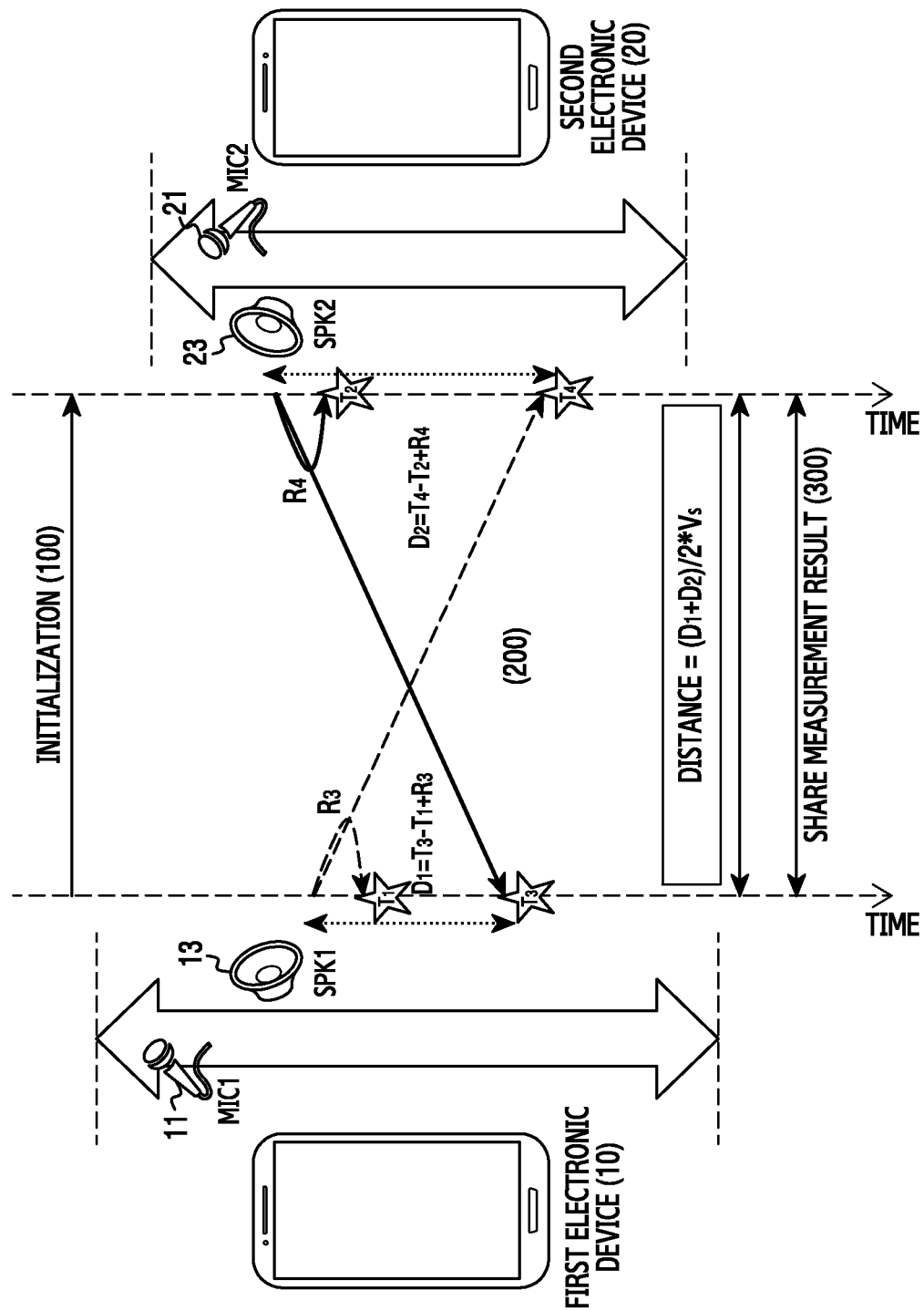
FIG. 4B illustrates a distance measuring method by using feedback according to various embodiments of the present disclosure.

FIG. 4B illustrates a distance measuring method by using feedback according to various embodiments of the present disclosure. FIG. 4B illustrates sound waves that are transmitted and received between the first electronic device 10 and the second electronic device 20.

Referring to FIG. 4B, the first electronic device 10 may include the first microphone (MIC1) 11 and the first speaker (SPK1) 13. The second electronic device 20 may include the second microphone (MIC2) 21 and the second speaker (SPK2) 23. The first electronic device 10 of FIG. 4B may have a similar configuration as the first electronic device 10 of FIG. 4A. The second electronic device 20 of FIG. 4B may have a similar configuration as the second electronic device 20 of FIG. 4A.

Referring to FIG. 4B, in operation 100, the first electronic device 10 and the second electronic device 20 may perform the initialization. The first electronic device 10 and the second electronic device 20 may perform the negotiation for the distance measurement by performing the signalling. The operation of the first electronic device 10 and the second electronic device 20 in FIG. 4B may correspond to the operation of the first electronic device 10 and the second electronic device 20 in FIG. 4A. However, the first electronic device 10 and the second electronic device 20 do not perform the exchange or negotiation operation for the second value $D_2$ in operation 100 of FIG. 4B. Instead, the first electronic device 10 and the second electronic device 20 of FIG. 4B may exchange and share the second value $D_2$ in the operation described below.

After the negotiation and signalling operation 100, the first electronic device 10 and the second electronic device 20 may perform the distance measurement in operation 200. The first electronic device 10 may activate the first microphone 11 and the first speaker 13, respectively, which are included in the first electronic device 10, for a certain period of time prior to operation 100. In addition, after a message for the negotiation is received from the first electronic device 10, the second electronic device 20 may activate the second microphone 21 and the second speaker 23, respectively, which are included in the second electronic device 20, for a certain period of time. In addition, in response to the activation of the first microphone 11 for the certain period of time, the first recording device (not shown in FIG. 4B) included in the first electronic device 10 may be activated for the certain period of time. According to this, the first electronic device 10 may record sound waves that are received through the first microphone 11 for the certain period of time. Similarly, in response to the activation of the second microphone 21 for the certain period of time, the second recording device (not shown in FIG. 4B) included in the second electronic device 20 may be activated for the certain period of time. According to this, the second electronic device 20 may record sound waves that are received through the second microphone 21 for the certain period of time.

The first electronic device 10 may determine a value $R_3$ in the same manner as the first electronic device 10 of FIG. 4A. The value $R_3$ may correspond to the time difference between the timing of when the first electronic device 10 outputs the first sound wave and the value $T_1$. The first electronic device 10 may recognize the value $R_3$ as a predefined value.

The second speaker 23 included in the second electronic device 20 may output the second sound wave. The second microphone 21 included in the second electronic device 20 may receive the second sound wave. In this case, the second electronic device 20 may identify the timing $T_2$ of when the second sound wave is received through the audio data that is recorded by the second recording device.

In addition, the difference between the timing of when the second sound wave is output through the second speaker 23 and the timing $T_2$ may be referred to as $R_4$. $R_4$ may refer to a propagation delay of the sound wave between the second speaker 23 and the second microphone 21. The second electronic device 20 may determine the value $R_4$ based on the distance between the second speaker 23 and the second microphone 21 and the transmission speed (340 m/s) of a sound wave. More specifically, the second electronic device 20 may determine the value $R_4$ by dividing the distance value between the second speaker 23 and the second microphone 21 by the transmission speed (340 m/s) of a sound wave. The distance value between the second speaker 23 and the second microphone 21 may be determined to be a fixed value, according to various embodiments. Since the transmission speed of a sound wave is a constant value, the second electronic device 20 may recognize the value $R_4$ as a predefined value.

The first microphone 11 may receive the second sound wave that is output from the second speaker 23. In this case, the first electronic device 10 may identify the timing $T_3$ of when the second sound wave is received through the first recording device. Similarly, the second microphone 21 may receive the first sound wave that is output from the first speaker 13. In this case, the second electronic device 20 may identify the timing $T_4$ of when the first sound wave is received through the second recording device. According to this, the first electronic device 10 may determine the first value $D_1$ corresponding to the difference between the timing of when the first electronic device 10 outputs the first sound wave and the timing $T_3$ of when the first electronic device receives the second sound wave that is output from the second electronic device 20. More specifically, the first value may be determined to be a value obtained by adding, to the value $R_3$, a difference value between the value $T_3$ and the value $T_1$.

In addition, the second electronic device 20 may determine the second value $D_2$ corresponding to the difference between the timing of when the second electronic device 20 outputs the second sound wave and the timing $T_4$ of when the second electronic device receives the first sound wave that is output from the first electronic device 10. More specifically, the second electronic device 20 may determine the second value $D_2$ to be a value obtained by adding, to the value $R_4$, a difference value between the value $T_4$ and the value $T_2$.

The sum of the first value $D_1$ and the second value $D_2$ may correspond to an RTT value of the sound wave between the first electronic device 10 and the second electronic device 20. Generally, in the case where one of two devices transmits the first signal and the other device transmits the second signal immediately after receiving the first signal, the RTT may be defined to be the difference between the transmission timing of the first signal and the reception timing of the second signal, which are measured by the one device. In the case of FIG. 4B, since the second sound wave is not transmitted after receiving the first sound wave, the first value, which corresponds to the difference between the transmission timing of the first sound wave and the reception timing of the second sound wave in the first electronic device 10, is different from the RTT. However, compared to a general RTT measurement environment, the second sound wave is transmitted in advance by the second value, which is the difference between the transmission timing of the second sound wave and the reception timing of the first sound wave in the second electronic device 20. Therefore, if the first value is compensated for by the second value (that is, if the first value and the second value are summated), the first electronic device 10 may obtain an RTT value of the sound wave. The first electronic device 10 may obtain the difference between the transmission timing of the first sound wave and the reception timing of the second sound wave in the first electronic device 10 (i.e., the same value as the RTT of the sound wave) on the assumption that the second electronic device 20 transmits the second sound wave immediately after receiving the first sound wave.

In addition, unlike FIG. 4B, in the case where the second electronic device 20 outputs the second sound wave after receiving the first sound wave from the first electronic device 10, the first electronic device 10 and the second electronic device 20 may determine the RTT value of the sound wave in the same manner as FIG. 4A, even in the case of using feedback. At this time, the second value may be a positive value.

In operation 300, the first electronic device 10 and the second electronic device 20 may share the measurement result. The first electronic device 10 may transmit the first value to the second electronic device 20. The second electronic device 20 may transmit the second value to the first electronic device 10. As a result, the first electronic device 10 may determine an average value of the first value, which is directly determined by the first electronic device 10 and the second value that is received from the second electronic device 20, and then may determine a distance value between the first electronic device 10 and the second electronic device 20 by multiplying the average value and the transmission speed (340 m/s) of a sound wave. Similarly, the second electronic device 20 may determine an average value of the second value, which is directly determined by the second electronic device 20, and the first value that is received from the first electronic device 10, and then may determine a distance value between the first electronic device 10 and the second electronic device 20 by multiplying the average value and the transmission speed (340 m/s) of a sound wave. For example, the first electronic device 10 may determine the first value to be 300 μs. The first electronic device 10 may receive a message that contains the second value from the second electronic device 20. The second value may be determined to be 100 μs. In this case, the distance between the first electronic device 10 and the second electronic device 20 may be determined by multiplying '(300+100)/2=200 (μs)' by 340 m/s. For example, the distance between the first electronic device 10 and the second electronic device 20 may be 0.068 m (6.8 cm).

Although FIG. 4B shows that the second electronic device 20 outputs the second sound wave before receiving the first sound wave from the first electronic device, the present disclosure is not limited thereto. For example, even when using feedback, in the case of where the second electronic device 20 outputs the second sound wave after receiving the first sound wave from the first electronic device, the second electronic device 20 may determine the distance with respect to the first electronic device in the same manner as the description above. In this case, the second value corresponding to the difference between the output timing of the second sound wave and the reception timing of the first sound wave may be a negative value.

In the embodiment shown in FIGS. 4A and 4B, the first electronic device 10 and the second electronic device 20 may determine the reception timings of the first sound wave and second sound wave based on the recorded audio data. However, according to another embodiment of the present disclosure, the first electronic device 10 and the second electronic device 20 may determine the reception timings of the first sound wave and second sound wave without the recording. For example, the first electronic device 10 may record the reception timing of the first sound wave by the first microphone 11 included in the first electronic device 10 and the reception timing of the second sound wave by the first microphone 11 without the first recording device in order to thereby determine $T_1$. Similarly, the second electronic device 20 may record the reception timing of the second sound wave by the second microphone 21 included in the second electronic device 20 and the reception timing of the first sound wave by the second microphone 21 without the second recording device in order to thereby determine $T_1$.

Figure 5A:
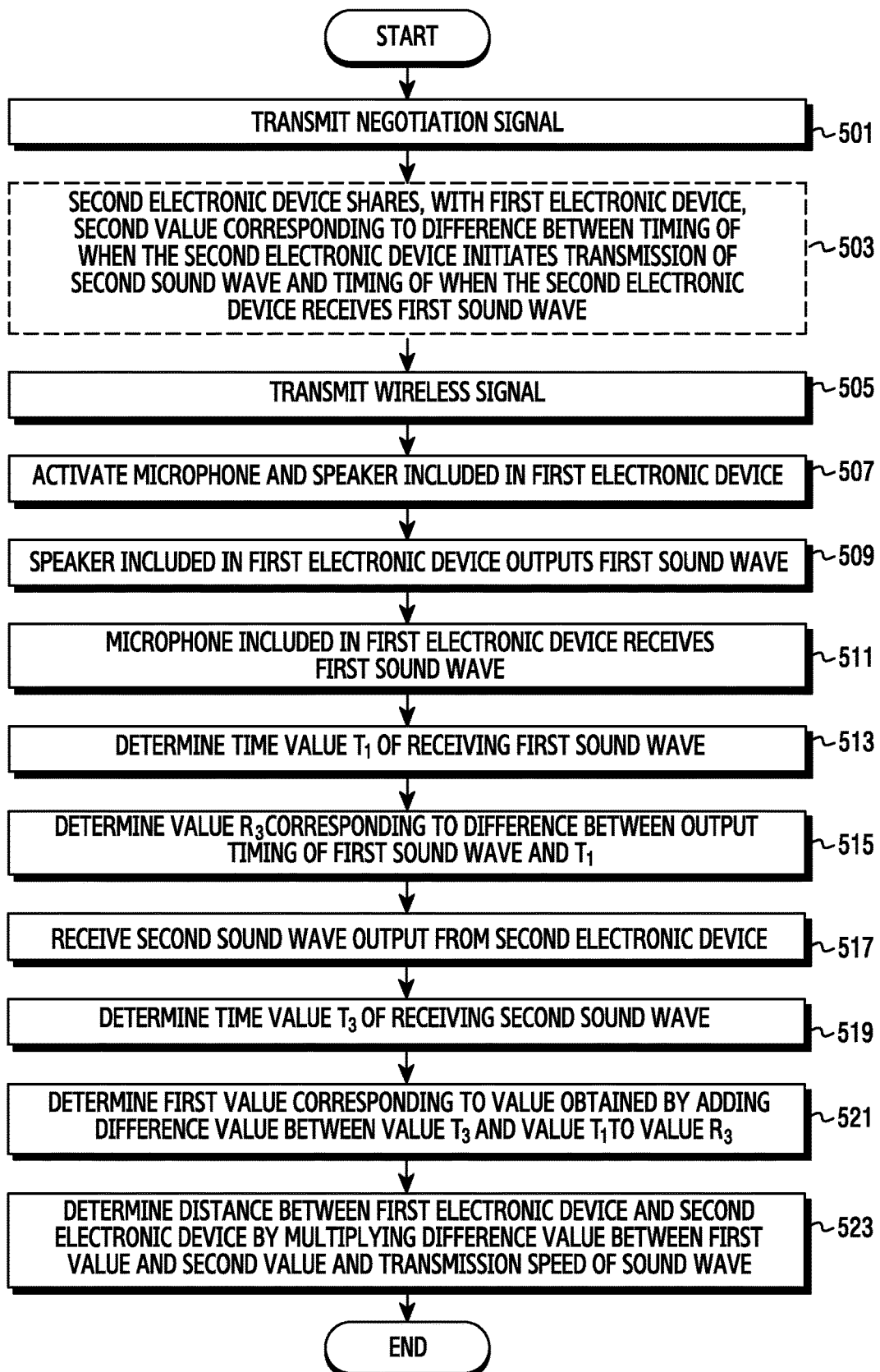
FIG. 5A is a flowchart illustrating a distance-measuring operation of a first electronic device without using feedback according to various embodiments of the present disclosure.

FIG. 5A is a flowchart illustrating a distance-measuring operation of a first electronic device without using feedback according to various embodiments of the present disclosure. The first electronic device may be the first electronic device 10 of FIG. 4A.

Referring to FIG. 5A, in operation 501, the first electronic device 10 may transmit a negotiation signal to the second electronic device 20. The negotiation signal may contain distance measurement-related parameters. The distance measurement-related parameters may contain information on the required measurement accuracy. As described above with respect to FIGS. 4A and 4B, the information on the required measurement accuracy may be determined in advance by adjusting the sampling rate for the detection of the sound wave. The first electronic device 10 may configure a connection with the second electronic device 20 based on the negotiation information contained in the negotiation signal.

In operation 503, the first electronic device 10 may share the second value with the second electronic device 20. The second value may be a value corresponding to the difference between the timing of initiating the transmission of the second sound wave and the reception timing of the first sound wave in the second electronic device 20. The first electronic device 10 may share the second value with the second electronic device 20 in various ways. For example, the first electronic device 10 may configure the second value randomly. After configuring the second value randomly, the first electronic device 10 may transmit the second value to the second electronic device 20. As another embodiment of the present disclosure, the second electronic device 20 may configure the second value randomly. After configuring the second value randomly, the second electronic device 20 may transmit the second value to the first electronic device 10. For example, the first electronic device 10 may receive, from the second electronic device 20, the second value that has been randomly configured. As another embodiment of the present disclosure, the first electronic device 10 may determine the second value, according to a specified rule, with the second electronic device 20. The specified rule may contain at least one of the parameters related to the distance measurement, the characteristics of the first electronic device 10, or the characteristics of the second electronic device 20. As another example, the first electronic device 10 may determine the second value according to a specified value. The second electronic device 20 may have the specified value before performing the negotiation and signalling with the first electronic device 10. For example, the first electronic device 10 and the second electronic device 20 may determine the specified value to be the second value prior to the execution of the negotiation and signalling. In this case, the sharing operation, as in operation 503, may not be necessary.

In operation 505, the first electronic device 10 may transmit a wireless signal to the second electronic device 20. The wireless signal may be transmitted or received in order to activate the microphone and speaker included in the first electronic device 10 and the second electronic device 20.

In operation 507, the first electronic device 10 may activate the first microphone 11 and the first speaker 13 included in the first electronic device 10 immediately after transmitting the wireless signal. In operation 509, the first speaker 13 included in the first electronic device 10 may output the first sound wave. The first electronic device 10 may include the first speaker 13 or the first microphone 11.

In operation 511, the first microphone 11 included in the first electronic device 10 may receive the first sound wave. The first sound wave that is output from the speaker in the electronic device may be received by the microphone in the same electronic device.

In operation 513, the first electronic device 10 may determine the time value $T_1$ of when the first sound wave is received. The first electronic device 10 may determine the value $T_1$ through the first recording device that records sound waves received through the first microphone 11. The first electronic device 10 may include the first recording device.

In operation 515, the first electronic device 10 may determine the value $R_3$ corresponding to the difference between the output timing of the first sound wave and $T_1$. The value $R_3$ may be determined based on the distance between the first speaker 13 and the first microphone 11, and based on the transmission speed (340 m/s) of a sound wave. More specifically, the first electronic device 10 may determine the value $R_3$ to be a value obtained by dividing the distance value between the first speaker 13 and the first microphone 11 by the transmission speed (340 m/s) of a sound wave. The distance value may be determined to be a fixed value, according to the embodiment of the present disclosure. In addition, since the transmission speed of a sound wave is a constant value, the first electronic device 10 may recognize the value $R_3$ as a predefined value.

In operation 517, the first electronic device 10 may receive the second sound wave that is output from the second electronic device 20. More specifically, the first microphone 11 included in the first electronic device 10 may receive the second sound wave.

In operation 519, the first electronic device 10 may determine the time value $T_3$ of when the second sound wave is received. The first electronic device 10 may determine the time value $T_3$ through the first recording device that is included in the first electronic device 10 and records the sound waves that are received through the first microphone 11.

In operation 521, the first electronic device 10 may determine the first value corresponding to a value obtained by adding the difference value between the value $T_3$ and the value $T_1$ to the value $R_3$. The value $T_3$ and the value $T_1$ have been determined in operations 567 and 561, respectively.

In operation 523, the first electronic device 10 may determine the distance between the first electronic device 10 and the second electronic device 20 by multiplying the difference value between the first value and the second value by the transmission speed of a sound wave. It is assumed that the second electronic device 20 outputs the second sound wave after receiving the first sound wave because the first electronic device 10 does not use feedback. In this case, since the output timing of the second sound wave is subtracted by the output timing of the first sound wave, the second electronic device 20 may determine the second value to be a positive value. The second electronic device 20 may determine the second value to be a negative value by subtracting the output timing of the second sound wave from the output timing of the first sound wave. If the second value is positive, the second electronic device 20 may determine the difference value between the first value and the second value. If the second value is negative, the second electronic device 20 may determine an average value of the first value and the second value. In order to distinguish the present embodiment from that of FIG. 5B, the description will be made based on the difference value in the case of not using feedback. For example, it is assumed that the second value is a positive value in the case of not using feedback.

The first electronic device 10 may determine the difference value between the first value and the second value by using the average time for which the first sound wave transmitted from the first electronic device 10 reaches the second electronic device 20, or by using the average time for which the second sound wave transmitted from the second electronic device 20 reaches the first electronic device 10. The first electronic device 10 may determine the distance value between the first electronic device 10 and the second electronic device 20 to be the product of the difference value and the transmission speed of a sound wave.

Although it is not shown in FIG. 5A, the first electronic device 10 may share the measurement result with the second electronic device 20. The first electronic device 10 may transmit the distance value between the first electronic device 10 and the second electronic device 20 to the second electronic device 20. The first electronic device 10 may transmit, to the second electronic device 20, the first value that the first electronic device 10 has measured. In this case, since the second electronic device recognizes the second value, the second electronic device 20 may calculate the distance value between the first electronic device 10 and the second electronic device 20 based on the first value and the second value.

Figure 5B:
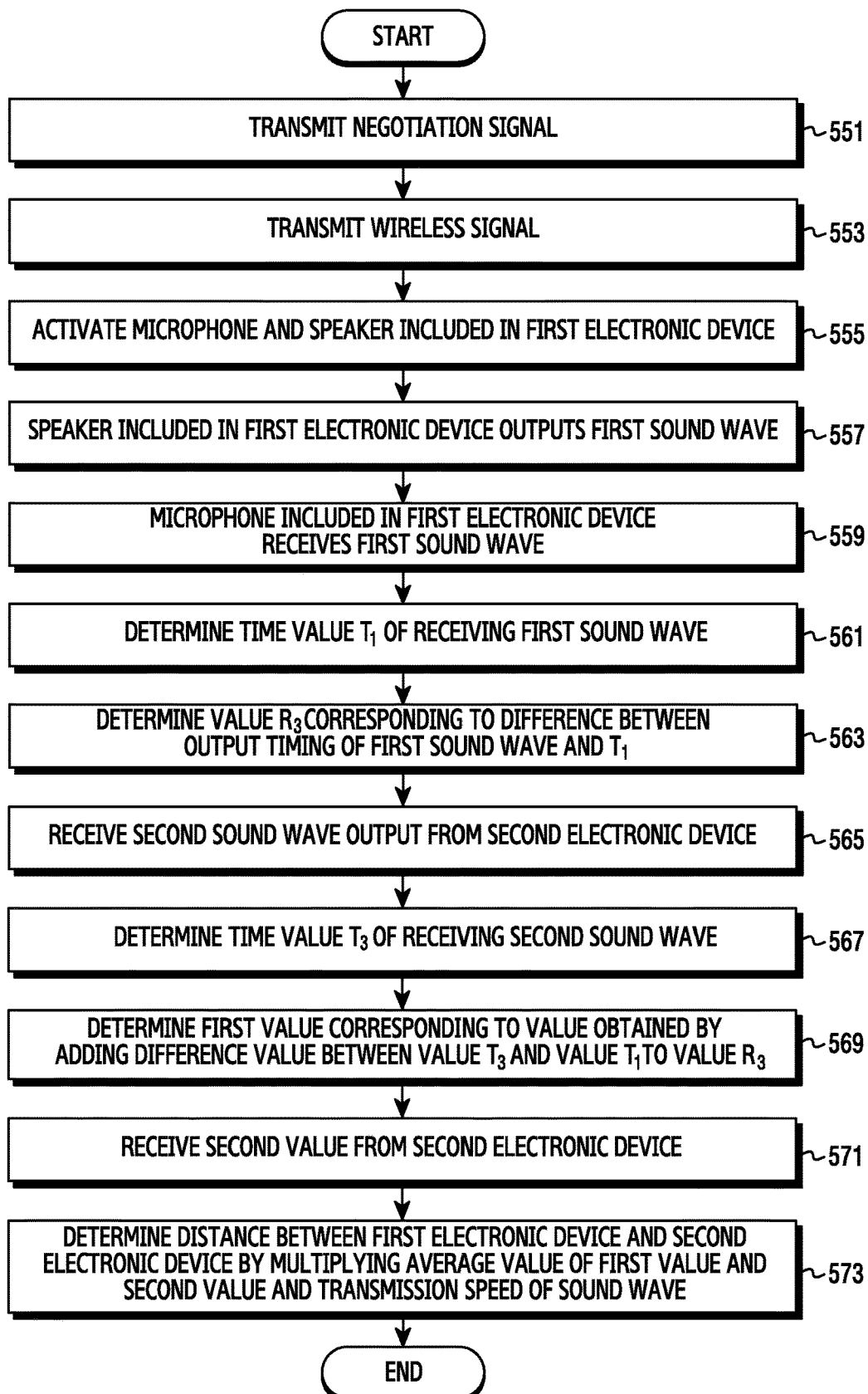
FIG. 5B is a flowchart illustrating a distance-measuring operation of a first electronic device by using feedback according to various embodiments of the present disclosure.

FIG. 5B is a flowchart illustrating a distance-measuring operation of a first electronic device by using feedback according to various embodiments of the present disclosure. The first electronic device may be the first electronic device 10 of FIG. 4B.

Some of the operations in FIG. 5B are performed in the same manner as the operations in FIG. 5A. Operations 551, 553, 555, 557, 559, 561, 563, 565, 567, and 569 are performed in the same manner as operations 501, 505, 507, 509, 511, 513, 515, 517, 519, and 521 of FIG. 5A, respectively.

Referring to FIG. 5B, in operation 571, the first electronic device 10 may receive the second value from the second electronic device 20. The second value may be determined by the second electronic device 20. This may be determined in the same manner as operations 551 to 569 for determining the first value in the first electronic device 10, as described above (that is, operations 501, and 505 to 521 for determining the first value in FIG. 5A). The first electronic device 10 may determine an RTT value of the sound wave by receiving the second value that is fed back from the second electronic device 20. Unlike FIG. 5A, since the first electronic device 10 does not share the second value with the second electronic device 20 until receiving the second value, feedback procedure may be necessarily required.

In operation 573, the first electronic device 10 may determine the distance between the first electronic device 10 and the second electronic device 20 by multiplying the average value of the first value and the second value by the transmission speed of a sound wave. In the case where the second electronic device 20 receives the first sound wave after outputting the second sound wave, the second value may be a positive value. Since the reception timing of the first sound wave is subtracted by the output timing of second sound wave, the second electronic device 20 may determine the second value to be a positive value. However, in the case where the second electronic device 20 transmits the second sound wave after receiving the first sound wave, the second value may be a negative value. Since the reception timing of the first sound wave is subtracted by the transmission timing of the second sound wave, the second electronic device 20 may determine the second value to be a negative value.

The first electronic device 10 may determine the average value of the first value and the second value by using the average time for which the first sound wave transmitted from the first electronic device 10 reaches the second electronic device 20, or by using the average time for which the second sound wave transmitted from the second electronic device 20 reaches the first electronic device 10. The first electronic device 10 may determine the distance value between the first electronic device 10 and the second electronic device 20 to be the product of the average value and the transmission speed of a sound wave.

Figure 6A:
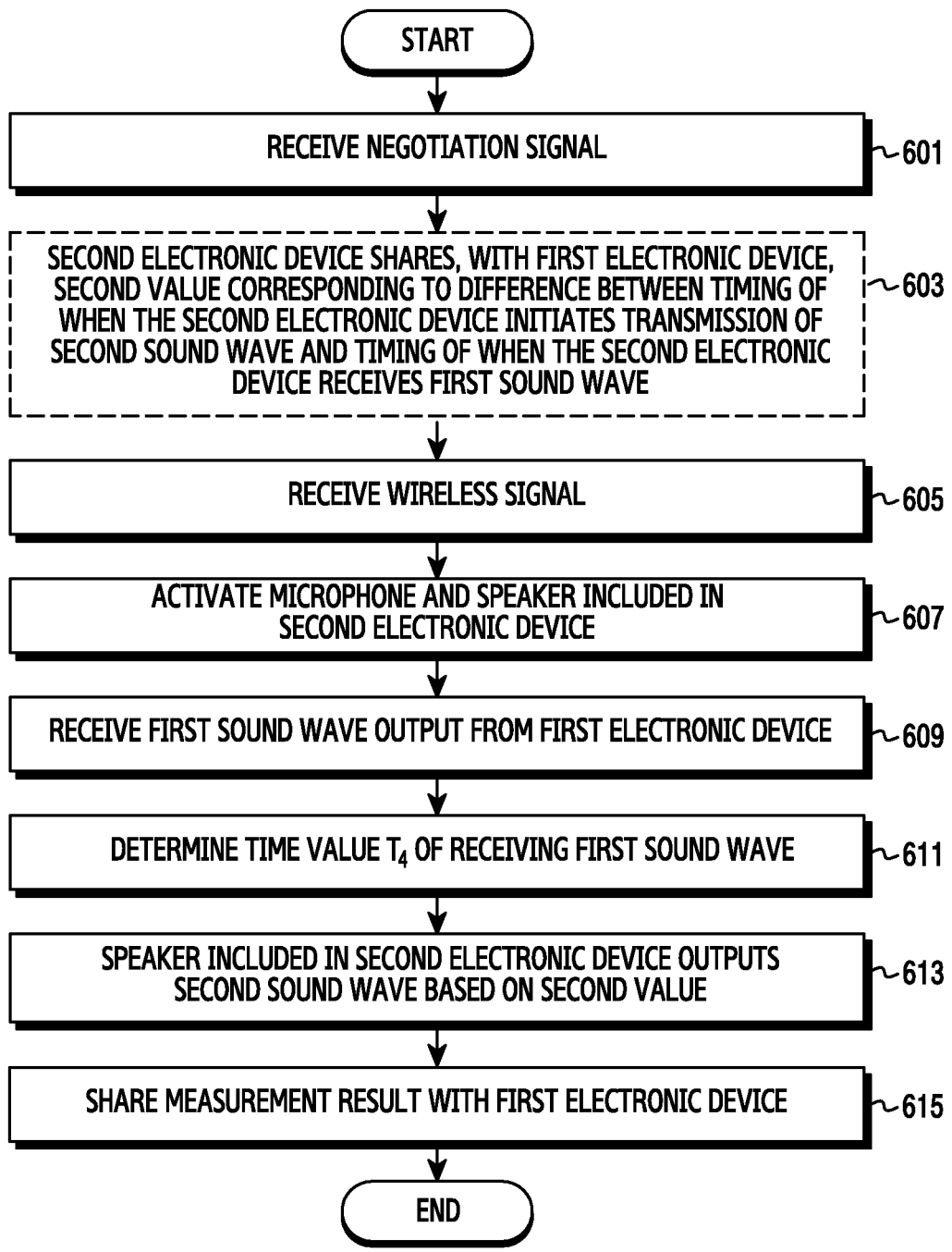
FIG. 6A is a flowchart illustrating a distance-measuring operation of a second electronic device without using feedback according to various embodiments of the present disclosure.

FIG. 6A is a flowchart illustrating a distance-measuring operation without using feedback in a second electronic device according to various embodiments of the present disclosure. The second electronic device may be the second electronic device 20 of FIG. 4A.

Referring to FIG. 6A, in operation 601, the second electronic device 20 may receive the negotiation signal from the first electronic device 10. The negotiation signal may contain distance measurement-related parameters, and the distance measurement-related parameters may contain information on the required measurement accuracy. As described above with respect to FIG. 4A, the information on the required measurement accuracy may be determined in advance by adjusting a sampling rate for the detection of the sound wave. The connection between the first electronic device 10 and the second electronic device 20 may be established based on the negotiation information contained in the negotiation signal.

In operation 603, the second electronic device 20 may share the second value with the first electronic device 10. The second value may be a value corresponding to the difference between the timing of initiating the transmission of the second sound wave and the reception timing of the first sound wave in the second electronic device 20. The second electronic device 20 may share the second value with the first electronic device 10 in a variety of ways. For example, the second electronic device 20 may transmit the second value to the first electronic device 10, or may receive the second value from the first electronic device 10. As another example, the second electronic device 20 may determine the second value according to a predefined rule, or may determine the second value to be a specified value. The detailed operations of the various methods have been described in operation 503 of FIG. 5A above.

In operation 605, the second electronic device 20 may receive a wireless signal from the first electronic device 10. The wireless signal may be transmitted or received in order to activate the microphone and the speaker included in the first electronic device 10 and the second electronic device 20.

In operation 607, the second electronic device 20 may activate the second microphone 21 and the second speaker 23 included in the second electronic device 20 immediately after receiving the wireless signal.

In operation 609, the second electronic device 20 may receive the first sound wave that is output from the first electronic device 10. More specifically, the second microphone 21 included in the second electronic device 20 may receive the first sound wave.

In operation 611, the second electronic device 20 may determine the time value $T_4$ of receiving the first sound wave. The second electronic device 20 may determine the time value $T_4$ through the second recording device that records the sound waves received through the second microphone 21. The second electronic device 20 may include the second recording device.

In operation 613, the second electronic device 20 may output the second sound wave based on the second value. The second electronic device 20 may receive the first sound wave in operation 609, and may output the second sound wave after the elapse of time corresponding to the second value. More specifically, the second speaker 23 included in the second electronic device 20 may output the second sound wave.

In operation 615, the second electronic device 20 may share the measurement result with the first electronic device 10. In the case of not using feedback, the second electronic device 20 cannot determine the distance between the first electronic device 10 and the second electronic device 20. Since the second electronic device 20 does not recognize the first value, the distance between the first electronic device 10 and the second electronic device 20 cannot be determined. The first value may correspond to the difference value between the timing of when the first electronic device 10 outputs the first sound wave and the timing of when the first electronic device 10 receives the second sound wave. Accordingly, the second electronic device 20 may receive the measurement result from the first electronic device 10. The measurement result may be the distance between the first electronic device 10 and the second electronic device 20, which has been determined by the first electronic device 10. Alternatively, the measurement result may be the first value that has been determined by the first electronic device. If the measurement result is the first value, the second electronic device 20 may calculate the distance between the first electronic device 10 and the second electronic device 20 based on the first value.

Figure 6B:
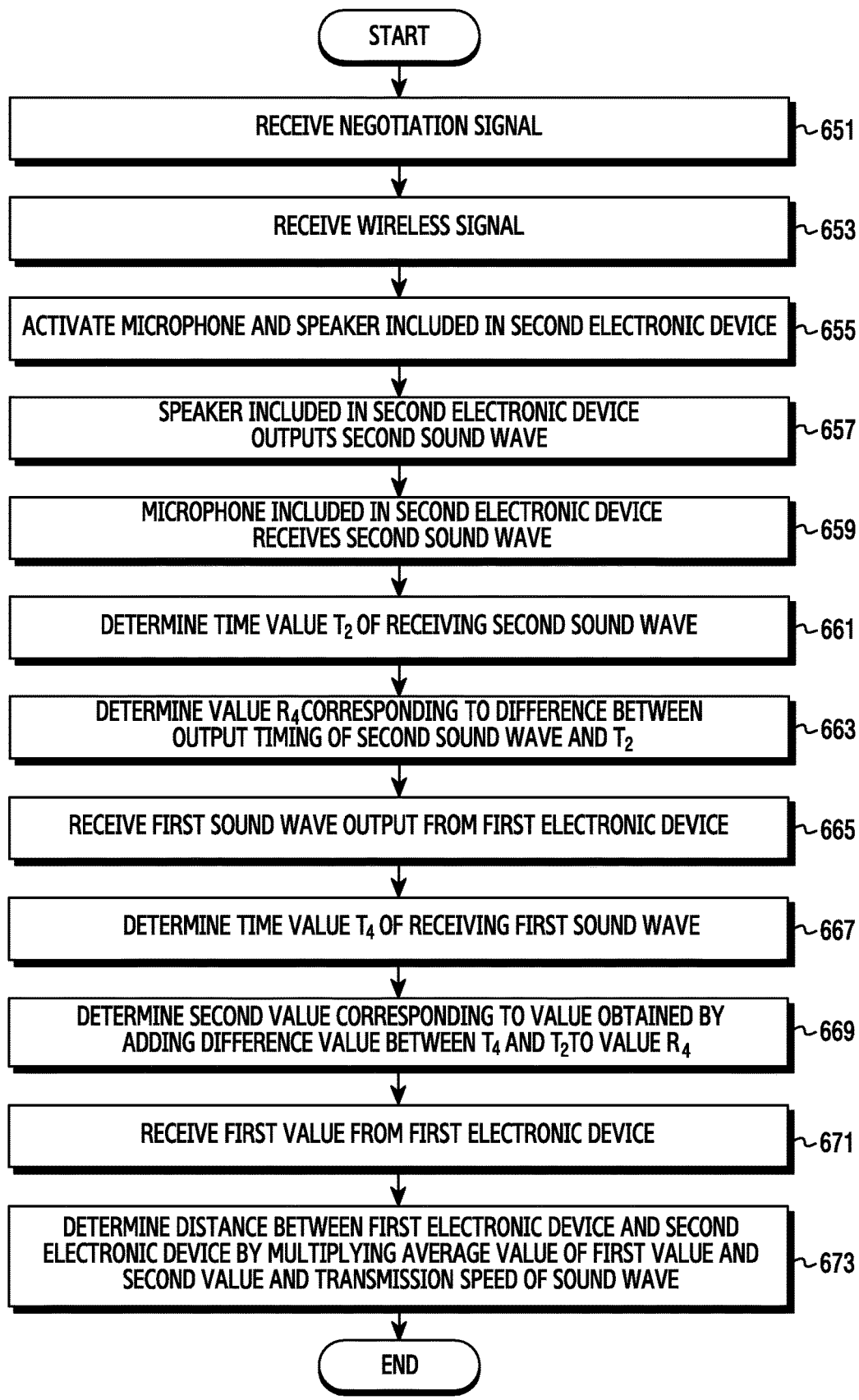
FIG. 6B is a flowchart illustrating a distance-measuring operation of a second electronic device by using feedback according to various embodiments of the present disclosure.

FIG. 6B is a flowchart illustrating a distance-measuring operation by using feedback in a second electronic device according to various embodiments of the present disclosure. The second electronic device may be the second electronic device 20 of FIG. 4B.

Referring to FIG. 6B, in operation 651, the second electronic device 20 may receive a negotiation signal from the first electronic device 10. Operation 651 may be performed in the same manner as operation 601 of FIG. 6A.

In operation 653, the second electronic device 20 may receive a wireless signal from the first electronic device 10. Operation 653 may be performed in the same manner as operation 605 of FIG. 6A.

In operation 655, the second electronic device 20 may activate the second microphone 21 and the second speaker 23 included in the second electronic device 20 immediately after receiving the wireless signal. Operation 655 may be performed in the same manner as operation 607 of FIG. 6A.

In operation 657, the second speaker 23 included in the second electronic device 20 may output the second sound wave. The second electronic device 20 may include the second speaker 23 and the second microphone 21, respectively.

In operation 659, the first microphone 21 included in the second electronic device 20 may receive the second sound wave. The second sound wave that is output from the speaker in the electronic device may be received through the microphone in the same electronic device.

In operation 661, the second electronic device 20 may determine the time value $T_2$ of when the second sound wave is received. The second electronic device 20 may determine the time value $T_2$ through the second recording device that records the sound waves received through the second microphone 21. The second electronic device 20 may include the second recording device.

In operation 663, the second electronic device 20 may determine the value $R_4$ corresponding to the difference between the output time of the second sound wave and $T_2$. The second electronic device 20 may determine the value $R_3$ based on the distance between the first speaker 13 and the first microphone 11, and the transmission speed (340 m/s) of a sound wave. More specifically, the second electronic device 20 may determine the value $R_4$ by dividing the distance value between the second speaker 23 and the second microphone 21 by the transmission speed (340 m/s) of a sound wave. The distance value may be determined to be a fixed value, according to the embodiment of the present disclosure. Since the transmission speed of a sound wave is a constant value, the second electronic device 20 may recognize the value $R_4$ as a predefined value.

In operation 665, the second electronic device 20 may receive the first sound wave that is output from the first electronic device 10. More specifically, the second microphone 21 included in the second electronic device 20 may receive the first sound wave.

In operation 667, the second electronic device 20 may determine the time value $T_4$ of receiving the first sound wave. The second electronic device 20 may determine the time value $T_4$ through the second recording device that records the sound waves received through the second microphone 21.

In operation 669, the second electronic device 20 may determine the second value corresponding to a value that is obtained by adding a difference value between $T_4$ and $T_2$ to the value $R_4$. The value $T_4$ and the value $T_2$ have been determined in operations 667 and 661, respectively.

In operation 671, the second electronic device 20 may receive the first value from the first electronic device 10. The first value may be determined by the first electronic device 10. The first electronic device 10 may determine the first value through the method of operations 551 to 573 in FIG. 5B.

In operation 673, the second electronic device 20 may determine the distance between the first electronic device 10 and the second electronic device 20 by multiplying the average value of the first value and the second value by the transmission speed of a sound wave. In the case where the second electronic device 20 receives the first sound wave after outputting the second sound wave, the second value may be a positive value. Since the reception timing of the first sound wave is subtracted by the output timing of the second sound wave, the second electronic device 20 may determine the second value to be a positive value. However, in the case where the second electronic device 20 transmits the second sound wave after receiving the first sound wave, the second value may be a negative value. Since the reception timing of the first sound wave is subtracted by the transmission timing of the second sound wave, the second electronic device 20 may determine the second value to be a negative value.

The second electronic device 20 may determine the average value of the first value and the second value by using the average time for which the second sound wave transmitted from the second electronic device 20 reaches the first electronic device 10, or by using the average time for which the first sound wave transmitted from the first electronic device 10 reaches the second electronic device 20. The second electronic device 20 may determine the distance value between the first electronic device 10 and the second electronic device 20 to be the product of the average value and the transmission speed of a sound wave.

Figure 7:
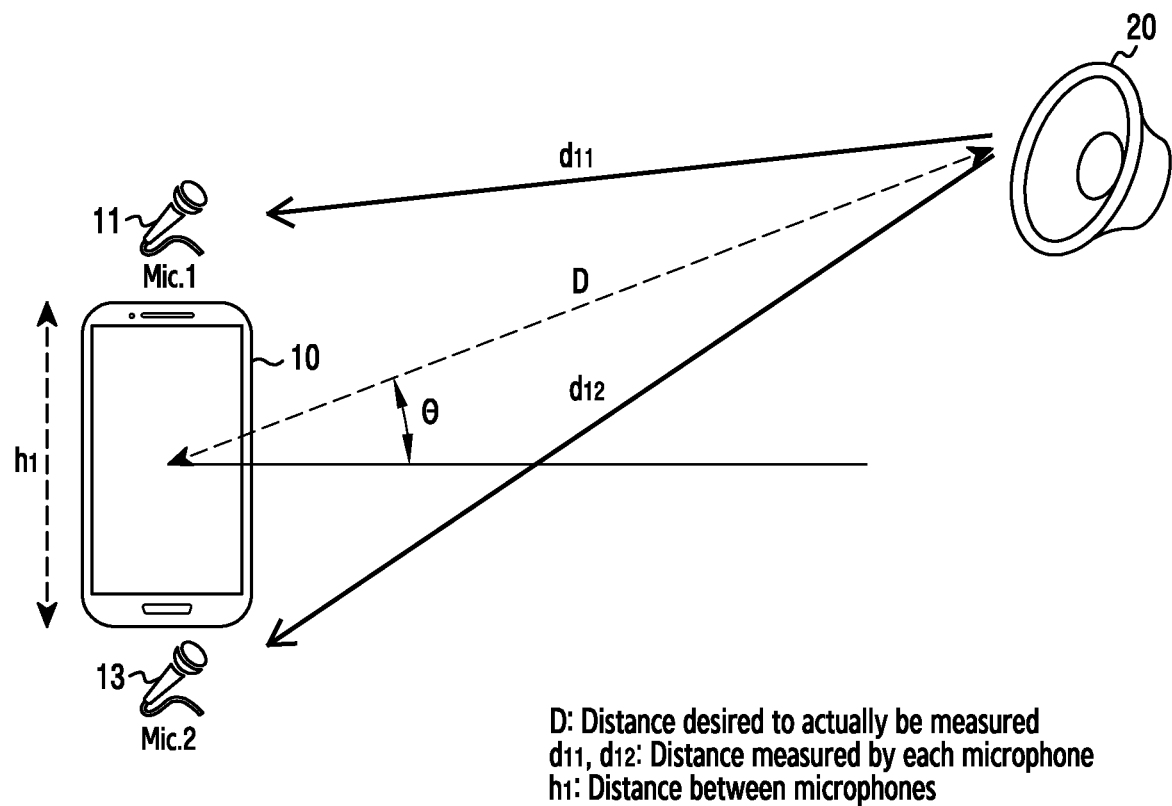
FIG. 7 illustrates a principle of a distance and direction-measuring operation according to various embodiments of the present disclosure.

FIG. 7 illustrates a principle of a wireless distance and direction-measuring operation according to various embodiments of the present disclosure. The distance measurement and direction-measuring operation shown in FIG. 7 may be performed by the first electronic device 10 or the second electronic device 20.

Referring to FIG. 7, the first electronic device 10 or the second electronic device 20 may determine the distance between the first electronic device 10 and the second electronic device 20 by using sound waves (or sound signals) or wireless signals (or electrical signals). According to the embodiment of the present disclosure, the distance between the first electronic device 10 and the second electronic device 20 may be determined according to the procedure that has been described in FIG. 3, 4A, 4B, 5A, or 5B.

According to another embodiment of the present disclosure, in the case of determining the distance between the first electronic device 10 and the second electronic device 20 by using the sound waves and the wireless signals, the first electronic device 10 or the second electronic device 20 may measure the distance between a transmitting device and a receiving device based on the transmission delay difference that results from the difference between the transmission speed of a wireless signal and the transmission speed of a sound wave in the air.

The various embodiments of the present disclosure measure the distance by using the elements (e.g., speakers, microphones, wireless modules, and the like) that are adopted by most electronic devices. Since such distance measurement can be performed within a specific accuracy, the various embodiments of the present disclosure may provide a variety of effects by using the distance measurement. For example, the various embodiments of the present disclosure may recognize the user's intention based on the measured distance or a distance change, and may perform the operations (for example, video screen mirroring, music streaming, adjusting the viewing angle of a camera or TV set, TV booting, releasing personal computer (PC) lock, a screen/data sharing function between devices, or a dual screen/sound service) according to the recognized intention.

As another example, the various embodiments of the present disclosure may measure the proximity based on the accurate distance measurement result in order to thereby strengthen a payment service function. As another example, the various embodiments of the present disclosure may make geo-fencing clearly based on the accurate distance measurement result in order to thereby provide accurate position-based services. As another example, the various embodiments of the present disclosure may configure the environment of media devices (e.g., installation of a room speaker or a home theatre environment) based on the accurate distance measurement result.

Referring to FIG. 7, the second electronic device 20 may be a sound source, and the first electronic device 10 may be a direction-measuring end of the sound source. The first electronic device 10 receives sound waves that are transmitted from the speaker of the second electronic device 20 through the first microphone (Mic.1) 11 and the second microphone (Mic.2) 13. The first electronic device 10 estimates the distance D between the measuring end 10 and the sound source 20 and the direction θ of the sound source with respect to the measuring end 10 by using the distance $h_1$ between the first microphone 11 and the second microphone 13, the distance $d_{11}$ between the sound source and the first microphone 11, which is measured by the first microphone 11, and the distance $d_{12}$ between the sound source 20 and the second microphone 13, which is measured by the second microphone 13.

More specifically, the first electronic device 10 may determine the distance value D based on the square of $d_{11}$, the square of $d_{12}$, and the square of $h_1$. In addition, the first electronic device 10 may determine the direction value θ based on the square of the distance D, the square of $d_{11}$, and the square of $h_1$. For example, the distance value D and the direction value θ may be determined by Equation 1 below.

$$D=\tfrac{1}{2}*\mathrm{sqrt}(2(d_{11})^2+2(d_{12})^2-h_1^2)$$

$$\Theta=\pi/2-a\,\cos((D^2+h_1^2/4-(d_{11})^2)/(Dh_1)) \quad \text{Equation 1}$$

Here, D denotes the distance between the first electronic device and the second electronic device, which is actually desired to be measured. $d_{11}$ denotes the distance between the first microphone and the second electronic device, and $d_{12}$ denotes the distance between the second microphone and the second electronic device. $h_1$ denotes the distance between the first microphone and the second microphone, and θ denotes the direction of the second electronic device with respect to the first electronic device (that is, the angle between $d_{11}$ and $d_{12}$).

Figure 8:
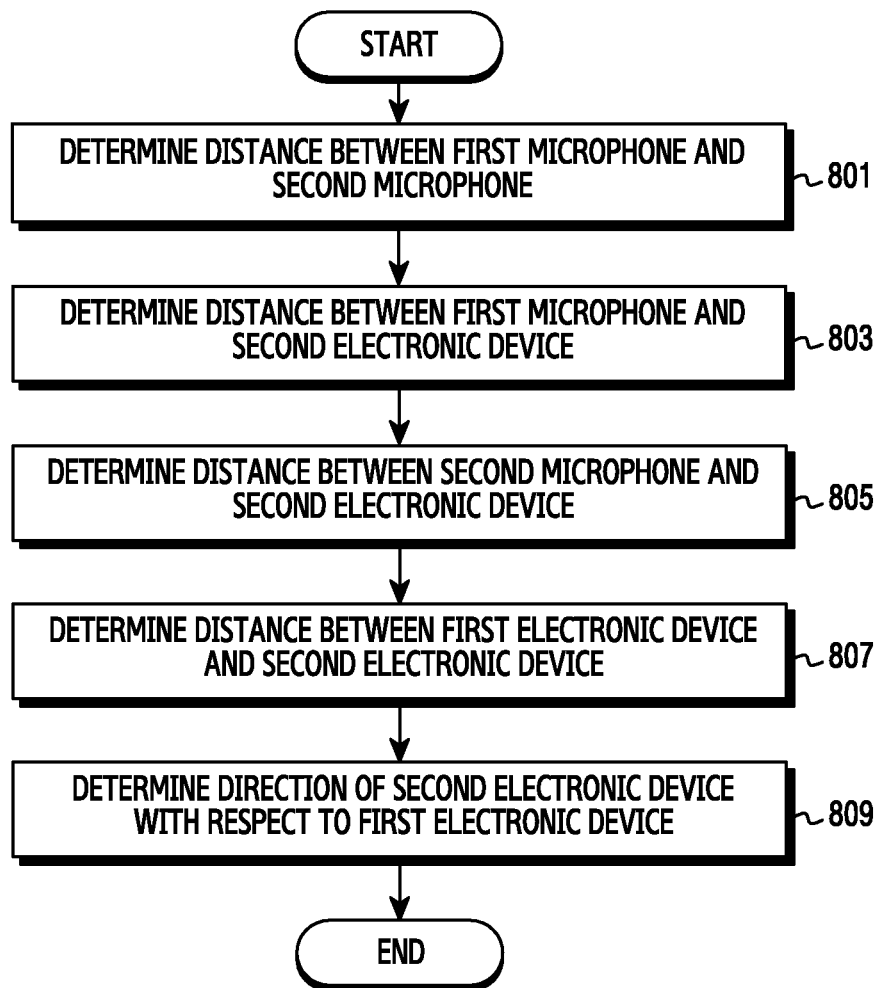
FIG. 8 is a flowchart illustrating a distance and direction-measuring operation of a first electronic device according to various embodiments of the present disclosure.

FIG. 8 is a flowchart illustrating a wireless distance and direction-measuring operation in a first electronic device according to various embodiments of the present disclosure.

Referring to FIG. 8, first, in operation 801, the first electronic device 10 may determine the distance $h_1$ between the first microphone 11 and second microphone 13, which are included in the first electronic device 10. According to the embodiment of the present disclosure, since the first microphone 11 and the second microphone 13 included in the first electronic device 10 may be provided at fixed positions, the distance value $h_1$ may be a determined value.

In operation 803, the first electronic device 10 may determine the distance $d_{11}$ between the first microphone 11 and the second electronic device 20. According to the embodiment of the present disclosure, the first electronic device 10 may determine the distance $d_{11}$ based on one or more sound waves that are received (detected) through the first microphone 11. Here, the one or more sound waves may include the first sound wave transmitted by the first electronic device 10 and the second sound wave transmitted by the second electronic device 20. For example, the first electronic device 10 may determine the distance $d_{11}$ by using the first value that is determined by the reception time of the first sound wave and the second sound wave, and by using the second value that is received from the second electronic device 20. For example, the first electronic device 10 may determine the distance $d_{11}$ according to the distance measurement operation 200 described in FIG. 1A or the distance determination operation according to the description of FIGS. 4A and 4B.

In addition, in operation 805, the first electronic device 10 may determine the distance $d_{12}$ between the second microphone 13 and the second electronic device. Similarly as in operation 803, the first electronic device 10 may determine the distance $d_{12}$ based on one or more sound waves that are received (detected) through the second microphone 13. Here, the one or more sound waves may include the first sound wave transmitted by the first electronic device 10 and the second sound wave transmitted by the second electronic device 20. For example, the first electronic device 10 may determine the distance $d_{12}$ by using the first value that is determined by the reception time of the first sound wave and the second sound wave, and by using the second value that is received from the second electronic device 20. For example, the first electronic device 10 may determine the distance $d_{12}$ according to the distance measurement operation 200 described in FIG. 1A or the distance determination operation according to the description of FIGS. 4A and 4B.

In operation 807, the first electronic device 10 may determine the distance D between the first electronic device 10 and the second electronic device. Here, the distance D may be determined to be the distance that is desired to actually be measured between the first electronic device 10 and the second electronic device 20. The first electronic device 10 may determine the distance value D based on $d_{11}$, $d_{12}$, and $h_1$. For example, the distance value D may be determined according to Equation 1.

Finally, in operation 809, the first electronic device 10 may determine the direction θ of the second electronic device 20 with respect to the first electronic device 10. Here, the direction θ indicates the angle between $d_{11}$ and $d_{11}$ as illustrated in FIG. 7. The first electronic device 10 may determine the direction θ based on $d_{11}$, D, and $h_1$. For example, the direction value θ may be determined according to Equation 1.

Figure 9:
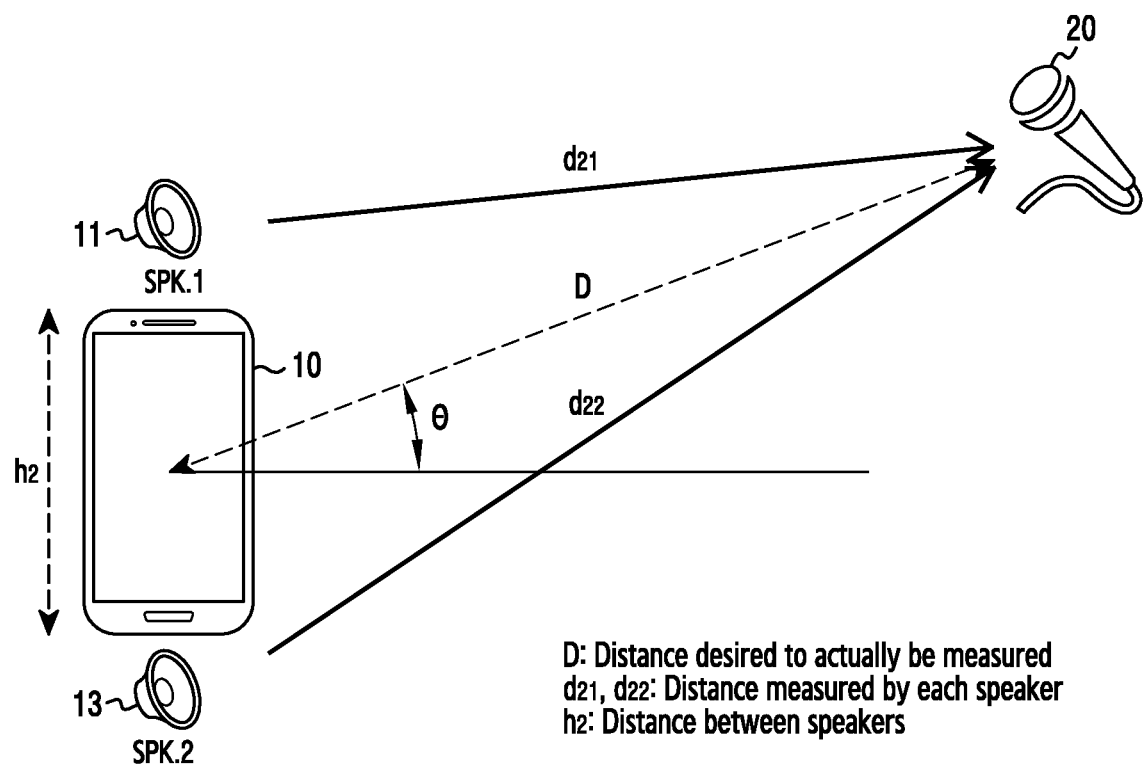
FIG. 9 illustrates a principle of a distance and direction-measuring operation according to various embodiments of the present disclosure.

FIG. 9 illustrates a principle of a wireless distance and direction-measuring operation according to various embodiments of the present disclosure.

Referring to FIG. 9, the first electronic device 10 may be a sound source, and the second electronic device 20 may be a direction measuring end of the sound source. The second electronic device 20 receives, through the microphone, the sound waves that are transmitted from the first speaker (SPK.1) 11 and the second speaker (SPK.2) 13 included in the first electronic device 10. The second electronic device 20 receives, through the microphone, the sound waves that are simultaneously transmitted from the first speaker 11 and the second speaker 13, and measures the distance $d_{21}$ between the microphone and the first speaker 11, as well as the distance $d_{22}$ between the microphone and the second speaker 13. In this case, if the second electronic device 20 recognizes the distance $h_2$ between the first speaker 11 and second speaker 13, the second electronic device 20 may estimate the distance D between the measuring end 20 and the sound source 10, and may estimate the direction θ of the sound source with respect to the measuring end 20 by using the distance $h_2$ between the first speaker 11 and the second speaker 13, the distance $d_{21}$ between the microphone and the first speaker 11, which is measured by the microphone, and the distance $d_{22}$ between the microphone and the second speaker 13, which is measured by the microphone.

More specifically, the first electronic device 10 may determine the distance value D based on the square of $d_{21}$, the square of $d_{22}$, and the square of $h_2$. In addition, the first electronic device 10 may determine the direction value θ based on the square of the distance D, the square of $d_{21}$, and the square of $h_2$. For example, the distance value D and the direction value θ may be determined by Equation 2 below.

$$D = \tfrac{1}{2} * \mathrm{sqrt}(2(d_{21})^2 + 2(d_{22})^2 - h_1^2)$$

$$\Theta = \mathrm{pi}/2 - a\cos((D^2 + h_2^2/4 - (d_{21})^2)/(Dh_2)) \quad \text{Equation 2}$$

Here, D denotes the distance between the first electronic device and the second electronic device, which is actually desired to be measured. $d_{21}$ denotes the distance between the first speaker and the second electronic device, and $d_{22}$ denotes the distance between the second speaker and the second electronic device. $h_2$ denotes the distance between the first speaker and the second speaker, and θ denotes the direction of the second electronic device with respect to the first electronic device (that is, the angle between $d_{21}$ and $d_{22}$).

Figure 10:
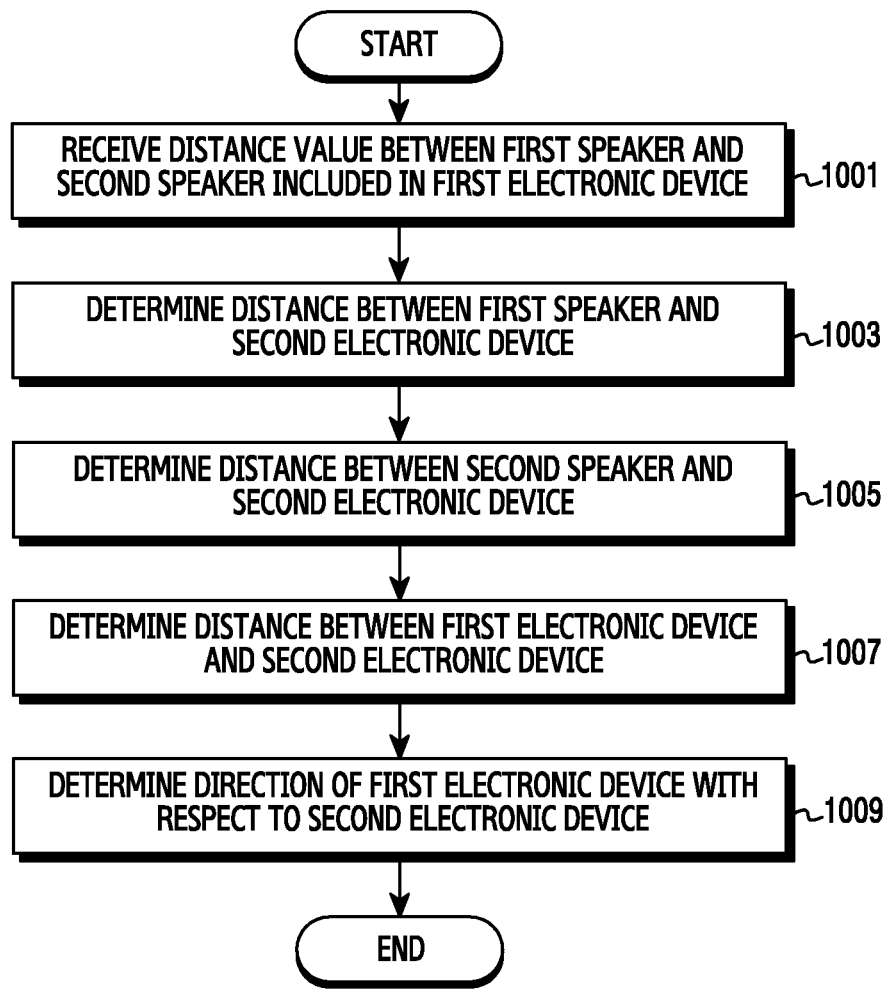
FIG. 10 is a flowchart illustrating a distance and direction-measuring operation of a first electronic device according to various embodiments of the present disclosure.

FIG. 10 is a flowchart illustrating a wireless distance and direction-measuring operation in a first electronic device according to various embodiments of the present disclosure.

Referring to FIG. 10, first, in operation 1001, the second electronic device 20 may receive, from the first electronic device 10, the distance $h_2$ between the first speaker 11 and the second speaker 13, which are included in the first electronic device 10. According to the embodiment of the present disclosure, the second electronic device 20 may determine the distance $d_{21}$ based on one or more sound waves that are received (detected) through a microphone. Here, the one or more sound waves may include the first sound wave transmitted by the first electronic device 10 and the second sound wave transmitted by the second electronic device 20. For example, the second electronic device 20 may determine the distance $d_{21}$ by using the second value that is determined by the reception time of the first sound wave and the second sound wave, and by using the first value that is received from the first electronic device 10. For example, since the first speaker 11 and the second speaker 13 included in the first electronic device 10 may be provided at fixed positions, the distance value $h_2$ may be a determined value. In addition, according to the embodiment of the present disclosure, the second electronic device 20 may receive the value $h_2$ from the first electronic device 10 based on the negotiation and signalling operation 100 shown in FIG. 1A.

In operation 1003, the second electronic device 20 may determine the distance $d_{21}$ between the first speaker 11 and the second electronic device 20. According to the embodiment of the present disclosure, the distance $d_{21}$ may be determined according to the distance measurement operation 200 described in FIG. 1A or the distance determination operation in FIGS. 4A and 4B.

In addition, in operation 1005, the second electronic device 20 may determine the distance $d_{22}$ between the second speaker 13 and the second electronic device. Similarly as in operation 1003, the second electronic device 20 may determine the distance $d_{22}$ based on one or more sound waves that are received (detected) through a microphone. Here, the one or more sound waves may include the first sound wave transmitted by the first electronic device 10 and the second sound wave transmitted by the second electronic device 20. For example, the second electronic device 20 may determine the distance $d_{22}$ by using the second value that is determined by the reception time of the first sound wave and the second sound wave, and by using the first value that is received from the first electronic device 10. For example, the distance $d_{22}$ may be determined according to the distance measurement operation 200 described in FIG. 1A or the distance determination operation in FIGS. 4A and 4B.

In operation 1007, the second electronic device 20 may determine the distance D between the first electronic device 10 and the second electronic device. Here, the distance D may be determined to be a distance that is desired to actually be measured between the first electronic device 10 and the second electronic device 20, and more specifically, the distance value D may be determined according to Equation 1.

Finally, in operation 1009, the second electronic device 20 may determine the direction θ of the first electronic device 10 with respect to the second electronic device 20. Here, the direction θ indicates the angle between $d_{21}$ and $d_{22}$ as illustrated in FIG. 9. The second electronic device 20 may determine the direction θ the basis of on $d_{21}$, D, and $h_2$. For example, the direction value θ may be determined according to Equation 2.

Figure 11A:
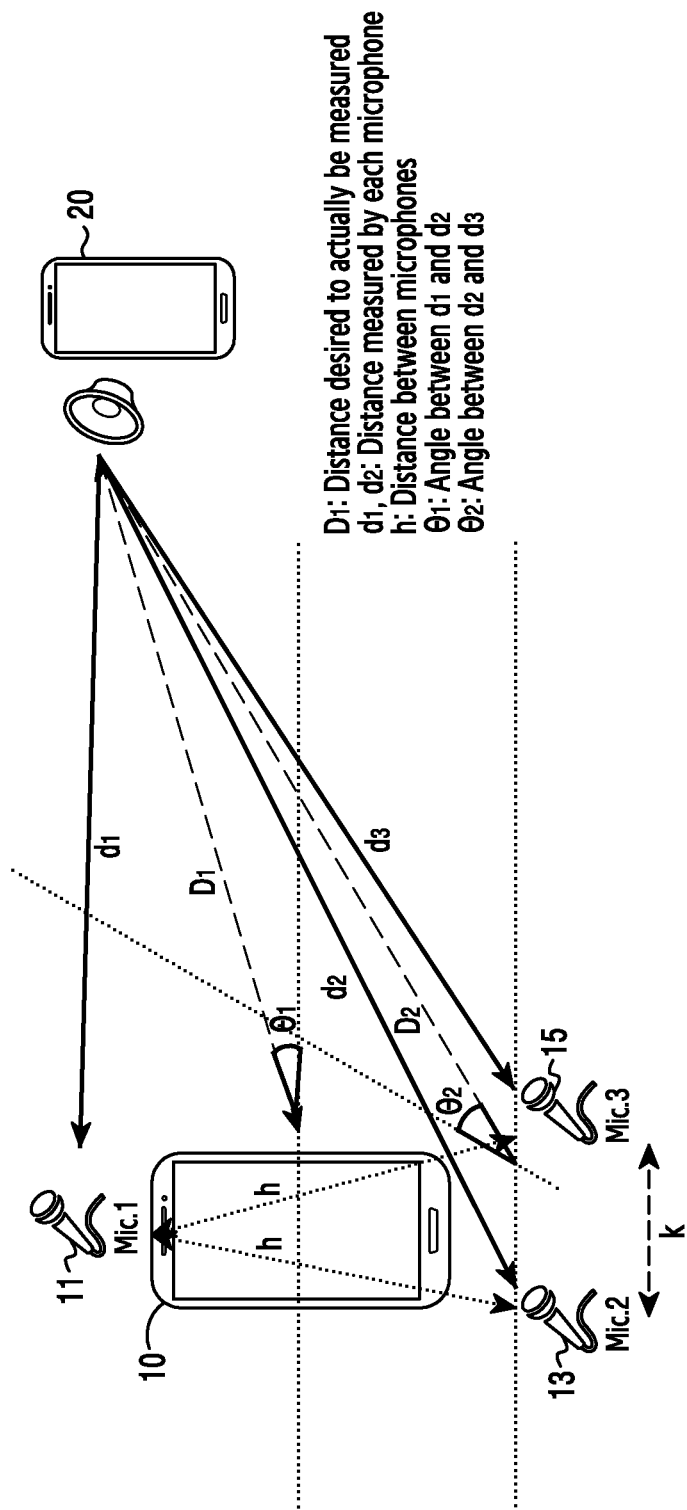
FIGS. 11A and 11B illustrates a principle of a distance and direction-measuring operation according to various embodiments of the present disclosure.
Figure 11B:
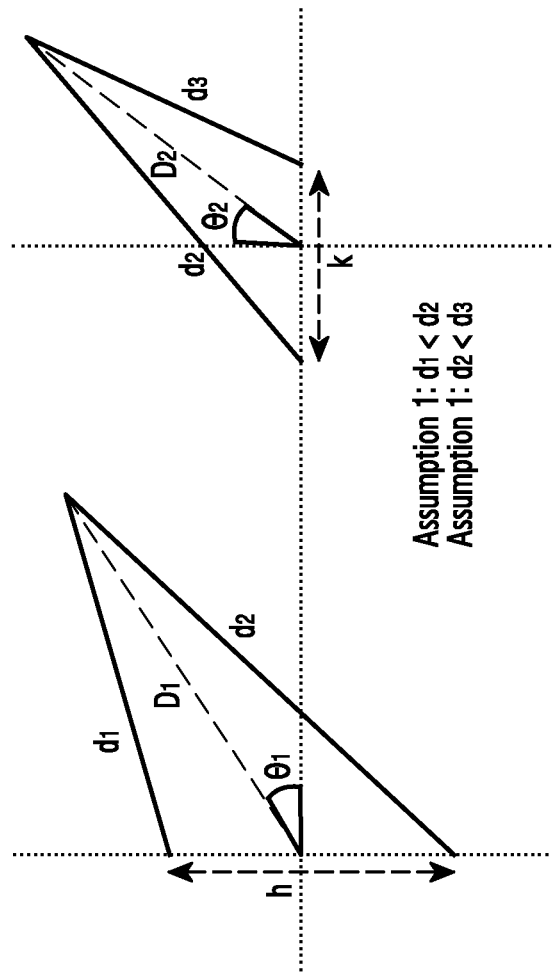

FIGS. 11A and 11B illustrate a principle of a wireless distance and direction-measuring operation according to various embodiments of the present disclosure.

Referring to FIGS. 11A and 11B, the second electronic device 20 may be a sound source, and the first electronic device 10 may be a direction-measuring end of the sound source. The first electronic device 10 receives sound waves that are transmitted from the speaker of the second electronic device 20 through the first microphone (Mic.1) 11, the second microphone (Mic.2) 13, and the second microphone (Mic.3) 15 in a three dimensional space. The first electronic device 10 estimates the first distance $D_1$ between the measuring end 10 and the sound source 20, the second distance $D_2$ between the measuring end 10 and the sound source 20, the first direction $θ_1$ of the sound source with respect to the measuring end 10, and the second direction $θ_2$ of the sound source with respect to the measuring end 10 by using the distance h between the first microphone 11 and the second microphone 13, the distance h between the first microphone 11 and the third microphone 15, the distance k between the second microphone 13 and the third microphone 15, the distance $d_1$ between the sound source and the first microphone 11, which is measured by the first microphone 11, the distance $d_2$ between the sound source 20 and the second microphone 13, which is measured by the second microphone 13, and the distance $d_3$ between the sound source 20 and the third microphone 15, which is measured by the third microphone 15.

More specifically, the first electronic device 10 may determine the distance value $D_1$ based on the square of $d_1$, the square of $d_2$, and the square of h. Similarly, the first electronic device 10 may determine the distance value $D_2$ based on the square of $d_2$, the square of $d_3$, and the square of k. In addition, the first electronic device 10 may determine the direction value θ1 based on the square of the distance $D_1$, the square of $d_1$, and the square of h. Similarly, the first electronic device 10 may determine the direction value θ2 based on the square of the distance $D_2$, the square of $d_3$, and the square of k. For example, the distance value $D_1$, the distance value $D_2$, the direction value $θ_1$, and the direction value $θ_2$ may be determined by Equation 3 below.

$$D_1 = \tfrac{1}{2} \cdot \text{sqrt}(2(d_1^2 + 2(d_2)^2 - h^2)$$

$$D_2 = \tfrac{1}{2} \cdot \text{sqrt}(2(d_2^2 + 2(d_3)^2 - k^2)$$

$$Θ_1 = \text{pi}/2 - a\cos((D_1^2 + h^2/4 - (d_1)^2)/(D_1 h))$$

$$Θ_2 = \text{pi}/2 - a\cos((D_2^2 + k^2/4 - (d_3)^2)/(D_2 k)) \quad \text{Equation 3}$$

Here, h denotes the distance between the first microphone and the second microphone, or denotes the distance between the first microphone and the third microphone. k denotes the distance between the second microphone and the third microphone, and $d_1$ denotes the distance between the first microphone and the second electronic device. $d_2$ denotes the distance between the second microphone 13 and the second electronic device, and $d_3$ denotes the distance between the third microphone and the second electronic device. $D_1$ denotes the first distance between the first electronic device and the second electronic device, and $D_2$ denotes the second distance between the first electronic device and the second electronic device. In addition, $θ_1$ denotes the first direction of the second electronic device with respect to the first electronic device, and $θ_2$ denotes the second direction of the second electronic device with respect to the first electronic device.

Figure 12:
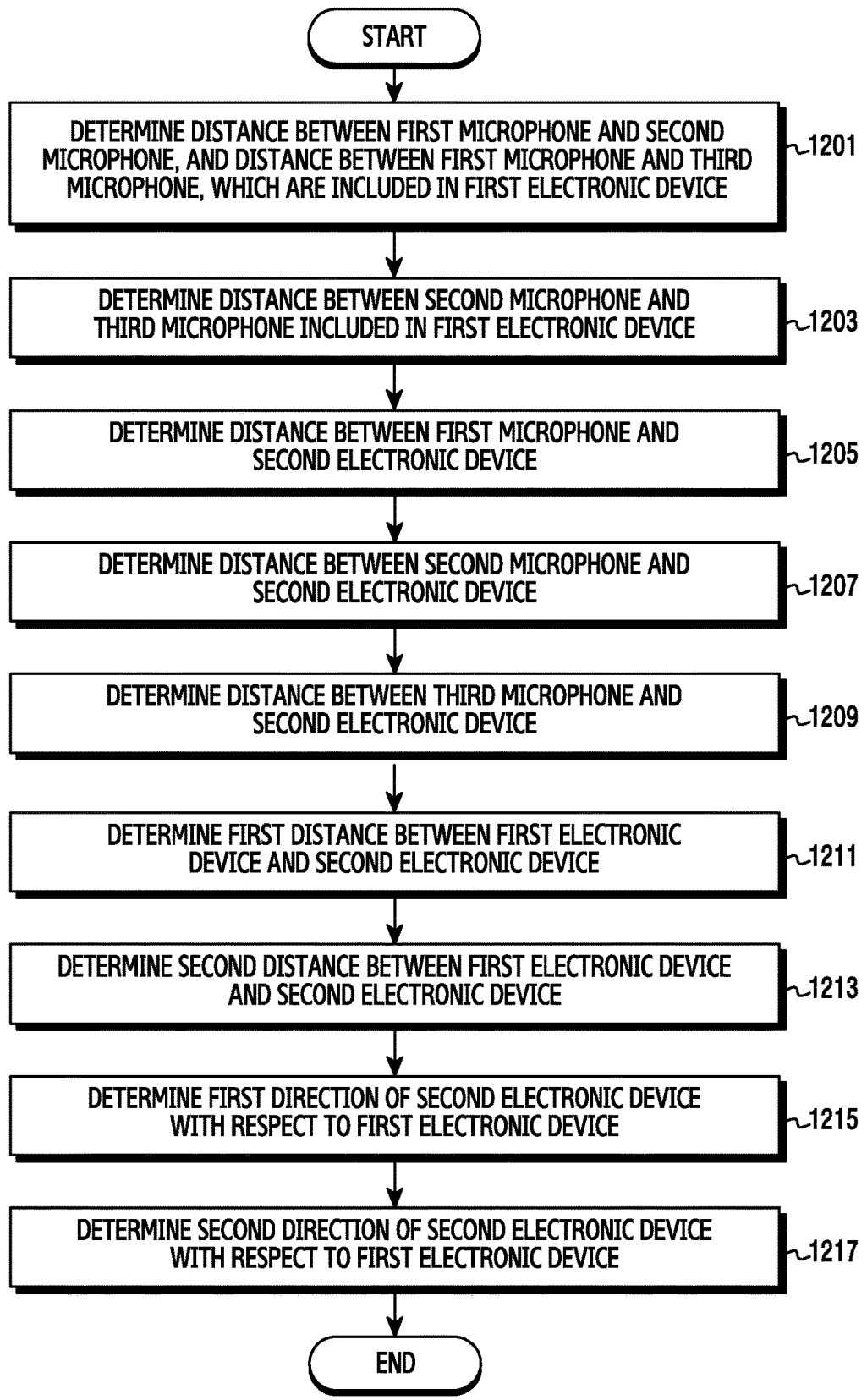
FIG. 12 is a flowchart illustrating a distance and direction-measuring operation of a first electronic device according to various embodiments of the present disclosure.

FIG. 12 is a flowchart illustrating a wireless distance and direction-measuring operation in a first electronic device according to various embodiments of the present disclosure.

Referring to FIG. 12, first, in operation 1201, the first electronic device 10 may determine the distance h between the first microphone 11 and the second microphone 13, and the distance h between the first microphone 11 and the third microphone 15, which are included in the first electronic device 10. According to the embodiment of the present disclosure, since the first microphone 11, the second microphone 13, and the third microphone 15 included in the first electronic device 10 may be provided at fixed positions, the distance value h may be a determined value.

In operation 1203, the first electronic device 10 may determine the distance k between the second microphone 13 and the third microphone 15 included in the first electronic device 10. According to the embodiment of the present disclosure, since the first microphone 11, the second microphone 13, and the third microphone 15 included in the first electronic device 10 may be provided at fixed positions, the distance value k may be a determined value.

In addition, in operation 1205, the first electronic device 10 may determine the distance $d_1$ between the first microphone 11 and the second electronic device 20. According to the embodiment of the present disclosure, the first electronic device 10 may determine the distance $d_1$ based on one or more sound waves that are received (detected) through the first microphone 11. Here, the one or more sound waves may include the first sound wave transmitted by the first electronic device 10 and the second sound wave transmitted by the second electronic device 20. For example, the first electronic device 10 may determine the distance $d_1$ by using the first value that is determined by the reception time of the first sound wave and the second sound wave, and by using the second value that is received from the second electronic device 20. For example, the first electronic device 10 may determine the distance $d_1$ according to the distance measurement operation 200 described in FIG. 1A or the distance determination operation according to the description of FIGS. 4A and 4B.

In operation 1207, the first electronic device 10 may determine the distance $d_2$ between the second microphone 13 and the second electronic device 20. Similarly as in operation 1205, the first electronic device 10 may determine the distance $d_2$ based on one or more sound waves that are received (detected) through the second microphone 13. Here, the one or more sound waves may include the first sound wave transmitted by the first electronic device 10 and the second sound wave transmitted by the second electronic device 20. For example, the first electronic device 10 may determine the distance $d_2$ by using the first value that is determined by the reception time of the first sound wave and the second sound wave, and by using the second value that is received from the second electronic device 20. For example, the first electronic device 10 may determine the distance $d_2$ according to the distance measurement operation 200 described in FIG. 1A or the distance determination operation according to the description of FIGS. 4A and 4B.

In operation 1209, the first electronic device 10 may determine the distance $d_3$ between the third microphone 15 and the second electronic device 20. Similarly as in operation 1207, the first electronic device 10 may determine the distance $d_3$ based on one or more sound waves that are received (detected) through the third microphone 15. Here, the one or more sound waves may include the first sound wave transmitted by the first electronic device 10 and the second sound wave transmitted by the second electronic device 20. For example, the first electronic device 10 may determine the distance $d_3$ by using the first value that is determined by the reception time of the first sound wave and the second sound wave, and by using the second value that is received from the second electronic device 20. For example, the first electronic device 10 may determine the distance $d_3$ according to the distance measurement operation 200 described in FIG. 1A or the distance determination operation according to the description of FIGS. 4A and 4B.

In operation 1211, the first electronic device 10 may determine the first distance $D_1$ between the first electronic device 10 and the second electronic device 20. Here, the distance $D_1$ may be determined to be a distance that is actually desired to be measured between the first electronic device 10 and the second electronic device 20, and more specifically, the distance value $D_1$ may be determined according to Equation 3.

In addition, in operation 1213, the first electronic device 10 may determine the second distance $D_2$ between the first electronic device 10 and the second electronic device 20. Here, the distance $D_2$ may be determined to be a distance that is actually desired to be measured between the first electronic device 10 and the second electronic device 20, and more specifically, the distance value $D_2$ may be determined according to Equation 3.

In operation 1215, the first electronic device 10 may determine the first direction $\theta_1$ of the second electronic device 20 with respect to the first electronic device 10. Here, the direction $\theta_1$ indicates the angle between $d_1$ and $d_2$ as illustrated in FIGS. 11A and 11B, and more specifically, the direction value $\theta 1$ may be determined according to Equation 3.

Finally, in operation 1217, the first electronic device 10 may determine the second direction $\theta_2$ of the second electronic device 20 with respect to the first electronic device 10. Here, the direction $\theta_2$ indicates the angle between $d_2$ and $d_3$ as illustrated in FIGS. 11A and 11B, and more specifically, the direction value $\theta_2$ may be determined according to Equation 3.

Figure 13:
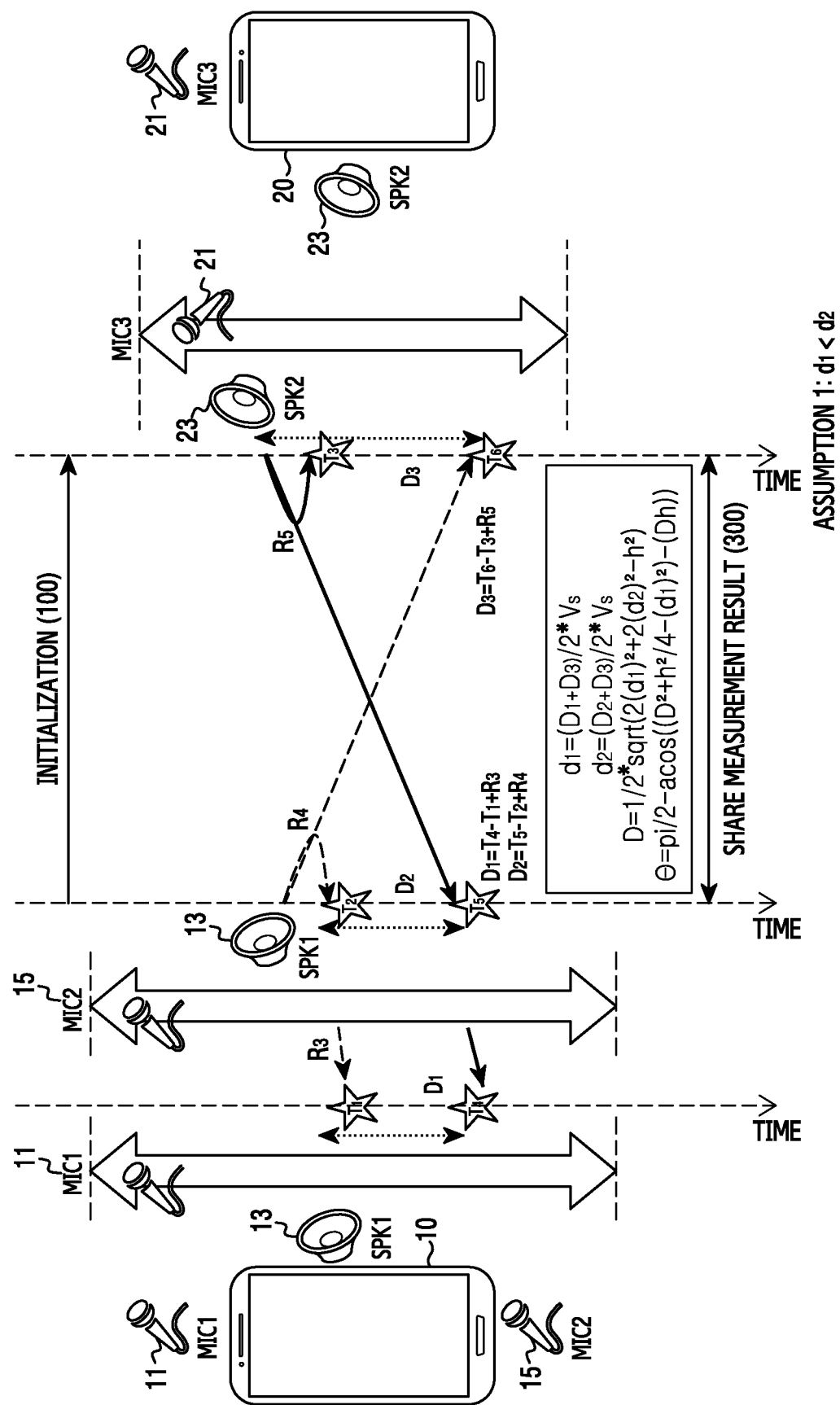
FIG. 13 illustrates a processing flow of a distance measuring method according to various embodiments of the present disclosure.

FIG. 13 illustrates a processing flow of a distance measuring method according to various embodiments of the present disclosure.

Referring to FIG. 13, the first electronic device 10 may include the first microphone (MIC1) 11, the first speaker (SPK1) 13, and the second microphone (MIC2) 15, and the second electronic device 20 may include the third microphone (MIC3) 21 and the second speaker (SPK2) 23, respectively. Although FIG. 13 shows that the first electronic device 10 includes two microphones and one speaker and the second electronic device includes one microphone and one speaker, respectively, this is only an example, and the first electronic device 10 and the second electronic device 20 may include a plurality of microphones and a plurality of speakers, respectively, according to another embodiment of the present disclosure.

Referring to FIG. 13, in operation 100, the first electronic device 10 and the second electronic device 20 perform initialization. For example, the first electronic device 10 and the second electronic device 20 may perform the negotiation for the distance measurement by performing the signalling. For example, the first electronic device 10 and the second electronic device 20 may exchange information that informs of supportable measuring methods and information that designates a measuring method to be used for the distance measurement. In the embodiment of FIGS. 4A and 4B, a measuring method using the sound waves is selected. In this case, the first electronic device 10 may transmit ID information on the first sound wave to be transmitted to the second electronic device 20. The second electronic device 20 may transmit ID information on the second sound wave to be transmitted to the first electronic device 10. For example, the ID information on the first sound wave may contain one of the duration of the first sound wave, the pitch of the sound, the loudness of the sound, or a pattern of the sound. As another example, the ID information on the second sound wave may contain one of the duration of the second sound wave, the pitch of the sound, the loudness of the sound, or a pattern of the sound.

After the negotiation and signalling operation 100, the first electronic device 10 and the second electronic device 20 may perform the distance measurement in operation 200. Here, the first electronic device 10 may activate the first microphone 11, the first speaker 13, and the second microphone 15, which are included in the first electronic device 10, for a certain period of time prior to performing the negotiation and signalling operation 100. The second electronic device 20 may activate the third microphone 21 and the second speaker 23, which are included in the second electronic device 20, for a certain period of time after receiving the initial signal from the first electronic device 10.

In addition, in response to the activation of the first microphone 11 and the second microphone 15 for the certain period of time, the first recording device (not shown in FIG. 13) included in the first electronic device 10 may be activated for the certain period of time. According to this, the first recording device may record sound waves that are received through the first microphone 11 and the second microphone 15 for the certain period of time. Similarly, in response to the activation of the third microphone 21 for the certain period of time, the second recording device (not shown in FIG. 13) included in the second electronic device 20 may be activated for the certain period of time. According to this, the second recording device may record sound waves that are received through the third microphone 21 for the certain period of time.

Referring to FIG. 13, the first speaker 13 included in the first electronic device 10 may output the first sound wave, and the first microphone 11 and the second microphone 15 included in the first electronic device 10 may receive the first sound wave, respectively. In this case, the first electronic device 10 may identify the timing $T_1$ of when the first sound wave is received by the first microphone 11 through the first recording device. The first electronic device 10 may identify the timing $T_2$ of when the first sound wave is received by the second microphone 15 through the first recording device.

In addition, the difference between the timing of when the first sound wave is output through the first speaker 13 and the timing $T_1$ may be configured to be $R_3$. The value $R_3$ may be determined based on the distance between the first speaker 13 and the first microphone 11, and the transmission speed ($V_s$, 340 m/s) of a sound wave. In other words, the value $R_3$ may be determined by dividing a distance value between the first speaker 13 and the first microphone 11 by the transmission speed (340 m/s) of a sound wave. The distance value may be determined to be a fixed value, according to the embodiment of the present disclosure. In addition, since the transmission speed of a sound wave is a constant value, the first electronic device 10 may recognize the value $R_3$ as a predefined value.

Similarly, the difference between the timing of when the first sound wave is output through the first speaker 13 and the timing $T_2$ may be configured to be $R_4$. The value $R_4$ may be determined based on the distance between the first speaker 13 and the second microphone 15, and the transmission speed ($V_s$, 340 m/s) of a sound wave. In other words, the value $R_4$ may be determined by dividing the distance value between the first speaker 13 and the second microphone 15 by the transmission speed (340 m/s) of a sound wave. The distance value may be determined to be a fixed value, according to the embodiment of the present disclosure. In addition, since the transmission speed of a sound wave is a constant value, the first electronic device 10 may recognize the value $R_4$ as a predefined value.

The second speaker 23 included in the second electronic device 20 may output the second sound wave, and the third microphone 21 included in the second electronic device 20 may receive the second sound wave. In this case, the second electronic device 20 may identify the timing $T_3$ of when the second sound wave is received through the second recording device.

In addition, the difference between the timing of when the second sound wave is output through the second speaker 23 and the timing $T_3$ may be configured to be $R_5$. The value $R_5$ may be determined based on the distance between the second speaker 23 and the third microphone 21 and the transmission speed (340 m/s) of a sound wave. In other words, the value $R_5$ may be determined by dividing the distance value between the second speaker 23 and the third microphone 21 by the transmission speed (340 m/s) of a sound wave. The distance value may be determined to be a fixed value, according to the embodiment of the present disclosure. In addition, since the transmission speed of a sound wave is a constant value, the second electronic device 20 may recognize the value $R_5$ as a predefined value.

The first microphone 11 may receive the second sound wave that is output from the second speaker 23, and in this case, the first electronic device 10 may identify, through the first recording device, the timing $T_4$ of when the second sound wave is received by the first microphone 11. In addition, the second microphone 15 may receive the second sound wave that is output from the second speaker 23, and in this case, the first electronic device 10 may identify, through the first recording device, the timing $T_4$ of when the second sound wave is received by the second microphone 15.

The third microphone 21 may receive the first sound wave that is output from the first speaker 13, and in this case, the second electronic device 20 may identify, through the second recording device, the timing $T_6$ of when the first sound wave is received.

According to this, the first electronic device 10 may determine the first value $D_1$ corresponding to the difference between the timing of when the first electronic device 10 outputs the first sound wave and the timing $T_4$ of when the first microphone 11 receives the second sound wave that is output from the second electronic device 20. More specifically, the first value may be determined to be a value obtained by adding, to the value $R_3$, the difference value between the value $T_4$ and the value $T_1$.

In addition, the first electronic device 10 may determine the second value $D_2$ corresponding to the difference between the timing of when the first electronic device 10 outputs the first sound wave and the timing $T_5$ of when the second microphone 15 receives the second sound wave that is output from the second electronic device 20. More specifically, the second value may be determined to be a value obtained by adding, to the value $R_4$, the difference value between the value $T_5$ and the value $T_2$.

The second electronic device 20 may determine the third value $D_3$ corresponding to the difference between the timing of when the second electronic device 20 outputs the second sound wave and the timing $T_6$ of receiving the first sound wave that is output from the first electronic device 10. More specifically, the third value may be determined to be a value obtained by adding, to the value $R_5$, the difference value between the value $T_6$ and the value $T_3$.

In the measurement result sharing operation 300, the first electronic device 10 may transmit the first value and the second value to the second electronic device 20, and the second electronic device 20 may transmit the third value to the first electronic device 10. As a result, the first electronic device 10 may determine an average value of the first value that is directly determined by the first electronic device 10 and the third value that is received from the second electronic device 20, and then may determine the distance value $d_1$ between the first microphone 11 of the first electronic device 10 and the second electronic device 20 by multiplying the average value and the transmission speed (340 m/s) of a sound wave.

In addition, the first electronic device 10 may determine an average value of the second value that is directly determined by the first electronic device 10 and the third value that is received from the second electronic device 20, and then may determine a distance value $d_2$ between the second microphone 15 of the first electronic device 10 and the second electronic device 20 by multiplying the average value and the transmission speed (340 m/s) of a sound wave.

Similarly, the second electronic device 20 may determine an average value of the third value that is directly determined by the second electronic device 20 and the first value or the second value that is received from the first electronic device 10, and then may determine the distance value between the first electronic device 10 and the second electronic device 20 by multiplying the average value and the transmission speed (340 m/s) of a sound wave.

Consequently, according to the principles described above with respect to FIGS. 7 and 12, the first electronic device 10 may determine the distance D that is desired to actually be measured between the first electronic device 10 and the second electronic device 20 (for example, the distance between the center point of the first electronic device 10 and the second speaker 23 included in the second electronic device 20) and the direction θ of the second electronic device 20 with respect to the first electronic device 10.

More specifically, the first electronic device 10 may determine the distance value D based on the square of $d_1$, the square of $d_2$, and the square of h. In addition, the first electronic device 10 may determine the direction θ based on the square of D, the square of $d_1$, and the square of h. For example, the distance D and the direction θ may be determined by Equation 4 below.

$$D = \tfrac{1}{2} * \text{sqrt}(2(d_1)^2 + 2(d_2)^2 - h^2)$$

$$\Theta = pi/2 - a\cos((D^2 + h^2/4 - (d_1)^2)/(Dh)) \quad \text{Equation 4}$$

Here, D denotes the distance between the first electronic device and the second electronic device, which is actually desired to be measured. $d_1$ denotes the distance between the first microphone and the second electronic device, and $d_2$ denotes the distance between the second microphone and the second electronic device. h denotes the distance between the first microphone and the second microphone, and θ denotes the direction of the second electronic device with respect to the first electronic device.

Although FIG. 13 illustrates the case of using feedback, the present disclosure is not limited thereto. In FIG. 13, the first electronic device 10 may determine the distance in a manner that does not use feedback. The method of determining the distance has been described above with respect to FIGS. 4A, 5A, and 6A. In the case of not using feedback, the first electronic device 10 may omit the measurement result sharing operation 300.

Figure 14:
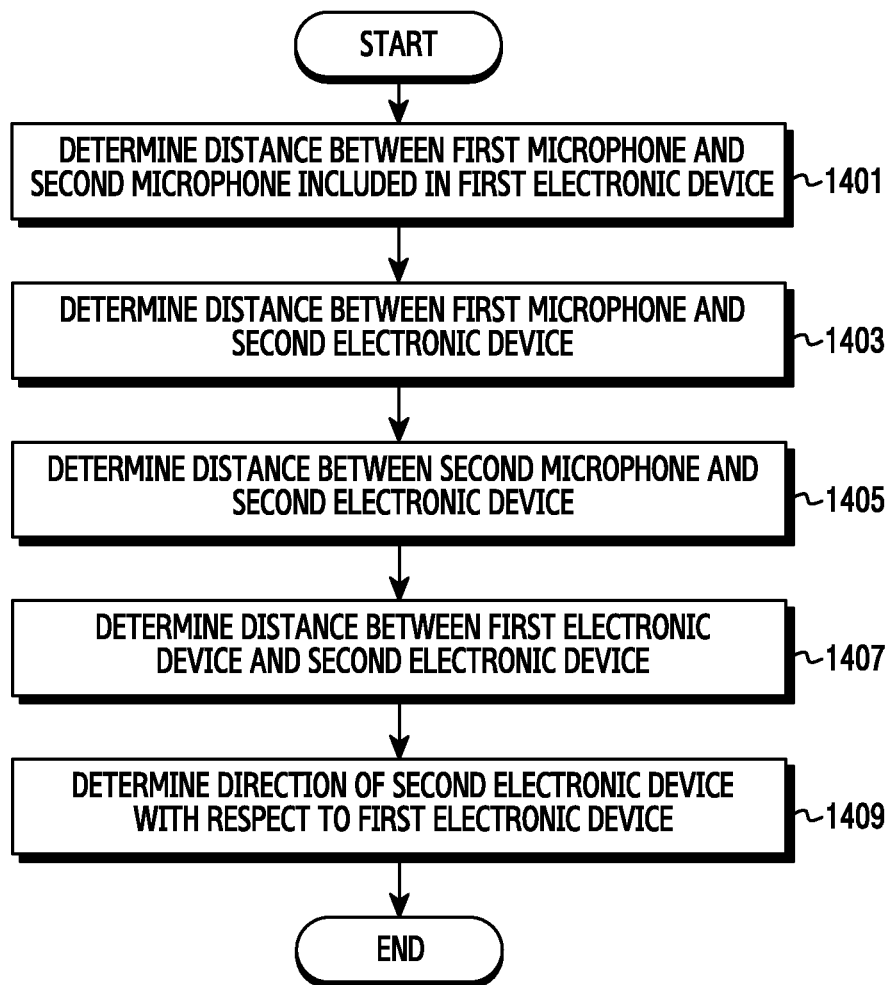
FIG. 14 is a flowchart illustrating a distance-measuring operation of a first electronic device according to various embodiments of the present disclosure.

FIG. 14 is a flowchart illustrating a distance-measuring operation in a first electronic device according to various embodiments of the present disclosure.

Referring to FIG. 14, first, in operation 1401, the first electronic device 10 may determine the distance h between the first microphone 11 and the second microphone 15, which are included in the first electronic device 10. According to the embodiment of the present disclosure, since the first microphone 11 and the second microphone 15 included in the first electronic device 10 may be provided at fixed positions, the distance value h may be a determined value.

In operation 1403, the first electronic device 10 may determine the distance $d_1$ between the first microphone 11 and the second electronic device 20. According to the embodiment of the present disclosure, the distance $d_1$ may be determined according to the distance measurement operation 200 described in FIG. 1A or the distance determination operation described in FIG. 13.

In addition, in operation 1405, the first electronic device 10 may determine the distance $d_2$ between the second microphone 15 and the second electronic device. Similarly, according to the embodiment of the present disclosure, the distance $d_2$ may be determined according to the distance measurement operation 200 described in FIG. 1A or the distance determination operation described in FIG. 13.

In operation 1407, the first electronic device 10 may determine the distance D between the first electronic device 10 and the second electronic device 20. Here, the distance D may be determined to be a distance that is actually desired to be measured between the first electronic device 10 and the second electronic device 20 (for example, the distance between the center point of the first electronic device 10 and the second speaker 23 included in the second electronic device 20), and more specifically, the distance value D may be determined according to Equation 4.

Finally, in operation 1409, the first electronic device 10 may determine the direction θ of the second electronic device 20 with respect to the first electronic device 10. More specifically here, the direction value θ may be determined according to Equation 4.

Figure 15:
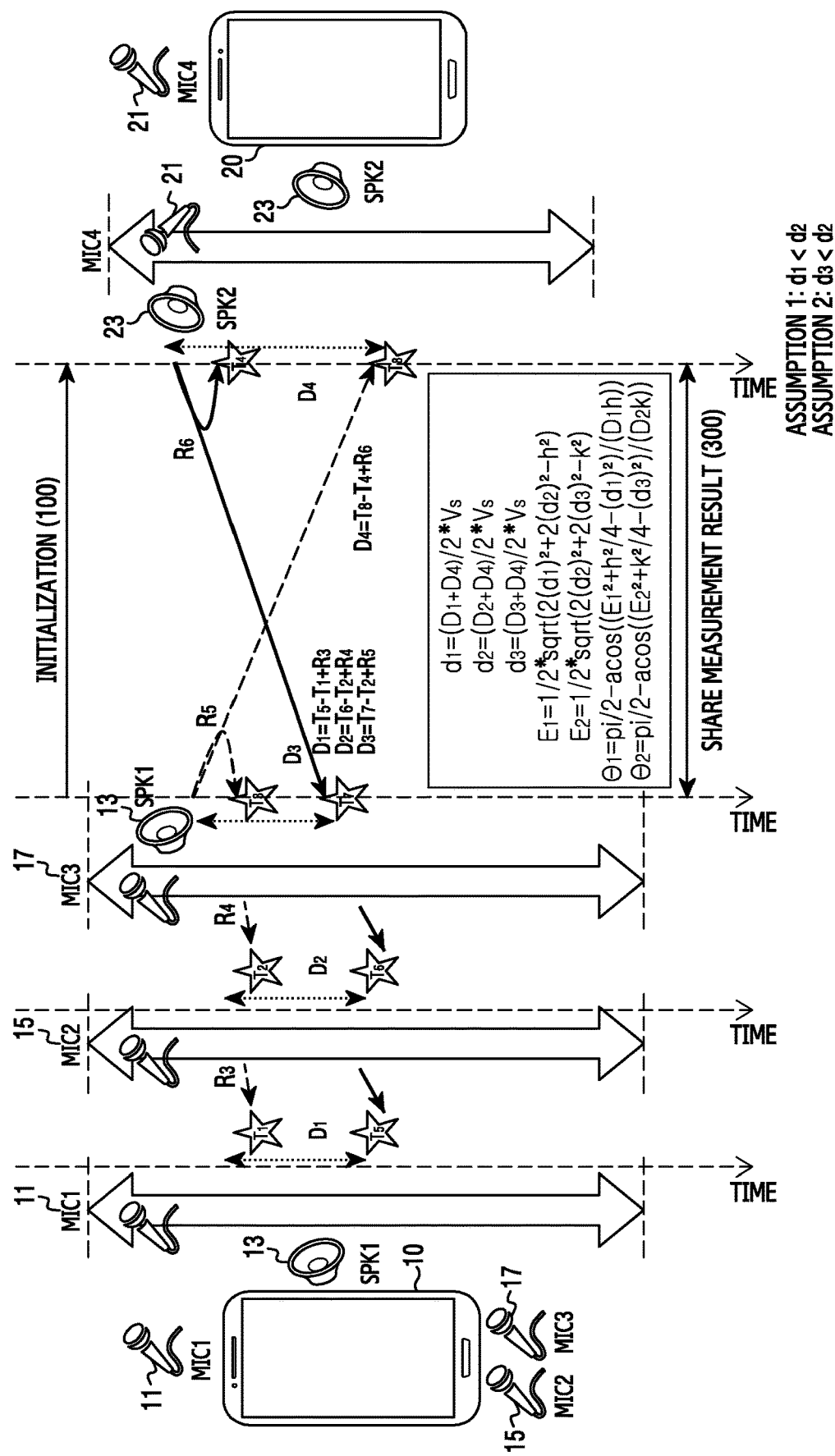
FIG. 15 illustrates a processing flow of a distance measuring method according to various embodiments of the present disclosure.

FIG. 15 illustrates a processing flow of a distance measuring method according to various embodiments of the present disclosure.

Referring to FIG. 15, the first electronic device 10 may perform the negotiation with the second electronic device 20 by performing the signalling with respect to the second electronic device 20. The negotiation and signalling operation 100 may be performed in the same manner as in the description above with respect to FIGS. 1A and 1B.

Referring to FIG. 15, the first electronic device 10 may include the first microphone (MIC1) 11, the first speaker (SPK1) 13, the second microphone (MIC2) 15, and the third microphone (MIC3) 17, and the second electronic device 20 may include the fourth microphone (MIC4) 21 and the second speaker (SPK2) 23, respectively. Although FIG. 15 shows that the first electronic device 10 includes three microphones and one speaker and the second electronic device includes one microphone and one speaker, respectively, this is only an example, and the first electronic device 10 and the second electronic device 20 may include a plurality of microphones and a plurality of speakers, respectively, according to another embodiment of the present disclosure.

After the negotiation and signalling operation 100, the first electronic device 10 and the second electronic device 20 may perform the distance measurement operation 200. Here, the first electronic device 10 may activate the first microphone 11, the first speaker 13, the second microphone 15, and the third microphone 17, which are included in the first electronic device 10, for a certain period of time prior to performing the negotiation and signalling operation 100. The second electronic device 20 may activate the fourth microphone 21 and the second speaker 23, which are included in the second electronic device 20, for a certain period of time after receiving the initial signal from the first electronic device 10.

In addition, in response to the activation of the first microphone 11, the second microphone 15, and the third microphone 17 for the certain period of time, the first recording device (not shown in FIG. 15) included in the first electronic device 10 may be activated for the certain period of time so that the first recording device may record sound waves that are received through the first microphone 11, the second microphone 15, and the third microphone 17 for the certain period of time. Similarly, in response to the activation of the fourth microphone 21 for the certain period of time, the second recording device (not shown in FIG. 15)

included in the second electronic device 20 may be activated for the certain period of time so that the second recording device may record sound waves that are received through the fourth microphone 21 for the certain period of time.

Referring to FIG. 15, the first speaker 13 included in the first electronic device 10 may output the first sound wave, and the first microphone 11, the second microphone 15, and the third microphone 17 included in the first electronic device 10 may receive the first sound wave, respectively. In this case, the first electronic device 10 may identify, through the first recording device, the timing $T_1$ of when the first sound wave is received by the first microphone 11. The first electronic device 10 may identify, through the first recording device, the timing $T_2$ of when the first sound wave is received by the second microphone 15. The first electronic device 10 may identify, through the first recording device, the timing $T_3$ of when the first sound wave is received by the third microphone 17.

In addition, the difference between the timing of when the first sound wave is output through the first speaker 13 and the timing $T_1$ may be configured to be $R_3$. The value $R_3$ may be determined based on the distance between the first speaker 13 and the first microphone 11 and the transmission speed ($V_s$, 340 m/s) of a sound wave. In other words, the value $R_3$ may be determined by dividing the distance value between the first speaker 13 and the first microphone 11 by the transmission speed (340 m/s) of a sound wave. The distance value may be determined to be a fixed value, according to the embodiment of the present disclosure. In addition, since the transmission speed of a sound wave is a constant value, the first electronic device 10 may recognize the value $R_3$ as a predefined value.

In addition, the difference between the timing of when the first sound wave is output through the first speaker 13 and the timing $T_2$ may be configured to be $R_4$. The value $R_4$ may be determined based on the distance between the first speaker 13 and the second microphone 15 and the transmission speed ($V_s$, 340 m/s) of a sound wave. In other words, the value $R_4$ may be determined by dividing the distance value between the first speaker 13 and the second microphone 15 by the transmission speed (340 m/s) of a sound wave. The distance value may be determined to be a fixed value, according to the embodiment of the present disclosure. In addition, since the transmission speed of a sound wave is a constant value, the first electronic device 10 may recognize the value $R_4$ as a predefined value.

In addition, the difference between the timing of when the first sound wave is output through the first speaker 13 and the timing $T_3$ may be configured to be $R_5$. The value $R_5$ may be determined based on the distance between the first speaker 13 and the third microphone 17 and the transmission speed ($V_s$, 340 m/s) of a sound wave. In other words, the value $R_5$ may be determined by dividing the distance value between the first speaker 13 and the third microphone 17 by the transmission speed (340 m/s) of a sound wave. The distance value may be determined to be a fixed value, according to the embodiment of the present disclosure. In addition, since the transmission speed of a sound wave is a constant value, the first electronic device 10 may recognize the value $R_5$ as a predefined value.

The second speaker 23 included in the second electronic device 20 may output the second sound wave, and the fourth microphone 21 included in the second electronic device 20 may receive the second sound wave. In this case, the second electronic device 20 may identify the timing $T_4$ of when the second sound wave is received through the second recording device.

In addition, the difference between the timing of when the second sound wave is output through the second speaker 23 and the timing $T_4$ may be configured to be $R_6$. The value $R_6$ may be determined based on the distance between the second speaker 23 and the fourth microphone 21, and the transmission speed (340 m/s) of a sound wave. In other words, the value $R_6$ may be determined by dividing a distance value between the second speaker 23 and the fourth microphone 21 by the transmission speed (340 m/s) of a sound wave. The distance value may be determined to be a fixed value, according to the embodiment of the present disclosure. In addition, since the transmission speed of a sound wave is a constant value, the second electronic device 20 may recognize the value $R_6$ as a predefined value.

The first microphone 11 may receive the second sound wave that is output from the second speaker 23, and in this case, the first electronic device 10 may identify, through the first recording device, the timing $T_5$ of when the second sound wave is received by the first microphone 11. In addition, the second microphone 15 may receive the second sound wave that is output from the second speaker 23, and in this case, the first electronic device 10 may identify, through the first recording device, the timing $T_6$ of when the second sound wave is received by the second microphone 15. In addition, the third microphone 17 may receive the second sound wave that is output from the second speaker 23, and in this case, the first electronic device 10 may identify, through the first recording device, the timing $T_7$ of when the second sound wave is received by the third microphone 17.

The fourth microphone 21 may receive the first sound wave that is output from the first speaker 13, and in this case, the second electronic device 20 may identify, through the second recording device, the timing $T_8$ of when the first sound wave is received.

According to this, the first electronic device 10 may determine the first value $D_1$ corresponding to the difference between the timing of when the first electronic device 10 outputs the first sound wave and the timing $T_5$ of when the first microphone 11 receives the second sound wave that is output from the second electronic device 20. More specifically, the first value may be determined to be a value obtained by adding, to the value $R_3$, a difference value between the value $T_5$ and the value $T_1$.

In addition, the first electronic device 10 may determine the second value $D_2$ corresponding to the difference between the timing of when the first electronic device 10 outputs the first sound wave and the timing $T_6$ of when the second microphone 15 receives the second sound wave that is output from the second electronic device 20. More specifically, the second value may be determined to be a value obtained by adding, to the value $R_4$, a difference value between the value $T_6$ and the value $T_2$.

In addition, the first electronic device 10 may determine the third value $D_3$ corresponding to the difference between the timing of when the first electronic device 10 outputs the first sound wave and the timing $T_7$ of when the third microphone 17 receives the second sound wave that is output from the second electronic device 20. More specifically, the third value may be determined to be a value obtained by adding the difference value between the value $T_7$ and the value $T_3$ to the value $R_5$.

The second electronic device 20 may determine the fourth value $D_4$ corresponding to the difference between the timing of when the second electronic device 20 outputs the second sound wave and the timing $T_8$ of when the second electronic device 20 receives the first sound wave that is output from the first electronic device 10. More specifically, the fourth value may be determined to be a value obtained by adding the difference value between the value $T_8$ and the value $T_4$ to the value $R_6$.

In the measurement result sharing operation 300, the first electronic device 10 may transmit the first value, the second value, and the third value to the second electronic device 20, and the second electronic device 20 may transmit the fourth value to the first electronic device 10. As a result, the first electronic device 10 may determine an average value of the first value that is directly determined by the first electronic device 10 and the fourth value that is received from the second electronic device 20, and then may determine a distance value $d_1$ between the first microphone 11 of the first electronic device 10 and the second electronic device 20 by multiplying the average value and the transmission speed (340 m/s) of a sound wave.

In addition, the first electronic device 10 may determine an average value of the second value that is directly determined by the first electronic device 10 and the fourth value that is received from the second electronic device 20, and then may determine a distance value $d_2$ between the second microphone 15 of the first electronic device 10 and the second electronic device 20 by multiplying the average value and the transmission speed (340 m/s) of a sound wave.

In addition, the first electronic device 10 may determine an average value of the third value that is directly determined by the first electronic device 10 and the fourth value that is received from the second electronic device 20, and then may determine a distance value $d_3$ between the third microphone 17 of the first electronic device 10 and the second electronic device 20 by multiplying the average value and the transmission speed (340 m/s) of a sound wave.

Similarly, the second electronic device 20 may determine an average value of the fourth value that is directly determined by the second electronic device 20, and the first value, the second value, or the third value that is received from the first electronic device 10, and then may determine the distance value between the first electronic device 10 and the second electronic device 20 by multiplying the average value and the transmission speed (340 m/s) of a sound wave.

Figure 11B:
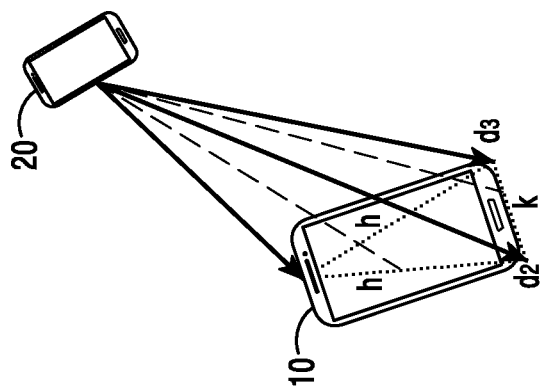

Consequently, according to the principles described above with respect to FIGS. 11A to 12, the first electronic device 10 may determine the first distance $E_1$ that is desired to actually be measured between the first electronic device 10 and the second electronic device 20 (for example, the distance between the center point of the first microphone 11 and the second microphone 15, and the second speaker 23 included in the second electronic device 20) and the second distance $E_2$ that is desired to be actually measured between the first electronic device 10 and the second electronic device 20 (for example, the distance between the center point of the second microphone 15 and the third microphone 17, and the second speaker 23 included in the second electronic device 20). In addition, the first electronic device 10 may determine the first direction $\theta_1$ of the second electronic device 20 with respect to the first electronic device 10 and the second direction $\theta_2$ of the second electronic device 20 with respect to the first electronic device 10.

More specifically, the first electronic device 10 may determine the distance value $E_1$ based on the square of $d_1$, the square of $d_2$, and the square of h. Similarly, the first electronic device 10 may determine the distance value $E_2$ based on the square of $d_2$, the square of $d_3$, and the square of k. In addition, the first electronic device 10 may determine the direction value θ 1 based on the square of $E_1$, the square of $d_1$, and the square of h. Similarly, the first electronic device 10 may determine the direction value $\theta_2$ based on the square of $E_2$, the square of $d_3$, and the square of k. For example, the distance value $E_1$, the distance value $E_2$, the direction value θ 1, and the direction value $\theta_2$ may be determined by Equation 5 below.

$$E_1 = \tfrac{1}{2} * \mathrm{sqrt}(2(d_1)^2 + 2(d_2)^2 - h^2)$$

$$E_2 = \tfrac{1}{2} * \mathrm{sqrt}(2(d_2)^2 + 2(d_3)^2 - k^2)$$

$$\Theta_1 = \mathrm{pi}/2 - a\,\cos((E_1^2 + h^2/4 - (d_1)^2)/(D_1 h))$$

$$\Theta_2 = \mathrm{pi}/2 - a\,\cos((E_2^2 + k^2/4 - (d_3)^2)/(D_2 k)) \qquad \text{Equation 5}$$

Here, $E_1$ denotes the first distance between the first electronic device and the second electronic device, which is actually desired to be measured, and $E_2$ denotes the second distance between the first electronic device and the second electronic device, which is actually desired to be measured. $d_1$ denotes the distance between the first microphone and the second electronic device, and $d_2$ denotes the distance between the second microphone and the second electronic device. $d_3$ denotes the distance between the third microphone and the second electronic device, and h denotes the distance between the first microphone and the second microphone, or denotes the distance between the first microphone and the third microphone. k denotes the distance between the second microphone and the third microphone. In addition, $\theta_1$ denotes the first direction of the second electronic device with respect to the first electronic device, and $\theta_2$ denotes the second direction of the second electronic device with respect to the first electronic device.

Figure 16:
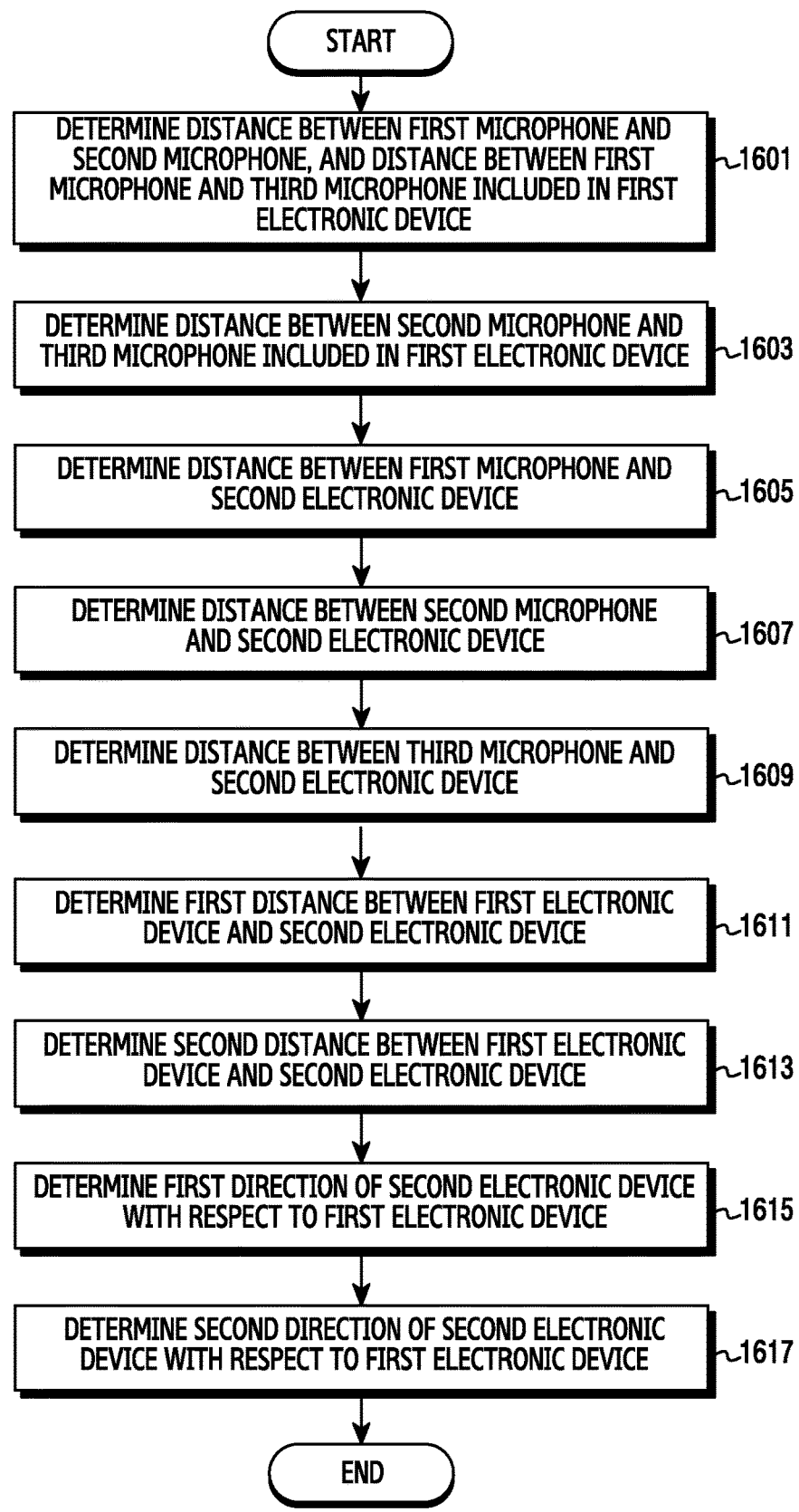
FIG. 16 is a flowchart illustrating a distance-measuring operation of a first electronic device according to various embodiments of the present disclosure.

FIG. 16 is a flowchart illustrating a distance-measuring operation in a first electronic device according to various embodiments of the present disclosure.

Referring to FIG. 16, first, in operation 1601, the first electronic device 10 may determine the distance h between the first microphone 11 and the second microphone 15, which are included in the first electronic device 10, and may determine the distance h between the first microphone 11 and the third microphone 17, which are included in the first electronic device 10. According to the embodiment of the present disclosure, since the first microphone 11, the second microphone 15, and the third microphone 17 included in the first electronic device 10 may be provided at fixed positions, the distance value h may be a determined value.

In operation 1603, the first electronic device 10 may determine the distance k between the second microphone 15 and the third microphone 17 included in the first electronic device 10. According to the embodiment of the present disclosure, since the first microphone 11, the second microphone 15, and the third microphone 17 included in the first electronic device 10 may be provided at fixed positions, the distance value k may be a determined value.

In addition, in operation 1605, the first electronic device 10 may determine the distance $d_1$ between the first microphone 11 and the second electronic device 20. According to the embodiment of the present disclosure, the distance $d_1$ may be determined according to the distance measurement operation 200 described in FIG. 1A or the distance determination operation described in FIG. 15.

In operation 1607, the first electronic device 10 may determine the distance $d_2$ between the second microphone 15 and the second electronic device 20. According to the embodiment of the present disclosure, the distance $d_2$ may be determined according to the distance measurement operation 200 described in FIG. 1A or the distance determination operation described in FIG. 15.

In operation 1609, the first electronic device 10 may determine the distance $d_3$ between the third microphone 17 and the second electronic device 20. According to the embodiment of the present disclosure, the distance $d_3$ may be determined according to the distance measurement operation 200 described in FIG. 1A or the distance determination operation described in FIG. 15.

In operation 1611, the first electronic device 10 may determine the first distance $E_1$ between the first electronic device 10 and the second electronic device 20. Here, the distance $E_1$ may be determined to be the distance that is actually desired to be measured between the first electronic device 10 and the second electronic device 20, and for example, may be determined to be the distance between the center point of the first microphone 11 and the second microphone 15 and the second speaker 23 included in the second electronic device 20. More specifically, the distance value $E_1$ may be determined according to Equation 5.

In addition, in operation 1613, the first electronic device 10 may determine the second distance $E_2$ between the first electronic device 10 and the second electronic device 20. Here, the distance $E_2$ may be determined to be the distance that is actually desired to be measured between the first electronic device 10 and the second electronic device 20, and for example, may be determined to be the distance between the center point of the second microphone 15 and the third microphone 17 and the second speaker 23 included in the second electronic device 20. More specifically, the distance value $E_2$ may be determined according to Equation 5.

In operation 1615, the first electronic device 10 may determine the first direction $\theta_1$ of the second electronic device 20 with respect to the first electronic device 10. More specifically, the direction value $\theta_1$ may be determined according to Equation 5.

Finally, in operation 1617, the first electronic device 10 may determine the second direction $\theta_2$ of the second electronic device 20 with respect to the first electronic device 10. More specifically, the direction value $\theta_2$ may be determined according to Equation 5.

Figure 17:
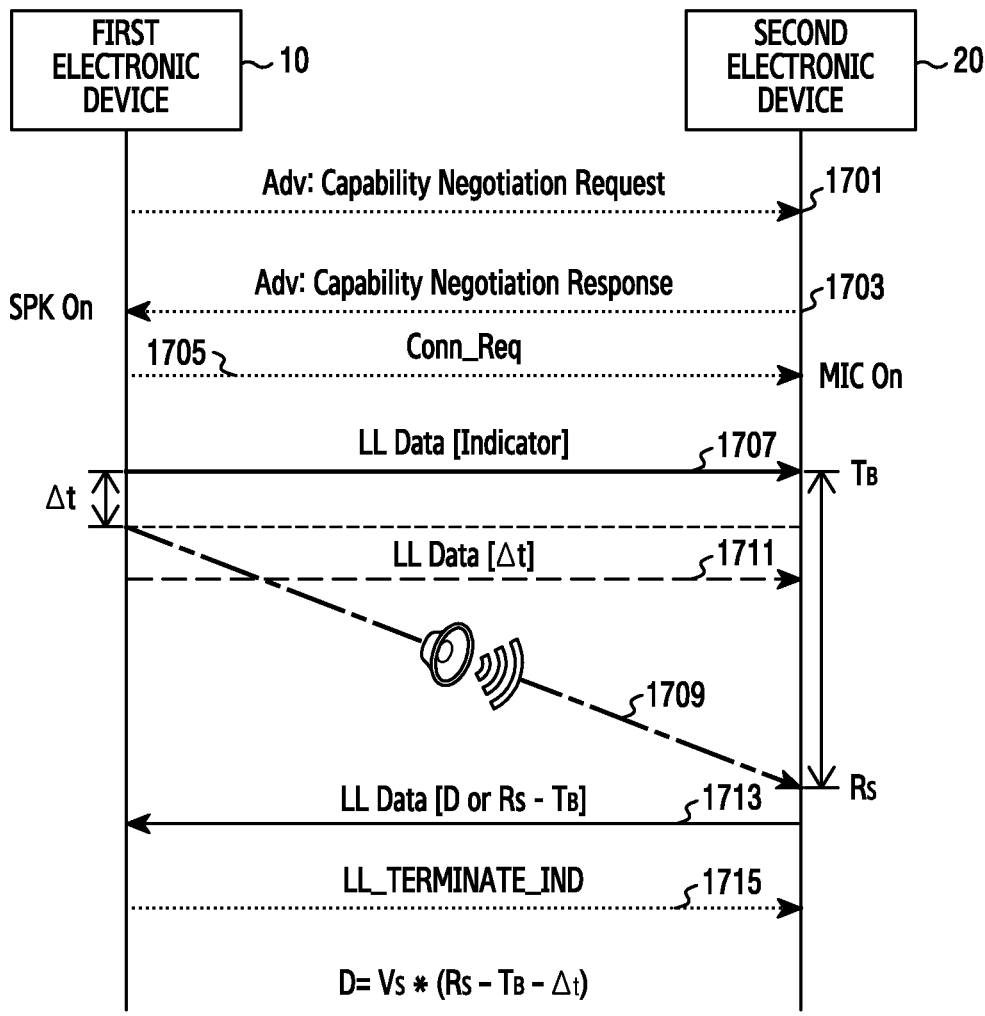
FIG. 17 illustrates a processing flow of a distance measuring method according to various embodiments of the present disclosure.

FIG. 17 illustrates a processing flow of a distance measuring method according to various embodiments of the present disclosure.

Referring to FIG. 17, the first electronic device 10 may include the first speaker, and the second electronic device 20 may include the second microphone. First, in operation 1701, the first electronic device 10 may transmit a capability negotiation request for measuring the distance to a certain electronic device. In other words, the capability negotiation request may be broadcast in the form of an advertising packet, and a certain electronic device near the first electronic device 10 may receive the capability negotiation request.

According to the embodiment of the present disclosure, the second electronic device 20 may receive the capability negotiation request, and may transmit a capability negotiation response to the first electronic device 10 in response to the capability negotiation request in operation 1703. In other words, in the embodiment of the present disclosure, the negotiation between the first electronic device 10 and the second electronic device 20 may be made in a similar manner as the procedure described in FIG. 2. In this case, the first electronic device 10, which has received the capability negotiation response, may activate the speaker included in the first electronic device 10.

In addition, the first electronic device 10 may transmit a connection request to establish a connection with the second electronic device 20 in operation 1705. In response thereto, the second electronic device 20 may receive the connection request from the first electronic device 10. According to this, the connection between the first electronic device 10 and the second electronic device 20 may be established. According to the embodiment of the present disclosure, the first electronic device 10 and the second electronic device 20 may be connected using BT. In this case, the second electronic device 20, which has received the connection request, may activate the microphone that is included in the second electronic device 20.

In operation 1707, the first electronic device 10 may transmit the first wireless signal to the second electronic device 20. According to the embodiment of the present disclosure, the first wireless signal may be transmitted in the form of an LL data signal, and may serve as a reference signal for measuring the distance between the first electronic device 10 and the second electronic device 20. In this case, the first wireless signal may be referred to as a distance measurement indicator as well. The second electronic device 20 may receive the first wireless signal at the timing $T_B$.

In addition, in operation 1709, the first electronic device 10 may transmit a sound wave to the second electronic device 20 at the timing of when the time $\Delta t$ has elapsed since the transmission timing of the first wireless signal. Here, the first electronic device 10 may calculate the value $\Delta t$. For example, the clock of a system or chip that transmits the wireless signal and the clock of a system or chip that transmits the sound wave may be converted to a reference clock of the entire system, and then the value $\Delta t$ may be calculated. In addition, in operation 1711, the first electronic device 10 may transmit the second wireless signal to the second electronic device 20, wherein the second wireless signal may be transmitted in the form of an LL data signal as the first wireless signal, and the second wireless signal may contain the value $\Delta t$ that has been calculated by the first electronic device 10. Here, the value $\Delta t$ may be one of the parameters for calculating the distance between the first electronic device 10 and the second electronic device 20. In this case, the second electronic device 20 may receive the sound wave at the timing $R_s$.

The second electronic device 20 may measure the distance between the first electronic device 10 and the second electronic device 20 based on the parameters that are measured by the second electronic device 20 or that are received from the first electronic device 10. It may be assumed that the timing of when the first electronic device 10 transmits the first wireless signal to the second electronic device 20 is the same, being $T_B$, as the timing of when the second electronic device 20 receives the first wireless signal from the first electronic device 10. It may be assumed that the transmission delay of the wireless signal is close to zero. At this time, the difference value between the timing of when the first electronic device 10 transmits the sound wave to the second electronic device 20 and the timing $R_S$ of when the second electronic device 20 receives the sound wave from the first electronic device 10 may be determined to be $(R_S-T_B-\Delta t)$. Here, the value $R_S$ and the value $T_B$ may be measured by the second electronic device 20, and the value $\Delta t$ may be received from the first electronic device 10. Consequently, the second electronic device 20 may calculate the distance between the first electronic device 10 and the second electronic device 20 by multiplying the value $(R_S-T_B-\Delta t)$ and the transmission speed (340 m/s) of a sound wave.

In this case, the second electronic device 20 may transmit the third wireless signal to the first electronic device 10 in operation 1713, wherein the third wireless signal may contain the distance value between the first electronic device 10 and the second electronic device 20, or may contain the value ($R_S$-$T_B$), which has been previously determined. In the case where the third wireless signal contains the value ($R_S$-$T_B$), the first electronic device 10 may directly calculate the distance between the first electronic device 10 and the second electronic device 20 by multiplying the value ($R_S$-$T_B$-$\Delta t$) and the transmission speed (340 m/s) of a sound wave through the received value ($R_S$-$T_B$) and the value $\Delta t$ that has been determined by the first electronic device 10. Finally, in operation 1715, the first electronic device 10 may transmit a connection termination signal to the second electronic device 20.

Figure 18:
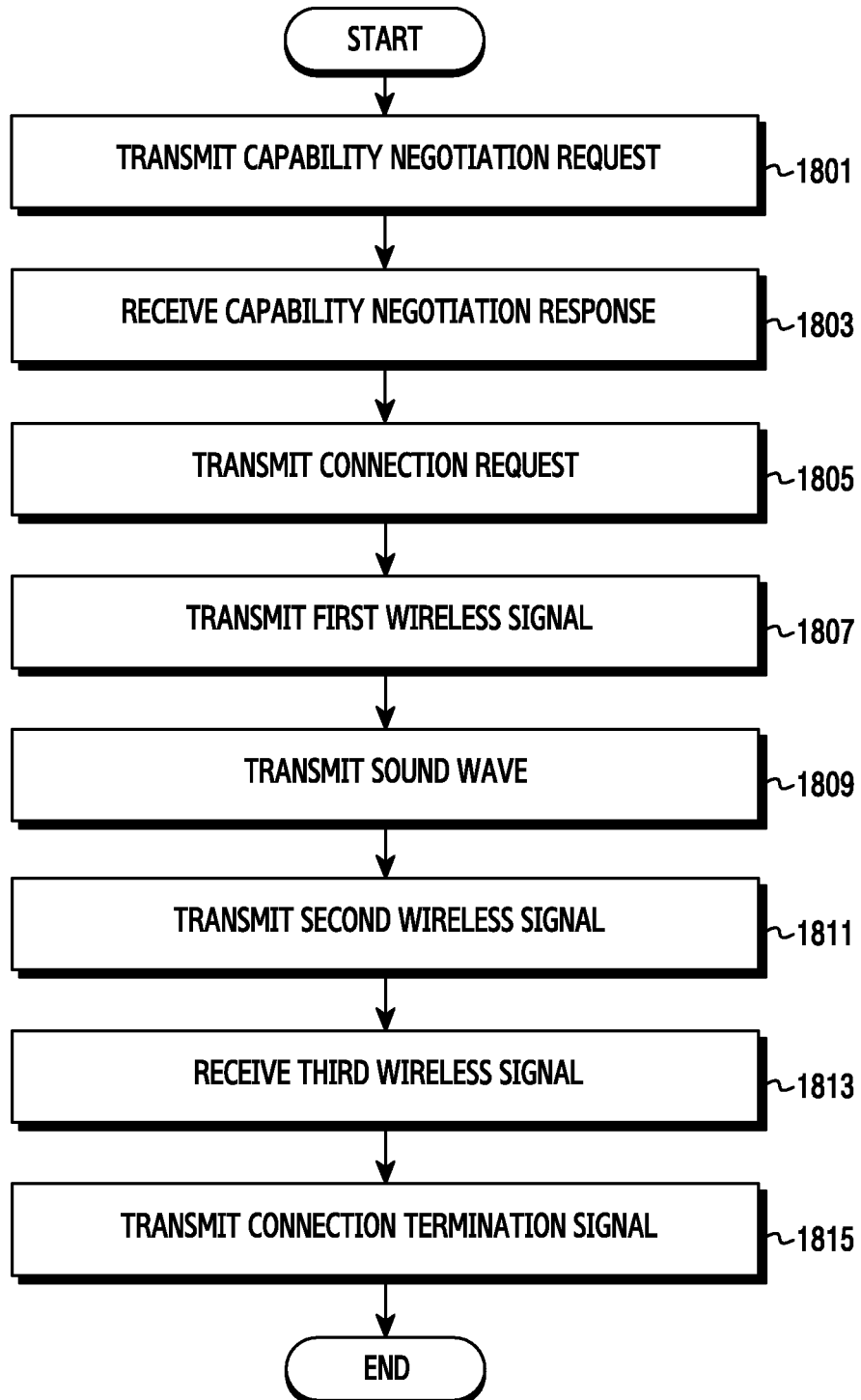
FIG. 18 is a flowchart illustrating a distance-measuring operation of a first electronic device according to various embodiments of the present disclosure.

FIG. 18 is a flowchart illustrating a distance-measuring operation in a first electronic device according to various embodiments of the present disclosure.

Referring to FIG. 18, first, in operation 1801, the first electronic device 10 may transmit a capability negotiation request. In other words, the capability negotiation request may be broadcast in the form of an advertising packet, and a certain electronic device near the first electronic device 10 may receive the capability negotiation request.

In operation 1803, the first electronic device 10 may receive a capability negotiation response from the second electronic device 20. According to the embodiment of the present disclosure, the negotiation between the first electronic device 10 and the second electronic device 20 may be made in a similar manner as the procedure described in FIG. 2. In this case, the first electronic device 10, which has received the capability negotiation response may activate a speaker included in the first electronic device 10.

In addition, the first electronic device 10 may transmit a connection request to the second electronic device 20 in operation 1805. According to the embodiment of the present disclosure, the first electronic device 10 and the second electronic device 20 may be connected using BT.

In operation 1807, the first electronic device 10 may transmit the first wireless signal to the second electronic device 20. According to the embodiment of the present disclosure, the first wireless signal may be transmitted in the form of an LL data signal, and may serve as a reference signal for measuring the distance between the first electronic device 10 and the second electronic device 20.

In addition, in operation 1809, the first electronic device 10 may transmit a sound wave to the second electronic device 20. In this case, the first electronic device 10 may transmit the sound wave to the second electronic device 20 at the timing of when the time $\Delta t$ has elapsed since the transmission timing of the first wireless signal.

In operation 1811, the first electronic device 10 may transmit the second wireless signal to the second electronic device 20. In this case, the second wireless signal may contain the value $\Delta t$ that has been calculated by the first electronic device 10. Here, the value $\Delta t$ may be one of the parameters for calculating the distance between the first electronic device 10 and the second electronic device 20.

In addition, in operation 1813, the first electronic device 10 may receive the third wireless signal from the second electronic device 20. Provided that the timing of when the first electronic device 10 transmits the first wireless signal to the second electronic device 20 is the same, being $T_B$, as the timing of when the second electronic device 20 receives the first wireless signal from the first electronic device 10, the difference value between the timing of when the first electronic device 10 transmits the sound wave to the second electronic device 20 and the timing $R_S$ of when the second electronic device 20 receives the sound wave from the first electronic device 10 may be determined to be ($R_S$-$T_B$-$\Delta t$). Here, the value $R_S$ corresponds to the timing of when the second electronic device 20 receives the sound wave. Consequently, the distance between the first electronic device 10 and the second electronic device 20 may be calculated through the product of the value ($R_S$-$T_B$-$\Delta t$) and the transmission speed (340 m/s) of a sound wave, and the third wireless signal may contain the distance value. In some cases, the third wireless signal may contain the value ($R_S$-$T_B$), and in this case, the first electronic device 10 may directly calculate the distance between the first electronic device 10 and the second electronic device 20 by multiplying the value ($R_S$-$T_B$-$\Delta t$) and the transmission speed (340 m/s) of a sound wave.

Finally, in operation 1815, the first electronic device 10 may transmit a connection termination signal to the second electronic device 20.

Figure 19:
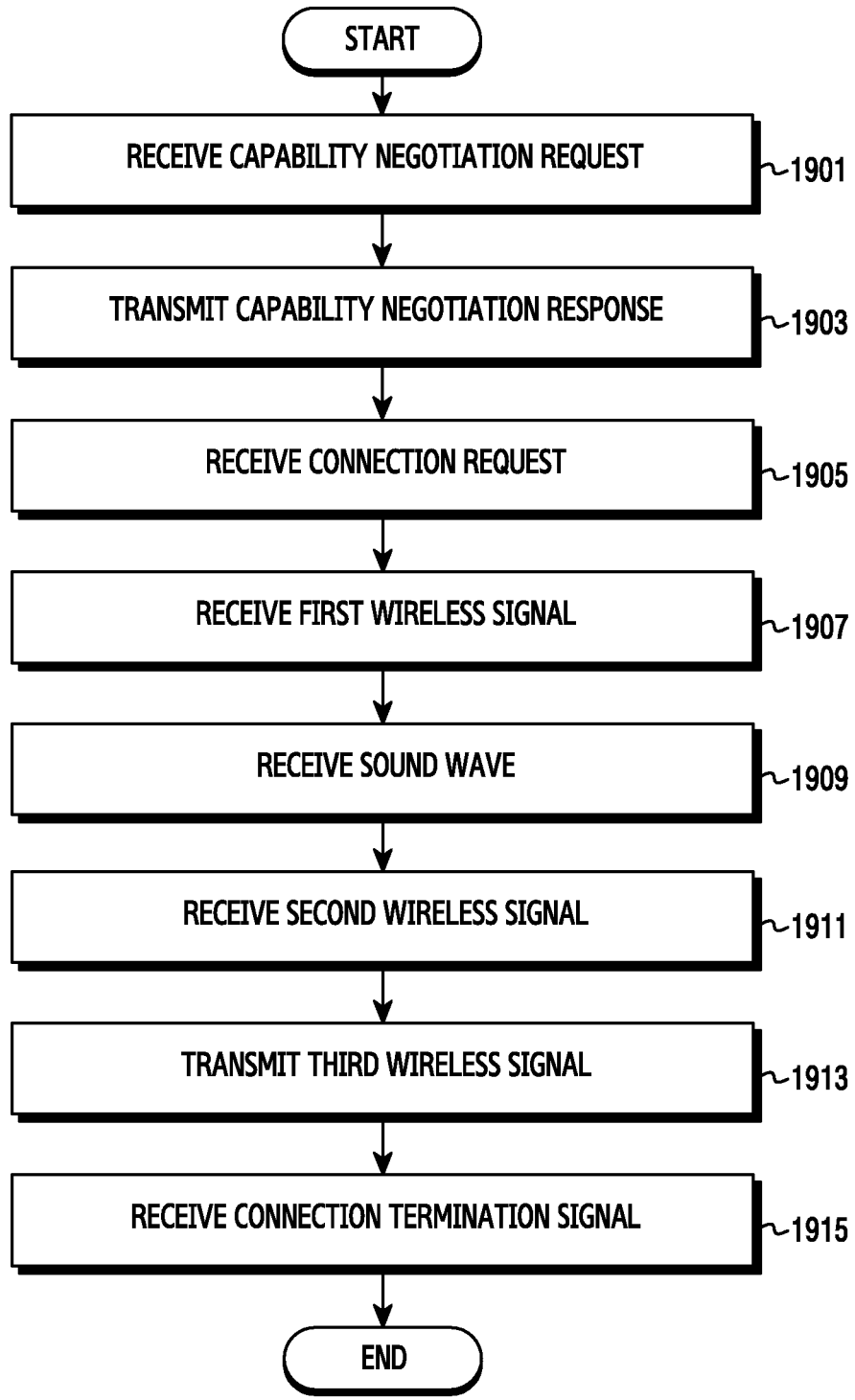
FIG. 19 is a flowchart illustrating a distance-measuring operation of a second electronic device according to various embodiments of the present disclosure.

FIG. 19 is a flowchart illustrating a distance-measuring operation in a second electronic device according to various embodiments of the present disclosure.

Referring to FIG. 19, first, in operation 1901, the second electronic device 20 may receive a capability negotiation request from the first electronic device 10. In other words, the capability negotiation request may be broadcast in the form of an advertising packet by the first electronic device 10.

In operation 1903, the second electronic device 20 may transmit a capability negotiation response to the first electronic device 10. According to the embodiment of the present disclosure, the negotiation between the first electronic device 10 and the second electronic device 20 may be made in a similar manner as the procedure described in FIG. 2.

In addition, the second electronic device 20 may receive a connection request from the first electronic device 10 in operation 1905. According to this, the connection between the first electronic device 10 and the second electronic device 20 may be established. According to the embodiment of the present disclosure, the first electronic device 10 and the second electronic device 20 may be connected using BT. In this case, the second electronic device 20, which has received the connection request may activate a microphone included in the second electronic device 20.

In operation 1907, the second electronic device 20 may receive the first wireless signal from the first electronic device 10. According to the embodiment of the present disclosure, the first wireless signal may be transmitted in the form of an LL data signal, and may serve as a reference signal for measuring the distance between the second electronic device 20 and the first electronic device 10. Here, the second electronic device 20 may receive the first wireless signal at the timing $T_B$.

In addition, in operation 1909, the second electronic device 20 may receive a sound wave from the first electronic device 10. In this case, the first electronic device 10 may transmit the sound wave to the second electronic device 20 at the timing of when the time $\Delta t$ has elapsed since the transmission timing of the first wireless signal.

In operation 1911, the second electronic device 20 may receive the second wireless signal from the first electronic device 10. In this case, the second wireless signal may contain the value $\Delta t$ that has been calculated by the first electronic device 10. Here, the value $\Delta t$ may be one of the parameters for calculating the distance between the first electronic device 10 and the second electronic device 20.

In addition, in operation 1913, the second electronic device 20 may transmit the third wireless signal to the first electronic device 10. Provided that the timing of when the first electronic device 10 transmits the first wireless signal to the second electronic device 20 is the same, being $T_B$, as the timing of when the second electronic device 20 receives the first wireless signal from the first electronic device 10, the difference value between the timing of when the first electronic device 10 transmits the sound wave to the second electronic device 20 and the timing $R_S$ of when the second electronic device 20 receives the sound wave from the first electronic device 10 may be determined to be $(R_S - T_B - \Delta t)$. Consequently, the second electronic device 20 may calculate the distance between the first electronic device 10 and the second electronic device 20 through the product of the value $(R_S - T_B - \Delta t)$ and the transmission speed (340 m/s) of a sound wave, and the third wireless signal may contain the distance value. In some cases, the third wireless signal may contain the value $(R_S - T_B)$, and in this case, the first electronic device 10 may directly calculate the distance between the first electronic device 10 and the second electronic device 20 by multiplying the value $(R_S - T_B - \Delta t)$ and the transmission speed (340 m/s) of a sound wave.

Finally, in operation 1915, the second electronic device 20 may receive a connection termination signal from the first electronic device 10.

Figure 20:
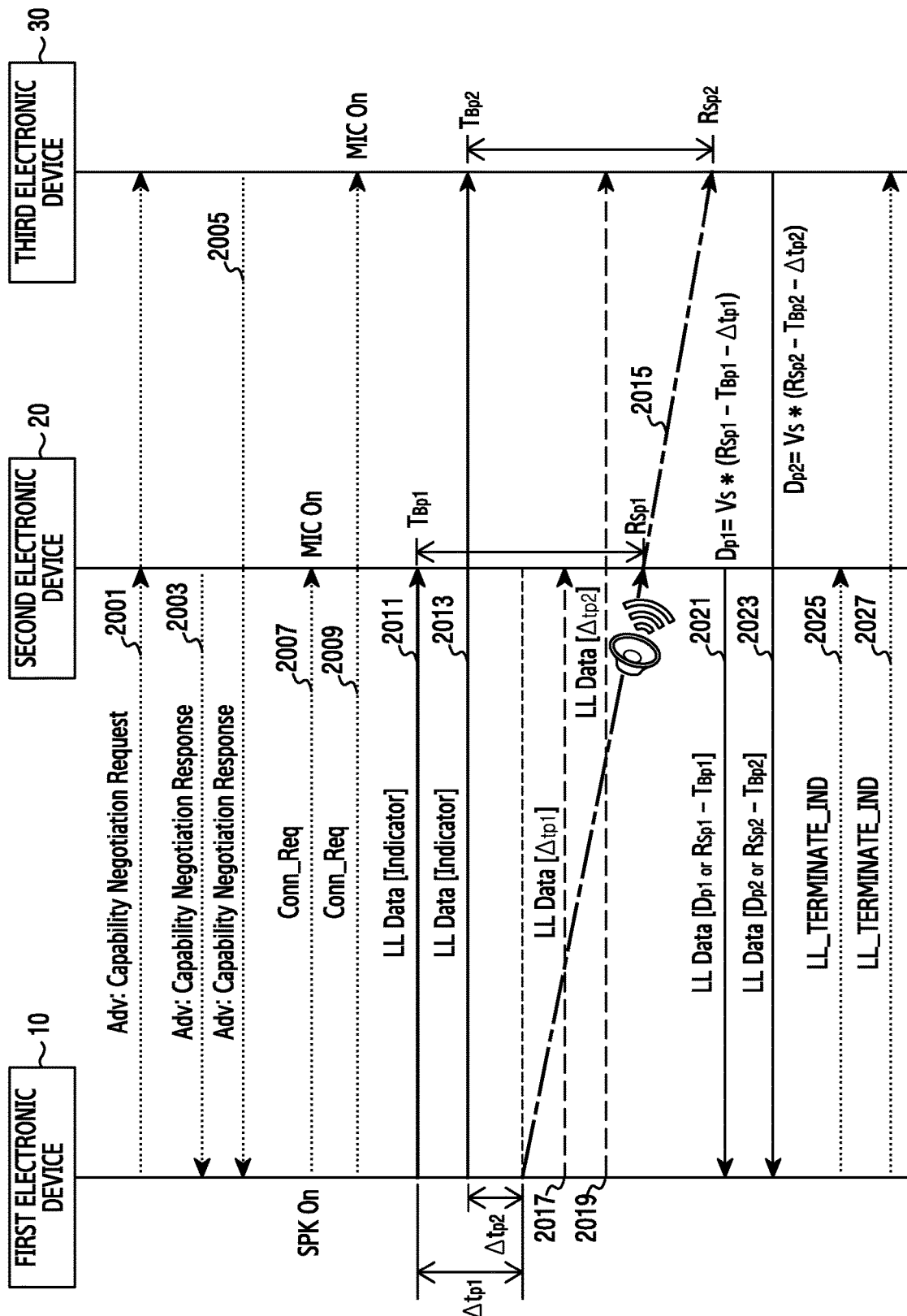
FIG. 20 illustrates a processing flow of a distance measuring method according to various embodiments of the present disclosure.

FIG. 20 illustrates a processing flow of a distance measuring method according to various embodiments of the present disclosure.

Referring to FIG. 20, the first electronic device 10 may include the first speaker, and the second electronic device 20 may include the second microphone. In addition, the third electronic device 30 may include the third microphone. First, in operation 2001, the first electronic device 10 may transmit a capability negotiation request for measuring the distance to a certain electronic device. In other words, the capability negotiation request may be broadcast in the form of an advertising packet, and a certain electronic device near the first electronic device 10 may receive the capability negotiation request. Here, the capability negotiation request may be received by a plurality of electronic devices.

According to the embodiment of the present disclosure, the second electronic device 20 may receive the capability negotiation request, and may transmit the first capability negotiation response to the first electronic device 10 in response to the capability negotiation request in operation 2003. In addition, the third electronic device 30 may receive the capability negotiation request, and may transmit the second capability negotiation response to the first electronic device 10 in response to the capability negotiation request in operation 2005.

In other words, in the embodiment of the present disclosure, the negotiation between the first electronic device 10 and the second electronic device 20, and the negotiation between the first electronic device 10 and the third electronic device 30 may be made in a similar manner as the procedure described in FIG. 2. In this case, the first electronic device 10, which has received the first capability negotiation response and the second capability negotiation response, may activate the speaker included in the first electronic device 10.

In addition, the first electronic device 10 may transmit, to the second electronic device 20, the first connection request to establish a connection with the second electronic device 20 in operation 2007. In response thereto, the second electronic device 20 may receive the first connection request from the first electronic device 10. According to this, the connection between the first electronic device 10 and the second electronic device 20 may be established. In addition, in operation 2009, the first electronic device 10 may transmit, to the third electronic device 30, the second connection request to establish a connection with the third electronic device 30, and, in response thereto, the third electronic device 30 may receive the second connection request from the first electronic device 10. According to this, the connection between the first electronic device 10 and the third electronic device 30 may be established. According to the embodiment of the present disclosure, the first electronic device 10 and the second electronic device 20, as well as the first electronic device 10 and the third electronic device 30 may be connected using BT, respectively. In this case, the second electronic device 20, which has received the first connection request, may activate the microphone that is included in the second electronic device 20, and the third electronic device 30, which has received the second connection request, may activate the microphone that is included in the third electronic device 30.

In operation 2011, the first electronic device 10 may transmit the first wireless signal to the second electronic device 20. According to the embodiment of the present disclosure, the first wireless signal may be transmitted in the form of an LL data signal, and may serve as a reference signal for measuring the distance between the first electronic device 10 and the second electronic device 20. The first wireless signal may be referred to as a distance measurement indicator as well. Here, the second electronic device 20 may receive the first wireless signal at the timing $T_{Bp1}$.

In addition, in operation 2013, the first electronic device 10 may transmit the second wireless signal to the third electronic device 30. According to the embodiment of the present disclosure, the second wireless signal may be transmitted in the form of an LL data signal, and may serve as a reference signal for measuring the distance between the first electronic device 10 and the third electronic device 30. The second wireless signal may be referred to as a distance measurement indicator as well. Here, the third electronic device 30 may receive the second wireless signal at the timing $T_{Bp2}$.

In operation 2015, the first electronic device 10 may transmit a sound wave at the timing of when the time $\Delta t_{p1}$ has elapsed since the transmission timing of the first wireless signal (that is, at the timing of when the time $\Delta t_{p2}$ has elapsed since the transmission timing of the second wireless signal). Here, the sound wave is not targeted at a specific electronic device, and may be merely output through the speaker included in the first electronic device 10 so that the electronic devices near the first electronic device 10 may receive the sound wave.

Here, the first electronic device 10 may calculate the value $\Delta t_{p1}$ or the value $\Delta t_{p2}$. For example, the clock of a system or chip that transmits the wireless signal and the clock of a system or chip that transmits the sound wave may be converted to a reference clock of the entire system, and then the value $\Delta t_{p1}$ and the value $\Delta t_{p2}$ may be calculated. In addition, in operation 2017, the first electronic device 10 may transmit the third wireless signal to the second electronic device 20, wherein the third wireless signal may be transmitted in the form of an LL data signal as the first wireless signal, and the third wireless signal may contain the value $\Delta t_{p1}$ that has been calculated by the first electronic device 10. Here, the value $\Delta t_{p1}$ may be one of the parameters for calculating the distance between the first electronic device 10 and the second electronic device 20. In this case, the second electronic device 20 may receive the sound wave at the timing $R_{Sp1}$.

In addition, in operation 2019, the first electronic device 10 may transmit the fourth wireless signal to the third electronic device 30, wherein the fourth wireless signal may be transmitted in the form of an LL data signal as the second wireless signal, and the fourth wireless signal may contain the value $\Delta t_{p2}$ that has been calculated by the first electronic device 10. Here, the value $\Delta t_{p2}$ may be one of the parameters for calculating the distance between the first electronic device 10 and the third electronic device 30. In this case, the third electronic device 30 may receive the sound wave at the timing $R_{Sp2}$.

Here, the second electronic device 20 may measure the distance between the first electronic device 10 and the second electronic device 20 based on the parameters that are measured by the second electronic device 20 or that are received from the first electronic device 10. For example, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the first electronic device 10 transmits the sound wave to the second electronic device 20 and the timing $R_{Sp1}$ of when the second electronic device 20 receives the sound wave from the first electronic device 10 may be determined to be $(R_{Sp1}-T_{Bp1}-\Delta t_{p1})$. Here, the value $R_{Sp1}$ and the value $T_{Bp1}$ may be measured by the second electronic device 20, and the value $\Delta t_{p1}$ may be received from the first electronic device 10. Consequently, the second electronic device 20 may calculate the distance between the first electronic device 10 and the second electronic device 20 by multiplying the value $(R_{Sp1}-T_{Bp1}-\Delta t_{p1})$ by the transmission speed (340 m/s) of a sound wave.

In addition, the third electronic device 30 may measure the distance between the first electronic device 10 and the third electronic device 30 based on the parameters that are measured by the third electronic device 30 or that are received from the first electronic device 10. For example, provided that the timing of when the first electronic device 10 transmits the second wireless signal to the third electronic device 30 is the same, being $T_{Bp2}$, as the timing of when the third electronic device 30 receives the second wireless signal from the first electronic device 10, the difference value between the timing of when the first electronic device 10 transmits the sound wave to the third electronic device 30 and the timing $R_{Sp2}$ of when the third electronic device 30 receives the sound wave from the first electronic device 10 may be determined to be $(R_{Sp2}-T_{Bp2}-\Delta t_{p2})$. Here, the value $R_{Sp2}$ and the value $T_{Bp2}$ may be measured by the third electronic device 30, and the value $\Delta t_{p2}$ may be received from the first electronic device 10. Consequently, the third electronic device 30 may calculate the distance between the first electronic device 10 and the third electronic device 30 by multiplying the value $(R_{Sp2}-T_{Bp2}-\Delta t_{p2})$ and the transmission speed (340 m/s) of a sound wave.

In this case, the second electronic device 20 may transmit the first response signal to the first electronic device 10 in operation 2021, wherein the first response signal may contain the distance value between the first electronic device 10 and the second electronic device 20, or the value $(R_{Sp1}-T_{Bp1})$, which has been previously determined. In the case where the first response signal contains the value $(R_{Sp1}-T_{Bp1})$, the first electronic device 10 may directly calculate the distance between the first electronic device 10 and the second electronic device 20 by multiplying the value $(R_{Sp1}-T_{Bp1}-\Delta t_{p1})$ and the transmission speed (340 m/s) of a sound wave through the received value $(R_{Sp1}-T_{Bp1})$ and the value $\Delta t_{p1}$ that has been determined by the first electronic device 10.

In addition, the third electronic device 30 may transmit the second response signal to the first electronic device 10 in operation 2023, wherein the second response signal may contain the distance value between the first electronic device 10 and the third electronic device 30, or the value $(R_{Sp2}-T_{Bp2})$, which has been previously determined. In the case where the second response signal contains the value $(R_{Sp2}-T_{Bp2})$, the first electronic device 10 may directly calculate the distance between the first electronic device 10 and the third electronic device 30 by multiplying the value $(R_{Sp2}-T_{Bp2}-\Delta t_{p2})$ and the transmission speed (340 m/s) of a sound wave through the received value $(R_{Sp2}-T_{Bp2})$ and the value $\Delta t_{p2}$ that has been determined by the first electronic device 10.

The first electronic device 10 may transmit the first connection termination signal to the second electronic device 20 in operation 2025, and may transmit the second connection termination signal to the third electronic device 30 in operation 2027.

Here, although the description has been made of the operation in which the first electronic device 10 determines the distance only to the second electronic device 20 and only to the third electronic device 30, this is only an example, and the first electronic device 10 may perform the distance measurement with respect to a plurality of electronic devices near the first electronic device 10.

Figure 21:
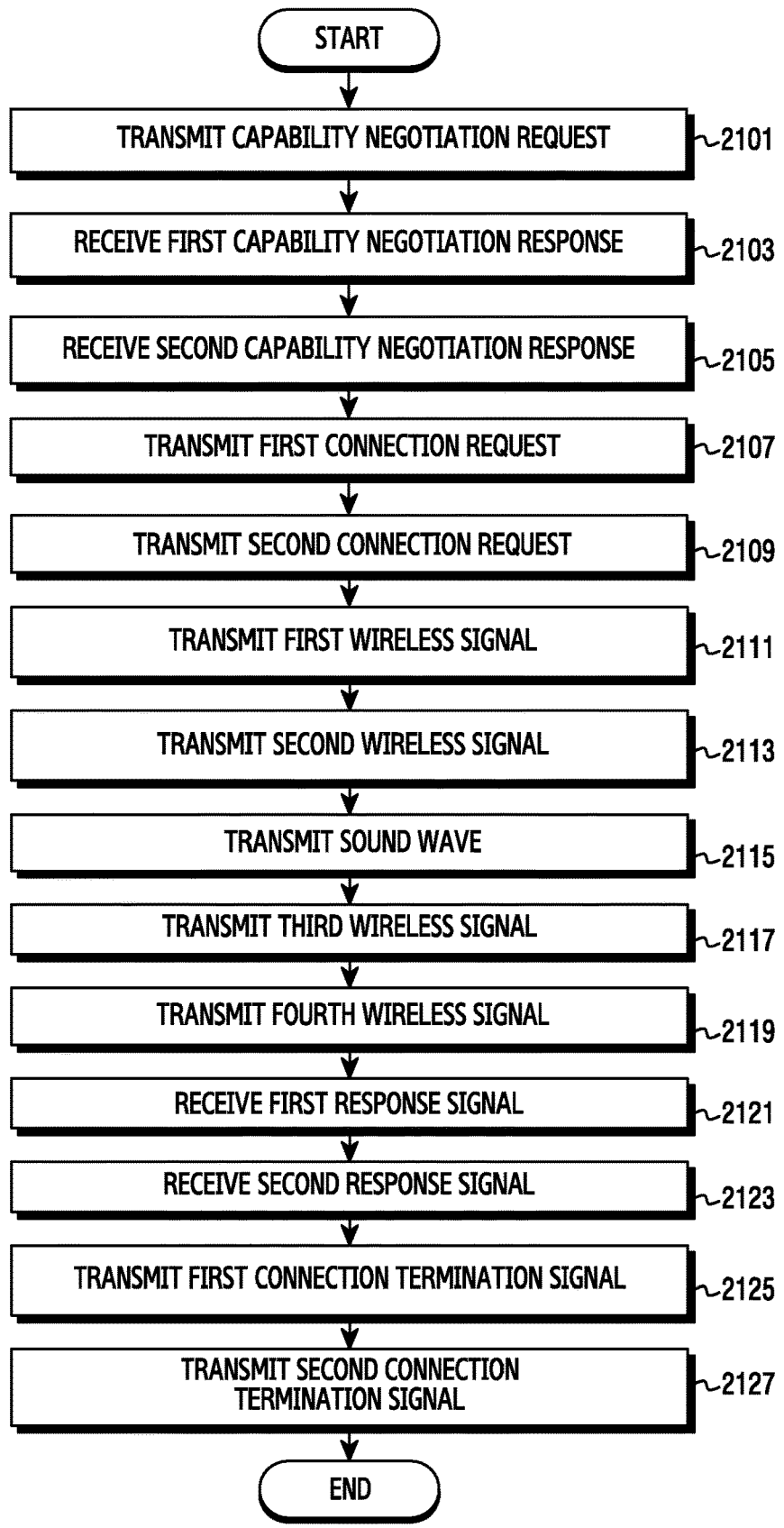
FIG. 21 is a flowchart illustrating a distance-measuring operation of a first electronic device according to various embodiments of the present disclosure.

FIG. 21 is a flowchart illustrating a distance-measuring operation in a first electronic device according to various embodiments of the present disclosure.

Referring to FIG. 21, first, in operation 2101, the first electronic device 10 may transmit a capability negotiation request. Here, the capability negotiation request may be transmitted to measure the distance to a certain electronic device near the first electronic device 10, and the capability negotiation request may be broadcast in the form of an advertising packet. In this case, the capability negotiation request may be received by a plurality of electronic devices.

The first electronic device 10 may receive the first capability negotiation response from the second electronic device 20 in operation 2103, and the first electronic device 10 may receive the second capability negotiation response from the third electronic device 30 in operation 2105. In this case, the first electronic device 10, which has received the first capability negotiation response and the second capability negotiation response may activate a speaker included in the first electronic device 10.

In addition, the first electronic device 10 may transmit the first connection request to the second electronic device 20 in operation 2107. In addition, the first electronic device 10 may transmit the second connection request to the third electronic device 30 in operation 2109. According to the embodiment of the present disclosure, the first electronic device 10 and the second electronic device 20, as well as the first electronic device 10 and the third electronic device 30 may be connected using BT, respectively.

The first electronic device 10 may transmit the first wireless signal to the second electronic device 20 in operation 2111, and the first electronic device 10 may transmit the second wireless signal to the third electronic device 30 in operation 2113. The first wireless signal and the second wireless signal may be transmitted in the form of an LL data signal. The first wireless signal may serve as a reference signal for measuring the distance between the first electronic device 10 and the second electronic device 20, and the second wireless signal may serve as a reference signal for measuring the distance between the first electronic device 10 and the third electronic device 30.

In operation 2115, the first electronic device 10 may transmit a sound wave. For example, the first electronic device 10 may transmit the sound wave at the timing of when the time $\Delta t_{p1}$ has elapsed since the transmission timing of the first wireless signal (that is, at the timing of when the time $\Delta t_{p2}$ has elapsed since the transmission timing of the second wireless signal).

In addition, the first electronic device 10 may transmit the third wireless signal to the second electronic device 20 in operation 2117, and the first electronic device 10 may transmit the fourth wireless signal to the third electronic device 30 in operation 2119. Here, the third wireless signal may be transmitted in the form of an LL data signal, and the third wireless signal may contain the value $\Delta t_{p1}$ that has been calculated by the first electronic device 10. In addition, the fourth wireless signal may be transmitted in the form of an LL data signal, and the fourth wireless signal may contain the value $\Delta t_{p2}$ that has been calculated by the first electronic device 10.

In operation 2121, the first electronic device 10 may receive the first response signal from the second electronic device 20. In this case, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the first electronic device 10 transmits the sound wave to the second electronic device 20 and the timing $R_{Sp1}$ of when the second electronic device 20 receives the sound wave from the first electronic device 10 may be determined to be $(R_{Sp1}-T_{Bp1}-\Delta t_{p1})$. Consequently, the distance between the first electronic device 10 and the second electronic device 20 may be calculated by multiplying the value $(R_{Sp1}-T_{Bp1}-\Delta t_{p1})$ and the transmission speed (340 m/s) of a sound wave, and the first response signal may contain the distance value between the first electronic device 10 and the second electronic device 20. In addition, the first response signal may contain the value $(R_{Sp1}-T_{Bp1})$. In this case, the first electronic device 10 may directly calculate the distance between the first electronic device 10 and the second electronic device 20 by multiplying the value $(R_{Sp1}-T_{Bp1}-\Delta t_{p1})$ and the transmission speed (340 m/s) of a sound wave through the received value $(R_{Sp1}-T_{Bp1})$ and the value $\Delta t_{p1}$ that has been determined by the first electronic device 10.

In addition, in operation 2123, the first electronic device 10 may receive the second response signal from the third electronic device 30. In this case, provided that the timing of when the first electronic device 10 transmits the second wireless signal to the third electronic device 30 is the same, being $T_{Bp2}$, as the timing of when the third electronic device 30 receives the first wireless signal from the first electronic device 10, the difference value between the timing of when the first electronic device 10 transmits the sound wave to the third electronic device 30 and the timing $R_{Sp2}$ of when the third electronic device 30 receives the sound wave from the first electronic device 10 may be determined to be $(R_{Sp2}-T_{Bp2}-\Delta t_{p2})$. Consequently, the distance between the first electronic device 10 and the third electronic device 30 may be calculated by multiplying the value $(R_{Sp2}-T_{Bp2}-\Delta t_{p2})$ by the transmission speed (340 m/s) of a sound wave, and the second response signal may contain the distance value between the first electronic device 10 and the third electronic device 30. In addition, the second response signal may contain the value $(R_{Sp2}-T_{Bp2})$. In this case, the first electronic device 10 may directly calculate the distance between the first electronic device 10 and the third electronic device 30 by multiplying the value $(R_{Sp2}-T_{Bp2}-\Delta t_{p2})$ and the transmission speed (340 m/s) of a sound wave through the received value $(R_{Sp2}-T_{Bp2})$ and the value $\Delta t_{p2}$ that has been determined by the first electronic device 10.

The first electronic device 10 may transmit the first connection termination signal to the second electronic device 20 in operation 2125, and may transmit the second connection termination signal to the third electronic device 30 in operation 2127.

Figure 22:
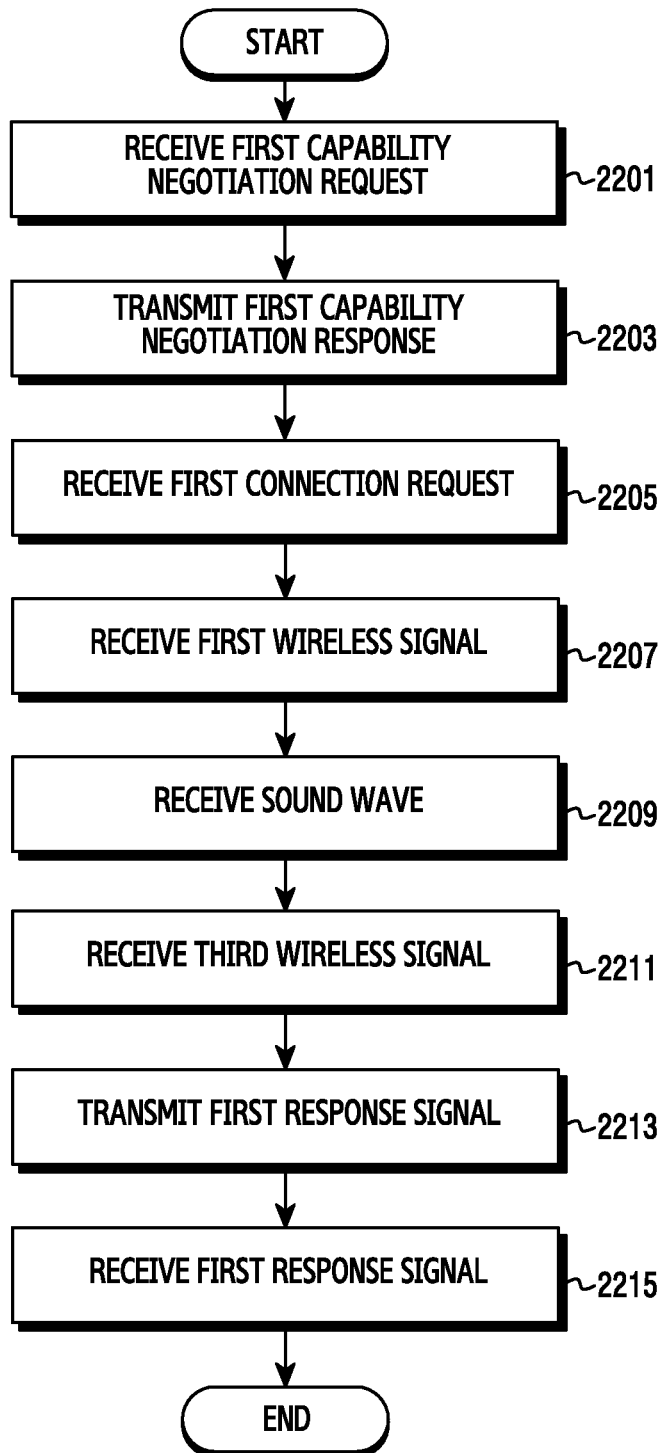
FIG. 22 is a flowchart illustrating a distance-measuring operation of a second electronic device according to various embodiments of the present disclosure.

FIG. 22 is a flowchart illustrating a distance-measuring operation in a second electronic device according to various embodiments of the present disclosure.

Referring to FIG. 22, first, in operation 2201, the second electronic device 20 may receive a capability negotiation request from the first electronic device 10. Here, the capability negotiation request may be transmitted to measure the distance to a certain electronic device near the first electronic device 10, and the capability negotiation request may be broadcast in the form of an advertising packet. In this case, the capability negotiation request may be received by a plurality of electronic devices.

In operation 2203, the second electronic device 20 may transmit the first capability negotiation response to the first electronic device 10. In this case, the first electronic device 10, which has received the first capability negotiation response, may activate a speaker included in the first electronic device 10.

In addition, in operation 2205, the second electronic device 20 may receive the first connection request from the first electronic device 10. According to this, the connection between the first electronic device 10 and the second electronic device 20 may be established. According to the embodiment of the present disclosure, the first electronic device 10 and the second electronic device 20 may be connected using BT. In this case, the second electronic device 20, which has received the first connection request, may activate a microphone that is included in the second electronic device 20.

In operation 2207, the second electronic device 20 may receive the first wireless signal from the first electronic device 10. The first wireless signal may be transmitted in the form of an LL data signal, and may serve as a reference signal for measuring the distance between the first electronic device 10 and the second electronic device 20. Here, the second electronic device 20 may receive the first wireless signal at the timing $T_{Bp1}$.

In addition, in operation 2209, the second electronic device 20 may receive a sound wave from the first electronic device 10. For example, the first electronic device 10 may transmit the sound wave at the timing of when the time $\Delta t_{p1}$ has elapsed since the transmission timing of the first wireless signal. In this case, the second electronic device 20 may receive the sound wave at the timing $R_{Sp1}$.

In addition, in operation 2211, the second electronic device 20 may receive the third wireless signal from the first electronic device 10. Here, the third wireless signal may be transmitted in the form of an LL data signal, and may contain the value $\Delta t_{p1}$, which has been calculated by the first electronic device 10.

The second electronic device 20 may transmit the first response signal to the first electronic device 10 in operation 2213. In this case, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the first electronic device 10 transmits the sound wave to the second electronic device 20 and the timing $R_{Sp1}$ of when the second electronic device 20 receives the sound wave from the first electronic device 10 may be determined to be ($R_{Sp1}-T_{Bp1}-\Delta t_{p1}$). Consequently, the distance between the first electronic device 10 and the second electronic device 20 may be calculated by multiplying the value ($R_{Sp1}-T_{Bp1}-\Delta t_{p1}$) and the transmission speed (340 m/s) of a sound wave, and the first response signal may contain the distance value between the first electronic device 10 and the second electronic device 20. In addition, the first response signal may contain the value ($R_{Sp1}-T_{Bp1}$). In this case, the first electronic device 10 may directly calculate the distance between the first electronic device 10 and the second electronic device 20 by multiplying the value ($R_{Sp1}-T_{Bp1}-\Delta t_{p1}$) and the transmission speed (340 m/s) of a sound wave through the received value ($R_{Sp1}-T_{Bp1}$) and the value $\Delta t_{p1}$, which has been determined by the first electronic device 10.

Finally, in operation 2215, the second electronic device 20 may receive the first connection termination signal from the first electronic device 10.

Although only the operation of the second electronic device 20 has been described in FIG. 22, the embodiment is not limited thereto, and the third electronic device 30 may operate in a similar manner as operations 2201 to 2213.

Figure 23:
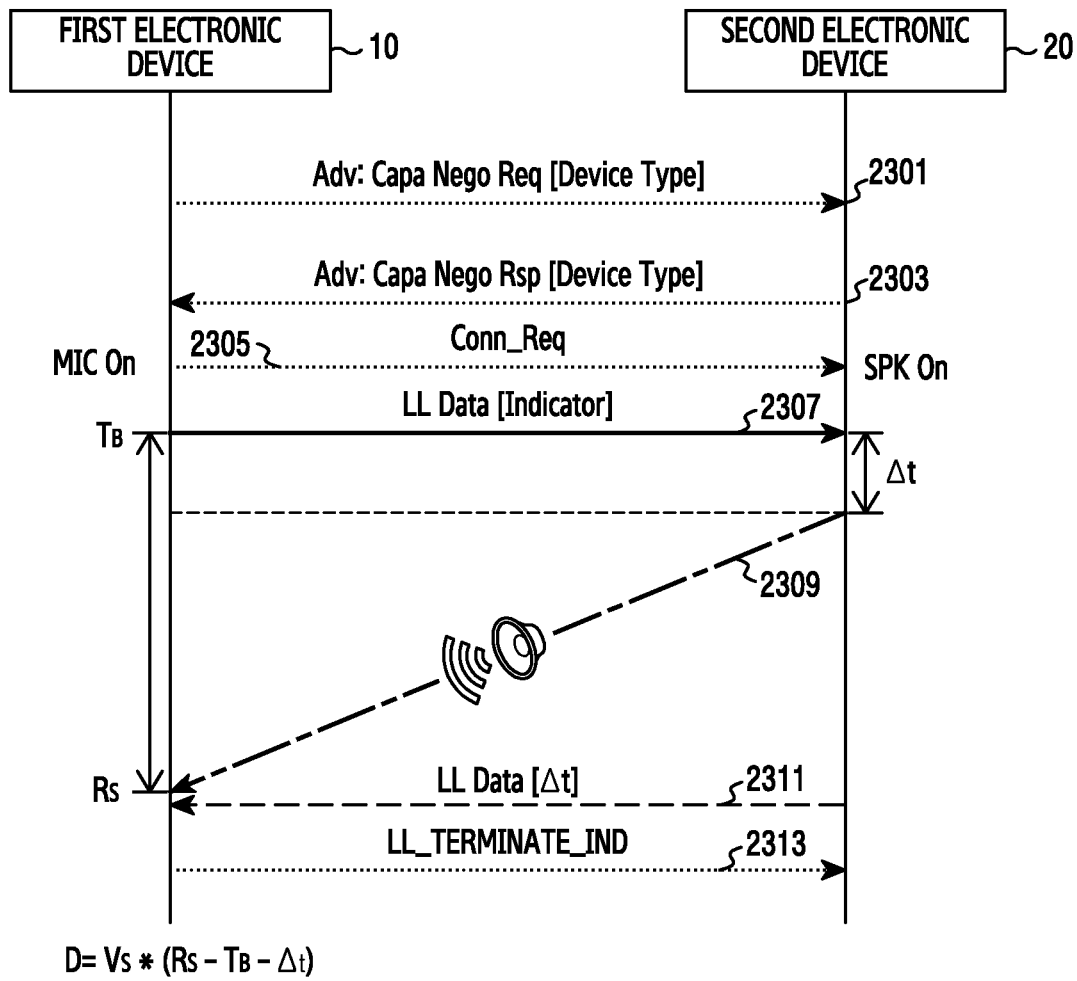
FIG. 23 illustrates a processing flow of a distance measuring method according to various embodiments of the present disclosure.

FIG. 23 illustrates a processing flow of a distance measuring method according to various embodiments of the present disclosure.

Referring to FIG. 23, the first electronic device 10 may include the first microphone, and the second electronic device 20 may include the second speaker. First, in operation 2301, the first electronic device 10 may transmit a negotiation request for measuring the distance to a certain electronic device. In other words, the negotiation request may be broadcast in the form of an advertising packet, and a certain electronic device near the first electronic device 10 may receive the negotiation request. Here, the negotiation request may contain information on the type of electronic device that performs the distance measurement.

In operation 2303, the second electronic device 20 may receive the negotiation request, and may transmit a negotiation response to the first electronic device 10 in response to the negotiation request. Here, the negotiation response may contain information on the type of electronic device that performs the distance measurement. In addition, in the embodiment of the present disclosure, the negotiation between the first electronic device 10 and the second electronic device 20 may be made in a similar manner as the procedure described in FIG. 2. In this case, the first electronic device 10, which has received the negotiation response, may activate a microphone included in the first electronic device 10.

In addition, the first electronic device 10 may transmit a connection request to establish a connection with the second electronic device 20 in operation 2305. In response thereto, the second electronic device 20 may receive the connection request from the first electronic device 10. According to this, the connection between the first electronic device 10 and the second electronic device 20 may be established. According to the embodiment of the present disclosure, the first electronic device 10 and the second electronic device 20 may be connected using BT. In this case, the second electronic device 20, which has received the connection request, may activate a speaker that is included in the second electronic device 20.

In operation 2307, the first electronic device 10 may transmit the first wireless signal to the second electronic device 20 at the timing $T_B$. According to the embodiment of the present disclosure, the first wireless signal may be transmitted in the form of an LL data signal, and may serve as a reference signal for measuring the distance between the first electronic device 10 and the second electronic device 20. The first wireless signal may be referred to as a distance measurement indicator as well. Here, taking the transmission speed of the wireless signal corresponding to the speed of light into consideration, it may be assumed that the timing $T_B$ of when the first electronic device 10 transmits the first wireless signal is the same as the timing of when the second electronic device 20 receives the first wireless signal.

In addition, in operation 2309, the second electronic device 20 may transmit a sound wave to the first electronic device 10 at the timing of when the time $\Delta t$ has elapsed since the reception timing $T_B$ of the first wireless signal. Here, the second electronic device 20 may calculate the value $\Delta t$. For example, the clock of a system or chip that transmits the wireless signal and the clock of a system or chip that transmits the sound wave may be converted to a reference clock of the entire system, and then the value $\Delta t$ may be calculated. In this case, the first electronic device 10 may receive the sound wave at the timing $R_s$.

In addition, in operation 2311, the second electronic device 20 may transmit the second wireless signal to the first electronic device 10, wherein the second wireless signal may be transmitted in the form of an LL data signal as the first wireless signal, and the second wireless signal may contain the value $\Delta t$ that has been calculated by the second electronic device 20. Here, the value $\Delta t$ may be one of the parameters for calculating the distance between the first electronic device 10 and the second electronic device 20.

Here, the first electronic device 10 may measure the distance between the first electronic device 10 and the second electronic device 20 based on the parameters that are measured by the first electronic device 10 or that are received from second electronic device 20. In other words, provided that the timing of when the first electronic device 10 transmits the first wireless signal to the second electronic device 20 is the same, being $T_B$, as the timing of when the second electronic device 20 receives the first wireless signal from the first electronic device 10, the difference value between the timing of when the first electronic device 10 transmits the sound wave to the second electronic device 20 and the timing $R_S$ of when the first electronic device 10 receives the sound wave from the second electronic device 20 may be determined to be ($R_S-T_B-\Delta t$). Here, the value $R_S$ and the value $T_B$ may be measured by the first electronic device 10, and the value $\Delta t$ may be received from the second electronic device 20. Consequently, the first electronic device 10 may calculate the distance between the first electronic device 10 and the second electronic device 20 by multiplying the value ($R_S-T_B-\Delta t$) and the transmission speed (340 m/s) of a sound wave.

In operation 2313, the first electronic device 10 may transmit a connection termination signal to the second electronic device 20.

Figure 24:
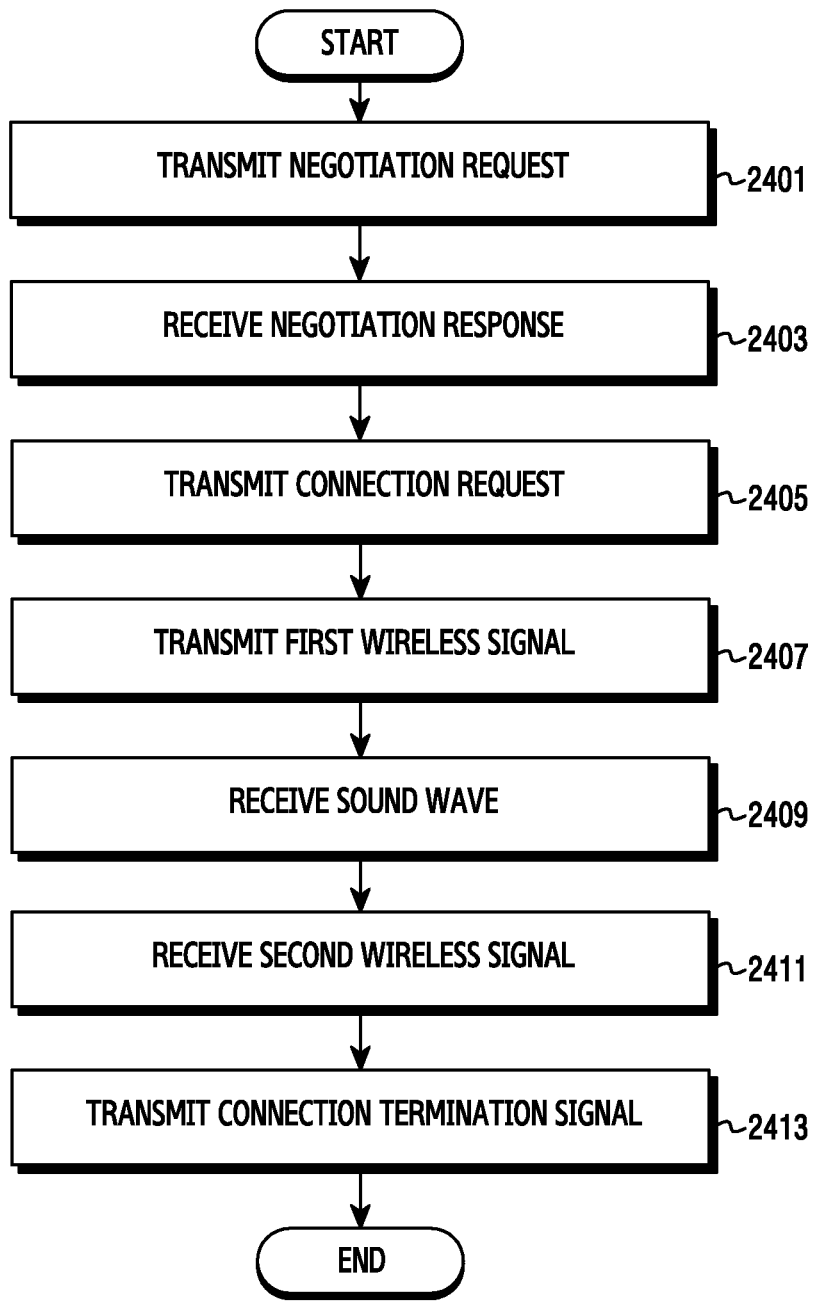
FIG. 24 is a flowchart illustrating a distance-measuring operation of a first electronic device according to various embodiments of the present disclosure.

FIG. 24 is a flowchart illustrating a distance-measuring operation in a first electronic device according to various embodiments of the present disclosure.

Referring to FIG. 24, first, in operation 2401, the first electronic device 10 may transmit a negotiation request. In other words, the negotiation request may be broadcast in the form of an advertising packet, and a certain electronic device near the first electronic device 10 may receive the negotiation request.

In operation 2403, the first electronic device 10 may receive a negotiation response from the second electronic device 20. According to the embodiment of the present disclosure, the negotiation between the first electronic device 10 and the second electronic device 20 may be made in a similar manner as the procedure described in FIG. 2. In this case, the first electronic device 10, which has received the negotiation response, may activate a microphone included in the first electronic device 10.

In addition, the first electronic device 10 may transmit a connection request to the second electronic device 20 in operation 2405. According to the embodiment of the present disclosure, the first electronic device 10 and the second electronic device 20 may be connected using BT.

In operation 2407, the first electronic device 10 may transmit the first wireless signal to the second electronic device 20. According to the embodiment of the present disclosure, the first wireless signal may be transmitted in the form of an LL data signal, and may serve as a reference signal for measuring the distance between the first electronic device 10 and the second electronic device 20. Here, taking the transmission speed of the wireless signal corresponding to the speed of light into consideration, it may be assumed that the timing $T_B$ of when the first electronic device 10 transmits the first wireless signal is the same as the timing of when the second electronic device 20 receives the first wireless signal.

In addition, the first electronic device 10 may transmit a sound wave to the second electronic device 20. In this case, in operation 2409, the first electronic device 10 may receive the sound wave at the timing $R_s$.

In operation 2411, the first electronic device 10 may receive the second wireless signal from the second electronic device 20. In this case, the second wireless signal may contain the value Δt which has been calculated by the second electronic device 20. Here, the value Δt may be one of the parameters for calculating the distance between the first electronic device 10 and the second electronic device 20.

Here, the first electronic device 10 may measure the distance between the first electronic device 10 and the second electronic device 20 based on the parameters that are measured by the first electronic device 10 or that are received from the second electronic device 20. In other words, provided that the timing of when the first electronic device 10 transmits the first wireless signal to the second electronic device 20 is the same, being $T_B$, as the timing of when the second electronic device 20 receives the first wireless signal from the first electronic device 10, the difference value between the timing of when the second electronic device 20 transmits the sound wave to the first electronic device 10 and the timing $R_S$ of when the first electronic device 10 receives the sound wave from the second electronic device 20 may be determined to be ($R_S-T_B-\Delta t$). Here, the value $R_S$ and the value $T_B$ may be measured by the first electronic device 10, and the value Δt may be received from the second electronic device 20. Consequently, the distance between the first electronic device 10 and the second electronic device 20 may be calculated through the product of the value ($R_S-T_B-\Delta t$) and the transmission speed (340 m/s) of a sound wave.

Finally, in operation 2413, the first electronic device 10 may transmit a connection termination signal to the second electronic device 20.

Figure 25:
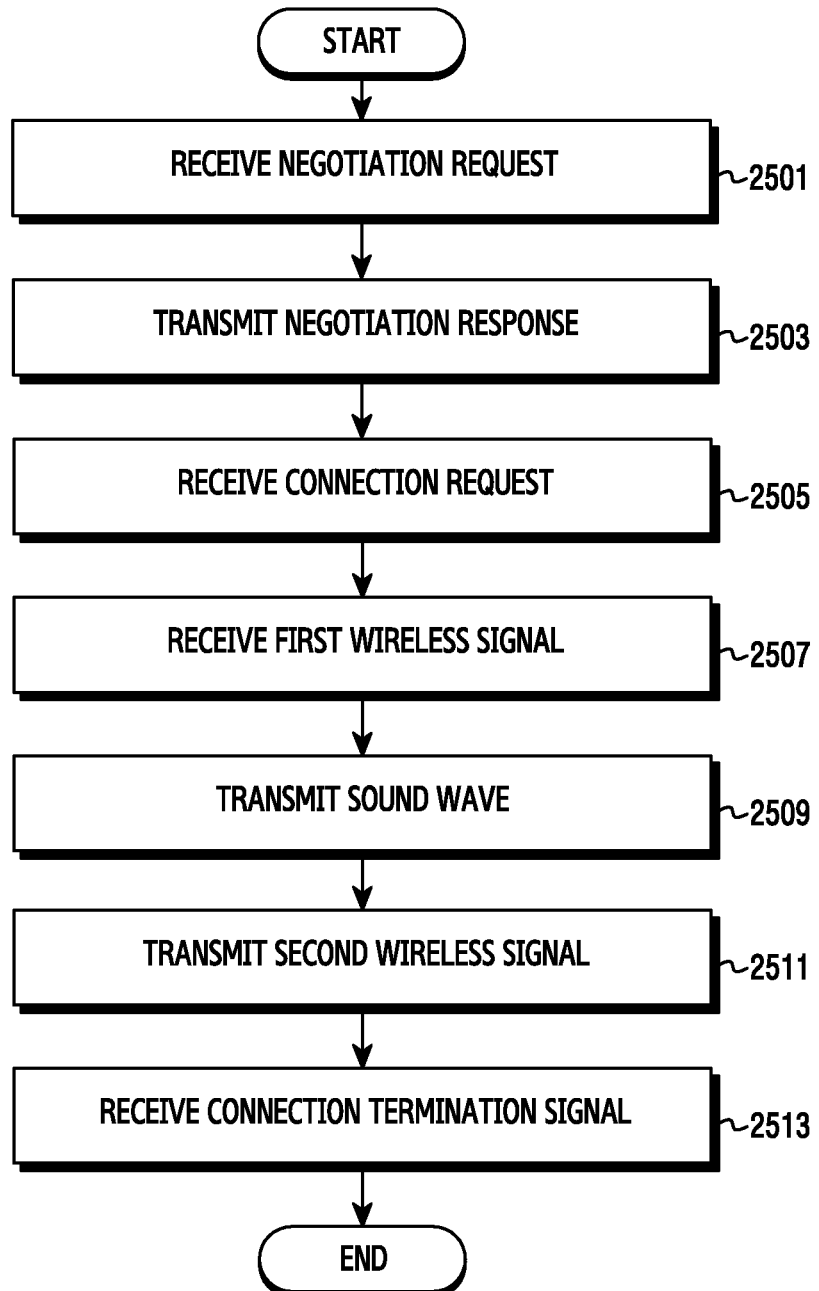
FIG. 25 is a flowchart illustrating a distance-measuring operation of a second electronic device according to various embodiments of the present disclosure.

FIG. 25 is a flowchart illustrating a distance-measuring operation in a second electronic device according to various embodiments of the present disclosure.

Referring to FIG. 25, first, in operation 2501, the second electronic device 20 may receive a negotiation request from the first electronic device 10. In other words, the negotiation request may be broadcast in the form of an advertising packet by the first electronic device 10.

In operation 2503, the second electronic device 20 may transmit a negotiation response to the first electronic device 10. According to the embodiment of the present disclosure, the negotiation between the first electronic device 10 and the second electronic device 20 may be made in a similar manner as the procedure described in FIG. 2.

In addition, the second electronic device 20 may receive a connection request from the first electronic device 10 in operation 2505. According to this, the connection between the first electronic device 10 and the second electronic device 20 may be established. According to the embodiment of the present disclosure, the first electronic device 10 and the second electronic device 20 may be connected using BT. In this case, the second electronic device 20, which has received the connection request, may activate a speaker included in the second electronic device 20.

In operation 2507, the second electronic device 20 may receive the first wireless signal from the first electronic device 10. According to the embodiment of the present disclosure, the first wireless signal may be transmitted in the form of an LL data signal, and may serve as a reference signal for measuring the distance between the second electronic device 20 and the first electronic device 10. Here, the second electronic device 20 may receive the first wireless signal at the timing $T_B$.

In addition, the second electronic device 20 may receive a sound wave from the first electronic device 10. In this case, in operation 2509, the second electronic device 20 may transmit the sound wave to the first electronic device 10 at the timing of when the time Δt has elapsed since the reception timing $T_B$ of the first wireless signal.

In operation 2511, the second electronic device 20 may transmit the second wireless signal to the first electronic device 10. In this case, the second wireless signal may contain the value Δt which has been calculated by the second electronic device 20. Here, the value Δt may be one of the parameters for calculating the distance between the first electronic device 10 and the second electronic device 20.

Finally, in operation 2513, the second electronic device 20 may receive a connection termination signal from the first electronic device 10.

Figure 26:
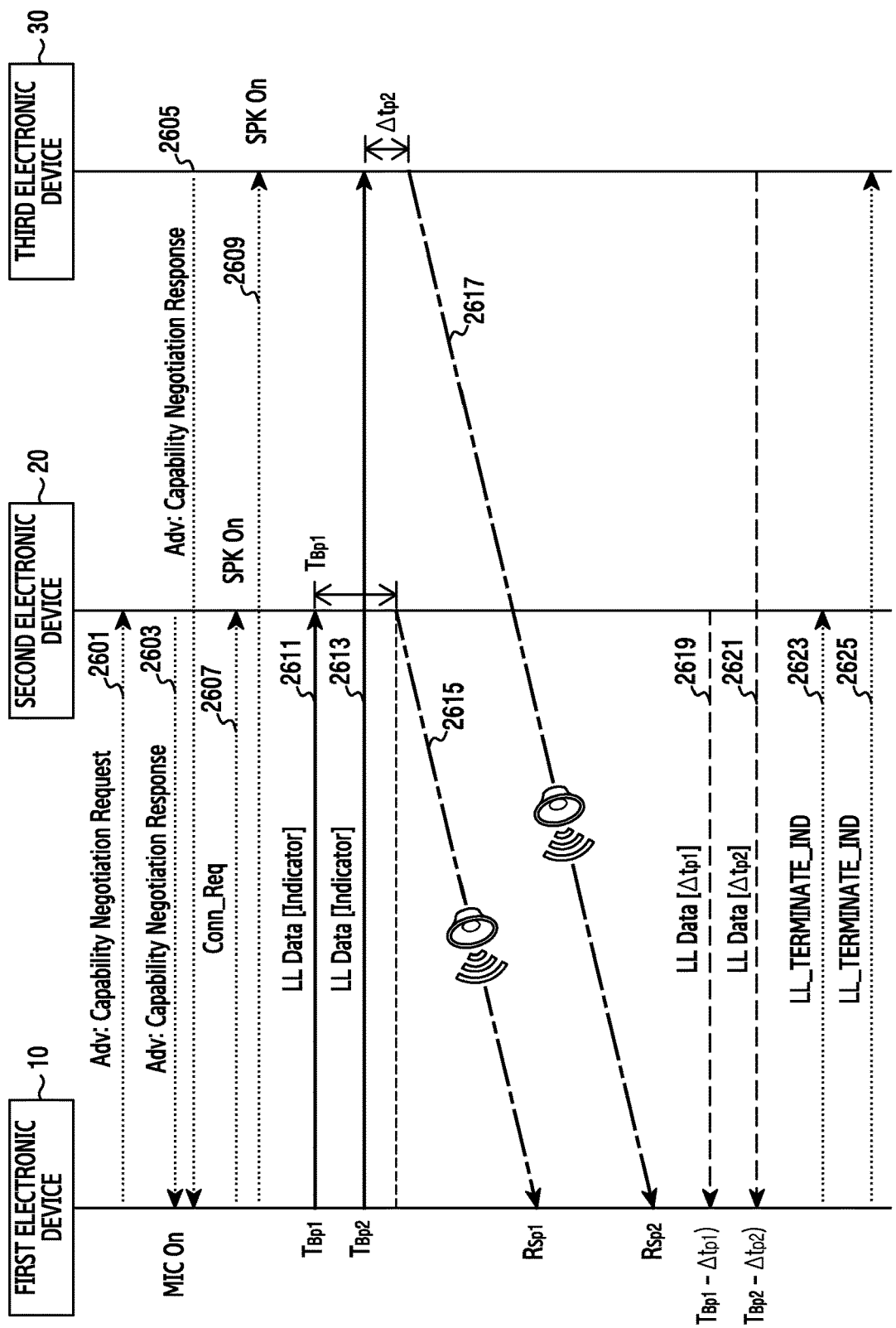
FIG. 26 illustrates a processing flow of a distance measuring method according to various embodiments of the present disclosure.

FIG. 26 illustrates a processing flow of a distance measuring method according to various embodiments of the present disclosure.

Referring to FIG. 26, the first electronic device 10 may include the first microphone, and the second electronic device 20 may include the second speaker. In addition, the third electronic device 30 may include the third speaker. First, in operation 2601, the first electronic device 10 may transmit a negotiation request for measuring the distance to a certain electronic device. In other words, the negotiation request may be broadcast in the form of an advertising packet, and a certain electronic device near the first electronic device 10 may receive the negotiation request. Here, the negotiation request may be received by a plurality of electronic devices. In addition, the negotiation request may contain information on the type of electronic device that performs the distance measurement.

In operation 2603, the second electronic device 20 may receive the negotiation request, and may transmit the first negotiation response to the first electronic device 10 in response to the negotiation request.

In operation 2605, the third electronic device 30 may receive the negotiation request, and may transmit the second negotiation response to the first electronic device 10 in response to the negotiation request. Here, the first negotiation response and the second negotiation response may contain information on the type of electronic that performs the distance measurement.

In addition, in the embodiment of the present disclosure, the negotiation between the first electronic device 10 and the second electronic device 20, and the negotiation between the first electronic device 10 and the third electronic device 30 may be made in a similar manner as the procedure described in FIG. 2. In this case, the first electronic device 10, which has received the first negotiation response and the second negotiation response, may activate a microphone included in the first electronic device 10.

In addition, the first electronic device 10 may transmit, to the second electronic device 20, the first connection request to establish a connection with the second electronic device 20 in operation 2607, and, in response thereto, the second electronic device 20 may receive the first connection request from the first electronic device 10. According to this, the connection between the first electronic device 10 and the second electronic device 20 may be established. In addition, in operation 2609, the first electronic device 10 may transmit, to the third electronic device 30, the second connection request to establish a connection with the third electronic device 30, and, in response thereto, the third electronic device 30 may receive the second connection request from the first electronic device 10. According to this, the connection between the first electronic device 10 and the third electronic device 30 may be established. According to the embodiment of the present disclosure, the first electronic device 10 and the second electronic device 20, as well as the first electronic device 10 and the third electronic device 30 may be connected using BT, respectively. In this case, the second electronic device 20, which has received the first connection request, may activate the second speaker that is included in the second electronic device 20, and the third electronic device 30, which has received the second connection request, may activate the third speaker that is included in the third electronic device 30.

In operation 2611, the first electronic device 10 may transmit the first wireless signal to the second electronic device 20 at the timing $T_{Bp1}$. According to the embodiment of the present disclosure, the first wireless signal may be transmitted in the form of an LL data signal, and may serve as a reference signal for measuring the distance between the first electronic device 10 and the second electronic device 20. In this case, the first wireless signal may be referred to as a distance measurement indicator as well. Here, taking the transmission speed of the wireless signal corresponding to the speed of light into consideration, it may be assumed that the timing $T_{Bp1}$ of when the first electronic device 10 transmits the first wireless signal is the same as the timing of when the second electronic device 20 receives the first wireless signal.

In addition, in operation 2613, the first electronic device 10 may transmit the second wireless signal to the third electronic device 30 at the timing $T_{Bp2}$. According to the embodiment of the present disclosure, the second wireless signal may be transmitted in the form of an LL data signal, and may serve as a reference signal for measuring the distance between the first electronic device 10 and the third electronic device 30. In this case, the second wireless signal may be referred to as a distance measurement indicator as well.

Here, taking the transmission speed of the wireless signal corresponding to the speed of light into consideration, it may be assumed that the timing $T_{Bp2}$ of when the first electronic device 10 transmits the second wireless signal is the same as the timing of when the third electronic device 30 receives the second wireless signal.

In operation 2615, the second electronic device 20 may transmit the first sound wave to the first electronic device 10 at the timing of when the time $\Delta t_{p1}$ has elapsed since the reception timing $T_{Bp1}$ of the first wireless signal. In this case, the first electronic device 10 may receive the first sound wave at the timing $R_{Sp1}$. In addition, in operation 2617, the third electronic device 30 may transmit the second sound wave to the first electronic device 10 at the timing of when the time $\Delta t_{p2}$ has elapsed since the reception timing $T_{Bp2}$ of the second wireless signal. In this case, the first electronic device 10 may receive the second sound wave at the timing $R_{Sp2}$.

Here, if the first sound wave and the second sound wave are transmitted at the same time or at a short interval of time, the first sound wave may interfere with the second sound wave, and vice versa. In order to address this issue, the first sound wave and the second sound wave may be configured to be signals that have different sequence, and thus, the first sound wave and the second sound wave may maintain the orthogonality. Accordingly, the issue in which the first sound wave and the second sound wave interfere with each other may be addressed. In addition, the second sound wave may be transmitted at a sufficient time interval after transmitting the first sound wave in order to thereby address the issue.

In addition, the second electronic device 20 may calculate the value $\Delta t_{p1}$. For example, the clock of a system or chip that transmits the wireless signal and the clock of a system or chip that transmits the sound wave may be converted to a reference clock of the entire system, and then the value $\Delta t_{p1}$ may be calculated. In addition, in operation 2619, the second electronic device 20 may transmit the first response signal to the first electronic device 10, wherein the first response signal may be transmitted in the form of an LL data signal as the first wireless signal, and the first response signal may contain the value $\Delta t_{p1}$, which has been calculated by the second electronic device 20. Here, the value $\Delta t_{p1}$ may be one of the parameters for calculating the distance between the first electronic device 10 and the second electronic device 20.

In addition, the third electronic device 30 may calculate the value $\Delta t_{p2}$. For example, the clock of a system or chip that receives the wireless signal and the clock of a system or chip that transmits the sound wave may be converted to a reference clock of the entire system, and then the value $\Delta t_{p2}$ may be calculated. In addition, in operation 2621, the third electronic device 30 may transmit the second response signal to the first electronic device 10, wherein the second response signal may be transmitted in the form of an LL data signal as the second wireless signal, and the second response signal may contain the value $\Delta t_{p2}$ that has been calculated by the third electronic device 30. Here, the value $\Delta t_{p2}$ may be one of the parameters for calculating the distance between the first electronic device 10 and the third electronic device 30.

Here, the first electronic device 10 may measure the distance between the first electronic device 10 and the second electronic device 20 based on the parameters that are measured by the first electronic device 10 or that are received from the second electronic device 20. For example, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the second electronic device 20 transmits the first sound wave to the first electronic device 10 and the timing $R_{Sp1}$ of when the first electronic device 10 receives the first sound wave from the second electronic device 20 may be determined to be ($R_{Sp1}-T_{Bp1}-\Delta t_{p1}$). Here, the value $R_{Sp1}$ and the value $T_{Bp1}$ may be measured by the first electronic device 10, and the value $\Delta t_{p1}$ may be received from the second electronic device 20. Consequently, the first electronic device 10 may calculate the distance $D_{p1}$ between the first electronic device 10 and the second electronic device 20 by multiplying the value ($R_{Sp1}-T_{Bp1}-\Delta t_{p1}$) and the transmission speed (340 m/s) of a sound wave.

In addition, the first electronic device 10 may measure the distance between the first electronic device 10 and the third electronic device 30 based on the parameters that are measured by the first electronic device 10 or that are received from the third electronic device 30. For example, provided that the timing of when the first electronic device 10 transmits the second wireless signal to the third electronic device 30 is the same, being $T_{Bp2}$, as the timing of when the third electronic device 30 receives the second wireless signal from the first electronic device 10, the difference value between the timing of when the third electronic device 30 transmits the second sound wave to the first electronic device 10 and the timing $R_{Sp2}$ of when the first electronic device 10 receives the second sound wave from the third electronic device 30 may be determined to be ($R_{Sp2}-T_{Bp2}-\Delta t_{p2}$). Here, the value $R_{Sp2}$ and the value $T_{Bp2}$ may be measured by the first electronic device 10, and the value $\Delta t_{p2}$ may be received from the third electronic device 30. Consequently, the first electronic device 10 may calculate the distance $D_{p2}$ between the first electronic device 10 and the third electronic device 30 by multiplying the value ($R_{Sp2}-T_{Bp2}-\Delta t_{p2}$) and the transmission speed (340 m/s) of a sound wave.

The first electronic device 10 may transmit the first connection termination signal to the second electronic device 20 in operation 2623, and may transmit the second connection termination signal to the third electronic device 30 in operation 2625.

Here, although the description has been made of the operation in which the first electronic device 10 determines the distance only to the second electronic device 20 and only to the third electronic device 30, this is only an example, and the first electronic device 10 may perform the distance measurement with respect to a plurality of electronic devices near the first electronic device 10.

Figure 27:
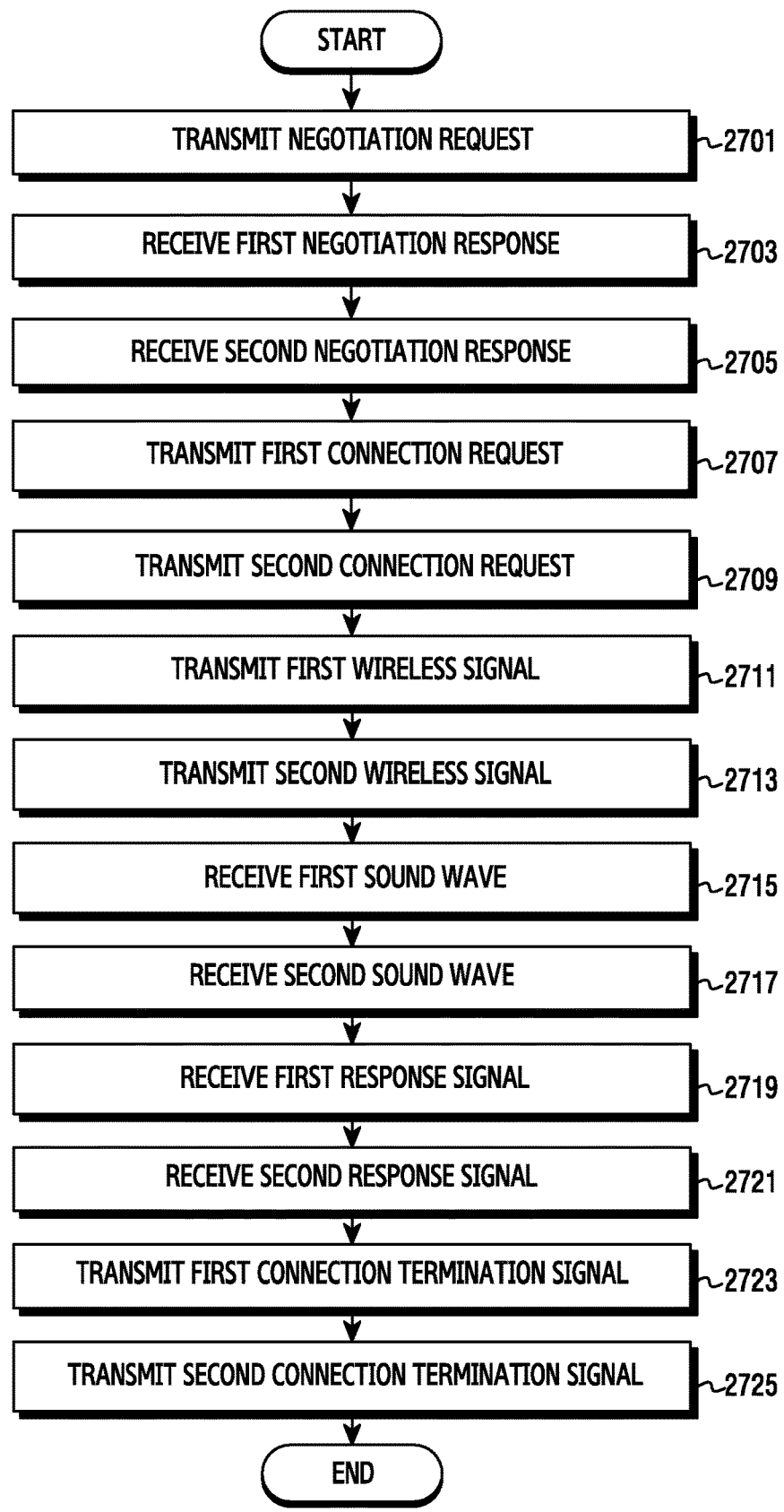
FIG. 27 is a flowchart illustrating a distance-measuring operation of a first electronic device according to various embodiments of the present disclosure.

FIG. 27 is a flowchart illustrating a distance-measuring operation in a first electronic device according to various embodiments of the present disclosure.

Referring to FIG. 27, first, in operation 2701, the first electronic device 10 may transmit a negotiation request. Here, the negotiation request may be transmitted to measure the distance to a certain electronic device near the first electronic device 10, and the negotiation request may be broadcast in the form of an advertising packet. In this case, the negotiation request may be received by a plurality of electronic devices.

In operation 2703, the first electronic device 10 may receive the first negotiation response from the second electronic device 20.

In operation 2705, the first electronic device 10 may receive the second negotiation response from the third electronic device 30. In this case, the first electronic device 10, which has received the first negotiation response and the second negotiation response, may activate the first microphone included in the first electronic device 10.

In addition, the first electronic device 10 may transmit the first connection request to the second electronic device 20 in operation 2707. In addition, the first electronic device 10 may transmit the second connection request to the third electronic device 30 in operation 2709. According to the embodiment of the present disclosure, the first electronic device 10 and the second electronic device 20, as well as the first electronic device 10 and the third electronic device 30 may be connected using BT, respectively.

The first electronic device 10 may transmit the first wireless signal to the second electronic device 20 in operation 2711, and the first electronic device 10 may transmit the second wireless signal to the third electronic device 30 in operation 2713. The first wireless signal and the second wireless signal may be transmitted in the form of an LL data signal. The first wireless signal may serve as a reference signal for measuring the distance between the first electronic device 10 and the second electronic device 20, and the second wireless signal may serve as a reference signal for measuring the distance between the first electronic device 10 and the third electronic device 30. Here, taking the transmission speed of the wireless signal corresponding to the speed of light into consideration, it may be assumed that the timing $T_{Bp1}$ of when the first electronic device 10 transmits the first wireless signal is the same as the timing of when the second electronic device 20 receives the first wireless signal, and it may be assumed that the timing $T_{Bp2}$ of when the first electronic device 10 transmits the second wireless signal is the same as the timing of when the third electronic device 30 receives the second wireless signal.

In addition, in operation 2715, the first electronic device 10 may receive the first sound wave from the second electronic device 20. The second electronic device 20 may transmit, to the first electronic device 10, the first sound wave at the timing of when the time $\Delta t_{p1}$ has elapsed since the reception timing $T_{Bp1}$ of the first wireless signal, and, in this case, the first electronic device 10 may receive the first sound wave at the timing $R_{Sp1}$.

In addition, in operation 2717, the first electronic device 10 may receive the second sound wave from the third electronic device 30. The third electronic device 30 may transmit, to the first electronic device 10, the second sound wave at the timing of when the time $\Delta t_{p2}$ has elapsed since the reception timing $T_{Bp2}$ of the second wireless signal. In this case, the first electronic device 10 may receive the second sound wave at the timing $R_{Sp2}$.

In operation 2719, the first electronic device 10 may receive the first response signal from the second electronic device 20. Here, the first response signal may contain the value $\Delta t_{p1}$ that has been calculated by the second electronic device 20. Here, the value $\Delta t_{p1}$ may be one of the parameters for calculating the distance between the first electronic device 10 and the second electronic device 20. In this case, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the second electronic device 20 transmits the first sound wave to the first electronic device 10 and the timing $R_{Sp1}$ of when the first electronic device 10 receives the first sound wave from the second electronic device 20 may be determined to be $(R_{Sp1}-T_{Bp1}-\Delta t_{p1})$. Consequently, the first electronic device 10 may calculate the distance between the first electronic device 10 and the second electronic device 20 by multiplying the value $(R_{Sp1}-T_{Bp1}-\Delta t_{p1})$ and the transmission speed (340 m/s) of a sound wave.

In addition, in operation 2721, the first electronic device 10 may receive the second response signal from the third electronic device 30. Here, the value $\Delta t_{p2}$ may be one of the parameters for calculating the distance between the first electronic device 10 and the third electronic device 30. Provided that the timing of when the first electronic device 10 transmits the second wireless signal to the third electronic device 30 is the same, being $T_{Bp2}$, as the timing of when the third electronic device 30 receives the second wireless signal from the first electronic device 10, the difference value between the timing of when the first electronic device 10 transmits the sound wave to the third electronic device 30 and the timing $R_{Sp2}$ of when the third electronic device 30 receives the sound wave from the first electronic device 10 may be determined to be $(R_{Sp2}-T_{Bp2}-\Delta t_{p2})$. Consequently, the first electronic device 10 may calculate the distance between the first electronic device 10 and the third electronic device 30 by multiplying the value $(R_{Sp2}-T_{Bp2}-\Delta t_{p2})$ by the transmission speed (340 m/s) of a sound wave.

The first electronic device 10 may transmit the first connection termination signal to the second electronic device 20 in operation 2723, and may transmit the second connection termination signal to the third electronic device 30 in operation 2725.

Figure 28:
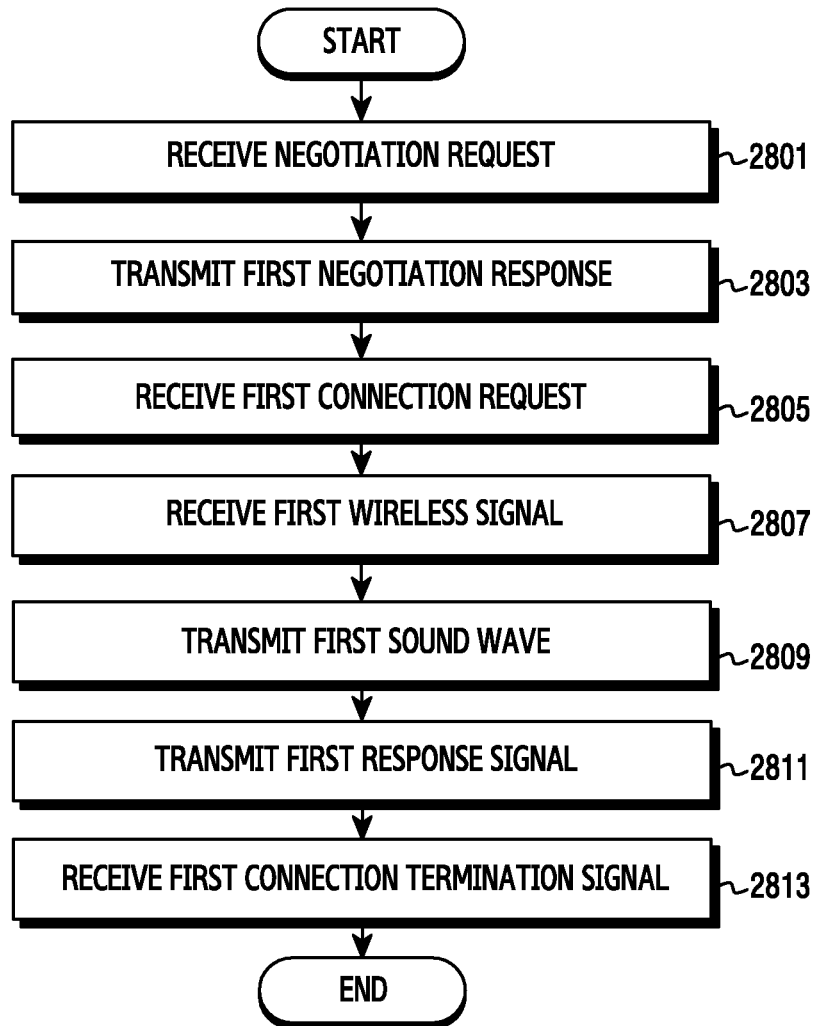
FIG. 28 is a flowchart illustrating a distance-measuring operation of a second electronic device according to various embodiments of the present disclosure.

FIG. 28 is a flowchart illustrating a distance-measuring operation in a second electronic device according to various embodiments of the present disclosure.

Referring to FIG. 28, first, in operation 2801, the second electronic device 20 may receive a negotiation request from the first electronic device 10. Here, the negotiation request may be transmitted to measure the distance to a certain electronic device near the first electronic device 10, and the negotiation request may be broadcast in the form of an advertising packet. In this case, the negotiation request may be received by a plurality of electronic devices.

In operation 2803, the second electronic device 20 may transmit the first negotiation response to the first electronic device 10. In this case, the first electronic device 10, which has received the first negotiation response, may activate the first microphone included in the first electronic device 10.

In addition, the second electronic device 20 may receive the first connection request from the first electronic device 10 in operation 2805. According to this, the connection between the first electronic device 10 and the second electronic device 20 may be established. According to the embodiment of the present disclosure, the first electronic device 10 and the second electronic device 20 may be connected using BT. In this case, the second electronic device 20, which has received the first connection request, may activate the second speaker included in the second electronic device 20.

In operation 2807, the second electronic device 20 may receive the first wireless signal from the first electronic device 10. The first wireless signal may be transmitted in the form of an LL data signal, and may serve as a reference signal for measuring the distance between the first electronic device 10 and the second electronic device 20. Here, taking the transmission speed of the wireless signal corresponding to the speed of light into consideration, it may be assumed that the timing $T_{Bp1}$ of when the first electronic device 10 transmits the first wireless signal is the same as the timing of when the second electronic device 20 receives the first wireless signal.

In addition, in operation 2809, the second electronic device 20 may transmit the first sound wave to the first electronic device 10. For example, the second electronic device 20 may transmit the first sound wave at the timing of when the time $\Delta t_{p1}$ has elapsed since the reception timing $T_{Bp1}$ of the first wireless signal.

In operation 2811, the second electronic device 20 may transmit the first response signal to the first electronic device 10. In this case, the first response signal may contain the value $\Delta t_{p1}$, which has been calculated by the second electronic device 20. Here, the value $\Delta t_{p1}$ may be one of the parameters for calculating the distance between the first electronic device 10 and the second electronic device 20. In this case, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the first electronic device 10 transmits the sound wave to the second electronic device 20 and the timing $R_{Sp1}$ of when the second electronic device 20 receives the sound wave from the first electronic device 10 may be determined to be $(R_{Sp1}-T_{Bp1}-\Delta t_{p1})$. Consequently, the first electronic device 10 may calculate the distance between the first electronic device 10 and the second electronic device 20 by multiplying the value $(R_{Sp1}-T_{Bp1}-\Delta t_{p1})$ and the transmission speed (340 m/s) of a sound wave.

Finally, in operation 2813, the second electronic device 20 may receive the first connection termination signal from the first electronic device 10.

Although only the operation of the second electronic device 20 has been described in FIG. 28, the embodiment is not limited thereto, and the third electronic device 30 may operate in a similar manner as operations 2801 to 2813.

Figure 29:
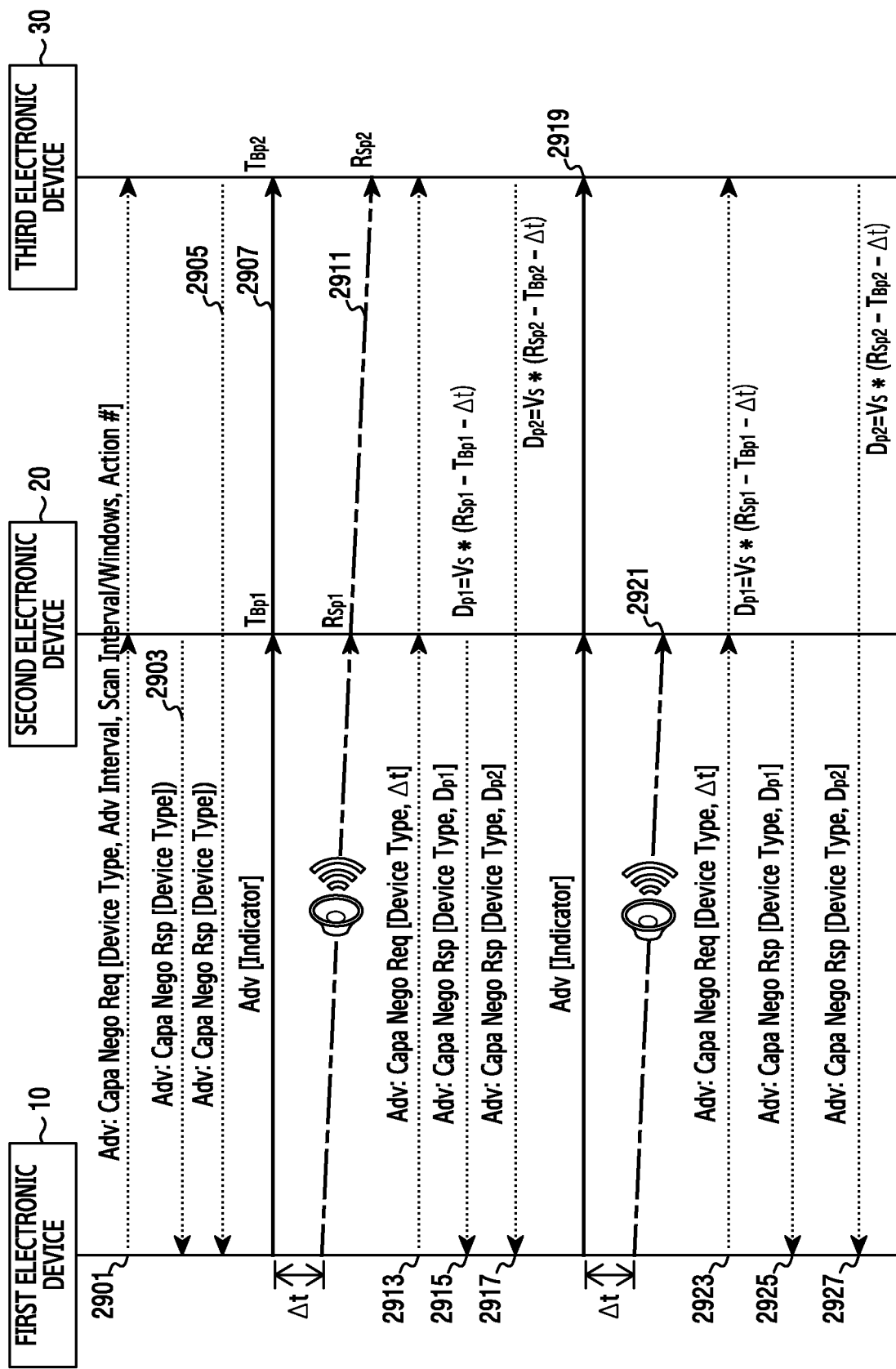
FIG. 29 illustrates a processing flow of a distance measuring method according to various embodiments of the present disclosure.

FIG. 29 illustrates a processing flow of a distance measuring method according to various embodiments of the present disclosure.

Referring to FIG. 29, the first electronic device 10 may include the first speaker, and the second electronic device 20 may include the second microphone. In addition, the third electronic device 30 may include the third microphone. First, in operation 2901, the first electronic device 10 may transmit the first negotiation request for measuring the distance to a certain electronic device. In other words, the first negotiation request may be broadcast in the form of a BLE advertising packet, and certain electronic devices near the first electronic device 10 may receive the first negotiation request. Here, the first negotiation request may be received by a plurality of electronic devices, and the first negotiation request may be referred to as the first advertising message.

In this case, the first negotiation request may contain a plurality of pieces of information. For example, the first negotiation request may contain information on the type of electronic device that performs the distance measurement, information on a transmission interval of the advertising messages, information on a detection interval of the device that receives the advertising messages, or on a detection window thereof, and information on the action number. Here, the action number is the information that indicates the advertising message number, through which the wireless signal for the distance measurement (i.e., the distance measurement indicator) is transmitted. According to the embodiment of the present disclosure, the action number may be configured to be '2,' and, in this case, the wireless signal for the distance measurement may be transmitted through the second advertising message that is transmitted by the first electronic device 10.

According to the embodiment of the present disclosure, the second electronic device 20 may receive the first negotiation request, and the second electronic device 20 may transmit the first negotiation response to the first electronic device 10 in response to the first negotiation request in operation 2903. In addition, the third electronic device 30 may receive the first negotiation request, and the third electronic device 30 may transmit the second negotiation response to the first electronic device 10 in response to the first negotiation request in operation 2905. Here, the first negotiation response by the second electronic device 20 and the first negotiation response by the third electronic device 30 may contain information on the electronic device that performs the distance measurement.

In operation 2907, the first electronic device 10 may transmit the first wireless signal. According to the embodiment of the present disclosure, the first wireless signal may be broadcast in the form of a BLE advertising packet, and may serve as a reference signal for measuring the distance between the first electronic device 10 and nearby electronic devices. Here, the first wireless signal may also be referred to as the second advertising message or a distance measurement indicator. According to the embodiment of the present disclosure, in the case where the action number contained in the first advertising message is configured to be 2, the second advertising message may contain the distance measurement indicator in order to thereby serve as a wireless signal for the distance measurement. Here, the second electronic device 20 may receive the first wireless signal at the timing $T_{Bp1}$, and the third electronic device 30 may receive the first wireless signal at the timing $T_{Bp2}$.

In operation 2911, the first electronic device 10 may transmit the first sound wave at the timing of when the time Δt has elapsed since the transmission timing of the first wireless signal. Here, the first sound wave is not targeted at a specific electronic device, and may be merely output through the speaker included in the first electronic device 10 so that the electronic devices near the first electronic device 10 may receive the sound wave. According to the embodiment of the present disclosure, the second electronic device 20 may receive the first sound wave at the timing $R_{Sp1}$, and the third electronic device 30 may receive the sound wave at the timing $R_{Sp2}$.

Here, the first electronic device 10 may calculate the value Δt. For example, the clock of a system or chip that transmits the wireless signal and the clock of a system or chip that transmits the sound wave may be converted to a reference clock of the entire system, and then the value Δt may be calculated. In addition, in operation 2913, the first electronic device 10 may transmit the second negotiation request. According to the embodiment of the present disclosure, the second negotiation request may be broadcast in the form of a BLE advertising packet, and the second electronic device 20 and the third electronic device 30 may receive the second negotiation request. Here, the second negotiation request may contain the value Δt that has been calculated by the first electronic device 10, and the value Δt may be one of the parameters for calculating the distance between the first electronic device 10 and the second electronic device 20, as well as between the first electronic device 10 and the third electronic device 30.

Here, the second electronic device 20 may measure the distance $D_{p1}$ between the first electronic device 10 and the second electronic device 20 based on the parameters that are measured by the second electronic device 20 or that are received from the first electronic device 10. For example, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the first electronic device 10 transmits the sound wave to the second electronic device 20 and the timing $R_{Sp1}$ of when the second electronic device 20 receives the sound wave from the first electronic device 10 may be determined to be $(R_{Sp1}-T_{Bp1}-\Delta t)$. Here, the value $R_{Sp1}$ and the value $T_{Bp1}$ may be measured by the second electronic device 20, and the value Δt may be received from the first electronic device 10. Consequently, the second electronic device 20 may calculate the distance between the first electronic device 10 and the second electronic device 20 by multiplying the value $(R_{Sp1}-T_{Bp1}-\Delta t)$ and the transmission speed (340 m/s) of a sound wave.

In addition, the third electronic device 30 may measure the distance between the first electronic device 10 and the third electronic device 30 based on the parameters that are measured by the third electronic device 30 or that are received from the first electronic device 10. For example, provided that the timing of when the first electronic device 10 transmits the second wireless signal to the third electronic device 30 is the same, being $T_{Bp2}$, as the timing of when the third electronic device 30 receives the second wireless signal from the first electronic device 10, the difference value between the timing of when the first electronic device 10 transmits the sound wave to the third electronic device 30 and the timing $R_{Sp2}$ of when the third electronic device 30 receives the sound wave from the first electronic device 10 may be determined to be $(R_{Sp2}-T_{Bp2}-\Delta t)$. Here, the value $R_{Sp2}$ and the value $T_{Bp2}$ may be measured by the third electronic device 30, and the value Δt may be received from the first electronic device 10. Consequently, the third electronic device 30 may calculate the distance between the first electronic device 10 and the third electronic device 30 by multiplying the value $(R_{Sp2}-T_{Bp2}-\Delta t)$ and the transmission speed (340 m/s) of a sound wave.

In this case, in operation 2915, the second electronic device 20 may transmit, to the first electronic device 10, the second negotiation response by the second electronic device 20, wherein the second negotiation response by the second electronic device 20 may contain the distance value between the first electronic device 10 and the second electronic device 20, or the value $(R_{Sp1}-T_{Bp1})$, which has been previously determined. In the case where the second negotiation response by the second electronic device 20 contains the value $(R_{Sp1}-T_{Bp1})$, the first electronic device 10 may directly calculate the distance between the first electronic device 10 and the second electronic device 20 by multiplying the value $(R_{Sp1}-T_{Bp1}-\Delta t)$ and the transmission speed (340 m/s) of a sound wave through the received value $(R_{Sp1}-T_{Bp1})$ and the value Δt that has been determined by the first electronic device 10.

In addition, in operation 2917, the third electronic device 30 may transmit, to the first electronic device 10, the second negotiation response by the third electronic device 30, wherein the second negotiation response by the third electronic device 30 may contain the distance value between the first electronic device 10 and the third electronic device 30, or the value ($R_{Sp2}-T_{Bp2}$), which has been previously determined. In the case where the second negotiation response by the third electronic device 30 contains the value ($R_{Sp2}-T_{Bp2}$), the first electronic device 10 may directly calculate the distance between the first electronic device 10 and the third electronic device 30 by multiplying the value ($R_{Sp2}-T_{Bp2}-\Delta t$) and the transmission speed (340 m/s) of a sound wave through the received value ($R_{Sp2}-T_{Bp2}$) and the value $\Delta t$ that has been determined by the first electronic device 10.

In addition, operations 2901 to 2917 are repeatedly performed through operations 2919 to 2927 so that the first electronic device 10 may repeatedly perform the distance measurement to the second electronic device 20 or the distance measurement to the third electronic device 30, or may perform the distance measurement to a new electronic device.

Here, although the description has been made of the operation in which the first electronic device 10 determines the distance only to the second electronic device 20 and only to the third electronic device 30, this is only an example, and the first electronic device 10 may perform the distance measurement with respect to a plurality of electronic devices near the first electronic device 10.

Figure 30:
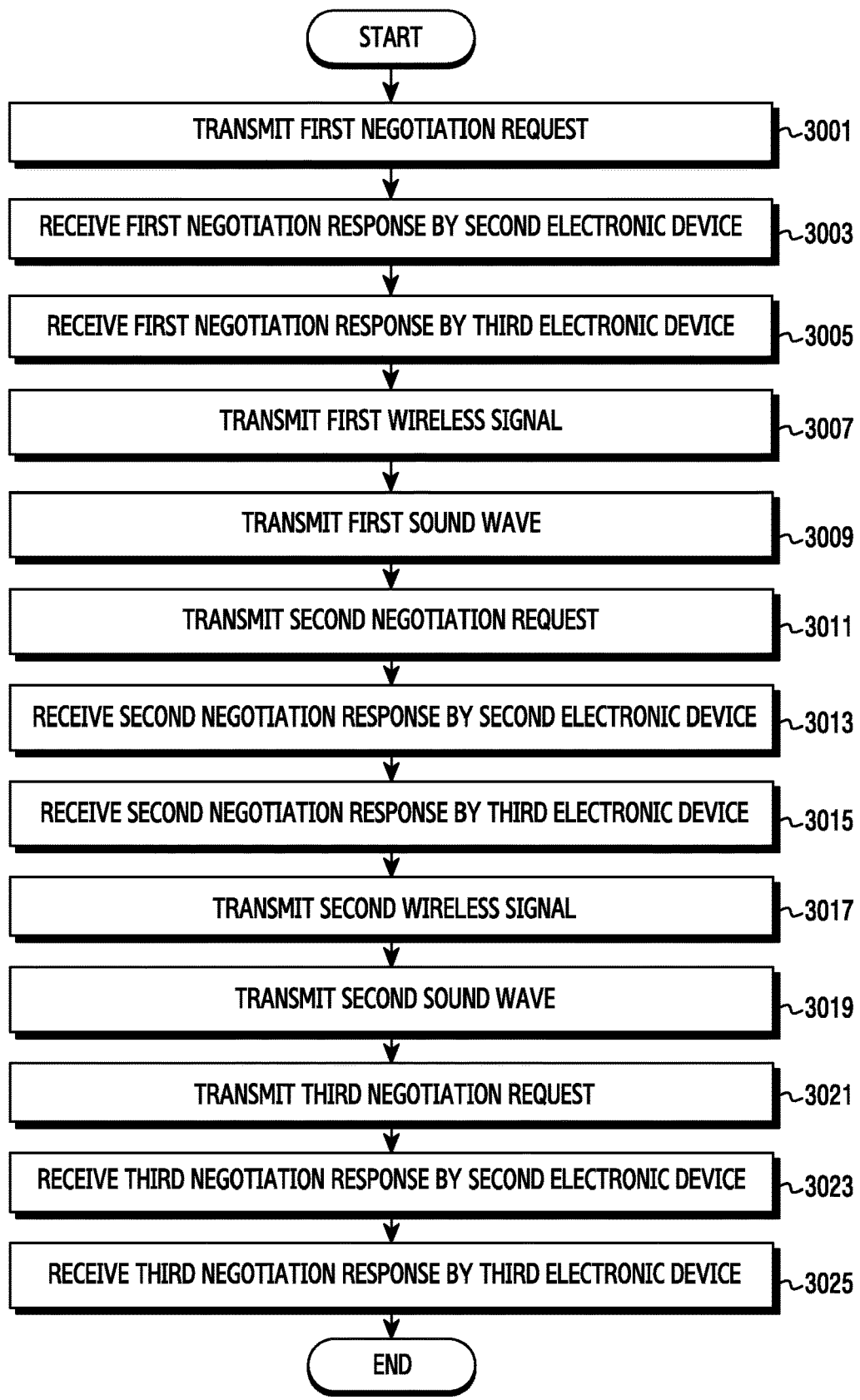
FIG. 30 is a flowchart illustrating a distance-measuring operation of a first electronic device according to various embodiments of the present disclosure.

FIG. 30 is a flowchart illustrating a distance-measuring operation in a first electronic device according to various embodiments of the present disclosure.

Referring to FIG. 30, first, in operation 3001, the first electronic device 10 may transmit the first negotiation request. The first negotiation request may be broadcast in the form of a BLE advertising packet, and certain electronic devices near the first electronic device 10 may receive the first negotiation request. Here, the first negotiation request may be received by a plurality of electronic devices, and the first negotiation request may be referred to as the first advertising message.

In operation 3003, the first electronic device 10 may receive the first negotiation response from the second electronic device 20.

In operation 3005, the first electronic device 10 may receive the first negotiation response from the third electronic device 30. Here, the first negotiation response by the second electronic device 20 and the first negotiation response by the third electronic device 30 may contain information on the electronic device that performs the distance measurement.

In operation 3007, the first electronic device 10 may transmit the first wireless signal. According to the embodiment of the present disclosure, the first wireless signal may be transmitted in the form of a BLE advertising packet, and may serve as a reference signal for measuring the distance between the first electronic device 10 and nearby electronic devices. Here, the first wireless signal may also be referred to as the second advertising message or a distance measurement indicator.

In operation 3009, the first electronic device 10 may transmit the first sound wave. Here, the sound wave is not targeted at a specific electronic device, and may be merely output through the speaker included in the first electronic device 10 so that the electronic devices near the first electronic device 10 may receive the sound wave.

In addition, in operation 3011, the first electronic device 10 may transmit the second negotiation request. The second negotiation request may be broadcast in the form of a BLE advertising packet. The second negotiation request may contain the value $\Delta t$ that has been calculated by the first electronic device 10, and the value $\Delta t$ may be one of the parameters for calculating the distance between the first electronic device 10 and the second electronic device 20, as well as between the distance between the first electronic device 10 and the third electronic device 30.

In operation 3013, the first electronic device 10 may receive the second negotiation response from the second electronic device 20.

In operation 3015, the first electronic device 10 may receive the second negotiation response from the third electronic device 30. Here, the second negotiation response by the second electronic device 20 may contain the distance information between the first electronic device 10 and the second electronic device 20, which has been measured by the second electronic device 20, and the second negotiation response by the third electronic device 30 may contain the distance information between the first electronic device 10 and the third electronic device 30, which has been measured by the third electronic device 30.

In operation 3017, the first electronic device 10 may transmit the second wireless signal. In operation 3019, the second sound wave may be transmitted. In operation 3021, the third negotiation request may be transmitted. In operation 3023, the third negotiation response by the second electronic device 20 may be received. In operation 3025, the third negotiation response by the third electronic device 30 may be received. Operations 3001 to 3016 may be repeatedly performed so that the first electronic device 10 may repeatedly perform the distance measurement with respect to the second electronic device 20 and the distance measurement with respect to the third electronic device 30, or may perform the distance measurement with respect to a new electronic device.

Figure 31:
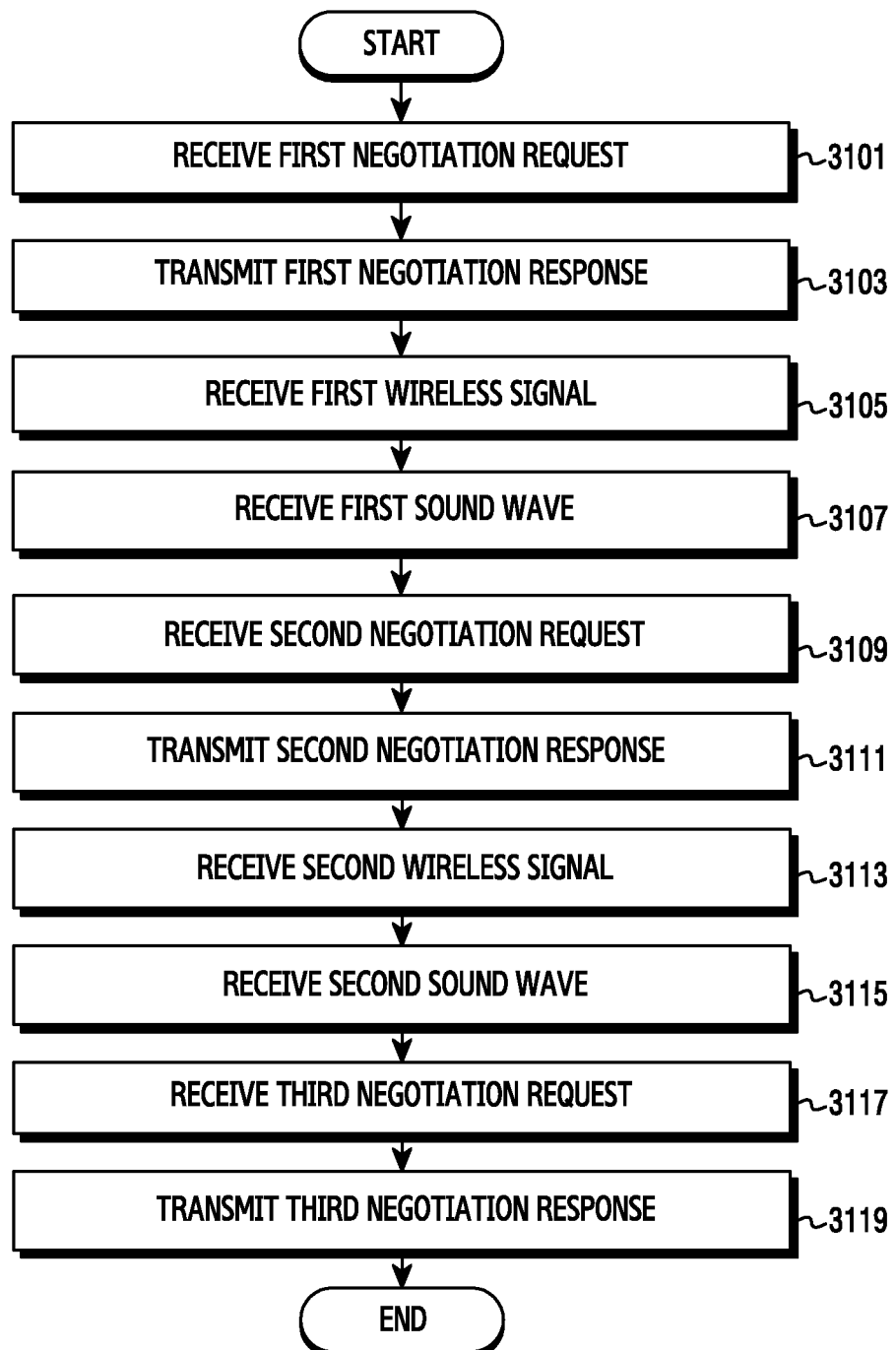
FIG. 31 is a flowchart illustrating a distance-measuring operation of a second electronic device according to various embodiments of the present disclosure.

FIG. 31 is a flowchart illustrating a distance-measuring operation in a second electronic device according to various embodiments of the present disclosure.

Referring to FIG. 31, first, in operation 3101, the second electronic device 20 may receive the first negotiation request from the first electronic device 10. The first negotiation request may be broadcast in the form of a BLE advertising packet, and the first negotiation request may be referred to as the first advertising message.

In operation 3103, the second electronic device 20 may transmit the first negotiation response to the first electronic device 10. Here, the first negotiation response may contain information on the electronic device that performs the distance measurement.

In addition, in operation 3105, the second electronic device 20 may receive the first wireless signal from the first electronic device 10. According to the embodiment of the present disclosure, the first wireless signal may be transmitted in the form of a BLE advertising packet, and may serve as a reference signal for measuring the distance between the first electronic device 10 and nearby electronic devices. Here, the first wireless signal may also be referred to as the second advertising message or a distance measurement indicator. Here, the second electronic device 20 may receive the first wireless signal at the timing $T_{Bp1}$.

In operation 3107, the second electronic device 20 may receive the first sound wave from the first electronic device 10. According to the embodiment of the present disclosure, the second electronic device 20 may receive the first sound wave at the timing $R_{Sp1}$.

In addition, in operation 3109, the second electronic device 20 may receive the second negotiation request from the first electronic device 10. The second negotiation request may be transmitted in the form of a BLE advertising packet.

The second negotiation request may contain the value Δt that has been calculated by the first electronic device 10, and the value Δt may be one of the parameters for calculating the distance between the first electronic device 10 and the second electronic device 20.

In operation 3111, the second electronic device 20 may transmit the second negotiation response to the first electronic device 10. Here, the second electronic device 20 may measure the distance $D_{p1}$ between the first electronic device 10 and the second electronic device 20 based on the parameters that are measured by the second electronic device 20 or that are received from the first electronic device 10. For example, provided that the timing of when the first electronic device 10 transmits the first wireless signal to the second electronic device 20 is the same, being $T_{Bp1}$, as the timing of when the second electronic device 20 receives the first wireless signal from the first electronic device 10, the difference value between the timing of when the first electronic device 10 transmits the sound wave to the second electronic device 20 and the timing $R_{Sp1}$ of when the second electronic device 20 receives the sound wave from the first electronic device 10 may be determined to be $(R_{Sp1}-T_{Bp1}-\Delta t)$. Here, the value $R_{Sp1}$ and the value $T_{Bp1}$ may be measured by the second electronic device 20, and the value Δt may be received from the first electronic device 10. Consequently, the second electronic device 20 may calculate the distance between the first electronic device 10 and the second electronic device 20 by multiplying the value $(R_{Sp1}-T_{Bp1}-\Delta t)$ and the transmission speed (340 m/s) of a sound wave.

The second negotiation response may contain the distance value between the first electronic device 10 and the second electronic device 20, or the value $(R_{Sp1}-T_{Bp1})$, which has been previously determined. In the case where the second negotiation response contains the value $(R_{Sp1}-T_{Bp1})$, the first electronic device 10 may directly calculate the distance between the first electronic device 10 and the second electronic device 20 by multiplying the value $(R_{Sp1}-T_{Bp1}-\Delta t)$ and the transmission speed (340 m/s) of a sound wave through the received value $(R_{Sp1}-T_{Bp1})$ and the value Δt, which has been determined by the first electronic device 10.

In operation 3113, the second electronic device 20 may receive the second wireless signal from the first electronic device 10. In operation 3115, the second sound wave may be received from the first electronic device 10. In operation 3117, the third negotiation request may be received from the first electronic device 10. In operation 3119, the third negotiation response may be transmitted to the first electronic device 10. According to this, operations 3101 to 3111 may be repeatedly performed so that the second electronic device 20 may repeatedly perform the distance measurement with respect to the first electronic device 10, or so that the first electronic device 10 may perform the distance measurement with respect to a new electronic device.

Although only the operation of the second electronic device 20 has been limitedly described in FIG. 31, the embodiment is not limited thereto, and the third electronic device 30 may operate in a similar manner as operations 3101 to 3119.

Figure 32:
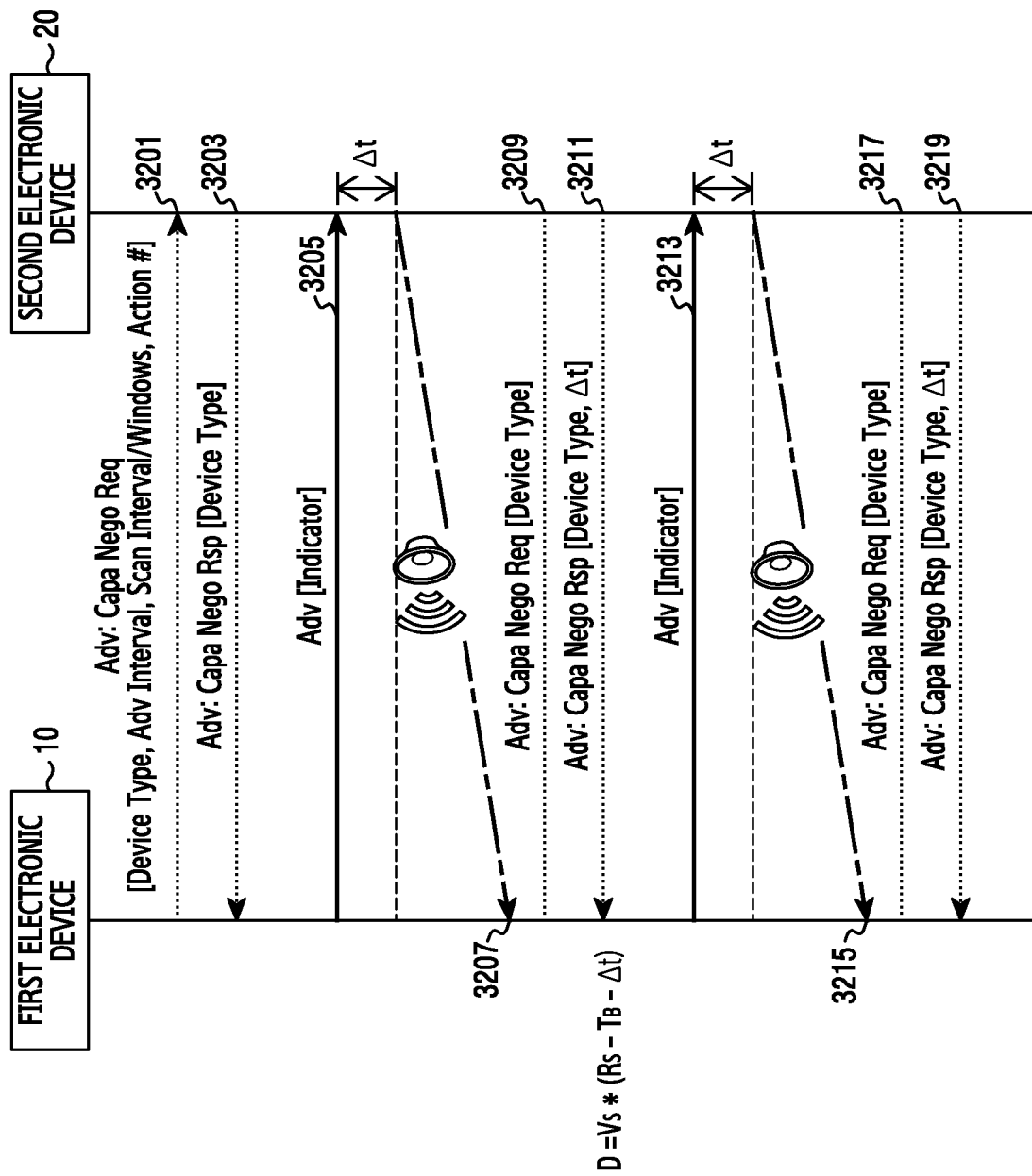
FIG. 32 illustrates a processing flow of a distance measuring method according to various embodiments of the present disclosure.

FIG. 32 illustrates a processing flow of a distance measuring method according to various embodiments of the present disclosure.

Referring to FIG. 32, the first electronic device 10 may include the first microphone, and the second electronic device 20 may include the second speaker. First, in operation 3201, the first electronic device 10 may transmit the first negotiation request for measuring the distance to a certain electronic device. In other words, the first negotiation request may be broadcast in the form of a BLE advertising packet, and certain electronic devices near the first electronic device 10 may receive the first negotiation request. Here, the first negotiation request may be received by a plurality of electronic devices, and the first negotiation request may be referred to as the first advertising message.

In this case, the first negotiation request may contain a plurality of pieces of information. For example, the first negotiation request may contain information on the type of electronic device that performs the distance measurement, information on a transmission interval of the advertising messages, information on a detection interval of the device that receives the advertising messages, or on a detection window thereof, and information on the action number. Here, the action number is the information that indicates the advertising message number, through which the wireless signal for the distance measurement (i.e., the distance measurement indicator) is transmitted. According to the embodiment of the present disclosure, the action number may be configured to be '2,' and, in this case, the wireless signal for the distance measurement may be transmitted through the second advertising message that is transmitted by the first electronic device 10.

According to the embodiment of the present disclosure, the second electronic device 20 may receive the first negotiation request, and may transmit the first negotiation response to the first electronic device 10 in response to the first negotiation request in operation 3203. Here, the first negotiation response may contain information on the electronic device that performs the distance measurement.

In operation 3205, the first electronic device 10 may transmit the first wireless signal. According to the embodiment of the present disclosure, the first wireless signal may be transmitted in the form of a BLE advertising packet, and may serve as a reference signal for measuring the distance between the first electronic device 10 and nearby electronic devices. Here, the first wireless signal may also be referred to as the second advertising message or a distance measurement indicator. According to the embodiment of the present disclosure, in the case where the action number contained in the first advertising message is configured to be 2, the second advertising message may contain the distance measurement indicator in order to thereby serve as a wireless signal for the distance measurement. Here, taking the transmission speed of the wireless signal corresponding to the speed of light into consideration, it may be assumed that the timing $T_B$ of when the first electronic device 10 transmits the first wireless signal is the same as the timing of when the second electronic device 20 receives the first wireless signal.

In operation 3207, the second electronic device 20 may transmit the first sound wave at the timing of when the time Δt has elapsed since the reception timing $T_B$ of the first wireless signal. According to the embodiment of the present disclosure, the first electronic device 10 may receive the first sound wave at the timing $R_S$.

In addition, in operation 3209, the first electronic device 10 may transmit the second negotiation request. Here, the second negotiation request may be broadcast in the form of a BLE advertising packet, and may contain information on the type of electronic device that performs the distance measurement. Here, the second electronic device 20 may calculate the value Δt. For example, the clock of a system or chip that transmits the wireless signal and the clock of a system or chip that transmits the sound wave may be converted to a reference clock of the entire system, and then the value Δt may be calculated.

In operation 3211, the second electronic device 20 may transmit the second negotiation response in response to the reception of the second negotiation request. The second negotiation response may contain the value Δt. Here, the value Δt may be one of the parameters for calculating the distance between the first electronic device 10 and the second electronic device 20, and between the first electronic device 10 and the third electronic device 30.

In addition, the first electronic device 10 may measure the distance D between the first electronic device 10 and the second electronic device 20 based on the parameters that are measured by the first electronic device 10 or that are received from second electronic device 20. In other words, provided that the timing of when the first electronic device 10 transmits the first wireless signal to the second electronic device 20 is the same, being $T_B$, as the timing of when the second electronic device 20 receives the first wireless signal from the first electronic device 10, the difference value between the timing of when the second electronic device 20 transmits the first sound wave to the first electronic device 10 and the timing $R_S$ of when the first electronic device 10 receives the first sound wave from the second electronic device 20 may be determined to be ($R_S$–$T_B$–Δt). Here, the value $R_S$ and the value $T_B$ may be measured by the first electronic device 10, and the value Δt may be received from the second electronic device 20. Consequently, the first electronic device 10 may calculate the distance between the first electronic device 10 and the second electronic device 20 by multiplying the value ($R_S$–$T_B$–Δt) and the transmission speed (340 m/s) of a sound wave.

Afterwards, operations 3201 to 3211 are repeatedly performed through operations 3213 to 3219 so that the first electronic device 10 may repeatedly perform the distance measurement with respect to the second electronic device 20, or may perform the distance measurement with respect to a new electronic device.

Referring to FIG. 32, although the description has been made of the operation in which the first electronic device 10 determines the distance only to the second electronic device 20, this is only an example. The first electronic device 10 may perform the distance measurement with respect to a plurality of electronic devices near the first electronic device 10.

Figure 33:
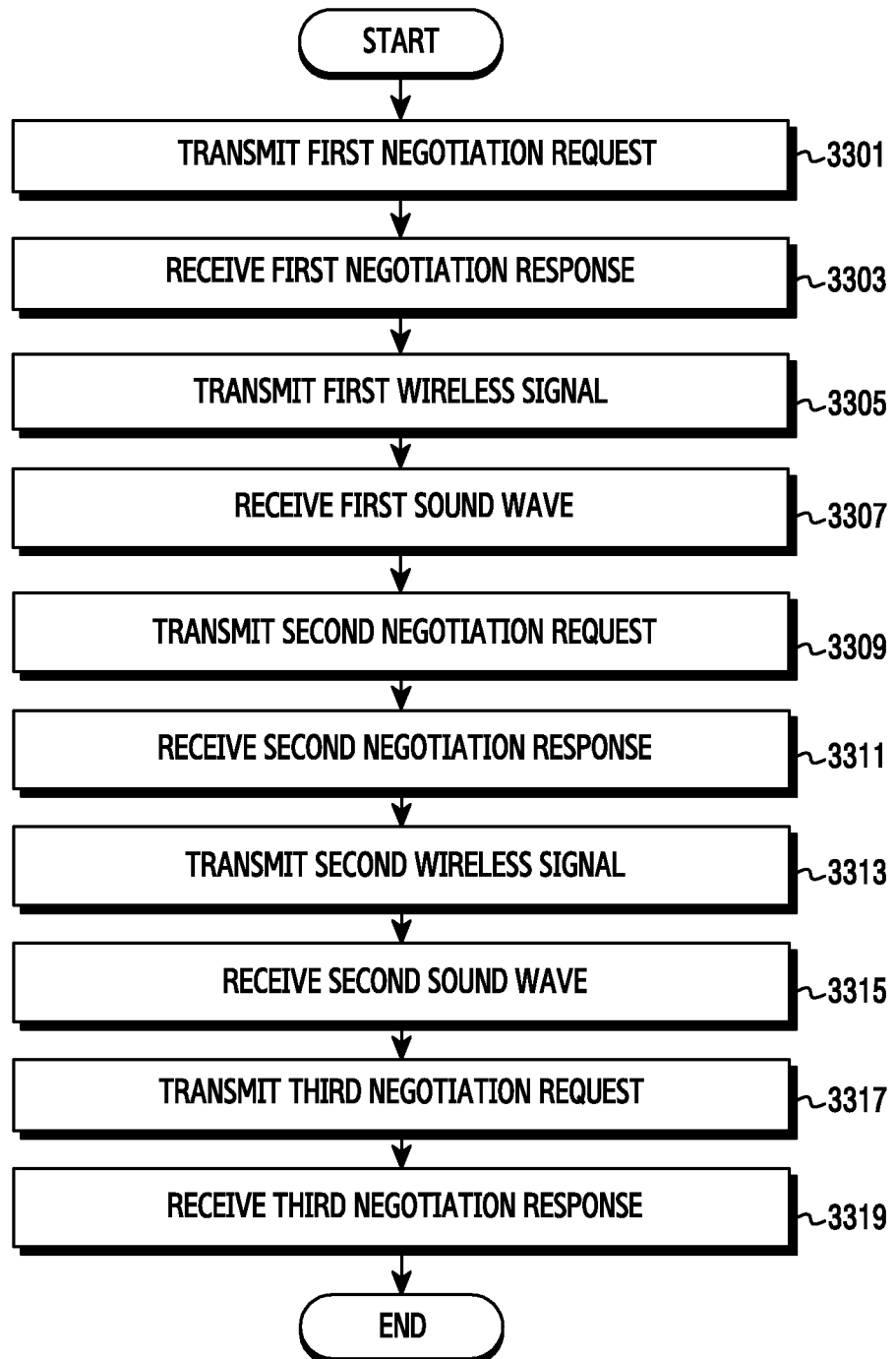
FIG. 33 is a flowchart illustrating a distance-measuring operation of a first electronic device according to various embodiments of the present disclosure.

FIG. 33 is a flowchart illustrating a distance-measuring operation in a first electronic device according to various embodiments of the present disclosure.

Referring to FIG. 33, first, in operation 3301, the first electronic device 10 may transmit the first negotiation request. The first negotiation request may be broadcast in the form of a BLE advertising packet, and certain electronic devices near the first electronic device 10 may receive the first negotiation request. Here, the first negotiation request may be received by a plurality of electronic devices, and the first negotiation request may be referred to as the first advertising message.

In operation 3303, the first electronic device 10 may receive the first negotiation response from the second electronic device 20. Here, the first negotiation response may contain information on the electronic device that performs the distance measurement.

In addition, in operation 3305, the first electronic device 10 may transmit the first wireless signal. According to the embodiment of the present disclosure, the first wireless signal may be transmitted in the form of a BLE advertising packet, and may serve as a reference signal for measuring the distance between the first electronic device 10 and nearby electronic devices. Here, the first wireless signal may also be referred to as the second advertising message or a distance measurement indicator.

In operation 3307, the first electronic device 10 may receive the first sound wave from the second electronic device 20.

In addition, in operation 3309, the first electronic device 10 may transmit the second negotiation request. Here, the second negotiation request may be broadcast in the form of a BLE advertising packet, and may contain information on the type of electronic device that performs the distance measurement.

In operation 3311, the first electronic device 10 may receive the second negotiation response. Here, the second negotiation response may be broadcast in the form of a BLE advertising packet. The second negotiation response may contain the value Δt that has been calculated by the second electronic device 20, and the value Δt may be one of the parameters for calculating the distance between the first electronic device 10 and the second electronic device 20.

In this case, the first electronic device 10 may measure the distance D between the first electronic device 10 and the second electronic device 20 based on the parameters that are measured by the first electronic device 10 or that are received from second electronic device 20. In other words, provided that the timing of when the first electronic device 10 transmits the first wireless signal to the second electronic device 20 is the same, being $T_B$, as the timing of when the second electronic device 20 receives the first wireless signal from the first electronic device 10, the difference value between the timing of when the second electronic device 20 transmits the first sound wave to the first electronic device 10 and the timing $R_S$ of when the first electronic device 10 receives the first sound wave from the second electronic device 20 may be determined to be ($R_S$–$T_B$–Δt). Here, the value $R_S$ and the value $T_B$ may be measured by the first electronic device 10, and the value Δt may be received from the second electronic device 20. Consequently, the first electronic device 10 may calculate the distance between the first electronic device 10 and the second electronic device 20 by multiplying the value ($R_S$–$T_B$–Δt) and the transmission speed (340 m/s) of a sound wave.

The first electronic device 10 may transmit the second wireless signal in operation 3313, receive the second sound wave in operation 3315, transmit the third negotiation request in operation 3317, and receive the third negotiation response in operation 3319. According to this, operations 3301 to 3311 are repeatedly performed so that the first electronic device 10 may repeatedly perform the distance measurement with respect to the second electronic device 20 and the distance measurement with respect to the third electronic device 30, or may perform the distance measurement with respect to a new electronic device.

Figure 34:
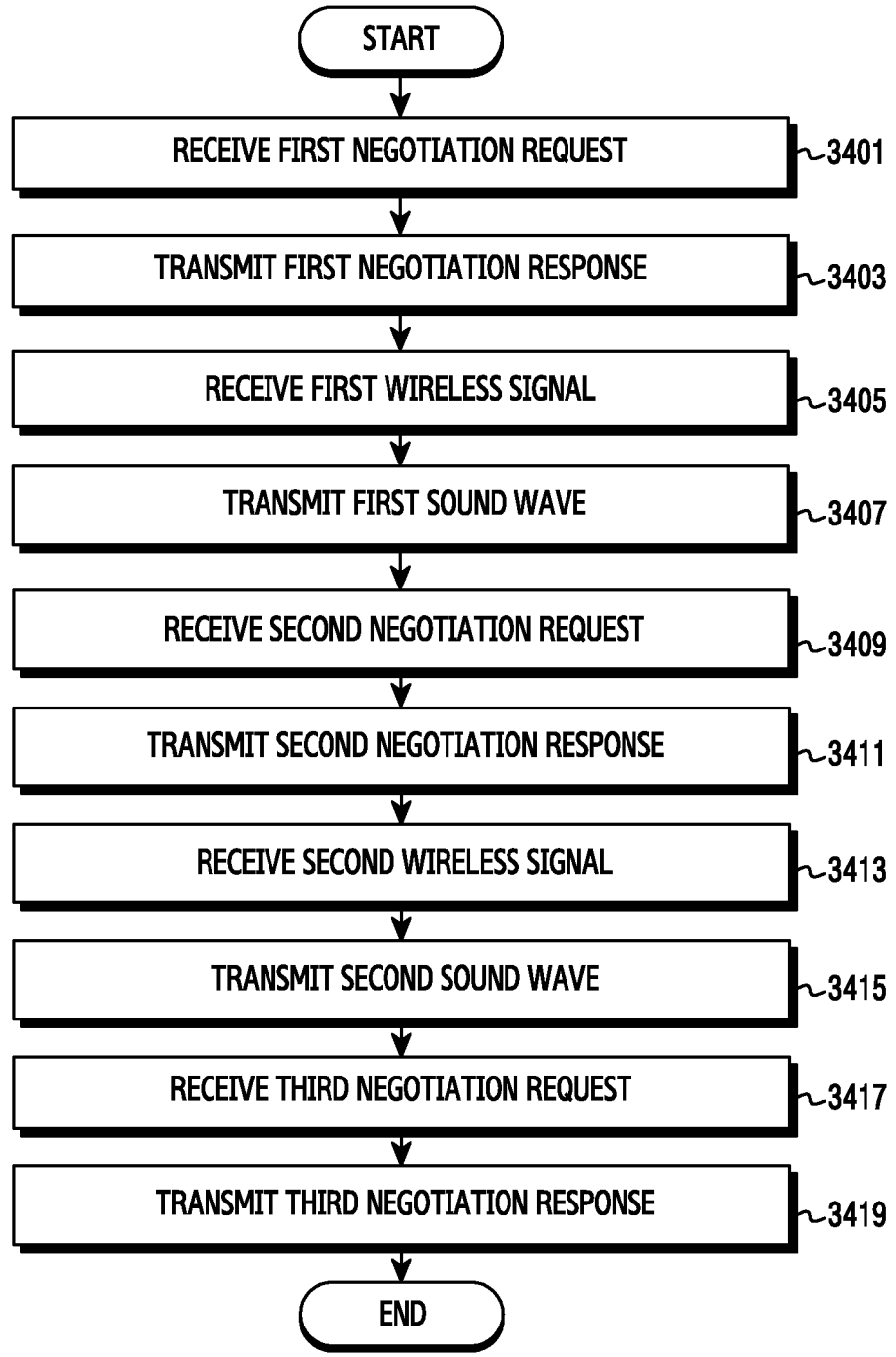
FIG. 34 is a flowchart illustrating a distance-measuring operation of a second electronic device according to various embodiments of the present disclosure.

FIG. 34 is a flowchart illustrating a distance-measuring operation in a second electronic device according to various embodiments of the present disclosure.

Referring to FIG. 34, first, in operation 3401, the second electronic device 20 may receive the first negotiation request from the first electronic device 10. The first negotiation request may be broadcast in the form of a BLE advertising packet, and the first negotiation may be referred to as the first advertising message.

In operation 3403, the second electronic device 20 may transmit the first negotiation response to the first electronic device 10. Here, the first negotiation response may contain information on the electronic device that performs the distance measurement.

In addition, in operation 3405, the second electronic device 20 may receive the first wireless signal from the first electronic device 10. According to the embodiment of the present disclosure, the first wireless signal may be transmitted in the form of a BLE advertising packet, and may serve as a reference signal for measuring the distance between the first electronic device 10 and nearby electronic devices. Here, the first wireless signal may also be referred to as the second advertising message or a distance measurement indicator. Here, taking the transmission speed of the wireless signal corresponding to the speed of light into consideration, it may be assumed that the timing $T_B$ of when the first electronic device 10 transmits the first wireless signal is the same as the timing of when the second electronic device 20 receives the first wireless signal.

In operation 3407, the second electronic device 20 may transmit the first sound wave to the first electronic device 10. In other words, the second electronic device 20 may transmit the first sound wave at the timing of when the time Δt has elapsed since the reception timing $T_B$ of the first wireless signal.

In addition, in operation 3409, the second electronic device 20 may receive the second negotiation request from the first electronic device 10. The second negotiation request may be transmitted in the form of a BLE advertising packet, and may contain information on the type of electronic device that performs the distance measurement.

In operation 3411, the second electronic device 20 may transmit the second negotiation response to the first electronic device 10. Here, the second negotiation response may be transmitted in the form of a BLE advertising packet. The second negotiation response may contain the value Δt that has been calculated by the second electronic device 20, and the value Δt may be one of the parameters for calculating the distance between the first electronic device 10 and the second electronic device 20.

The second electronic device 20 may receive the second wireless signal from the first electronic device 10 in operation 3413, transmit the second sound wave to the first electronic device 10 in operation 3415, receive the third negotiation request from the first electronic device 10 in operation 3417, and transmit the third negotiation response to the first electronic device 10 in operation 3419. According to this, operations 3401 to 3411 may be repeatedly performed so that the second electronic device 20 may allow the first electronic device 10 to repeatedly perform the distance measurement with respect to the second electronic device 20 and the distance measurement with respect to the third electronic device 30, or may allow the first electronic device 10 perform the distance measurement with respect to a new electronic device.

Figure 35:
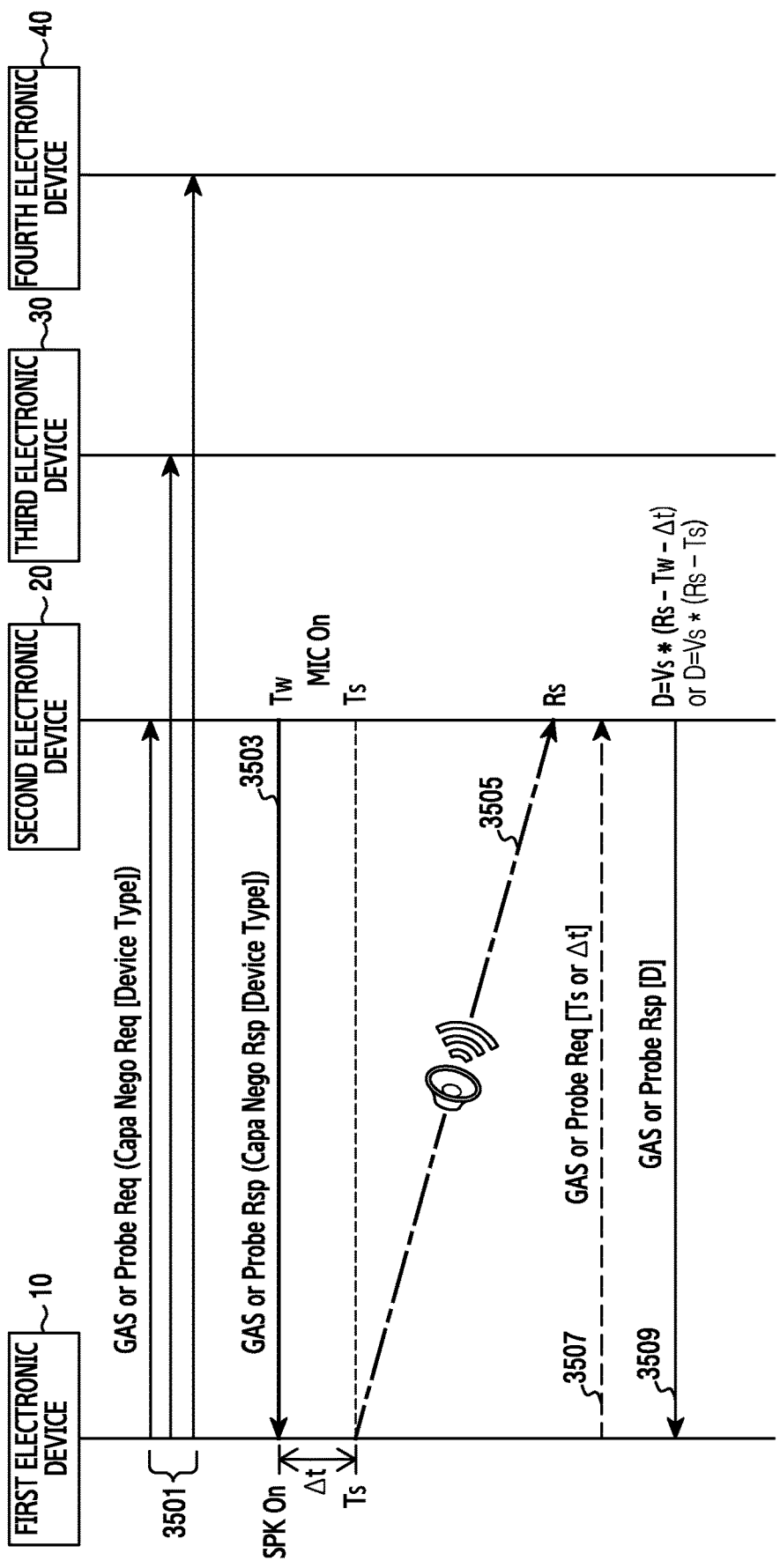
FIG. 35 illustrates a processing flow of a distance measuring method according to various embodiments of the present disclosure.

FIG. 35 illustrates a processing flow of a distance measuring method according to various embodiments of the present disclosure.

Referring to FIG. 35, the first electronic device 10 may include the first speaker, and the second electronic device 20 may include the second microphone. In addition, the third electronic device 30 may include the third microphone, and a fourth electronic device 40 may include the fourth microphone.

First, in operation 3501, the first electronic device 10 may transmit a negotiation request for measuring the distance to a certain electronic device. In other words, the negotiation request may be broadcast to certain electronic devices near the first electronic device 10, and the negotiation request may be referred to as a generic advertisement service (GAS) or a probe request on the condition of a Wi-Fi system. In this case, the negotiation request may contain information on the type of electronic device that performs the distance measurement. The first electronic device 10 may activate the first speaker after transmitting the negotiation request.

In operation 3503, the second electronic device 20 may receive the negotiation request, and, in response to the negotiation request, may transmit a negotiation response to the first electronic device 10 at the timing $T_W$. The negotiation response may be referred to as a GAS or probe response, and the negotiation response may contain information on the electronic device that performs the distance measurement. The second electronic device 20 may activate the second microphone after transmitting the negotiation response.

In operation 3505, the first electronic device 10 may transmit a sound wave at the timing (i.e., at the timing $T_S$) of when the time Δt has elapsed since the reception timing of the negotiation response. According to the embodiment of the present disclosure, the second electronic device 20 may receive the sound wave at the timing $R_S$. Here, the first electronic device 10 may calculate the value Δt. For example, the clock of a system or chip that transmits the wireless signal and the clock of a system or chip that transmits the sound wave may be converted to a reference clock of the entire system, and then the value Δt may be calculated.

In addition, in operation 3507, the first electronic device 10 may transmit parameters for the distance determination to the second electronic device 20, wherein the parameters may contain the value $T_S$ or the value Δt.

The second electronic device 20 may receive the parameters in response to the transmission of the parameters for the distance determination from the first electronic device 10 to the second electronic device 20. Here, the second electronic device 20 may measure the distance D between the first electronic device 10 and the second electronic device 20 based on the parameters that are measured by the second electronic device 20 or that are received from the first electronic device 10. For example, if the parameters that the second electronic device 20 has received contain the value $T_S$, the second electronic device 20 may determine the value $(R_S-T_S)$. If the parameters that the second electronic device 20 has received contain the value Δt, the second electronic device 20 may determine the value $(R_S-T_W-\Delta t)$. Consequently, the second electronic device 20 may calculate the distance between the first electronic device 10 and the second electronic device 20 by multiplying the value $(R_S-T_S)$ and the transmission speed (340 m/s) of a sound wave, or by multiplying the value $(R_S-T_W-\Delta t)$ and the transmission speed of a sound wave. Afterwards, in operation 3509, the second electronic device 20 may transmit the calculated distance information to the first electronic device 10.

Figure 36:
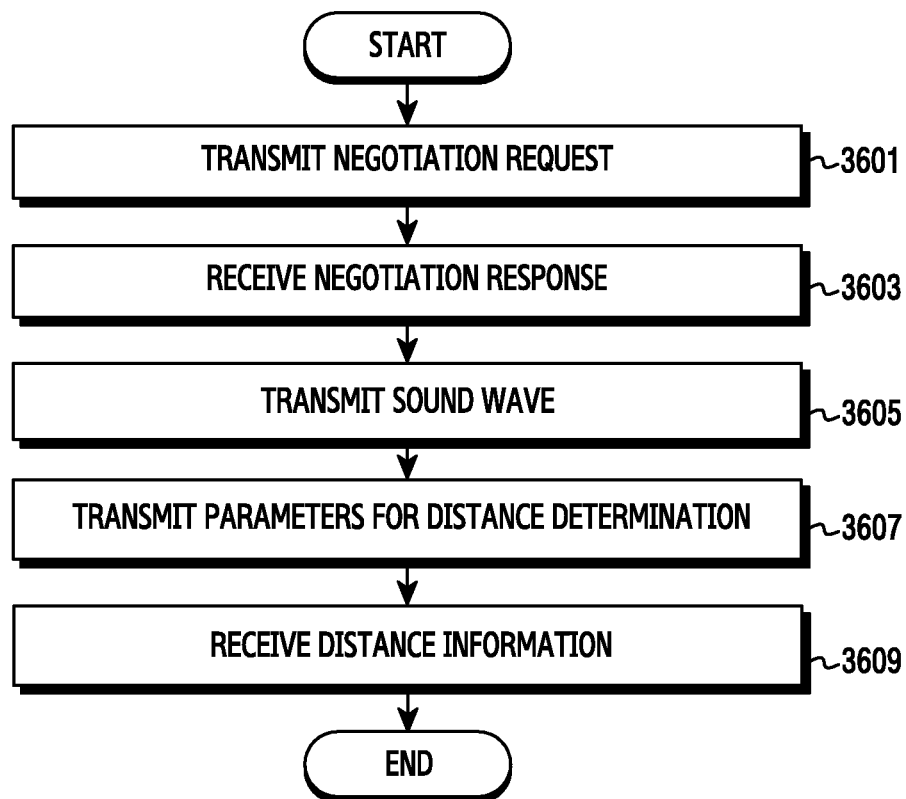
FIG. 36 is a flowchart illustrating a distance-measuring operation of a first electronic device according to various embodiments of the present disclosure.

FIG. 36 is a flowchart illustrating a distance-measuring operation in a first electronic device according to various embodiments of the present disclosure.

Referring to FIG. 36, first, in operation 3601, the first electronic device 10 may transmit a negotiation request. The negotiation request may be broadcast to certain electronic devices near the first electronic device 10, and the negotiation request may be referred to as a GAS or probe request on the condition of a Wi-Fi system. In this case, the negotiation request may contain information on the type of electronic device that performs the distance measurement. The first electronic device 10 may activate the first speaker after transmitting the negotiation request.

In operation 3603, the first electronic device 10 may receive a negotiation response. According to the embodiment of the present disclosure, the first electronic device 10 may receive the negotiation response from the second electronic device 20.

In addition, in operation 3605, the first electronic device 10 may transmit a sound wave. For example, the first electronic device 10 may transmit the sound wave at the timing (i.e., at the timing $T_S$) of when the time Δt has elapsed since the reception timing of the negotiation response.

In operation 3607, the first electronic device 10 may transmit parameters for the distance determination. Here, the parameters may contain the value $T_S$ or the value Δt.

Finally, in operation 3609, the first electronic device 10 may receive distance information that is calculated by the second electronic device 20.

Figure 37:
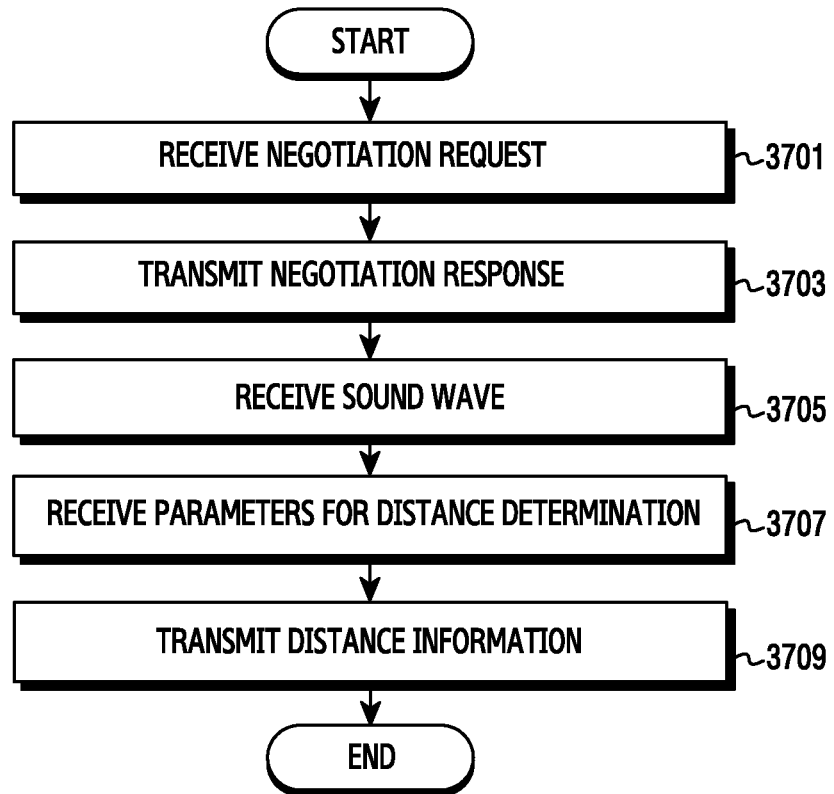
FIG. 37 is a flowchart illustrating a distance-measuring operation of a second electronic device according to various embodiments of the present disclosure.

FIG. 37 is a flowchart illustrating a distance-measuring operation in a second electronic device according to various embodiments of the present disclosure.

Referring to FIG. 37, first, in operation 3701, the second electronic device 20 may receive a negotiation request. The negotiation request may be broadcast to certain electronic devices near the first electronic device 10, and the negotiation request may be referred to as a GAS or probe request on the condition of a Wi-Fi system. In this case, the negotiation request may contain information on the type of electronic device that performs the distance measurement.

In operation 3703, the second electronic device 20 may transmit a negotiation response. The negotiation response may contain information on the electronic device that performs the distance measurement, and the second electronic device 20 may activate the second microphone after transmitting the negotiation response.

In addition, in operation 3705, the second electronic device 20 may receive a sound wave from the first electronic device 10. In this case, the second electronic device 20 may receive the sound wave at the timing $R_S$.

In operation 3707, the second electronic device 20 may receive parameters for the distance determination. Here, the parameters may contain the value $T_S$ or the value Δt.

Here, the second electronic device 20 may measure the distance D between the first electronic device 10 and the second electronic device 20 based on the parameters that are measured by the second electronic device 20 or that are received from the first electronic device 10. For example, if the parameters that the second electronic device 20 has received contain the value $T_S$, the second electronic device 20 may determine the value ($R_S$–$T_S$). If the parameters that the second electronic device 20 has received contain the value Δt, the second electronic device 20 may determine the value ($R_S$–$T_W$–Δt). Consequently, the second electronic device 20 may calculate the distance between the first electronic device 10 and the second electronic device 20 by multiplying the value ($R_S$–$T_S$) and the transmission speed (340 m/s) of a sound wave, or by multiplying the value ($R_S$–$T_W$–Δt) and the transmission speed of a sound wave. Afterwards, in operation 3709, the second electronic device 20 may transmit the calculated distance information to the first electronic device 10.

Figure 38:
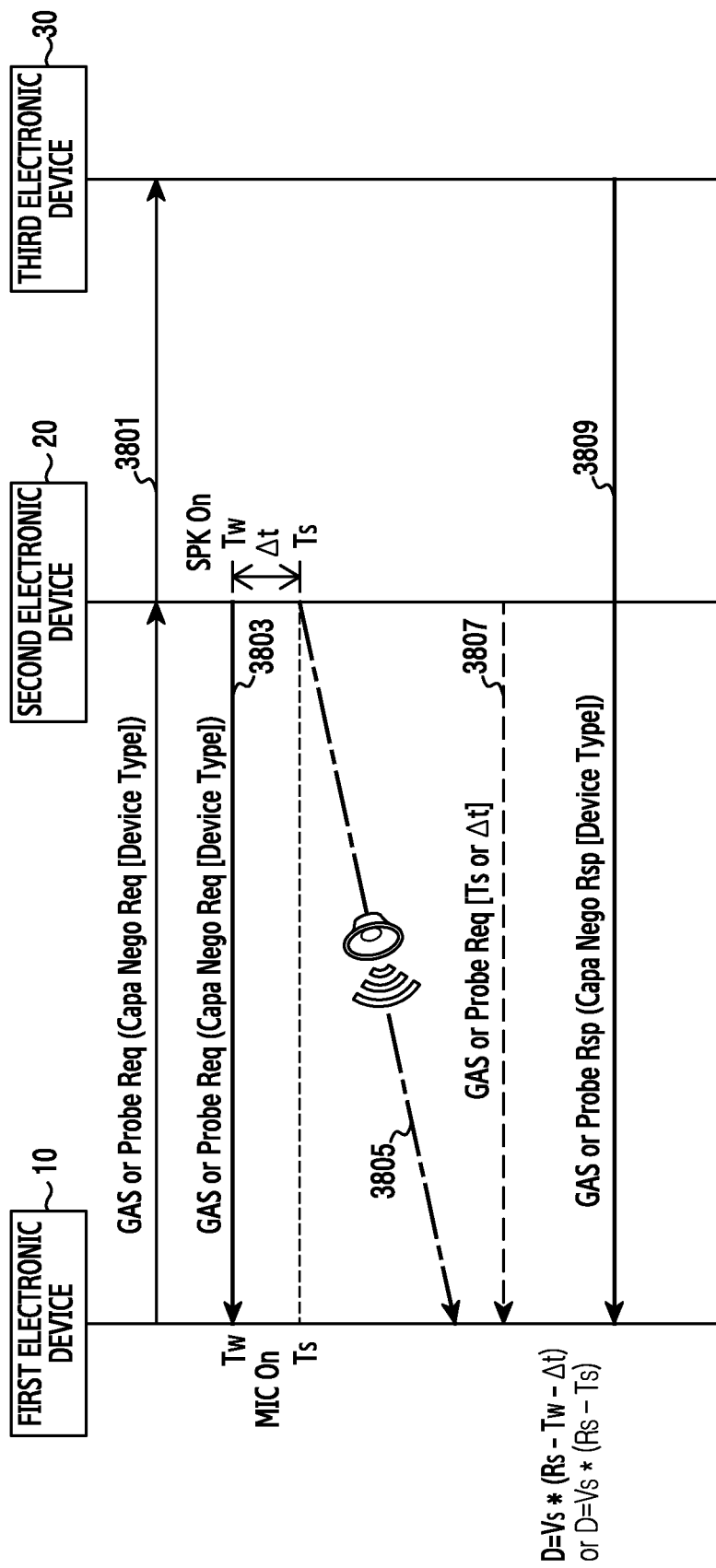
FIG. 38 illustrates a processing flow of a distance measuring method according to various embodiments of the present disclosure.

FIG. 38 illustrates a processing flow of a distance measuring method according to various embodiments of the present disclosure.

Referring to FIG. 38, the first electronic device 10 may include the first speaker, and the second electronic device 20 may include the second speaker. In addition, the third electronic device 30 may include the third speaker. First, in operation 3801, the first electronic device 10 may transmit a negotiation request for measuring the distance to a certain electronic device. In other words, the negotiation request may be broadcast to certain electronic devices near the first electronic device 10, and the negotiation request may be referred to as a GAS or probe request on the condition of a Wi-Fi system. In this case, the negotiation request may contain information on the type of electronic device that performs the distance measurement.

In operation 3803, the second electronic device 20 may receive the negotiation request, and may activate the second speaker at the timing of receiving the negotiation request. In addition, in response to the negotiation request, the second electronic device 20 may transmit the first negotiation response to the first electronic device 10 at the timing $T_w$. The first negotiation response may be referred to as a GAS or a probe response, and the first negotiation response may contain information on the electronic device that performs the distance measurement. In response to the transmission of the first negotiation response by the second electronic device 20, the first electronic device 10 may receive the first negotiation response, and may activate the first microphone at the timing of when the first negotiation response is received.

In operation 3805, the second electronic device 20 may transmit a sound wave at the timing (i.e., at the timing $T_S$) of when the time Δt has elapsed since the reception timing $T_W$ of the first negotiation response. According to the embodiment of the present disclosure, the first electronic device 10 may receive the sound wave at the timing $R_S$. Here, the second electronic device 20 may calculate the value Δt. For example, the clock of a system or chip that transmits the wireless signal and the clock of a system or chip that transmits the sound wave may be converted to a reference clock of the entire system, and then the value Δt may be calculated.

In addition, in operation 3807, the second electronic device 20 may transmit parameters for the distance determination to the first electronic device 10, wherein the parameters may contain the value $T_S$ or the value Δt.

The first electronic device 10 may receive the parameters in response to the transmission of the parameters for the distance determination from the second electronic device 20 to the first electronic device 10. Here, the first electronic device 10 may measure the distance D between the first electronic device 10 and the second electronic device 20 based on the parameters that are measured by the first electronic device 10 or that are received from the second electronic device 20. For example, if the parameters that the first electronic device 10 has received contain the value $T_S$, the first electronic device 10 may determine the value ($R_S$–$T_S$). If the parameters that the first electronic device 10 has received contain the value Δt, the first electronic device 10 may determine the value ($R_S$–$T_W$–Δt). Consequently, the first electronic device 10 may calculate the distance between the first electronic device 10 and the second electronic device 20 by multiplying the value ($R_S$–$T_S$) and the transmission speed (340 m/s) of a sound wave, or by multiplying the value ($R_S$–$T_W$–Δt) and the transmission speed of a sound wave.

Afterwards, in operation 3809, the third electronic device 30, which is a new electronic device that has not yet performed the distance measurement with the first electronic device 10, may transmit the second negotiation response in response to the negotiation request that is transmitted by the first electronic device 10 in operation 3801. In addition, distance between the first electronic device 10 and the third electronic device 30 may be measured in a similar manner as operations 3801 to 3807.

Figure 39:
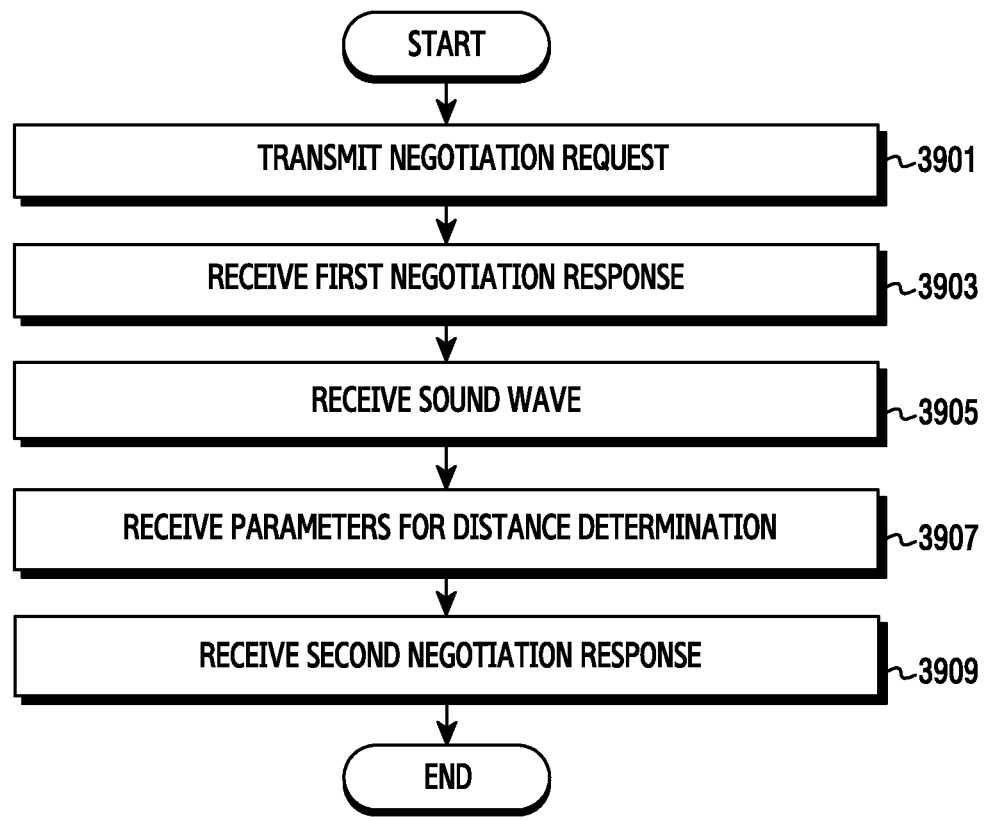
FIG. 39 is a flowchart illustrating a distance-measuring operation of a first electronic device according to various embodiments of the present disclosure.

FIG. 39 is a flowchart illustrating a distance-measuring operation of a first electronic device according to various embodiments of the present disclosure.

Referring to FIG. 39, first, in operation 3901, the first electronic device 10 may transmit a negotiation request. The negotiation request may be broadcast to certain electronic devices near the first electronic device 10, and the negotiation request may be referred to as a GAS or probe request on the condition of a Wi-Fi system. In this case, the negotiation request may contain information on the type of electronic device that performs the distance measurement. The first electronic device 10 may activate the first speaker after transmitting the negotiation request.

In operation 3903, the first electronic device 10 may receive the first negotiation response. According to the embodiment of the present disclosure, the first electronic device 10 may receive the first negotiation response from the second electronic device 20.

In addition, in operation 3905, the first electronic device 10 may receive a sound wave. Here, the sound wave may be transmitted by the second electronic device 20 at the timing (i.e., at the timing $T_S$) of when the time $\Delta t$ has elapsed since the transmission timing $T_W$ of the first negotiation response, and the first electronic device 10 may receive the sound wave at the timing $R_S$.

In operation 3907, the first electronic device 10 may receive parameters for the distance determination. Here, the parameters may contain the value $T_S$ or the value $\Delta t$.

Here, the first electronic device 10 may measure the distance D between the first electronic device 10 and the second electronic device 20 based on the parameters that are measured by the first electronic device 10 or that are received from the second electronic device 20. For example, if the parameters that the first electronic device 10 has received contain the value $T_S$, the first electronic device 10 may determine the value ($R_S$–$T_S$). If the parameters that the first electronic device 10 has received contain the value $\Delta t$, the first electronic device 10 may determine the value ($R_S$–$T_W$–$\Delta t$). Consequently, the first electronic device 10 may calculate the distance between the first electronic device 10 and the second electronic device 20 by multiplying the value ($R_S$–$T_S$) and the transmission speed (340 m/s) of a sound wave, or by multiplying the value ($R_S$–$T_W$–$\Delta t$) and the transmission speed of a sound wave.

Finally, in operation 3909, the first electronic device 10 may receive the second negotiation response from the third electronic device 30, and the distance between the first electronic device 10 and the third electronic device 30 may be measured in a similar manner as operations 3901 to 3907.

Figure 40:
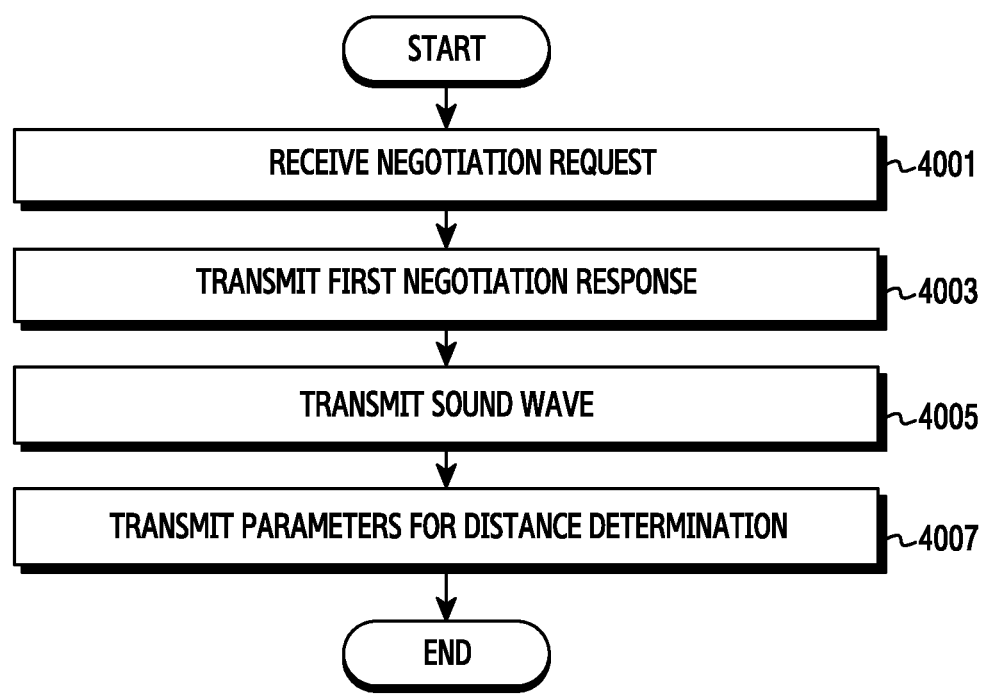
FIG. 40 is a flowchart illustrating a distance-measuring operation of a second electronic device according to various embodiments of the present disclosure.

FIG. 40 is a flowchart illustrating a distance-measuring operation of a second electronic device according to various embodiments of the present disclosure.

Referring to FIG. 40, first, in operation 4001, the second electronic device 20 may receive a negotiation request. The negotiation request may be broadcast to certain electronic devices near the first electronic device 10, and the negotiation request may be referred to as a GAS or probe request on the condition of a Wi-Fi system. In this case, the negotiation request may contain information on the type of electronic device that performs the distance measurement. The second electronic device 20 may activate the second speaker at the timing of when the negotiation request is received.

In operation 4003, the second electronic device 20 may transmit the first negotiation response. The first negotiation response may contain information on the electronic device that performs the distance measurement.

In addition, in operation 4005, the second electronic device 20 may transmit a sound wave to the first electronic device 10. For example, the second electronic device 20 may transmit the sound wave at the timing (i.e., at the timing $T_S$) of when the time $\Delta t$ has elapsed since the transmission timing $T_W$ of the negotiation response.

In operation 4007, the second electronic device 20 may transmit parameters for the distance determination to the first electronic device 10. Here, the parameters may contain the value $T_S$ or the value $\Delta t$.

Although only the operation of the second electronic device 20 has been limitedly described in FIG. 40, the embodiment is not limited thereto, and the third electronic device 30 may operate in a similar manner as operations 4001 to 4007.

Figure 41A:
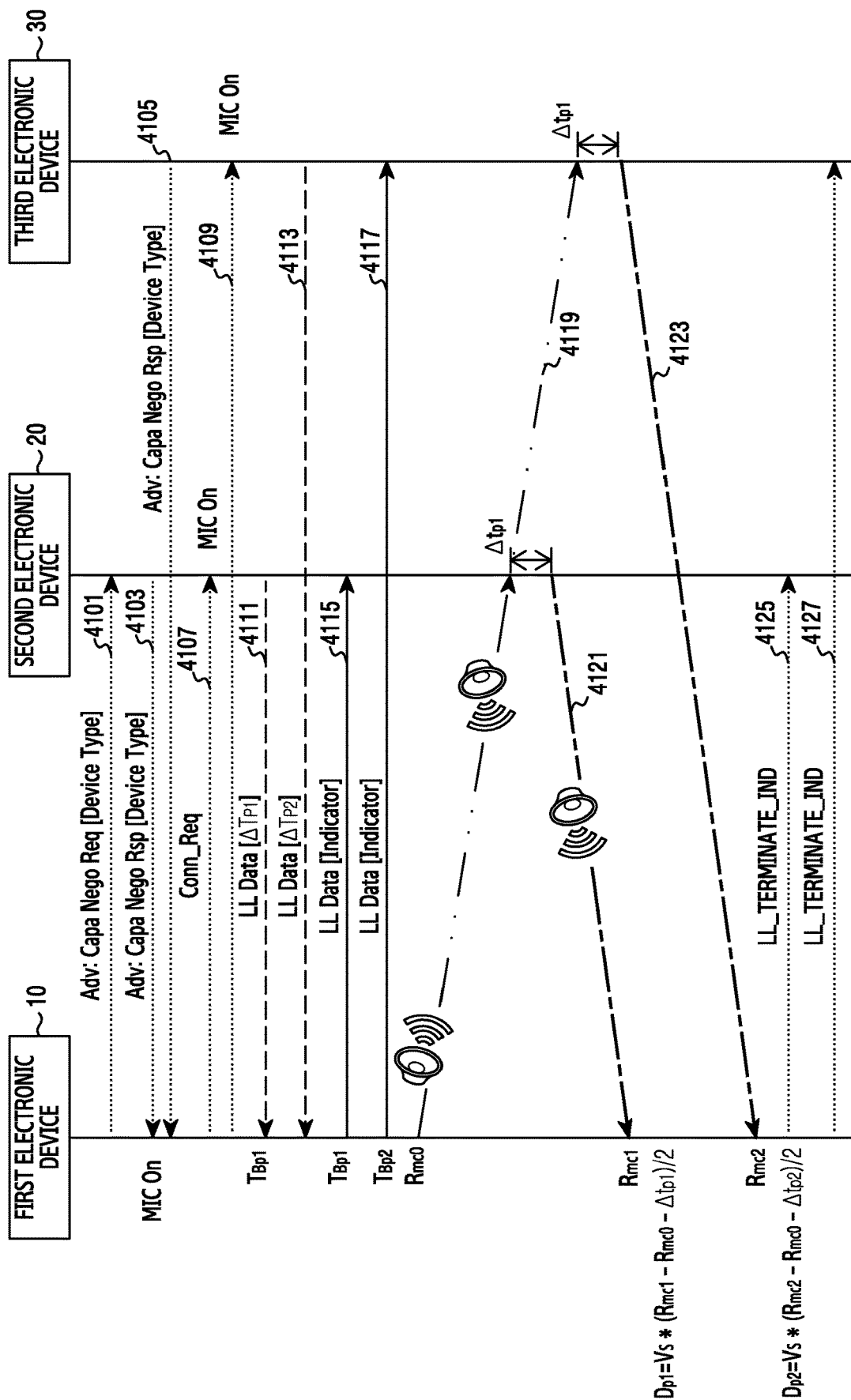
FIG. 41A illustrates a processing flow of a link layer (LL) data-based distance measuring method according to various embodiments of the present disclosure.

FIG. 41A illustrates a processing flow of an LL data-based distance measuring method according to various embodiments of the present disclosure.

Referring to FIG. 41A, the first electronic device 10 may perform the distance measurement with respect to a plurality of electronic devices near the first electronic device 10. The first electronic device 10 may include the first microphone and the first speaker. Unlike FIG. 41B described below, in FIG. 41A, the first electronic device 10 may perform the distance measurement with respect to a plurality of electronic devices near the first electronic device 10 without receiving feedback.

In operation 4101, the first electronic device 10 may transmit a negotiation request for measuring the distance to a certain electronic device. The first electronic device 10 may broadcast the negotiation request in the form of an advertising packet. A certain electronic device near the first electronic device 10 may receive the negotiation request. The negotiation request may be received by a plurality of electronic devices. The negotiation request may contain information on the electronic device that performs the distance measurement.

The second electronic device 20, according to various embodiments of the present disclosure, may receive the negotiation request. In operation 4103, the second electronic device 20 may transmit the first negotiation response to the first electronic device 10 in response to the negotiation request. In addition, the third electronic device 30 may receive the negotiation request. In operation 4105, the third electronic device 30 may transmit the second negotiation response to the first electronic device 10 in response to the negotiation request. The first negotiation response and the second negotiation response may contain information on the electronic device that performs the distance measurement, respectively. The negotiation between the first electronic device 10 and the second electronic device 20, as well as the negotiation between the first electronic device 10 and the third electronic device 30 may be made in a similar manner as the procedure described in FIG. 2.

In operation 4107, the first electronic device 10 may transmit, to the second electronic device 20, the first connection request to establish a connection with the second electronic device 20. In response thereto, the second electronic device 20 may receive the first connection request from the first electronic device 10. According to this, the connection between the first electronic device 10 and the second electronic device 20 may be established. Similarly, in operation 4109, the first electronic device 10 may transmit, to the third electronic device 30, the second connection request to establish a connection with the third electronic device 30. In response thereto, the third electronic device 30 may receive the second connection request from the first electronic device 10. According to this, the connection between the first electronic device 10 and the third electronic device 30 may be established.

According to various embodiments of the present disclosure, the first electronic device 10 and the second electronic device 20, as well as the first electronic device 10 and the third electronic device 30, may be connected using BT, respectively. The second electronic device 20, which has received the first connection request, may activate the second speaker that is included in the second electronic device 20. The third electronic device 30, which has received the second connection request, may activate the third speaker that is included in the third electronic device 30.

In operation 4111, the first electronic device 10 may negotiate with the second electronic device 20 through the first message. The first message may be intended to control the transmission of the second sound wave of the second electronic device 20. The first message may be transmitted in the form of an LL data signal. The first message may contain the second value ($\Delta t_{p1}$). The second value ($\Delta t_{p1}$) may correspond to the difference between the timing of when the second electronic device 20 receives the first sound wave that is output from the first electronic device 10 and the timing of when the second electronic device 20 outputs the second sound wave. Similarly, in operation 4113, the first electronic device 10 may negotiate with the third electronic device 30 through the second message. The second message may be intended to provide the elements that are necessary for determining the distance to the second electronic device 20. The second message may be transmitted in the form of an LL data signal. The second message may contain the third value ($\Delta t_{p2}$). The third value ($\Delta t_{p2}$) may correspond to the difference between the timing of when the third electronic device 30 receives the first sound wave that is output from the first electronic device 10 and the timing of when the third electronic device 30 outputs the third sound wave.

The detailed operation of the negotiation between the first electronic device 10 and the second electronic device 20, and between the first electronic device 10 and the third electronic device 30, has been described in FIG. 4A. Although FIG. 41A shows that operations 4111 to 4113 are performed after the connection is established, the embodiment is not limited to such sequence. For example, the operation in which the first electronic device 10 shares the second value, or the third value, with the second electronic device 20 or the third electronic device 30, respectively, may be performed before the establishment of the connection. As another example, the second value or the third value may be a determined value. Therefore, according to various embodiments of the present disclosure, the first electronic device 10 may not need operation 4111 or 4113.

In operation 4115, the first electronic device 10 may transmit the first wireless signal to the second electronic device 20. According to various embodiments of the present disclosure, the first wireless signal may be transmitted in the form of an LL data signal. The first wireless signal may be used as a reference signal to measure the distance between the first electronic device 10 and the second electronic device 20. The first wireless signal may be used for a function to activate the second microphone or the second speaker, which is included in the second electronic device 20. The first wireless signal may be referred to as a distance measurement indicator.

In operation 4117, the first electronic device 10 may transmit the second wireless signal to the third electronic device 30. According to various embodiments of the present disclosure, the second wireless signal may be transmitted in the form of an LL data signal, and the second wireless signal may be used as a reference signal to measure the distance between the first electronic device 10 and the third electronic device 30. The second wireless signal may be used for a function to activate the third microphone or the third speaker, which is included in the third electronic device 30.

The second wireless signal may be referred to as a distance measurement indicator as well.

In operation 4119, the first electronic device 10 may transmit the first sound wave. The first electronic device 10 may transmit the first sound wave at the timing $R_{mc0}$. The first electronic device 10 may record the value $R_{mc0}$.

In operation 4121, the second electronic device 20 may output the second sound wave when the time corresponding to the second value ($\Delta t_{p1}$) has elapsed since the reception timing of the first sound wave. The second electronic device 20 may transmit the second sound wave to the first electronic device 10. In operation 4123, the third electronic device 30 outputs the third sound wave when the time corresponding to the third value ($\Delta t_{p2}$) has elapsed since the reception timing of the first sound wave. The third electronic device 30 may transmit the third sound wave to the first electronic device 10.

The second sound wave and the third sound wave may be transmitted at the same time or at a short interval of time. In this case, the third sound wave may interfere with the second sound wave when the first electronic device 10 receives the second sound wave. The second sound wave may interfere with the third sound wave when the first electronic device 10 receives the third sound wave. Various methods may be provided in order to address this issue. For example, the second sound wave and the third sound wave may be configured to be signals that have different sequence. The second sound wave and the third sound wave may maintain the orthogonality through the different sequences. As a result, the issue in which the second sound wave and the third sound wave interfere with each other may be overcome. As another example, the third sound wave may be transmitted at a sufficient time interval after transmitting the second sound wave in order to thereby address the issue.

The first electronic device 10 may receive the second sound wave at the timing $R_{mc1}$, and may receive the third sound wave at the timing $R_{mc2}$. The first electronic device 10 may record the timing $R_{mc1}$ and the timing $R_{mc0}$. In addition, since the first electronic device 10 shares the second value ($\Delta t_{p1}$) with the second electronic device 20, the first electronic device 10 may determine the distance to the second electronic device 20. The second value ($\Delta t_{p1}$) may be a positive value. The first electronic device 10 may determine the value ($R_{mc1}-R_{mc0}-\Delta t_{p1}$)/2, and may determine the distance $D_{p1}$ between the first electronic device 10 and the second electronic device 20 by multiplying the value ($R_{mc1}-R_{mc0}-\Delta t_{p1}$)/2 and the transmission speed (340 m/s) of a sound wave. The details of the distance determining operation of the first electronic device 10 are the same as the description in FIG. 4A.

The first electronic device 10 may record the timing $R_{mc2}$ and the timing $R_{mc0}$. In addition, since the first electronic device 10 shares the third value ($\Delta t_{p2}$) with the third electronic device 30, the first electronic device 10 may determine the distance to the third electronic device 30. The third value ($\Delta t_{p2}$) may be a positive value. The first electronic device 10 may determine the value ($R_{mc2}-R_{mc0}-\Delta t_{p2}$)/2, and may determine the distance $D_{p2}$ between the first electronic device 10 and the third electronic device 30 by multiplying the value ($R_{mc2}-R_{mc0}-\Delta t_{p2}$)/2 and the transmission speed (340 m/s) of a sound wave. The details of the distance determining operation of the first electronic device 10 are the same as the description in FIG. 4A.

In operation 4125, the first electronic device 10 may transmit the first connection termination signal to the second electronic device 20. In operation 4127, the first electronic device 10 may transmit the second connection termination signal to the third electronic device 30.

Figure 41B:
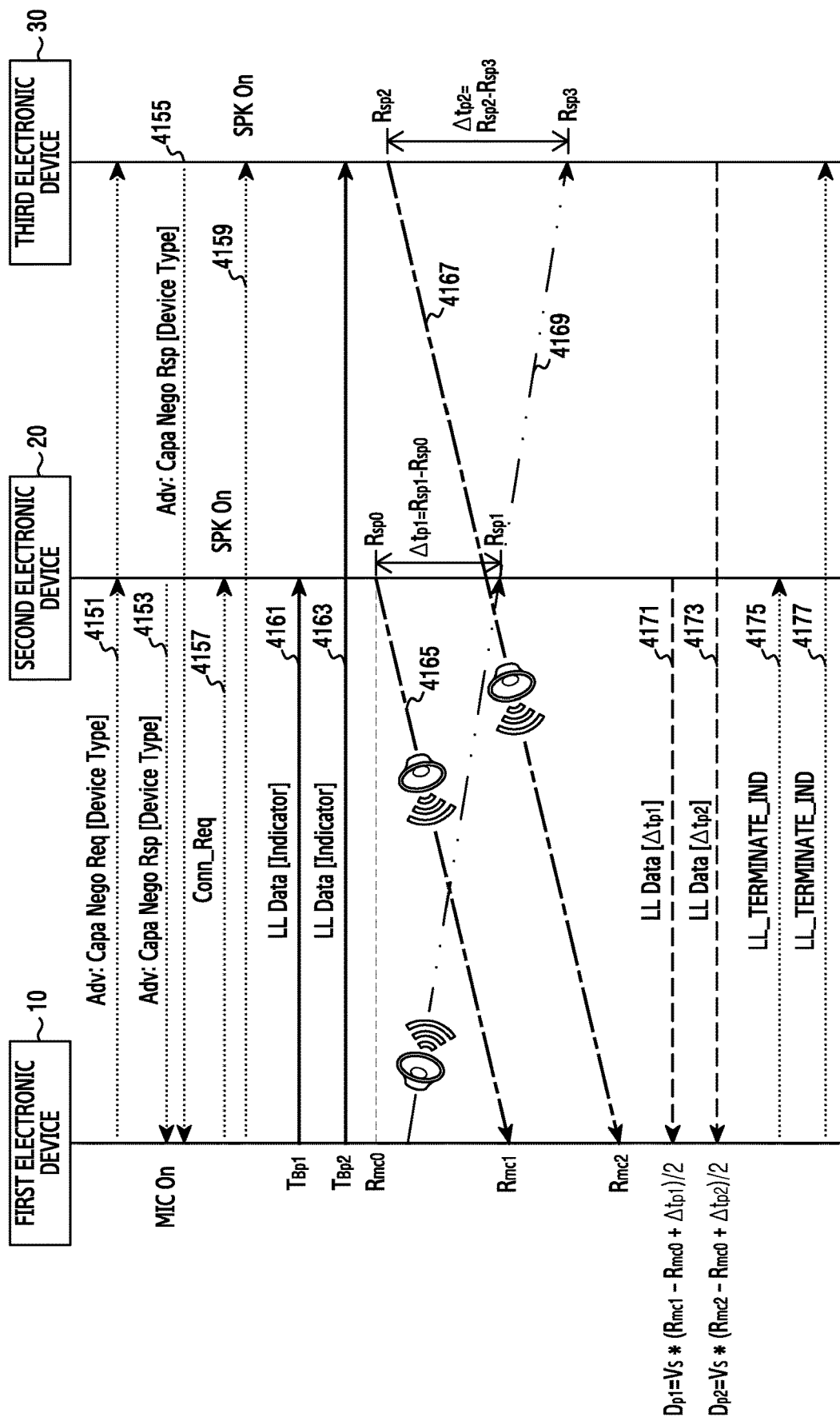
FIG. 41B illustrates a processing flow of an LL data-based distance measuring method by using feedback according to various embodiments of the present disclosure.

FIG. 41B illustrates a processing flow of an LL data-based distance measuring method by using feedback according to various embodiments of the present disclosure.

Referring to FIG. 41B, the first electronic device 10 may perform the distance measurement between the first electronic device 10 and a plurality of electronic devices. The first electronic device 10 may include the first microphone and the first speaker.

Some of the operations of FIG. 41B may be performed in the same manner as some of the operations of FIG. 41A. FIG. 41B is different from FIG. 41A in the sequence in which the first electronic device 10 shares the second value with the second electronic device 20 and the sequence in which the first electronic device 10 shares the third value with the third electronic device 30.

In operation 4151, the first electronic device 10 may transmit a negotiation request for measuring the distance to a certain electronic device. The operation 4151 may be performed in the same manner as operation 4101 of FIG. 41A.

In operation 4153, the second electronic device 20 may transmit the first negotiation response to the first electronic device 10 in response to the negotiation request. In operation 4155, the third electronic device 30 may transmit the second negotiation response to the first electronic device 10 in response to the negotiation request. The first negotiation response and the second negotiation response may contain information on the electronic device that performs the distance measurement, respectively. Operations 4153 and 4155 may be performed in the same manner as operations 4103 and 4105 of FIG. 41A.

In operation 4157, the first electronic device 10 may transmit, to the second electronic device 20, the first connection request to establish a connection with the second electronic device 20. In operation 4159, the first electronic device 10 may transmit, to the third electronic device 30, the second connection request to establish a connection with the third electronic device 30. Operations 4157 and 4159 may be performed in the same manner as operations 4107 and 4109 of FIG. 41A.

In operation 4161, the first electronic device 10 may transmit the first wireless signal to the second electronic device 20. Similarly, in operation 4163, the first electronic device 10 may transmit the second wireless signal to the third electronic device 30. Operations 4161 and 4163 may be performed in the same manner as operations 4115 and 4117 of FIG. 41A.

In operation 4165, the second electronic device 20 may transmit the second sound wave to the first electronic device 10 at the timing $R_{sp0}$. In operation 4167, the third electronic device 30 may transmit the third sound wave to the first electronic device 10 at the timing $R_{sp2}$. In operation 4169, the first electronic device 10 may transmit the first sound wave at the timing $R_{mc0}$. The first electronic device 10 may receive the second sound wave at the timing $R_{mc1}$, and may receive the third sound wave at the timing $R_{mc2}$. The second electronic device 20 may receive the first sound wave at the timing $R_{sp1}$, and the third electronic device 30 may receive the first sound wave at the timing $R_{sp3}$.

Since the second electronic device 20 may measure the value $R_{sp0}$ and the value $R_{sp1}$, respectively, the second electronic device 20 may determine the value $\Delta t_{p1}$ corresponding to the difference between the value $R_{sp1}$ and the value $R_{sp0}$. The value $\Delta t_{p1}$ may be determined by subtracting the value $R_{sp0}$ from the value $R_{sp1}$. If the second electronic device 20 transmits the second sound wave prior to the timing of receiving the first sound wave, the value $\Delta t_{p1}$ may be a positive value. On the contrary, if the second electronic device 20 transmits the second sound wave after the timing of receiving the first sound wave, the value $\Delta t_{p1}$ may be a negative value.

In operation 4171, the second electronic device 20 may transmit, to the first electronic device 10, the first message that contains the value $\Delta t_{p1}$. The first message may provide the elements that are necessary for the first electronic device 10 to determine the distance with respect to the second electronic device 20. Since the third electronic device may measure the value $R_{sp2}$ and the value $R_{sp3}$, respectively, the third electronic device may determine the value $\Delta t_{p2}$ corresponding to the difference between the value $R_{sp3}$ and the value $R_{sp2}$. In operation 4173, the third electronic device 30 may transmit, to the first electronic device 10, the second message that contains the value $\Delta t_{p2}$. The second message may provide the elements that are necessary for the first electronic device 10 to determine the distance with respect to the third electronic device 30. The first message and the second message may be transmitted in the form of an LL data.

The first electronic device 10, which has received the first message, may determine the value $(R_{mc1}-R_{mc0}+\Delta t_{p1})/2$, and may determine the distance $D_{p1}$ between the first electronic device 10 and the second electronic device 20 by multiplying the value $(R_{mc1}-R_{mc0}+\Delta t_{p1})/2$ and the transmission speed (340 m/s) of a sound wave. The first electronic device 10, which has received the second message, may determine the value $(R_{mc2}-R_{mc0}+\Delta t_{p2})/2$, and may determine the distance $D_{p2}$ between the first electronic device 10 and the third electronic device 30 by multiplying the value $(R_{mc2}-R_{mc0}+\Delta t_{p2})/2$ and the transmission speed (340 m/s) of a sound wave. The details of the distance determining operation of the first electronic device 10 are the same as the description in FIG. 4B.

In operation 4175, the first electronic device 10 may transmit the first connection termination signal to the second electronic device 20. In operation 4177, the first electronic device 10 may transmit the second connection termination signal to the third electronic device 30. Operations 4175 and 4177 may be performed in the same manner as operations 4125 and 4127 of FIG. 41A.

Referring to FIGS. 41A and 41B, although the description has been made of the operation in which the first electronic device 10 determines the distance only to the second electronic device 20 and only to the third electronic device 30, this is only an example. The first electronic device 10 may perform the distance measurement with respect to a plurality of electronic devices near the first electronic device 10, as well as the second electronic device 20 and the third electronic device 30.

Figure 42A:
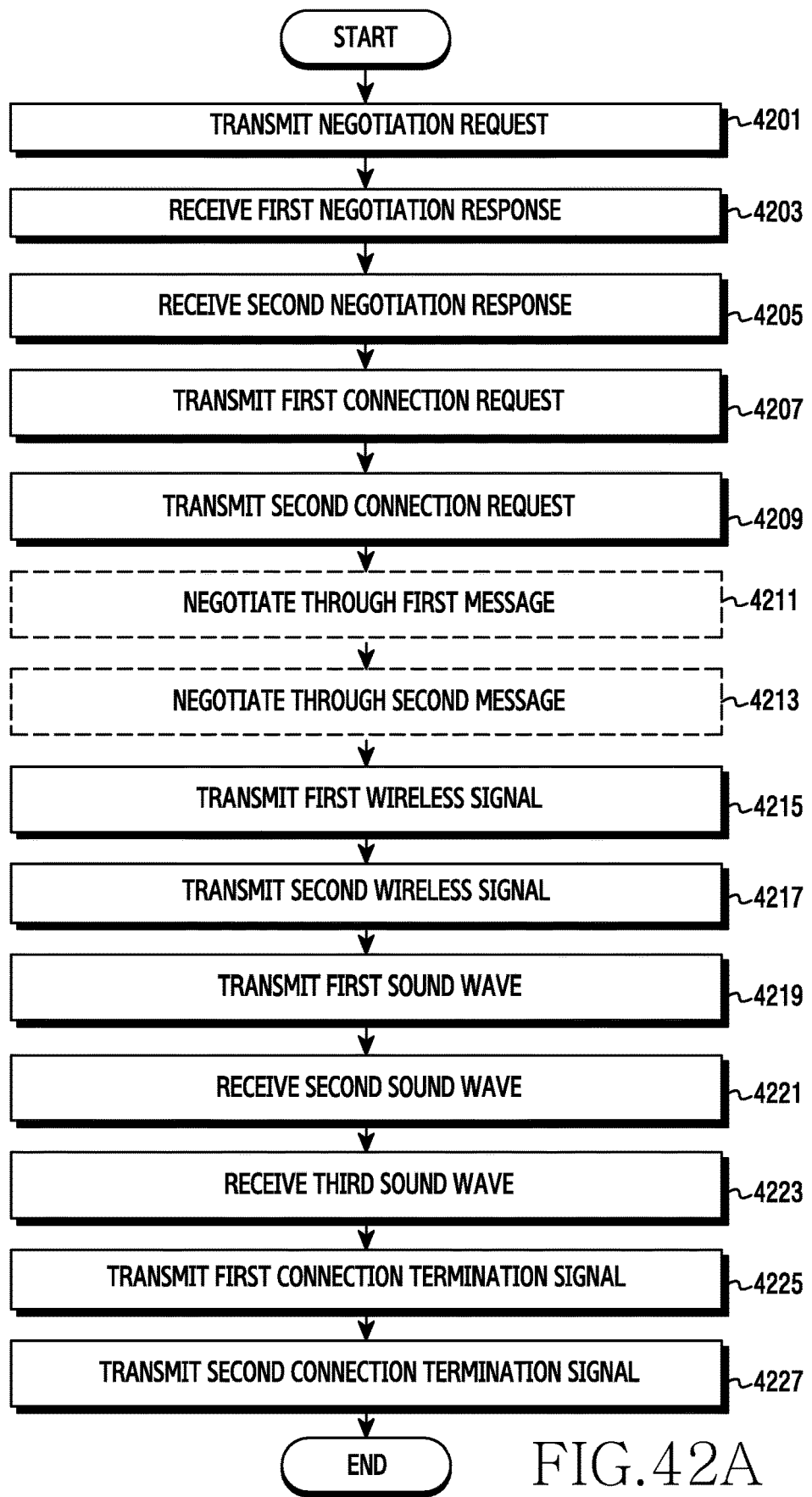
FIG. 42A is a flowchart illustrating an LL data-based distance-measuring operation of a first electronic device according to various embodiments of the present disclosure.

FIG. 42A is a flowchart illustrating an LL data-based distance-measuring operation in a first electronic device according to various embodiments of the present disclosure. The first electronic device may be the first electronic device 10 in FIG. 41A. Unlike FIG. 42B described below, in FIG. 42A, the first electronic device 10 may perform the distance measurement with respect to a plurality of electronic devices near the first electronic device 10 without using feedback.

Referring to FIG. 42A, in operation 4201, the first electronic device 10 may transmit a negotiation request. The negotiation request may be broadcast in the form of an advertising packet. A certain electronic device near the first electronic device 10 may receive the negotiation request. The negotiation request may be received by a plurality of electronic devices. The negotiation request may contain information on the electronic device that performs the distance measurement.

In operation 4203, the first electronic device 10 may receive the first negotiation response from the second electronic device 20. In operation 4205, the first may receive the second negotiation response from the third electronic device 30. The first negotiation response and the second negotiation response may contain information on the electronic device that performs the distance measurement, respectively.

The first electronic device 10 may transmit the first connection request to the second electronic device 20 in operation 4207, and may transmit the second connection request to the third electronic device 30 in operation 4209. According to this, the connection between the first electronic device 10 and the second electronic device 20 may be established, and the connection between the first electronic device 10 and the third electronic device 30 may be established. The connection may be made using BT.

In operation 4211, the first electronic device 10 may negotiate with the second electronic device 20 for the second value through the first message. The first message may contain the second value $\Delta t_{p1}$. The second value $\Delta t_{p1}$ may correspond to the difference between the timing $R_{sp1}$ of when the second electronic device 20 receives the first sound wave that is output from the first electronic device 10 and the timing $R_{sp0}$ of when the second electronic device 20 outputs the second sound wave.

In operation 4213, the first electronic device 10 may negotiate with the third electronic device 30 for the third value through the second message. The second message may contain the third value $\Delta t_{p2}$. The third value $\Delta t_{p2}$ may correspond to the difference between the timing $R_{sp3}$ of when the third electronic device 30 receives the first sound wave that is output from the first electronic device 10 and the timing $R_{sp2}$ of when the third electronic device 30 outputs the third sound wave.

In various embodiments of the present disclosure, the first electronic device 10 may determine the distance to each of the devices without receiving feedback from the second electronic device 20 or the third electronic device 30. Other operations may be necessary instead of not using feedback. The detailed description has been made in FIG. 4A. Although FIG. 42A shows the operation in which the message including the second value or the third value is transmitted and received after the connection is established, this operation may not be necessary in other embodiments. For example, the first electronic device 10 and the second electronic device 20 may share a certain value with each other. For example, the first electronic device 10 and the second electronic device 20 may share a certain value for the second value with each other before the establishment of the connection. The certain value may be determined in various ways. For example, the first electronic device 10 may determine the second value when executing an application of FIG. 47 that will be described below. The application may determine the second value according to a specified rule. The specified rule may contain the characteristics of the first electronic device 10 or the characteristics of the second electronic device 20. The specified rule may be determined by the negotiation operation and the signalling operation described in FIGS. 1A and 1B. As another example, the first electronic device 10 may determine the second value depending on the current temperature. The first electronic device 10 may measure the distance by using sound waves. Generally, the sound wave may be transmitted through the air as a medium. Since the transmission speed of a sound wave is dependent on the temperature, the first electronic device 10 may determine the second value to be an appropriate value according to the current temperature. As another example, the first electronic device 10 may determine the second value according to the current location. When the sound wave encounters an obstacle when travelling, it can go around the obstacle due to the nature of diffraction. Since the wavelength of a sound wave is relatively long, the degree of diffraction is greater than the other type of wave. Since the diffraction effect of the sound wave changes the travel path of the sound wave, a measurement error may occur. Considering such an error, the first electronic device 10 may determine the second value to be an appropriate value according to the current position.

In operation 4215, the first electronic device 10 may transmit the first wireless signal to the second electronic device 20. According to various embodiments of the present disclosure, the first wireless signal may be transmitted in the form of an LL data signal. The first wireless signal may serve as a reference signal to measure the distance between the first electronic device 10 and the second electronic device 20. The first wireless signal may perform a function to activate the second microphone or the second speaker, which is included in the second electronic device 20. The first wireless signal may be referred to as a distance measurement indicator as well.

In operation 4217, the first electronic device 10 may transmit the second wireless signal to the third electronic device 30. According to various embodiments of the present disclosure, the second wireless signal may be transmitted in the form of an LL data signal, and the second wireless signal may serve as a reference signal to measure the distance between the first electronic device 10 and the third electronic device 30. In addition, the second wireless signal may perform a function to activate the third microphone or the third speaker, which is included in the third electronic device 30. The second wireless signal may be referred to as a distance measurement indicator as well.

In operation 4219, the first electronic device 10 transmits the first sound wave. In this case, the first electronic device 10 may transmit the first sound wave at the timing $R_{mc0}$.

In operation 4221, the first electronic device 10 may receive the second sound wave from the second electronic device 20. In this case, the first electronic device 10 may receive the second sound wave at the timing $R_{mc1}$.

In operation 4223, the first electronic device 10 may receive the third sound wave from the third electronic device 30. In this case, the first electronic device 10 may receive the third sound wave at the timing $R_{mc2}$.

The first electronic device 10 may determine the value $(R_{mc1}-R_{mc0}-\Delta t_{p1})/2$, and may determine the distance $D_{p1}$ between the first electronic device 10 and the second electronic device 20 by multiplying the value $(R_{mc1}-R_{mc0}-\Delta t_{p1})/2$ and the transmission speed (340 m/s) of a sound wave. In addition, the first electronic device 10 may determine the value $(R_{mc2}-R_{mc0}-\Delta t_{p2})/2$, and may determine the distance $D_{p2}$ between the first electronic device 10 and the third electronic device 30 by multiplying the value $(R_{mc2}-R_{mc0}-\Delta t_{p2})/2$ and the transmission speed (340 m/s) of a sound wave.

Afterwards, the first electronic device 10 may transmit the first connection termination signal to the second electronic device 20 in operation 4225, and may transmit the second connection termination signal to the third electronic device 30 in operation 4227.

Figure 42B:
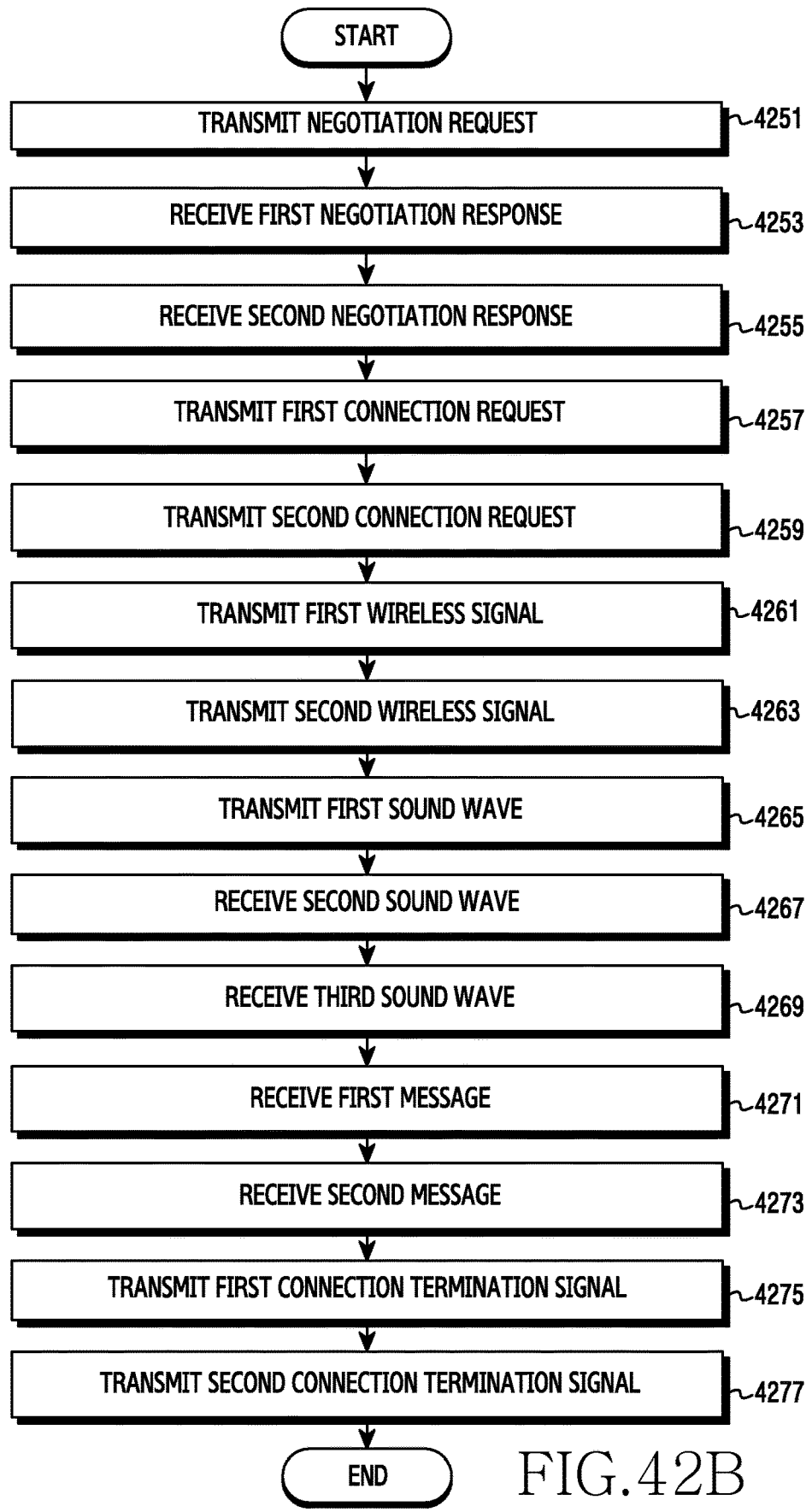
FIG. 42B is a flowchart illustrating an LL data-based distance-measuring operation of a first electronic device by using feedback according to various embodiments of the present disclosure.

FIG. 42B is a flowchart illustrating an LL data-based distance-measuring operation by using feedback in a first electronic device according to various embodiments of the present disclosure. The first electronic device may be the first electronic device 10 of FIG. 41B.

Some of the operations in FIG. 42B may be performed in the same manner as the operations of FIG. 42A. Operations 4251, 4253, 4255, 4257, 4259, 4261, 4263, 4265, 4267, and 4269 are performed in the same manner as operations 4201, 4203, 4205, 4207, 4209, 4215, 4217, 4219, 4221, and 4223 of FIG. 42A, respectively.

Referring to FIG. 42B, in operation 4271, the first electronic device 10 may receive the first message from the second electronic device 20. In this case, the first message may contain the value $\Delta t_{p1}$, which corresponds to the difference between the timing $R_{sp1}$ of when the second electronic device 20 receives the first sound and the timing $R_{sp0}$ of when the second electronic device 20 transmits the second sound wave. It has been described above that the value $\Delta t_{p1}$ may be a positive value in the case where the second electronic device 20 receives the first sound wave after transmitting the second sound wave.

In operation 4273, the first electronic device 10 may receive the second message from the third electronic device 30. In this case, the second message may contain the value $\Delta t_{p2}$, which corresponds to the difference between the timing $R_{sp3}$ of when the third electronic device 30 receives the first sound wave and the timing $R_{sp2}$ of when the third electronic device 30 transmits the third sound wave.

In this case, the first electronic device 10, which has received the first message, may determine the value $(R_{mc1}-R_{mc0}+\Delta t_{p1})/2$, and may determine the distance $D_{p1}$ between the first electronic device 10 and the second electronic device 20 by multiplying the value $(R_{mc1}-R_{mc0}+\Delta t_{p1})/2$ and the transmission speed (340 m/s) of a sound wave. In addition, the first electronic device 10, which has received the second message, may determine the value $(R_{mc2}-R_{mc0}+\Delta t_{p2})/2$, and may determine the distance $D_{p2}$ between the first electronic device 10 and the third electronic device 30 by multiplying the value $(R_{mc2}-R_{mc0}+\Delta t_{p2})/2$ and the transmission speed (340 m/s) of a sound wave.

Afterwards, the first electronic device 10 may transmit the first connection termination signal to the second electronic device 20 in operation 4275, and may transmit the second connection termination signal to the third electronic device 30 in operation 4277.

Figure 43A:
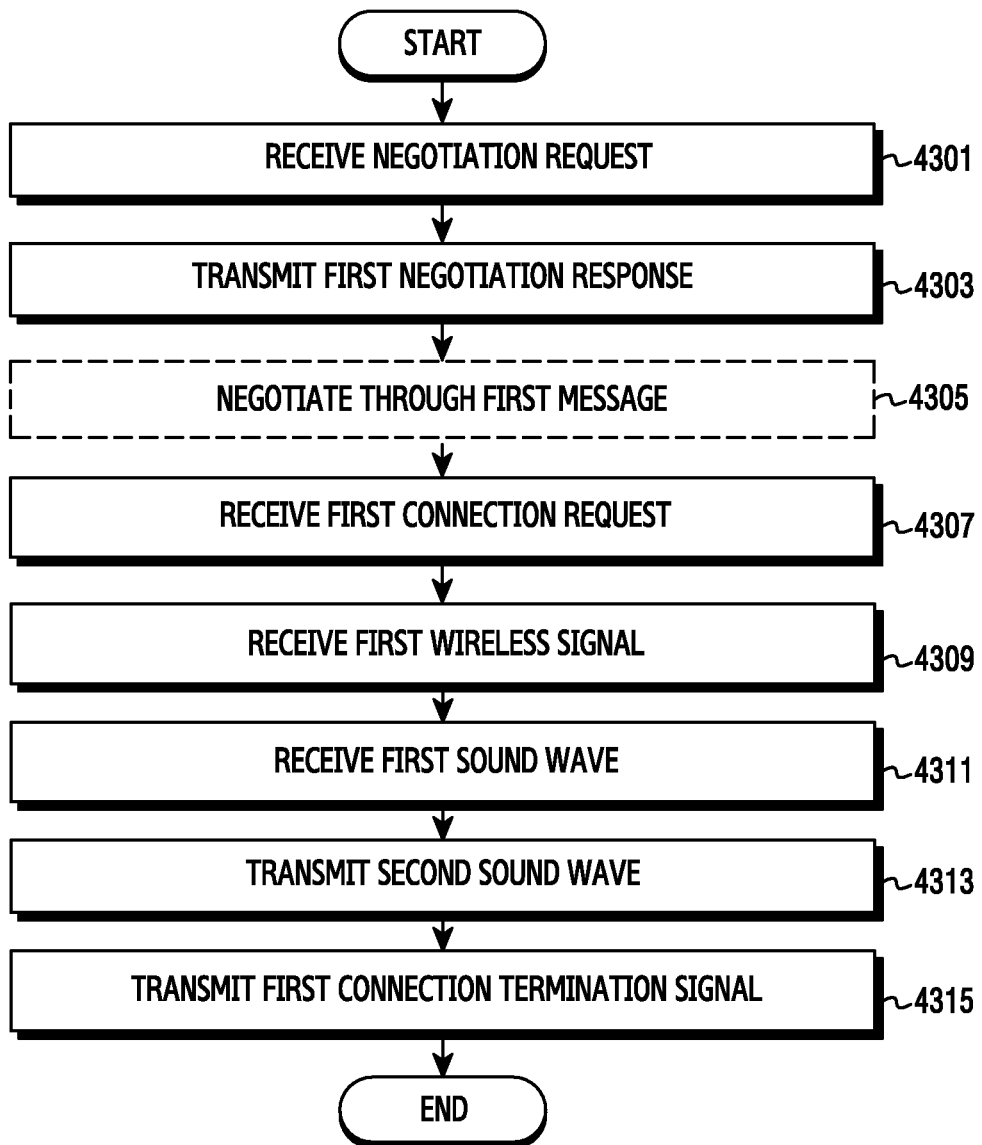
FIG. 43A is a flowchart illustrating an LL data-based distance-measuring operation of a second electronic device according to various embodiments of the present disclosure.

FIG. 43A is a flowchart illustrating an LL data-based distance-measuring operation of a second electronic device according to various embodiments of the present disclosure. The second electronic device may be the second electronic device 20 of FIG. 41A. Unlike FIG. 43B described below, in FIG. 43A, the first electronic device 10 may perform the distance measurement with respect to a plurality of electronic devices near the first electronic device 10 without using feedback.

Referring to FIG. 43A, in operation 4301, the second electronic device 20 may receive a negotiation request from the first electronic device 10. The negotiation request may be broadcast in the form of an advertising packet, and the negotiation request may contain information on the electronic device that performs the distance measurement.

In operation 4303, the second electronic device 20 may transmit the first negotiation response to the first electronic device 10. Here, the first negotiation response may contain information on the electronic device that performs the distance measurement.

In operation 4305, the second electronic device 20 may negotiate with the first electronic device 10 for the second value through the first message. The first message may contain the second value $\Delta t_{p1}$. The second value $\Delta t_{p1}$ may correspond to the difference between the timing $R_{sp1}$ of when the second electronic device 20 receives the first sound wave that is output from the first electronic device 10 and the timing $R_{sp0}$ of when the second electronic device 20 outputs the second sound wave. According to the operation above, the second electronic device 20 may share the second value with the first electronic device 10.

In operation 4307, the second electronic device 20 may receive the first connection request from the first electronic device 10. According to this, the connection between the first electronic device 10 and the second electronic device 20 may be established. The connection may be made using BT.

In operation 4309, the second electronic device 20 may receive the first wireless signal from the first electronic device 10. According to various embodiments of the present disclosure, the first wireless signal may be transmitted in the form of an LL data signal. The first wireless signal may serve as a reference signal to measure the distance between the first electronic device 10 and the second electronic device 20, or may perform a function to activate the second microphone or the second speaker, which is included in the second electronic device 20. The first wireless signal may be referred to as a distance measurement indicator as well.

In operation 4311, the second electronic device 20 may receive the first sound wave from the first electronic device 10. In this case, the second electronic device 20 may receive the first sound wave at the timing $R_{sp1}$.

In operation 4313, the second electronic device 20 may transmit the second sound wave. The second electronic device 20 may transmit the second sound wave when the time corresponding to the second value $\Delta t_{p1}$ has elapsed since the transmission timing of the first sound wave. The first electronic device 10 may recognize the second value in advance. The second electronic device 20 may transmit the second sound wave to the first electronic device 10 at the timing $R_{sp0}$. The value $R_{sp0}$ is obtained by adding the second value $\Delta t_{p1}$ to the value $R_{sp1}$.

In operation 4315, the second electronic device 20 may receive the first connection termination signal from the first electronic device 10.

Although it is not shown in FIG. 43A, the second electronic device 20 may receive the measurement result from the first electronic device 10 afterwards. For example, the measurement result may be the distance between the first electronic device 10 and the second electronic device 20, which has been calculated by the first electronic device 10. As another example, the measurement result may be a value that corresponds to the difference between the timing of when the first electronic device 10 outputs the first sound wave and the timing of when the first electronic device 10 receives the second sound wave.

Figure 43B:
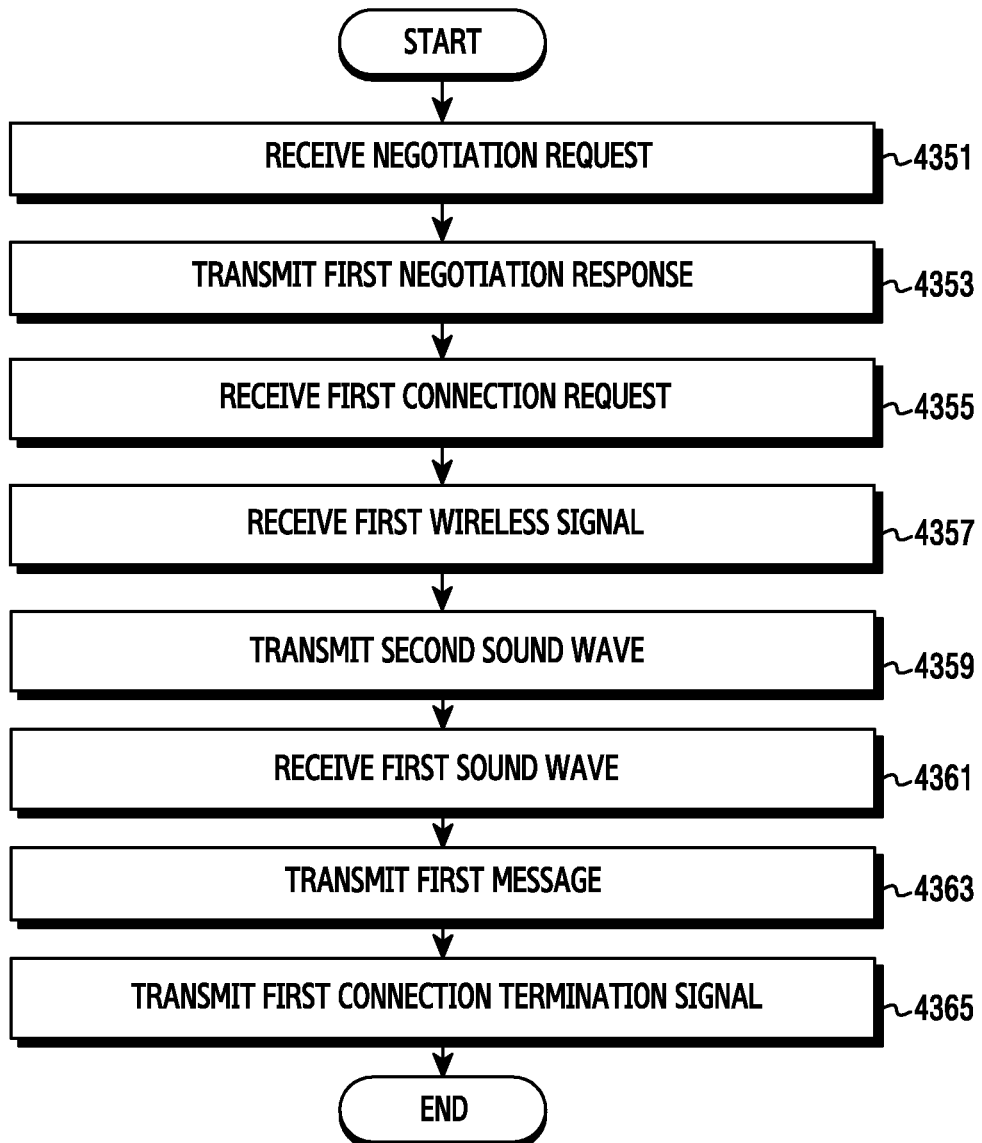
FIG. 43B is a flowchart illustrating an LL data-based distance-measuring operation of a second electronic device by using feedback according to various embodiments of the present disclosure.

FIG. 43B is a flowchart illustrating an LL data-based distance-measuring operation by using feedback in a second electronic device according to various embodiments of the present disclosure. The second electronic device may be the second electronic device 20 of FIG. 41B.

Some of the operations in FIG. 43B may be performed in the same manner as the operations of FIG. 43a. Operations 4351, 4353, 4355, and 4357 are performed in the same manner as operations 4301, 4303, 4307, and 4309, respectively.

Referring to FIG. 43B, in operation 4359, the second electronic device 20 may transmit the second sound wave. In this case, the second electronic device 20 may transmit the second sound wave to the first electronic device 10 at the timing $R_{sp0}$.

In operation 4361, the second electronic device 20 may receive the first sound wave from the first electronic device 10. In this case, the second electronic device 20 may receive the first sound wave at the timing $R_{sp1}$.

In operation 4363, the second electronic device 20 may transmit the first message to the first electronic device 10. In this case, the first message may contain the value $\Delta t_{p1}$ that corresponds to the difference between the timing $R_{sp1}$ of when the second electronic device 20 receives the first sound and the timing $R_{sp0}$ of when the second electronic device 20 transmits the second sound wave.

In operation 4365, the second electronic device 20 may receive the first connection termination signal from the first electronic device 10.

Although only the operation of the second electronic device 20 has been limitedly described in FIGS. 43A and 43B, the embodiment is not limited thereto, and the third electronic device 30 may operate in a similar manner.

Figure 44A:
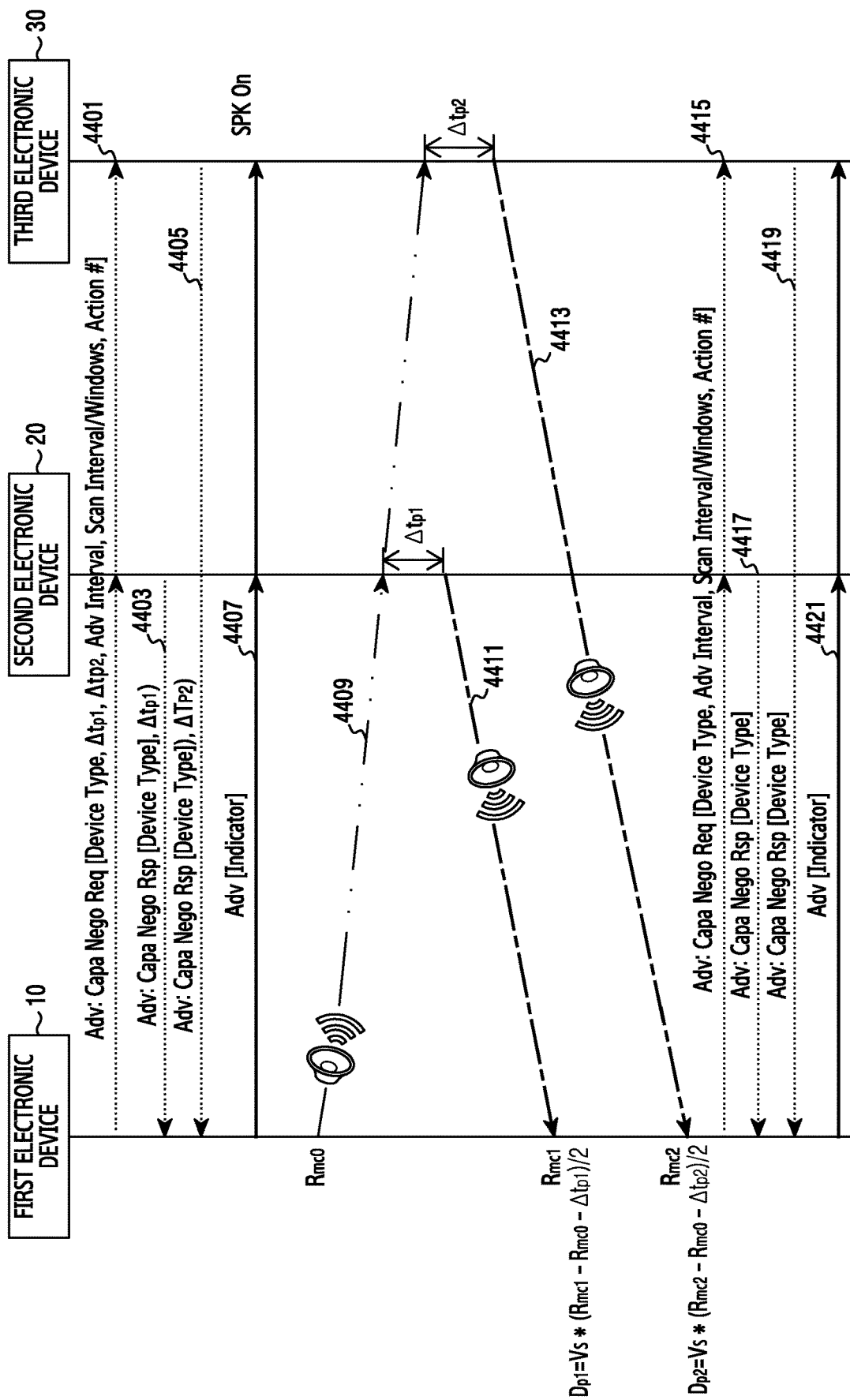
FIG. 44A illustrates a processing flow of a negotiation message-based distance measuring method according to various embodiments of the present disclosure.

FIG. 44A illustrates a processing flow of a negotiation message-based distance measuring method according to various embodiments of the present disclosure.

Referring to FIG. 44A, the first electronic device 10 may perform the distance measurement with respect to a plurality of electronic devices near the first electronic device 10, and the first electronic device 10 may include the first microphone and the first speaker. Unlike FIG. 44B described below, in FIG. 44A, the first electronic device 10 may perform the distance measurement with respect to a plurality of electronic devices near the first electronic device 10 without using feedback.

In operation 4401, the first electronic device 10 may transmit the first negotiation request for measuring the distance to a certain electronic device. The first negotiation request may be broadcast in the form of an advertising packet, and certain electronic devices near the first electronic device 10 may receive the first negotiation request. The first negotiation request may be received by a plurality of electronic devices, and the first negotiation request may be referred to as the first advertising message.

The first negotiation request may contain a plurality of pieces of information. For example, the first negotiation request may contain information on the type of electronic device that performs the distance measurement, information on the second value ($\Delta t_{p1}$), information on the third value ($\Delta t_{p2}$), information on a transmission interval of the advertising messages, information on a detection interval of the device that receives the advertising messages, or on a detection window thereof, and information on the action number. The second value ($\Delta t_{p1}$) may correspond to the difference between the timing of when the second electronic device 20 receives the first sound wave that is output from the first electronic device 10 and the timing of when the second electronic device 20 outputs the second sound wave. The third value ($\Delta t_{p2}$) may correspond to the difference between the timing of when the third electronic device 30 receives the first sound wave that is output from the first electronic device 10 and the timing of when the third electronic device 30 outputs the third sound wave. Since the first electronic device 10 does not use feedback, the first electronic device 10 may transmit the second value and the third value to the second electronic device 20 and the third electronic device 30, respectively, in advance. Here, the action number is the information that indicates the advertising message number through which the wireless signal for the distance measurement (i.e., the distance measurement indicator) is transmitted. The action number may be configured to be '2,' and, in this case, the wireless signal for the distance measurement may be transmitted through the second advertising message that is transmitted by the first electronic device 10.

The second electronic device 20 may receive the first negotiation request. In operation 4403, the second electronic device 20 may transmit the first negotiation response to the first electronic device 10 in response to the first negotiation request. In addition, the third electronic device 30 may receive the first negotiation request. In operation 4405, the third electronic device 30 may transmit the second negotiation response to the first electronic device 10 in response to the first negotiation request. In various embodiments of the present disclosure, the first negotiation response by the second electronic device 20 and the second negotiation response by the third electronic device 30 may contain information on the electronic device that performs the distance measurement, respectively. In various embodiments of the present disclosure, the first negotiation response by the second electronic device 20 and the second negotiation response by the third electronic device 30 may further contain the second value and the third value, respectively.

The operation in which the first electronic device 10 shares the second value and the third value with other electronic devices does not need to be duplicated. Therefore, in the case where the first electronic device 10 transmits the second value and the third value in operation 4401, the negotiation response may not contain the second value or the third value in operation 4403 or in operation 4405. On the contrary, in the case where the second electronic device 20 transmits the second value, the negotiation request may not contain the second value in operation 4401.

In operation 4407, the first electronic device 10 may transmit the first wireless signal. According to the embodiment of the present disclosure, the first wireless signal may be broadcast in the form of a BLE advertising packet. The first wireless signal may serve as a reference signal for measuring the distance between the first electronic device 10 and nearby electronic devices, a signal for activating the second microphone or the second speaker included in the second electronic device 20, or a signal for activating the third microphone or the third speaker included in the third electronic device 30. The first wireless signal may be referred to as the second advertising message or a distance measurement indicator.

In operation 4409, the first electronic device 10 may transmit the first sound wave at the timing $R_{mc0}$. The second electronic device 20 may receive the first sound wave at the timing $R_{Sp1}$, and the third electronic device 30 may receive the first sound wave at the timing $R_{Sp3}$.

In operation 4411, the second electronic device 20 may transmit the second sound wave at the timing $R_{mc1}$. The second electronic device 20 may transmit the second sound wave after the time corresponding to the second value ($\Delta t_{p1}$) has elapsed since the reception of the first sound wave. In operation 4413, the third electronic device 30 may transmit the third sound wave. The third electronic device 30 may transmit the third sound wave after the time corresponding to the third value ($\Delta t_{p2}$) has elapsed since the reception of the first sound wave.

The first electronic device 10 may receive the second sound wave at the timing $R_{mc1}$, and may receive the third sound wave at the timing $R_{mc2}$. If the first electronic device 10 receives the second sound wave and the third sound wave at the same time or at a short interval of time, the second sound wave may interfere with the third sound wave, and vice versa. In order to address this issue, the second sound wave and the third sound wave may be configured to be signals that have different sequences, and thus, the second sound wave and the third sound wave may maintain the orthogonality. The issue in which the second sound wave and the third sound wave interfere with each other when the first electronic device 10 receives the same may be addressed. In addition, the first electronic device 10 may receive the third sound wave at a sufficient time interval after receiving the second sound wave in order to thereby address the issue. The first electronic device 10 may implement the solution through the negotiation in the operation in which the first electronic device 10 shares the second value and the third value with the second electronic device 20 and the third electronic device 30, respectively.

The first electronic device 10 may determine the value $(R_{mc1} - R_{mc0} - \Delta t_{p1})/2$. The above-mentioned value may correspond to the RTT value of the sound wave. The first electronic device 10 may determine the distance $D_{p1}$ between the first electronic device 10 and the second electronic device 20 by multiplying the value $(R_{mc1} - R_{mc0} - \Delta t_{p1})/2$ and the transmission speed (340 m/s) of a sound wave. In addition, the first electronic device 10 may determine the value $(R_{mc2} - R_{mc0} - \Delta t_{p2})/2$. The above-mentioned value may correspond to the RTT value of the sound wave. The first electronic device 10 may determine the distance $D_{p2}$ between the first electronic device 10 and the third electronic device 30 by multiplying the value $(R_{mc2} - R_{mc0} - \Delta t_{p2})/2$ and the transmission speed (340 m/s) of a sound wave. The details of the distance determining operation of the first electronic device 10 are the same as the description in FIG. 4A.

In operation 4415, the first electronic device 10 may transmit the second negotiation request. Afterwards, operations 4417 to 4421 may be performed in the same manner as operations 4403, 4405, and 4407 above. The first electronic device 10 may measure the distance to the second electronic device 20 or the distance to the third electronic device 30 again, or may newly measure the distance to another electronic device by repeating operations 4401 to 4413.

Figure 44B:
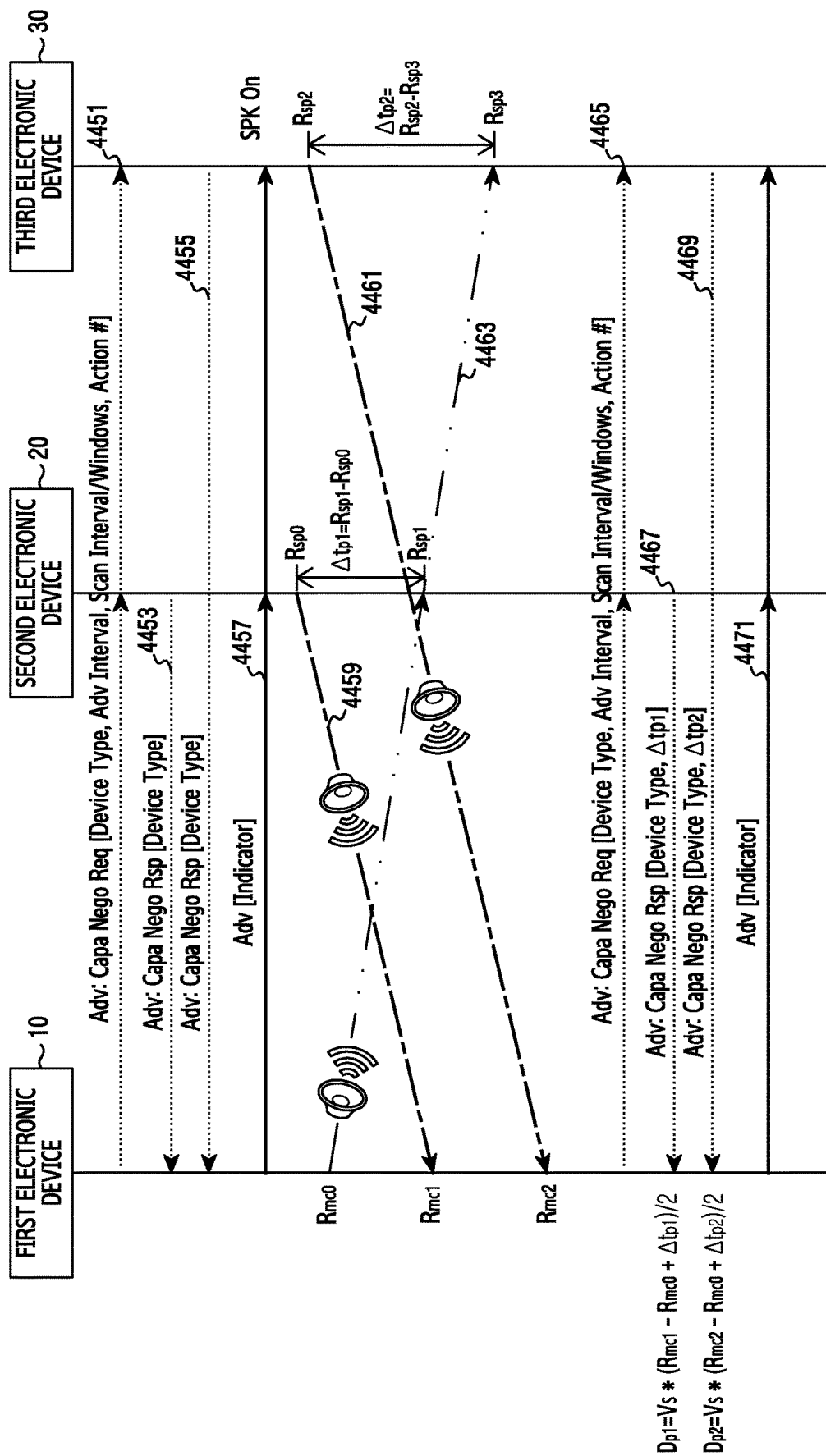
FIG. 44B illustrates a processing flow of a negotiation message-based distance measuring method by using feedback according to various embodiments of the present disclosure.

FIG. 44B illustrates a processing flow of a negotiation message-based distance measuring method by using feedback according to various embodiments of the present disclosure.

Referring to FIG. 44B, the first electronic device 10 may perform the distance measurement with respect to a plurality of electronic devices near the first electronic device 10, and the first electronic device 10 may include the first microphone and the first speaker.

In operation 4451, the first electronic device 10 may transmit the first negotiation request for measuring the distance to a certain electronic device. The first negotiation request may be broadcast in the form of an advertising packet, and certain electronic devices near the first electronic device 10 may receive the first negotiation request. The first negotiation request may be received by a plurality of electronic devices, and the first negotiation request may be referred to as the first advertising message.

The first negotiation request may contain a plurality of pieces of information. For example, the first negotiation request may contain information on the type of electronic device that performs the distance measurement, information on a transmission interval of the advertising messages, information on a detection interval of the device that receives the advertising messages, or on a detection window thereof, and information on the action number.

The second electronic device 20 may receive the first negotiation request. In operation 4453, the second electronic device 20 may transmit the first negotiation response to the first electronic device 10 in response to the first negotiation request. In addition, the third electronic device 30 may receive the first negotiation request. In operation 4455, the third electronic device 30 may transmit the second negotiation response to the first electronic device 10 in response to the first negotiation request. In various embodiments of the present disclosure, the first negotiation response by the second electronic device 20 and the second negotiation response by the third electronic device 30 may contain information on the electronic device that performs the distance measurement, respectively.

In operation 4457, the first electronic device 10 may transmit the first wireless signal. Operation 4457 may be performed in the same manner as operation 4407 of FIG. 44A.

In operation 4459, the second electronic device 20 may transmit the second sound wave to the first electronic device 10 at the timing $R_{sp0}$. In operation 4461, the third electronic device 30 may transmit the third sound wave to the first electronic device 10 at the timing $R_{sp2}$. In operation 4463, the first electronic device 10 may transmit the first sound wave at the timing $R_{mc0}$.

The first electronic device 10 may receive the second sound wave at the timing $R_{mc1}$, and may receive the third sound wave at the timing $R_{mc2}$. The second electronic device 20 may receive the first sound wave at the timing $R_{sp1}$, and the third electronic device 30 may receive the first sound wave at the timing $R_{sp3}$.

In operation 4465, the first electronic device 10 may transmit the second negotiation request, and the second negotiation request may contain information on the type of electronic device that performs the distance measurement, information on a transmission interval of the advertising messages, information on a detection interval of the device that receives the advertising messages, or on a detection window thereof, and information on the action number.

Since the second electronic device 20 is able to measure the value $R_{sp0}$ and the value $R_{sp1}$, respectively, the second electronic device 20 may determine the value $\Delta t_{p1}$ corresponding to the difference between the value $R_{sp1}$ and the value $R_{sp0}$. In operation 4467, the second electronic device 20 may transmit, to the first electronic device 10, the second negotiation response by the second electronic device 20, which includes the value $\Delta t_{p1}$. Since the third electronic device 30 is able to measure the value $R_{sp2}$ and the value $R_{sp3}$, respectively, the third electronic device 30 may determine the value $\Delta t_{p2}$ corresponding to the difference between the value $R_{sp3}$ and the value $R_{sp2}$. As a result, in operation 4469, the third electronic device 30 may transmit, to the first electronic device 10, the second negotiation response by the third electronic device 30, which includes the value $\Delta t_{p2}$.

In this case, the first electronic device 10, which has received the second negotiation response by the second electronic device 20, may determine the value $(R_{mc1} - R_{mc0} + \Delta t_{p1})/2$. The above-mentioned value may correspond to the RTT value of the first sound wave or the second sound wave.

The first electronic device 10 may determine the distance $D_{p1}$ between the first electronic device 10 and the second electronic device 20 by multiplying the value ($R_{mc1}-R_{mc0}+\Delta t_{p1}$)/2 and the transmission speed (340 m/s) of a sound wave. In addition, the first electronic device 10, which has received the second negotiation response by the third electronic device 30, may determine the value ($R_{mc2}-R_{mc0}+\Delta t_{p2}$)/2. The above-mentioned value may correspond to the RTT value of the first sound wave or the third sound wave. The first electronic device 10 may determine the distance $D_{p2}$ between the first electronic device 10 and the third electronic device 30 by multiplying the value ($R_{mc2}-R_{mc0}+\Delta t_{p2}$)/2 and the transmission speed (340 m/s) of a sound wave. The details of the distance determining operation of the first electronic device 10 are the same as the description in FIG. 4B.

In operation 4471, the first electronic device 10 may transmit the second wireless signal. The first electronic device 10 may measure the distance to the second electronic device 20 or the distance to the third electronic device 30 again, or may newly measure the distance to another electronic device by repeating operations 4401 to 4419.

Referring to FIGS. 44A and 44B, although the description has been made of the operation in which the first electronic device 10 determines the distance only to the second electronic device 20 and the distance only to the third electronic device 30, this is only an example, and the first electronic device 10 may perform the distance measurement with respect to a plurality of electronic devices near the first electronic device 10.

Figure 45A:
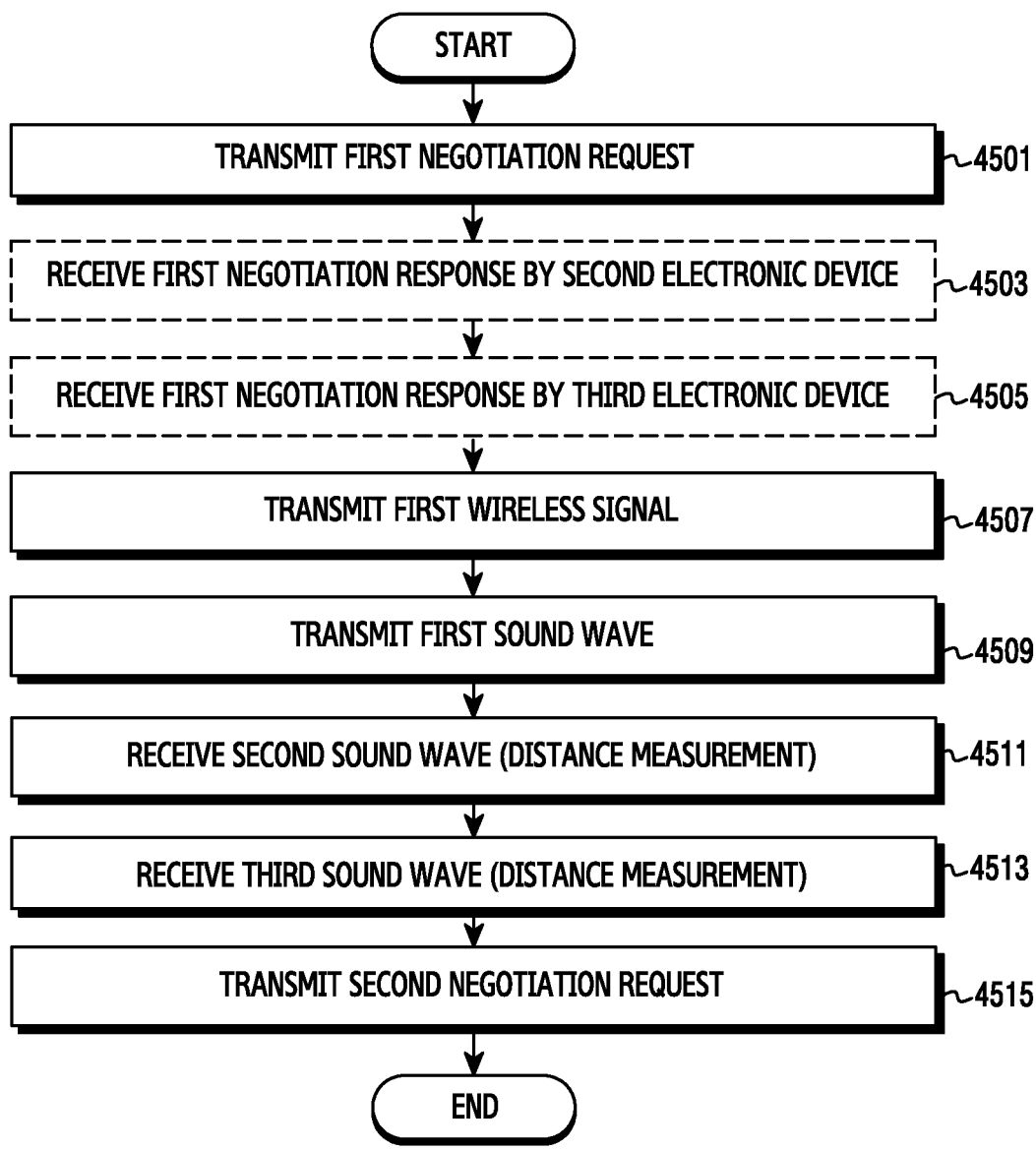
FIG. 45A is a flowchart illustrating a negotiation message-based distance-measuring operation of a first electronic device according to various embodiments of the present disclosure.

FIG. 45A is a flowchart illustrating a negotiation message-based distance-measuring operation of a first electronic device according to various embodiments of the present disclosure. The first electronic device may be the first electronic device 10 of FIG. 44A. Unlike FIG. 45B described below, in FIG. 45A, the first electronic device 10 may perform the distance measurement with respect to a plurality of electronic devices near the first electronic device 10 without using feedback.

Referring to FIG. 45A, in operation 4501, the first electronic device 10 may transmit the first negotiation request. The first negotiation request may be broadcast in the form of an advertising packet, and certain electronic devices near the first electronic device 10 may receive the first negotiation request. The first negotiation request may be received by a plurality of electronic devices, and the first negotiation request may be referred to as the first advertising message. The first advertising message may contain information on the second value $\Delta t_{p1}$ and information on the third value $\Delta t_{p2}$. The second value $\Delta t_{p1}$ may correspond to the difference between the timing of when the second electronic device 20 receives the first sound wave that is output from the first electronic device 10 and the timing of when the second electronic device 20 outputs the second sound wave. The third value $\Delta t_{p2}$ may correspond to the difference between the timing of when the third electronic device 30 receives the first sound wave that is output from the first electronic device 10 and the timing of when the third electronic device 30 outputs the third sound wave.

In operation 4503, the first electronic device 10 may receive a response to the first negotiation request from the second electronic device 20. The response may be referred to as the first negotiation response by the second electronic device 20. The first negotiation response by the second electronic device 20 may contain the second value. In addition, the first negotiation response by the second electronic device 20 may contain information on the electronic device that performs the distance measurement.

In operation 4505, the first electronic device 10 may receive a response to the first negotiation request from the third electronic device 30. The response may be referred to as the first negotiation response by the third electronic device 30. The first negotiation response by the third electronic device 30 may contain the third value. In addition, the first negotiation response by the third electronic device 30 may contain information on the electronic device that performs the distance measurement.

The operation in which the first electronic device 10 shares the second value and the third value with other electronic devices does not need to be duplicated. Therefore, in the case where the first electronic device 10 transmits the second value and the third value in operation 4501, the negotiation response may not contain the second value or the third value in operation 4503 or in operation 4505. On the contrary, in the case where the second electronic device 20 transmits the second value, the negotiation request may not contain the second value in operation 4501.

In operation 4507, the first electronic device 10 may transmit the first wireless signal. According to various embodiments of the present disclosure, the first wireless signal may be broadcast in the form of a BLE advertising packet. The first wireless signal may serve as a reference signal for measuring the distance between the first electronic device 10 and nearby electronic devices, a signal for activating the second microphone or the second speaker included in the second electronic device 20, or a signal for activating the third microphone or the third speaker included in the third electronic device 30. The first wireless signal may be referred to as the second advertising message or a distance measurement indicator.

In operation 4509, the first electronic device 10 may transmit the first sound wave. In this case, the first electronic device 10 may transmit the first sound wave at the timing $R_{mc0}$.

In operation 4511, the first electronic device 10 may receive the second sound wave from the second electronic device 20. In this case, the first electronic device 10 may receive the second sound wave at the timing $R_{mc1}$.

In operation 4513, the first electronic device 10 may receive the third sound wave from third electronic device 30. In this case, the first electronic device 10 may receive the third sound wave at the timing $R_{mc2}$.

The first electronic device 10 may determine the value ($R_{mc1}-R_{mc0}-\Delta t_{p1}$)/2, and may determine the distance $D_{p1}$ between the first electronic device 10 and the second electronic device 20 by multiplying the value ($R_{mc1}-R_{mc0}-\Delta t_{p1}$)/2 and the transmission speed (340 m/s) of a sound wave. In addition, the first electronic device 10 may determine the value ($R_{mc2}-R_{mc0}-\Delta t_{p2}$)/2, and may determine the distance $D_{p2}$ between the first electronic device 10 and the third electronic device 30 by multiplying the value ($R_{mc2}-R_{mc0}-\Delta t_{p2}$)/2 and the transmission speed (340 m/s) of a sound wave.

In operation 4515, the first electronic device 10 may transmit the second negotiation request. The negotiation request may be broadcast in the form of a BLE advertising packet. Operation 4155 may be performed in the same manner as operation 4501. Afterwards, the first electronic device 10 may repeat operations 4501 to 4513. The first electronic device 10 may measure the distance to the second electronic device 20 or the distance to the third electronic device 30 again, or may newly measure the distance to another electronic device through the repeated operations.

Figure 45B:
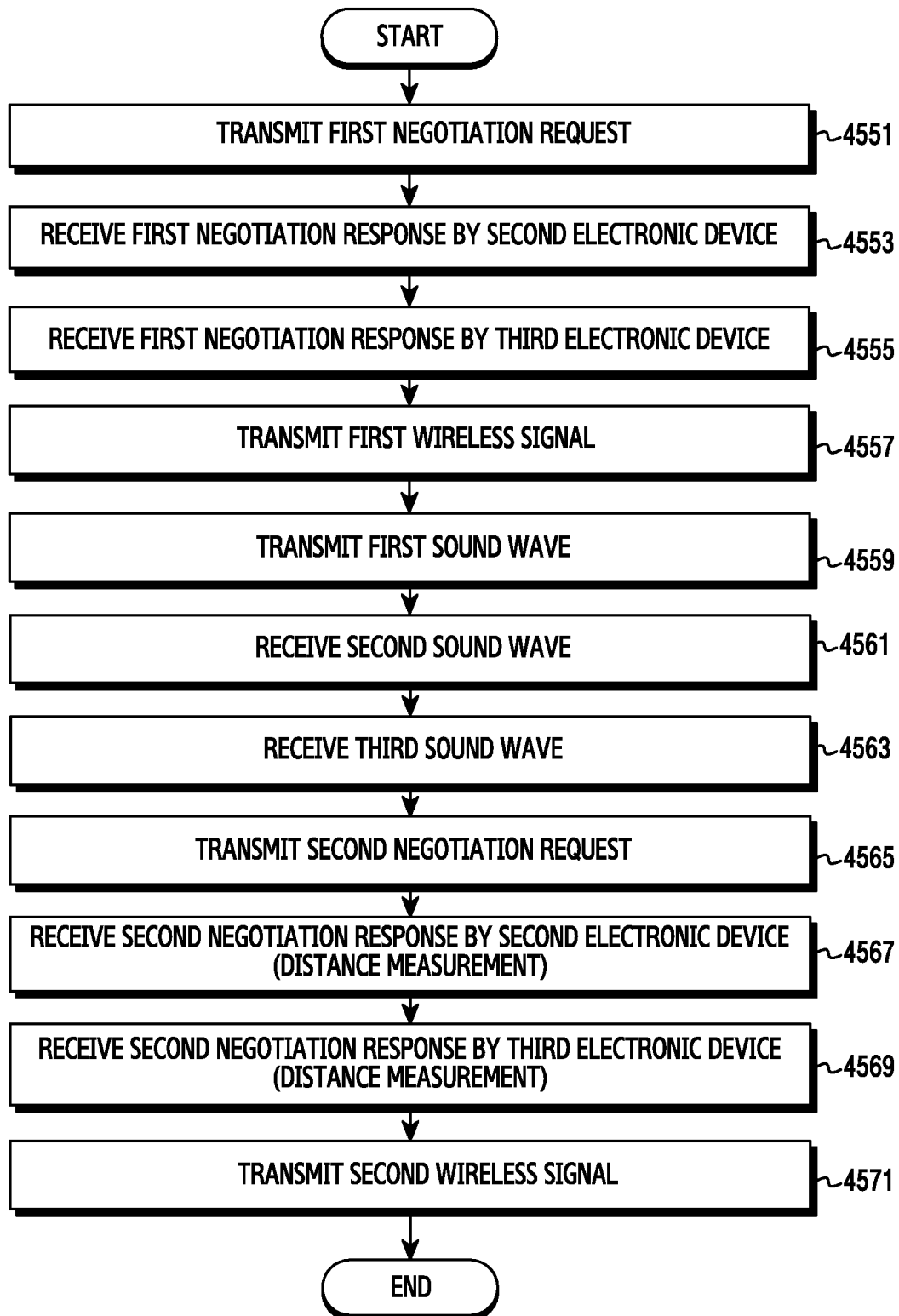
FIG. 45B is a flowchart illustrating a negotiation message-based distance-measuring operation of a first electronic device by using feedback according to various embodiments of the present disclosure.

FIG. 45B is a flowchart illustrating a negotiation message-based distance-measuring operation by using feedback in a first electronic device according to various embodiments of the present disclosure. The first electronic device may be the first electronic device 10 of FIG. 44A.

Referring to FIG. 45B, in operation 4551, the first electronic device 10 may transmit the first negotiation request. The first negotiation request may be broadcast in the form of an advertising packet, and certain electronic devices near the first electronic device 10 may receive the first negotiation request. The first negotiation request may be received by a plurality of electronic devices, and first negotiation request may be referred to as the first advertising message.

In operation 4553, the first electronic device 10 may receive the first negotiation response by the second electronic device 20, and in operation 4555, the first electronic device 10 may receive the first negotiation response by the third electronic device 30. The first negotiation response by the second electronic device 20 and the first negotiation response by the third electronic device 30 may contain information on the electronic device that performs the distance measurement.

In operation 4557, the first electronic device 10 may transmit the first wireless signal. The operation 4557 may be performed in the same manner as operation 4507 of FIG. 45A.

In operation 4559, the first electronic device 10 may transmit the first sound wave. For example, the first electronic device 10 may transmit the first sound wave at the timing $R_{mc0}$.

The first electronic device 10 may receive the second sound wave from the second electronic device 20 in operation 4561, and may receive the third sound wave from the third electronic device 30 in operation 4563. For example, the first electronic device 10 may receive the second sound wave at the timing $R_{mc1}$, and may receive the third sound wave at the timing $R_{mc2}$.

In operation 4565, the first electronic device 10 may transmit the second negotiation request. The second negotiation request may contain information on the type of electronic device that performs the distance measurement, information on a transmission interval of the advertising messages, information on a detection interval of the device that receives the advertising messages, or on a detection window thereof, and information on the action number.

In operation 4567, the first electronic device 10 may receive the second negotiation response by the second electronic device 20. In this case, the second negotiation response by the second electronic device 20 may contain the value $\Delta t_{p1}$, which corresponds to the difference between the timing $R_{sp1}$ of when the second electronic device 20 receives the first sound and the timing $R_{sp0}$ of when the second electronic device 20 transmits the second sound wave.

In operation 4569, the first electronic device 10 may receive the second negotiation response by the third electronic device 30. In this case, the second negotiation response by the third electronic device 30 may contain the value $\Delta t_{p2}$, which corresponds to the difference between the timing $R_{sp3}$ of when the third electronic device 30 receives the first sound and the timing $R_{sp2}$ of third electronic device 30 transmits the second sound wave.

The first electronic device 10, which has received the second negotiation response by the second electronic device 20, may determine the value $(R_{mc1}-R_{mc0}+\Delta t_{p1})/2$. The first electronic device 10 may determine the distance $D_{p1}$ between the first electronic device 10 and the second electronic device 20 by multiplying the value $(R_{mc1}-R_{mc0}+\Delta t_{p1})/2$ and the transmission speed (340 m/s) of a sound wave. In addition, the first electronic device 10, which has received the second negotiation response by the third electronic device 30, may determine the value $(R_{mc2}-R_{mc0}+\Delta t_{p2})/2$. The first electronic device 10 may determine the distance $D_{p2}$ between the first electronic device 10 and the third electronic device 30 by multiplying the value $(R_{mc2}-R_{mc0}+\Delta t_{p2})/2$ and the transmission speed (340 m/s) of a sound wave.

In operation 4571, the first electronic device 10 may transmit the second wireless signal. The first electronic device 10 may measure the distance to the second electronic device 20 or the distance to the third electronic device 30 again, or may newly measure the distance to another electronic device by repeating operations 4501 to 4519.

Figure 46A:
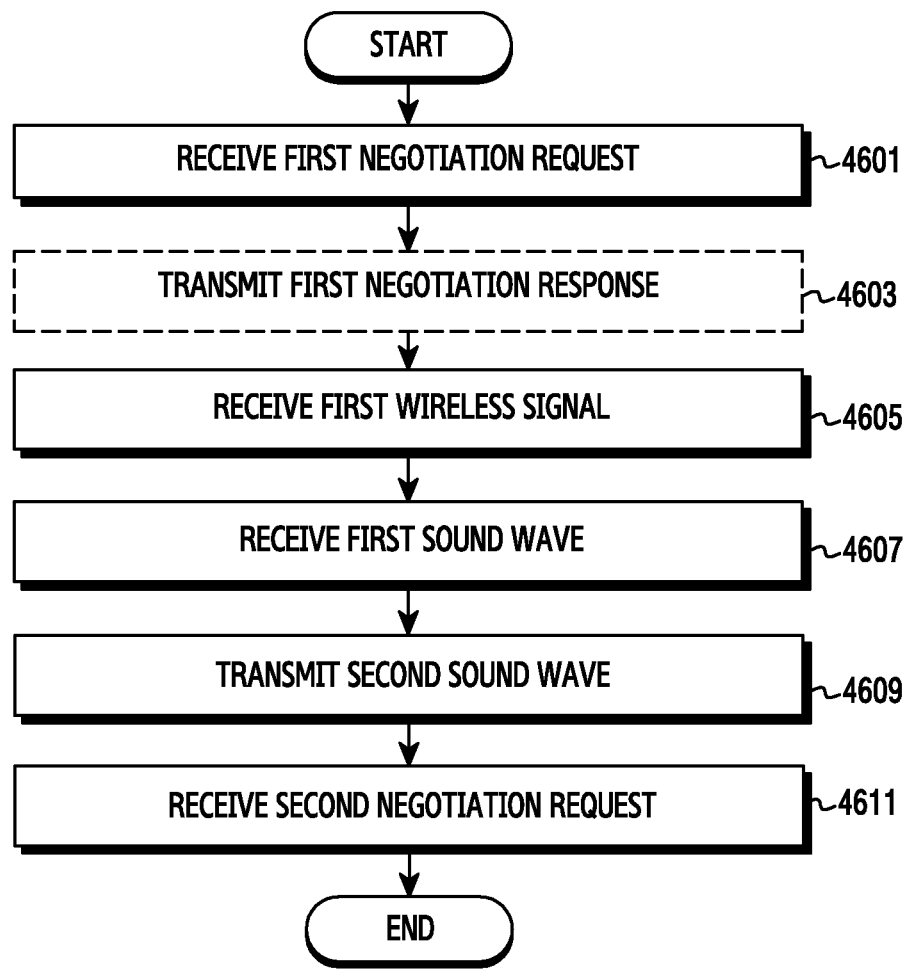
FIG. 46A is a flowchart illustrating a negotiation message-based distance-measuring operation of a second electronic device according to various embodiments of the present disclosure.

FIG. 46A is a flowchart illustrating a negotiation message-based distance-measuring operation of a second electronic device according to various embodiments of the present disclosure. The first electronic device may be the second electronic device 20 of FIG. 44A. Unlike FIG. 46B described below, in FIG. 46A, the first electronic device 10 may perform the distance measurement with respect to a plurality of electronic devices near the first electronic device 10 without using feedback.

Referring to FIG. 46A, in operation 4601, the second electronic device 20 may receive the first negotiation request. The first negotiation request may be broadcast in the form of an advertising packet, and the first negotiation request may be referred to as the first advertising message. The first advertising message may contain information on the second value $\Delta t_{p1}$. The second value $\Delta t_{p1}$ may correspond to the difference between the timing of when the second electronic device 20 receives the first sound wave that is output from the first electronic device 10 and the timing of when the second electronic device 20 transmits the second sound wave.

In operation 4603, the second electronic device 20 may transmit the first negotiation response. The first negotiation response may contain information on the type of electronic device that performs the distance measurement and information on the second value ($\Delta t_{p1}$). As described above, since the operation of sharing the second value does not need to be duplicated, in the case where the first advertising message contains the information on the second value in operation 4601, the first negotiation response may not contain the information on the second value in operation 4603.

In operation 4605, the second electronic device 20 may receive the first wireless signal. According to various embodiments of the present disclosure, the first wireless signal may be broadcast in the form of a BLE advertising packet. The first wireless signal may serve as a reference signal for measuring the distance between the first electronic device 10 and nearby electronic devices, or a signal for activating the second microphone or the second speaker included in the second electronic device 20. The first wireless signal may be referred to as the second advertising message or a distance measurement indicator.

In operation 4607, the second electronic device 20 may receive the first sound wave from the first electronic device 10. The second electronic device 20 may receive the first sound wave at the timing $R_{sp1}$.

In operation 4609, the second electronic device 20 may transmit the second sound wave. The second electronic device 20 may transmit the second sound wave when a specific period of time has elapsed since the reception of the first sound wave in operation 4607. The specific period of time may be the time corresponding to the second value. For example, the second electronic device 20 may transmit the second sound wave at the timing $R_{sp0}$, which is obtained by adding the time corresponding to the second value $\Delta t_{p1}$ to the timing $R_{sp1}$. The second electronic device 20 may transmit the second sound wave to the first electronic device 10.

Although it is not shown in FIG. 46A, the second electronic device 20 may receive the measurement result from the first electronic device 10 afterwards. The measurement result may be received through the negotiation request. In various embodiments of the present disclosure, the second electronic device 20 may receive the measurement result from the first electronic device 10 through an advertising packet. For example, the measurement result may be the distance between the first electronic device 10 and the second electronic device 20, which has been calculated by the first electronic device 10. As another example, the measurement result may be a value that corresponds to the difference between the timing of when the first electronic device 10 outputs the first sound wave and the timing of when the first electronic device 10 receives the second sound wave.

In operation 4611, the second electronic device 20 may receive the second negotiation request. According to various embodiments of the present disclosure, the second negotiation request may contain the measurement result. The second electronic device 20 may repeat operations 4601 to 4609 after operation 4611. The second electronic device 20 may measure the distance to the first electronic device 10 or the other electronic devices by repeating the operations above.

Figure 46B:
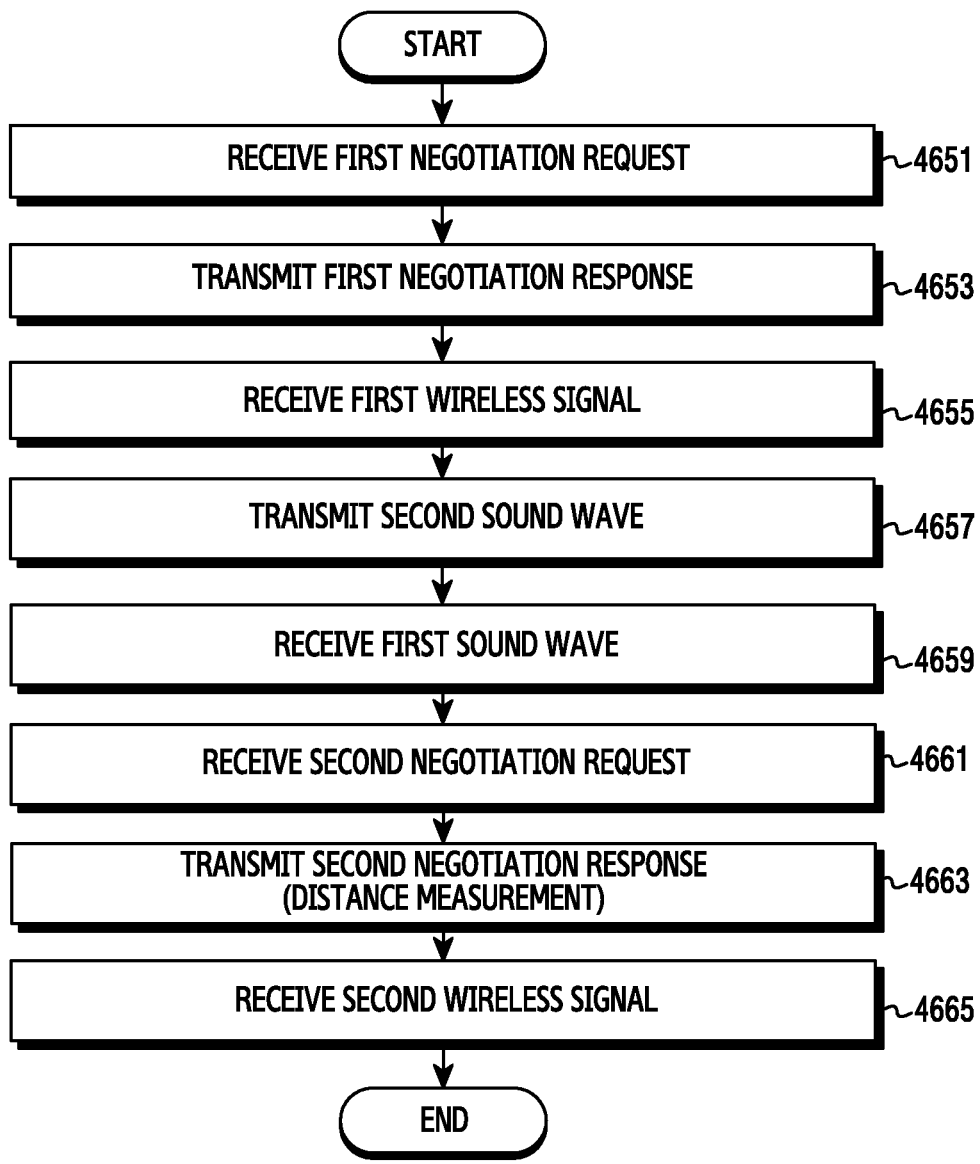
FIG. 46B is a flowchart illustrating a negotiation message-based distance-measuring operation of a second electronic device by using feedback according to various embodiments of the present disclosure.

FIG. 46B is a flowchart illustrating a negotiation message-based distance-measuring operation by using feedback in a second electronic device according to various embodiments of the present disclosure. The first electronic device may be the second electronic device 20 of FIG. 44B.

Referring to FIG. 46B, first, in operation 4651, the second electronic device 20 may receive the first negotiation request. The first negotiation request may be broadcast in the form of an advertising packet, and the first negotiation request may be referred to as the first advertising message.

In operation 4653, the second electronic device 20 may transmit the first negotiation response. The first negotiation response may contain information on the electronic device that performs the distance measurement.

In operation 4655, the second electronic device 20 may receive the first wireless signal. According to various embodiments of the present disclosure, the first wireless signal may be broadcast in the form of a BLE advertising packet. Operation 4655 may be performed in the same manner as operation 4605 of FIG. 46A.

In operation 4657, the second electronic device 20 may transmit the second sound wave. The second electronic device 20 may transmit the second sound wave at the timing $R_{sp0}$.

In operation 4659, the second electronic device 20 may receive the first sound wave from the first electronic device 10. The second electronic device 20 may transmit the first sound wave at the timing $R_{sp1}$.

In operation 4661, the second electronic device 20 may receive the second negotiation request. The second negotiation request may contain information on the type of electronic device that performs the distance measurement, information on a transmission interval of the advertising messages, information on a detection interval of the device that receives the advertising messages, or on a detection window thereof, information on the first value, and information on the action number. The first value may correspond to the difference between the timing of when first electronic device 10 outputs the first sound wave and the timing of when the first electronic device 10 receives the second sound wave. According to this, the second electronic device 20 may determine the distance to the first electronic device 10.

In operation 4663, the second electronic device 20 may transmit the second negotiation response. In this case, the second negotiation response may contain the value $\Delta t_{p1}$ that corresponds to the difference between the timing $R_{sp1}$ of when the second electronic device 20 receives the first sound and the timing $R_{sp0}$ of when the second electronic device 20 transmits the second sound wave. According to this, the first electronic device 10 may determine the distance between the first electronic device 10 and the second electronic device 20 from the value $\Delta t_{p1}$. The second electronic device 20 may receive a measurement result value from the first electronic device according to the subsequent procedure.

The second electronic device 20 may receive the second wireless signal in operation 4665, and may measure the distance to the first electronic device 10 by repeating operations 4651 to 4653.

Figure 47:
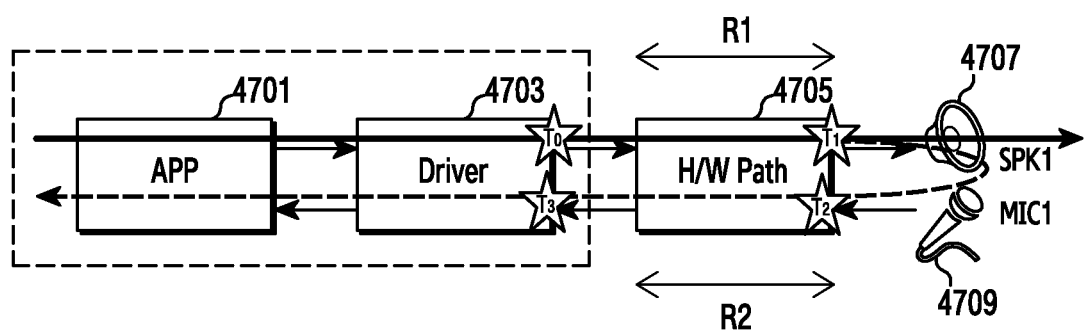
FIG. 47 illustrates a configuration of an electronic device for a self-calibration operation according to various embodiments of the present disclosure.

FIG. 47 illustrates a configuration of an electronic device for a self-calibration operation according to various embodiments of the present disclosure. The electronic device may be the first electronic device 10 in FIG. 1A or 1B.

Referring to FIG. 47, the first electronic device 10 may include an application 4701, a driver 4703, and a hardware area 4705. The first electronic device 10 may include a controller. The controller may include a software area. The software area may include the application 4701 and the driver 4703. For example, the controller of the first electronic device 10 may include the application 4701 and the driver 4703. Although the first electronic device 10 has been described to include the application 4701, the driver 4703, and the hardware area 4705 in FIG. 47, the second electronic device 20, according to the embodiment of the present disclosure, may include the application 4701, the driver 4703, and the hardware area 4705 as well.

The application 4701 is an element for executing services of the first electronic device 10. The application 4710 may include one or more commands for controlling the services. For example, the application 4701 may include one or more commands for distance and direction measurement, or calibration, according to various embodiments. As another example, the application 4701 may create data corresponding to the sound wave necessary for the distance measurement, and may analyze recorded audio data. The application 4701 may be referred to as a framework.

The driver 4703 is an element for controlling the operation of the hardware area 4705. The driver 4703 may control the operation of the hardware area 4705 according to the commands provided by the application 4701. For example, the driver 4703 may convert the commands to control signals that can be recognized by the elements included in the hardware area 4705. The driver 4703 may be referred to as a kernel. The kernel may operate in response to the execution of the application. The kernel may control specific hardware in response to the commands of the application. According to various embodiments of the present disclosure, the hardware may include one or more speakers or one or more microphones.

The hardware area 4705 is an element for generating wireless signals or sound waves. For example, the hardware area 4705 may include a module (e.g., a BT module 7425 or a communication module 7420 in FIG. 74) for generating wireless signals, such as BLE signals. As another example, the hardware area 4705 includes a module (e.g., an audio module 7480 of FIG. 74) for generating sound waves. A path that is input, or output, through the hardware area 4705 may be referred to as a hardware path.

The first electronic device 10 may perform the calibration as follows. The application 4701 of the first electronic device 10 may instruct the transmission of a reference signal for the calibration. The driver 4703 may generate the reference signal, and may transmit the reference signal to the hardware area 4705 at the timing $T_0$. The hardware area 4705 may transfer the reference signal to the first speaker (SPK1) 4707. According to this, the first speaker 4707 may output a sound wave corresponding to the reference signal at the timing $T_1$. The first microphone (MIC1) 4709 may receive the sound wave corresponding to the reference signal at the timing $T_2$. The hardware area 4705 may transfer the reference signal to the driver 4703 at the timing $T_3$.

The timing $T_0$ of when the driver 4703 outputs a signal and the timing $T_3$ of when the driver 4703 receives a signal can be identified. However, since the operation of the hardware area 4705 includes a physical signal processing procedure, it may be difficult for the first electronic device 10 to accurately specify the timing $T_1$ of when the reference signal is output to the first speaker 4707 and timing $T_2$ of when the reference signal is received through the first microphone 4709. For example, the first electronic device 10 cannot control the timing $T_1$ and the timing $T_2$, or cannot accurately specify the same. The first electronic device 10 may consider a system delay. The system delay may include a playback system delay and a capture system delay. When using $T_0$ and $T_3$, which can be identified in the driver 4703, as the transmission timing and the reception timing of a sound wave, $R_1$ corresponding to the difference between timing $T_1$ and timing $T_0$ may serve as the playback system delay, and $R_2$ corresponding to the difference between timing $T_3$ and timing $T_2$ may serve as the capture system delay.

According to various embodiments of the present disclosure, it may be necessary to accurately determine the first system delay value $R_1$ and the second system delay value $R_2$ for the accurate distance and direction measurement between the first electronic device 10 and the second electronic device 20. More particularly, when the system delay values of the first electronic device 10 and of the second electronic device 20 are different from each other, the difference between the system delay values may degrade the accuracy of the distance measurement. The detailed principle for determining the value $R_1$ and the value $R_2$ will be described in FIGS. 48 and 49 below.

Figure 48:
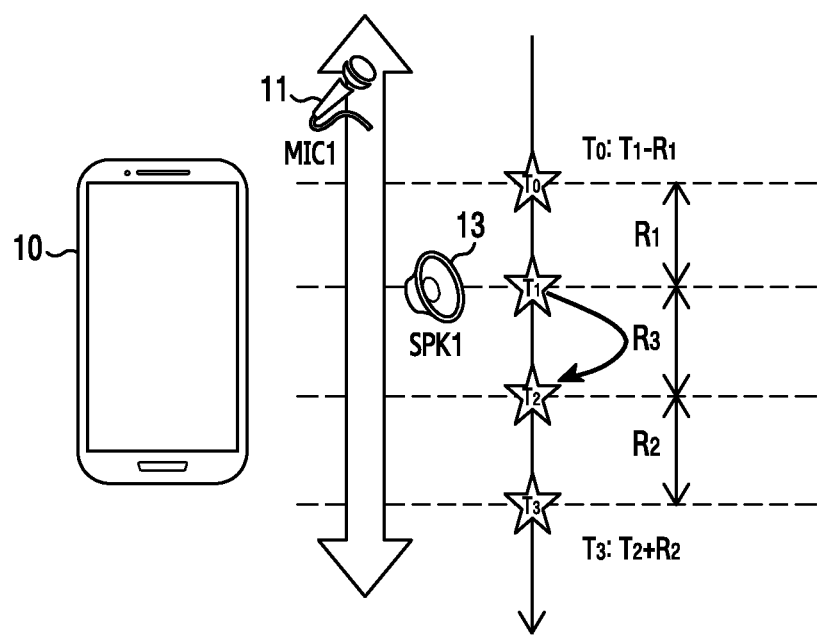
FIG. 48 illustrates an electronic device for a self-calibration operation according to various embodiments of the present disclosure.

FIG. 48 illustrates an electronic device for a self-calibration operation according to various embodiments of the present disclosure.

Referring to FIG. 48, the first speaker 13 included in the first electronic device 10 may output the first sound wave at the timing $T_1$. The first microphone (MIC1) 11 included in the first electronic device may receive the first sound wave at the timing $T_2$. In this case, assuming that the first microphone 11 and first speaker 13 are fixed, the distance between the first microphone 11 and the first speaker 13 may be determined to be a constant value. Since the transmission speed (340 m/s) of a sound wave is a constant value as well, the first electronic device 10 may determine the value $R_3$ corresponding to the difference between the timing $T_2$ and the timing $T_1$ by dividing the distance between the first microphone 11 and the first speaker 13 by the transmission speed of a sound wave.

The time difference between $T_0$ and $T_3$ is the sum of the value $R_1$, the value $R_2$, and the value $R_3$. The value $R_1$ corresponds to the time difference between $T_0$ and $T_1$. The value $R_1$ corresponds to the time difference between $T_2$ and $T_3$. For example, the value $T_0$ may be determined to be a difference value between the value $T_1$ and the value $R_1$. The value $T_3$ may be determined to be the sum of the value $T_2$ and the value $R_2$. For example, assuming that the system delay values $R_1$ and $R_2$, which occur in the hardware area 4705, are the same, the first electronic device 10 may determine the value $R_1$ or the value $R_2$ to be half the value obtained by subtracting $T_0$ and $R_3$ from $T_3$ according to the relationship between the value $T_0$ and the value $T_3$. Consequently, the first electronic device 10 may estimate the value $R_1$ or the value $R_2$ based on the identifiable values $T_0$, $T_3$, and $R_3$.

Figure 49:
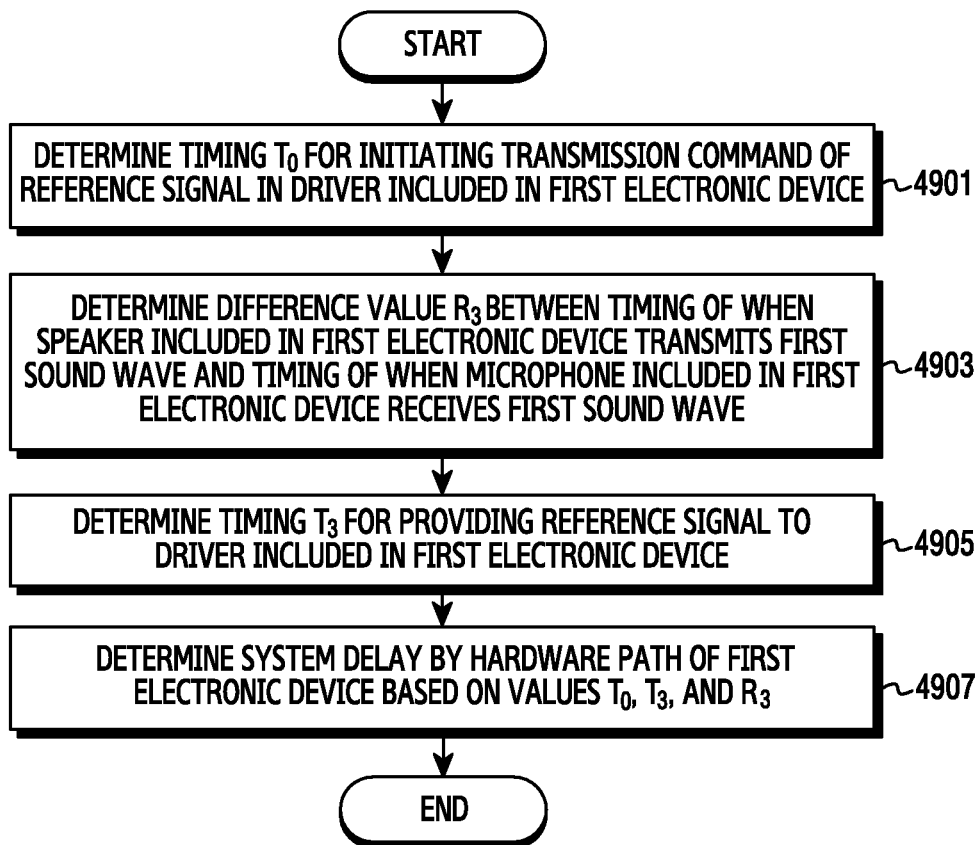
FIG. 49 is a flowchart illustrating a self-calibration operation according to various embodiments of the present disclosure.

FIG. 49 is a flowchart illustrating a self-calibration operation according to various embodiments of the present disclosure.

Referring to FIG. 49, first, in operation 4901, the first electronic device 10 may determine $T_0$ for initiating the transmission command of the reference signal by the driver 4703 included in the first electronic device 10. Since the operation of the driver 4703 is controlled by the first electronic device 10, the first electronic device 10 may identify the transmission timing of the reference signal in the driver 4703.

In operation 4903, the first electronic device 10 may determine the difference value $R_3$ between the timing $T_1$ of when the first speaker 13 included in the first electronic device generates the first sound wave and the timing $T_2$ of when the first microphone 11 included in the first electronic device 10 receives the first sound wave. Assuming that the first microphone 11 and first speaker 13 are fixed, the first electronic device 10 may determine the distance between the first microphone 11 and the first speaker 13 to be a constant value. Since the transmission speed (340 m/s) of a sound wave is a constant value as well, the first electronic device 10 may determine the value $R_3$ corresponding to the difference between the timing $T_2$ and the timing $T_1$ by dividing the distance between the first microphone 11 and the first speaker 13 by the transmission speed of a sound wave.

In operation 4905, the first electronic device 10 may determine $T_3$ for receiving the reference signal by the driver 4703 included in the first electronic device 10. Since the operation of the driver 4703 is controlled by the first electronic device 10, the first electronic device 10 may identify the timing $T_3$ of receiving the reference signal by the driver 4703.

In operation 4907, the first electronic device 10 may determine the system delay of the hardware area 4705 included in the first electronic device 10 based on the values $T_0$, $T_3$, and $R_3$. The system delay may include a playback system delay and a capture system delay. The playback system delay may correspond to the value of $R_1$. The capture system delay may correspond to the value $R_2$. For example, assuming that the value $R_1$ and the value $R_2$ are substantially identical to each other, the first electronic device 10 may determine the value $R_1$ or the value $R_2$ by dividing the value, which is obtained by subtracting $R_3$ from the time difference between $T_0$ and $T_3$, by 2. Consequently, the first electronic device 10 may estimate the value $R_1$ or the value $R_2$ based on the identifiable values $T_0$, $T_3$, and $R_3$.

Figure 50:
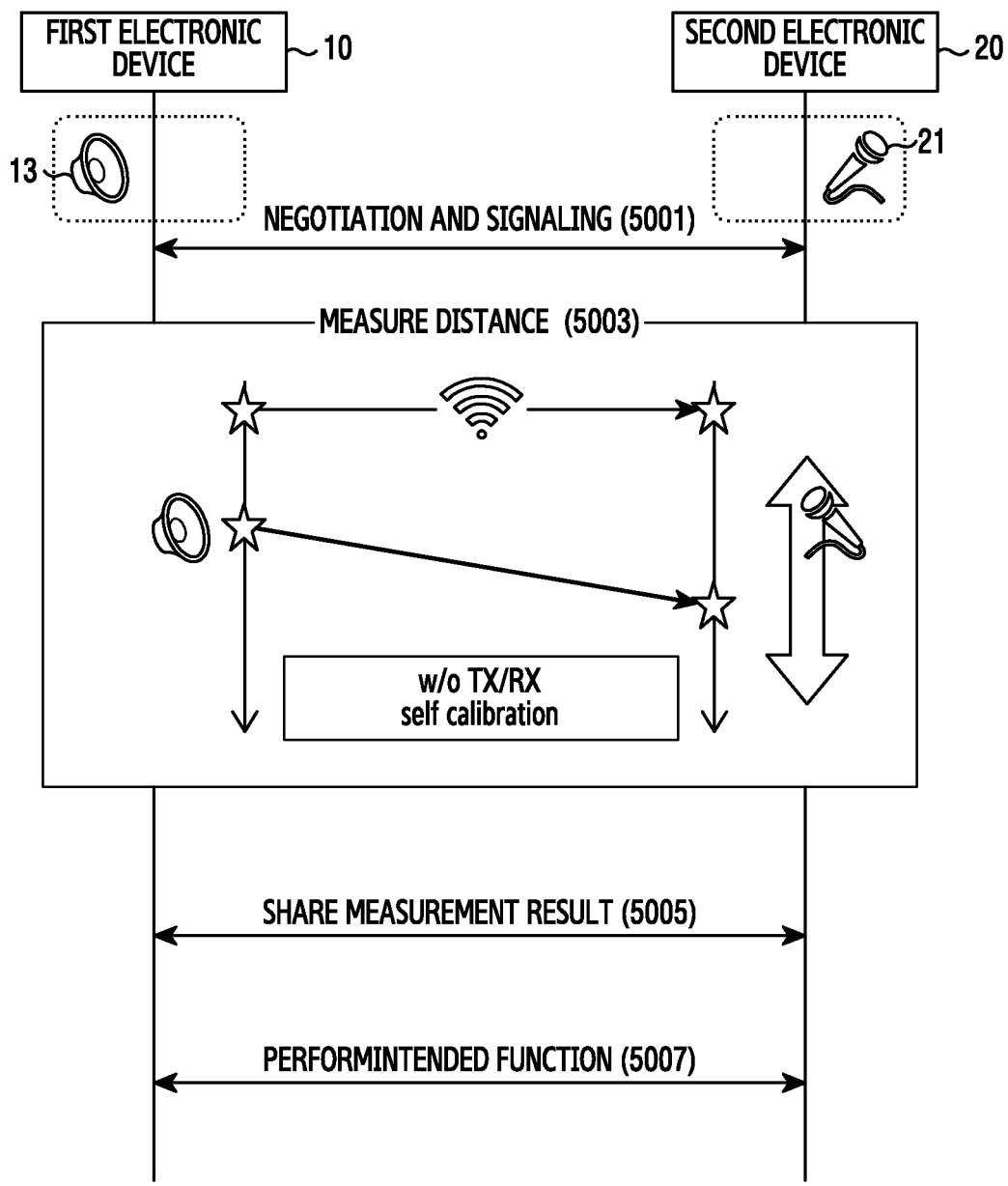
FIG. 50 illustrates a processing flow of a distance measuring method based on a self-calibration operation according to various embodiments of the present disclosure.

FIG. 50 illustrates a processing flow of a distance measuring method based on the self-calibration operation according to various embodiments of the present disclosure.

Referring to FIG. 50, the first electronic device (TX) 10 and the second electronic device (RX) 20 may perform, operation by operation, a negotiation and signalling operation 5001, a distance-measuring operation 5003, a measurement result sharing operation 5005, and an intended function executing operation 5007, respectively. In addition, according to the embodiment of the present disclosure, the first electronic device 10 may include the first speaker 13, and the second electronic device 20 may include the second microphone 21.

First, the negotiation and signalling operation 5001 may correspond to the negotiation and signalling operation 100 of FIG. 1A. In other words, the negotiation and signalling operation 5001 performed by the first electronic device 10 and the second electronic device 20 includes the operation in which the first electronic device 10 and the second electronic device 20 exchange characteristics.

In an embodiment of the present disclosure, the negotiation and signalling operation 5001 performed by the first electronic device 10 and the second electronic device 20 includes an operation in which the first electronic device 10 transmits distance measurement-related parameters to the second electronic device 20. In an embodiment of the present disclosure, the distance measurement-related parameters may contain at least one of a distance measurement cycle, a distance measurement start offset, the number of available speakers/microphones, the required measurement accuracy, the required distance measurement lead time, the recording time of a sound wave, identifier information of the first electronic device 10, or a generating method of a sound wave.

Referring to FIG. 50, in the case where the first speaker 13 included in the first electronic device 10 generates the first sound wave and the second microphone 21 included in the second electronic device 20 receives the first sound wave in order for the second electronic device 20 to measure the distance between the first electronic device 10 and the second electronic device 20, both the first electronic device 10 and the second electronic device 20 cannot perform the self-calibration according to the embodiment of the present disclosure.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

According to the embodiment shown in FIG. 50, since the first electronic device 10 includes only the first speaker 13 and the second electronic device 20 includes only the second microphone 21, as a result, both the first electronic device 10 and the second electronic device 20 cannot perform the self-calibration, and it is necessary to determine the system delay value that occurs in the hardware area, which is included in each of the first electronic device 10 and the second electronic device 20, through a separate process.

In addition, the distance-measuring operation 5003 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods. For example, the distance between the first electronic device 10 and the second electronic device 20 may be determined based on the arrival time difference between a wireless signal and a sound wave.

The measurement result sharing operation 5005 and the intended function executing operation 5007 may be included in the interworking operation 300 shown in FIG. 1B. According to the embodiment of the present disclosure, in the measurement result sharing operation 5005, the second electronic device 20 may feed the distance value between the first electronic device 10 and the second electronic device 20, which has been measured by the second electronic device 20, back to the first electronic device 10.

In addition, the intended function executing operation 5007 includes an operation of providing the second electronic device 20 with data related to services performed by the first electronic device 10, or an operation of providing the first electronic device 10 with data related to services performed by the second electronic device 20. The intended function executing operation 5007 will be described below in FIGS. 58 to 72.

Figure 51:
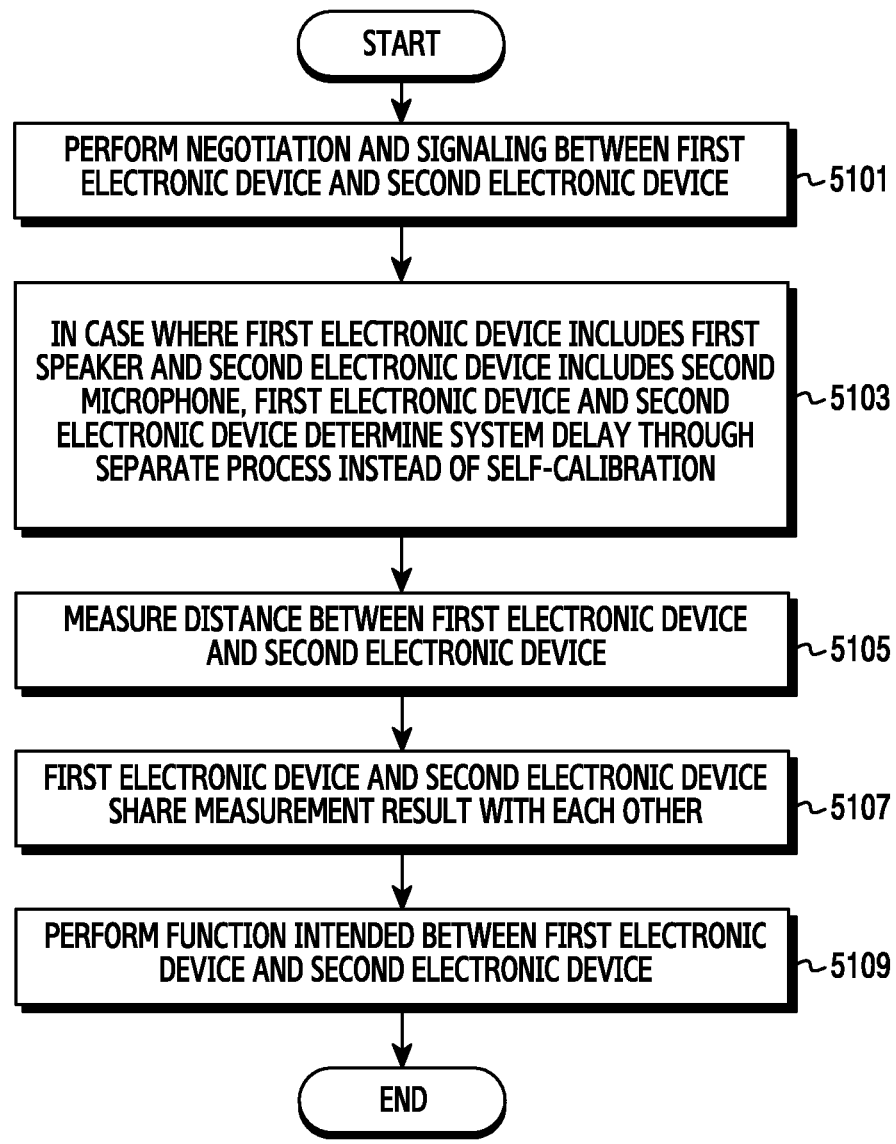
FIG. 51 is a flowchart illustrating a distance-measuring operation of a first electronic device based on a self-calibration operation according to various embodiments of the present disclosure.

FIG. 51 is a flowchart illustrating a distance-measuring operation of a first electronic device based on a self-calibration operation according to various embodiments of the present disclosure.

Referring to FIG. 51, first, in operation 5101, the negotiation and signalling operation 5001 may be performed between the first electronic device 10 and the second electronic device 20. Here, the negotiation and signalling operation 5001 may correspond to the negotiation and signalling operation 100 of FIG. 1A. In other words, the negotiation and signalling operation 5001 performed by the first electronic device 10 and the second electronic device 20 includes the operation in which the first electronic device 10 and the second electronic device 20 exchange characteristics.

In operation 5103, in the case where the first electronic device 10 includes the first speaker 13 and the second electronic device 20 includes the second microphone 21, the first electronic device 10 and the second electronic device 20 may determine the system delay through a separate process instead of the self-calibration.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

According to the embodiment shown in FIG. 50, since the first electronic device 10 includes only the first speaker 13 and the second electronic device 20 includes only the second microphone 21, as a result, both the first electronic device 10 and the second electronic device 20 cannot perform the self-calibration, and it is necessary to determine the system delay value that occurs in the hardware area, which is included in each of the first electronic device 10 and the second electronic device 20, through a separate process.

In operation 5105, the second electronic device 20 may measure the distance between the first electronic device 10 and the second electronic device 20. Here, the distance-measuring operation 5003 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods.

In addition, in operation 5107, the first electronic device 10 and the second electronic device 20 may share the measurement result with each other. According to the embodiment of the present disclosure, in the measurement result sharing operation 5005, the second electronic device 20 may feed the distance value between the first electronic device 10 and the second electronic device 20, which has been measured by the second electronic device 20, back to the first electronic device 10.

Finally, in operation 5109, the first electronic device 10 and the second electronic device 20 may execute the function that is intended by the first electronic device 10 and the second electronic device 20. Here, the intended function executing operation 5007 includes an operation of providing the second electronic device 20 with data related to services performed by the first electronic device 10, or an operation of providing the first electronic device 10 with data related to services performed by the second electronic device 20. The intended function executing operation 5007 will be described below in FIGS. 58 to 72.

Figure 52:
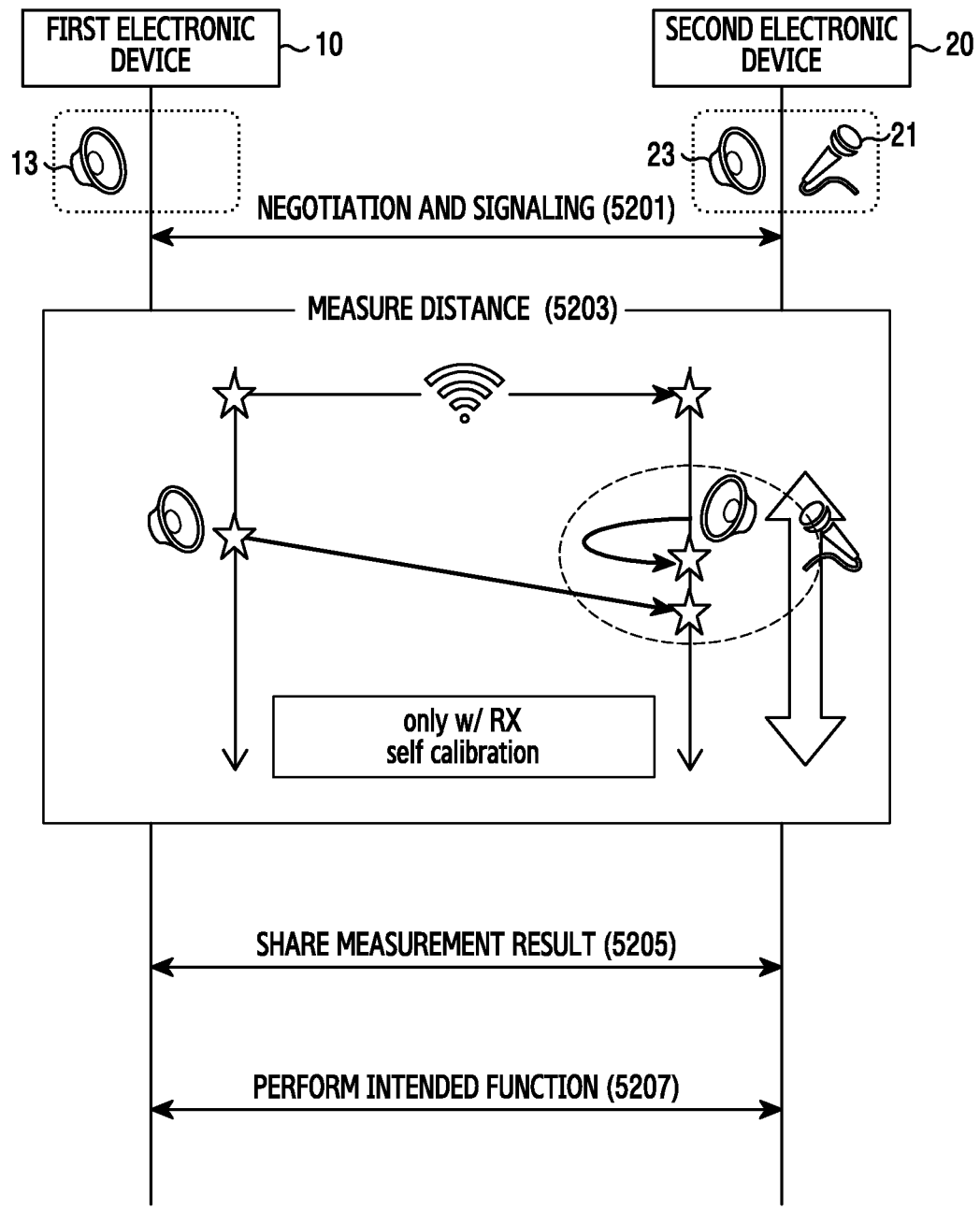
FIG. 52 illustrates a processing flow of a distance measuring method based on a self-calibration operation according to various embodiments of the present disclosure.

FIG. 52 illustrates a processing flow of a distance measuring method based on a self-calibration operation according to various embodiments of the present disclosure.

Referring to FIG. 52, the first electronic device (TX) 10 and the second electronic device (RX) 20 may perform, operation by operation, a negotiation and signalling operation 5201, a distance-measuring operation 5203, a measurement result sharing operation 5205, and an intended function executing operation 5207, respectively. In addition, according to the embodiment of the present disclosure, the first electronic device 10 may include the first speaker 13, and the second electronic device 20 may include the second microphone 21 and the second speaker 23, respectively.

First, the negotiation and signalling operation 5201 may correspond to the negotiation and signalling operation 100 of FIG. 1A. In other words, the negotiation and signalling operation 5201 performed by the first electronic device 10 and the second electronic device 20 includes the operation in which the first electronic device 10 and the second electronic device 20 exchange characteristics.

In an embodiment of the present disclosure, the negotiation and signalling operation 5201 performed by the first electronic device 10 and the second electronic device 20 includes the operation in which the first electronic device 10 transmits the distance measurement-related parameters to the second electronic device 20. In an embodiment of the present disclosure, the distance measurement-related parameters may contain at least one of a distance measurement cycle, a distance measurement start offset, the number of available speakers/microphones, the required measurement accuracy, the required distance measurement lead time, the recording time of a sound wave, identifier information of the first electronic device 10, or a generating method of a sound wave.

Referring to FIG. 52, in the case where: the first speaker 13 included in the first electronic device 10 generates the first sound wave, the second speaker 23 included in the second electronic device 20 generates the second sound wave, and the second microphone 21 included in the second electronic device 20 receives the first sound wave and the second sound wave in order for the second electronic device 20 to measure the distance between the first electronic device 10 and the second electronic device 20, the first electronic device 10 cannot perform the self-calibration according to the embodiment of the present disclosure, whereas the second electronic device 20 can perform the self-calibration according to the embodiment of the present disclosure.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

According to the embodiment shown in FIG. 52, since the first electronic device 10 includes only the first speaker 13, as a result, the first electronic device 10 cannot perform the self-calibration, and it is necessary to determine a system delay value that occurs in the hardware area, which is included in the first electronic device 10, through a separate process.

However, since the second electronic device 20 includes both the second microphone 21 and the second speaker 23, the second electronic device 20 can perform the self-calibration, according to the embodiment of the present disclosure, and it is not necessary to determine a system delay value that occurs in the hardware area, which is included in the second electronic device 20, through a separate process.

In addition, the distance-measuring operation 5203 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods. For example, the distance between the first electronic device 10 and the second electronic device 20 may be determined based on the arrival time difference between a wireless signal and a sound wave.

The measurement result sharing operation 5205 and the intended function executing operation 5207 may be included in the interworking operation 300 shown in FIG. 1B. According to the embodiment of the present disclosure, in the measurement result sharing operation 5205, the second electronic device 20 may feed the distance value between the first electronic device 10 and the second electronic device 20, which has been measured by the second electronic device 20, back to the first electronic device 10.

In addition, the intended function executing operation 5207 includes an operation of providing the second electronic device 20 with data related to services performed by the first electronic device 10, or an operation of providing the first electronic device 10 with data related to services performed by the second electronic device 20. The intended function executing operation 5207 will be described below in FIGS. 58 to 72.

Figure 53:
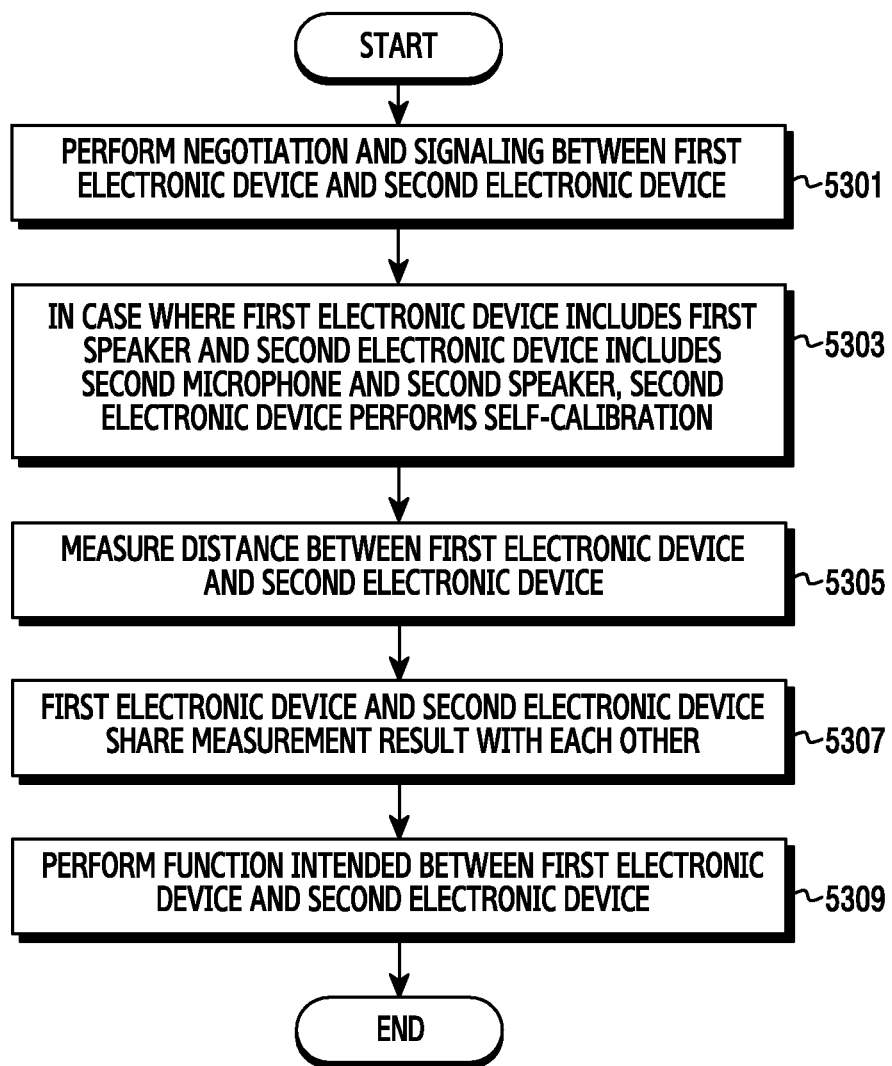
FIG. 53 is a flowchart illustrating a distance-measuring operation of a first electronic device based on a self-calibration operation according to various embodiments of the present disclosure.

FIG. 53 is a flowchart illustrating a distance-measuring operation of a first electronic device based on a self-calibration operation according to various embodiments of the present disclosure.

Referring to FIG. 53, first, in operation 5301, the negotiation and signalling operation between the first electronic device 10 and the second electronic device 20 may be performed. Here, the negotiation and signalling operation 5201 may correspond to the negotiation and signalling operation 100 of FIG. 1A. In other words, the negotiation and signalling operation 5201 performed by the first electronic device 10 and the second electronic device 20 includes the operation in which the first electronic device 10 and the second electronic device 20 exchange the characteristics.

In operation 5303, in the case where the first electronic device 10 includes the first speaker 13 and the second electronic device 20 includes the second microphone 21 and the second speaker 23, the second electronic device 20 may perform the self-calibration.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

According to the embodiment shown in FIG. 52, since the first electronic device 10 includes only the first speaker 13, as a result, the first electronic device 10 cannot perform the self-calibration, and it is necessary to determine a system delay value that occurs in the hardware area, which is included in the first electronic device 10, through a separate process.

However, since the second electronic device 20 includes both the second microphone 21 and the second speaker 23, the second electronic device 20 can perform the self-calibration, according to the embodiment of the present disclosure, and it is not necessary to determine a system delay value that occurs in the hardware area, which is included in the second electronic device 20, through a separate process.

In operation 5305, the second electronic device 20 may measure the distance between the first electronic device 10 and the second electronic device 20. Here, the distance-measuring operation 5305 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods.

In addition, in operation 5307, the first electronic device 10 and the second electronic device 20 may share the measurement result with each other. According to the embodiment of the present disclosure, in the measurement result sharing operation 5307, the second electronic device 20 may feed the distance value between the first electronic device 10 and the second electronic device 20, which has been measured by the second electronic device 20, back to the first electronic device 10.

Finally, in operation 5309, the first electronic device 10 and the second electronic device 20 may execute the function that is intended by the first electronic device 10 and the second electronic device 20. Here, the intended function executing operation 5309 includes an operation of providing the second electronic device 20 with data related to services performed by the first electronic device 10, or an operation of providing the first electronic device 10 with data related to services performed by the second electronic device 20. The intended function executing operation 5309 will be described below in FIGS. 58 to 72.

Figure 54:
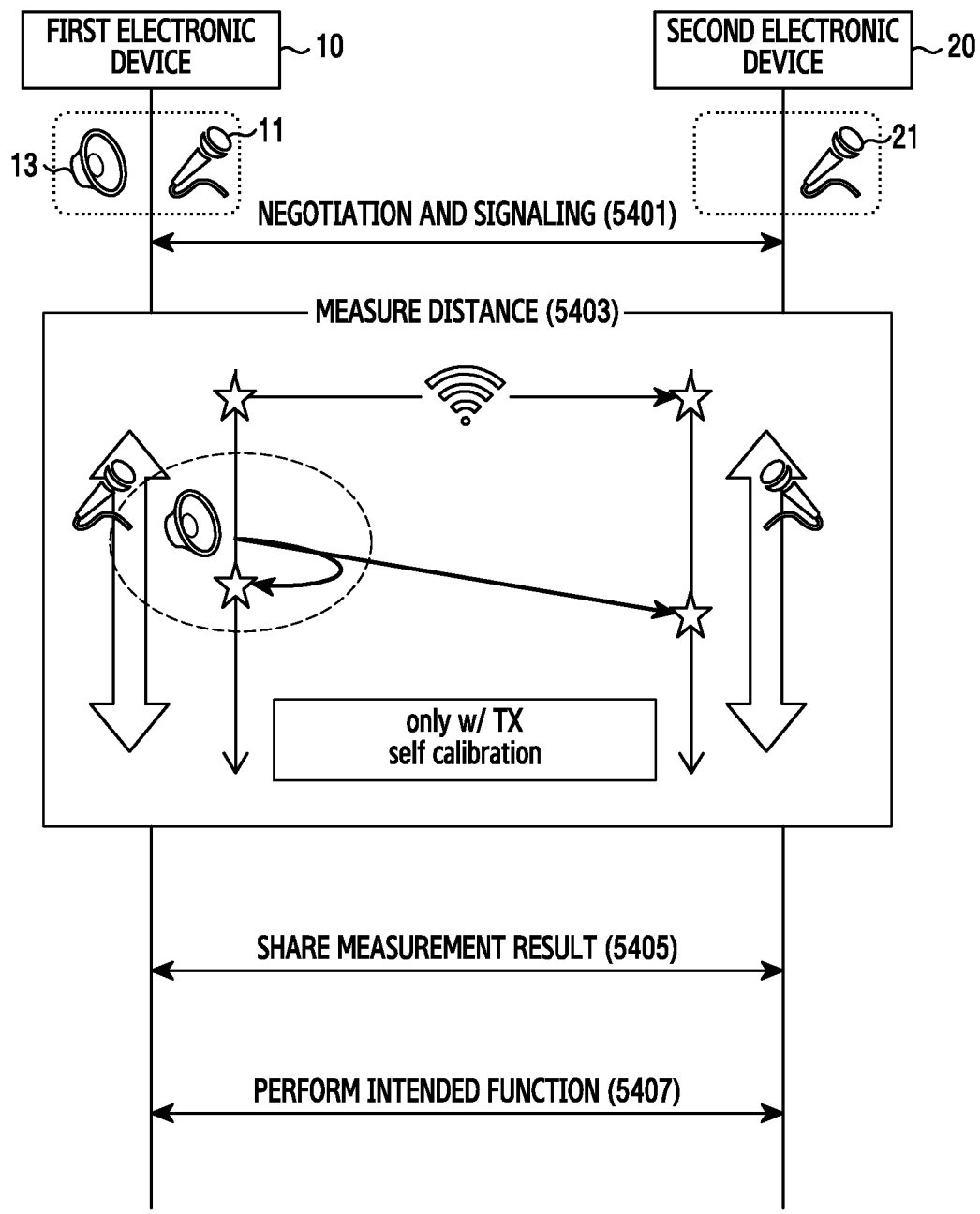
FIG. 54 illustrates a processing flow of a distance measuring method based on a self-calibration operation according to various embodiments of the present disclosure.

FIG. 54 illustrates a processing flow of a distance measuring method based on a self-calibration operation according to various embodiments of the present disclosure.

Referring to FIG. 54, the first electronic device (TX) 10 and the second electronic device (RX) 20 may perform, operation by operation, a negotiation and signalling operation 5401, a distance-measuring operation 5403, a measurement result sharing operation 5405, and an intended function executing operation 5407, respectively. In addition, according to the embodiment of the present disclosure, the first electronic device 10 may include the first speaker 13 and the first speaker 13, and the second electronic device 20 may include the second microphone 21, respectively.

First, the negotiation and signalling operation 5401 may correspond to the negotiation and signalling operation 100 of FIG. 1A. In other words, the negotiation and signalling operation 5401 performed by the first electronic device 10 and the second electronic device 20 includes the operation in which the first electronic device 10 and the second electronic device 20 exchange characteristics.

In an embodiment of the present disclosure, the negotiation and signalling operation 5401 performed by the first electronic device 10 and the second electronic device 20 includes an operation in which the first electronic device 10 transmits distance measurement-related parameters to the second electronic device 20. In an embodiment of the present disclosure, the distance measurement-related parameters may contain at least one of a distance measurement cycle, a distance measurement start offset, the number of available speakers/microphones, the required measurement accuracy, the required distance measurement lead time, the recording time of a sound wave, identifier information of the first electronic device 10, or a generating method of a sound wave.

Referring to FIG. 54, in the case where: the first speaker 13 included in the first electronic device 10 generates the first sound wave, the first microphone 11 included in the first electronic device 10 receives the first sound wave, and the second microphone 21 included in the second electronic device 20 receives the first sound wave in order for the second electronic device 20 to measure the distance between the first electronic device 10 and the second electronic device 20, the second electronic device 20 cannot perform the self-calibration according to the embodiment of the present disclosure, whereas the first electronic device 10 can perform the self-calibration according to the embodiment of the present disclosure.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

According to the embodiment shown in FIG. 54, since the second electronic device 20 includes only the second microphone 21, as a result, the second electronic device 20 cannot perform the self-calibration, and it is necessary to determine a system delay value that occurs in the hardware area, which is included in the second electronic device 20, through a separate process.

However, since the first electronic device 10 includes both the first microphone 11 and the first speaker 13, the first electronic device 10 can perform the self-calibration, according to the embodiment of the present disclosure. It is not necessary to determine a system delay value that occurs in the hardware area, which is included in the first electronic device 10, through a separate process.

In addition, the distance-measuring operation 5403 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods. For example, the distance between the first electronic device 10 and the second electronic device 20 may be determined based on the arrival time difference between a wireless signal and a sound wave.

The measurement result sharing operation 5405 and the intended function executing operation 5407 may be included in the interworking operation 300 shown in FIG. 1B. In various embodiments of the present disclosure, in the measurement result sharing operation 5405, the second electronic device 20 may feed the distance value between the first electronic device 10 and the second electronic device 20, which has been measured by the second electronic device 20, back to the first electronic device 10.

In addition, the intended function executing operation 5407 includes an operation of providing the second electronic device 20 with data related to services performed by the first electronic device 10, or an operation of providing the first electronic device 10 with data related to services performed by the second electronic device 20. The intended function executing operation 5407 will be described below in FIGS. 58 to 72.

Figure 55:
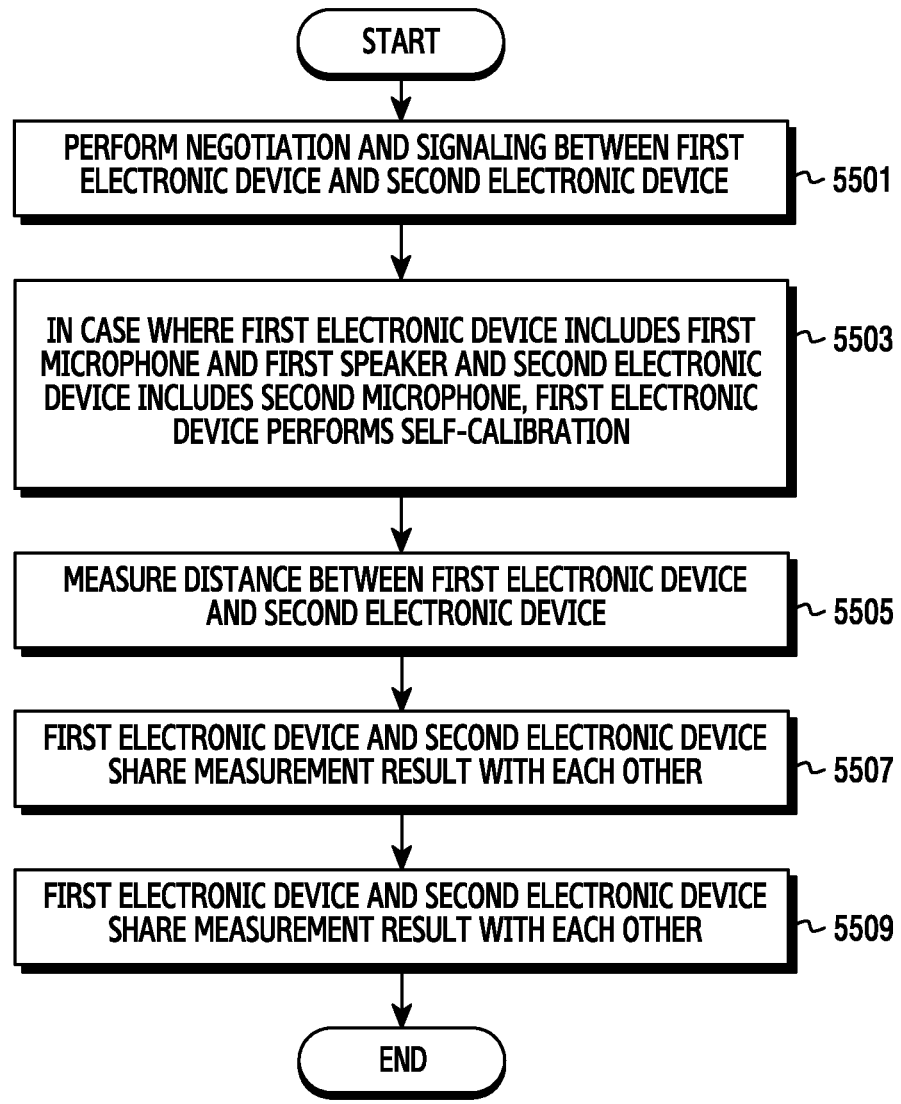
FIG. 55 is a flowchart illustrating a distance-measuring operation of a first electronic device based on a self-calibration operation according to various embodiments of the present disclosure.

FIG. 55 is a flowchart illustrating a distance-measuring operation of a first electronic device based on a self-calibration operation according to various embodiments of the present disclosure.

Referring to FIG. 55, first, in operation 5501, the negotiation and signalling operation between the first electronic device 10 and the second electronic device 20 may be performed. Here, the negotiation and signalling operation 5501 may correspond to the negotiation and signalling operation 100 of FIG. 1A. In other words, the negotiation and signalling operation 5501 performed by the first electronic device 10 and the second electronic device 20 includes the operation in which the first electronic device 10 and the second electronic device 20 exchange the characteristics.

In operation 5503, in the case where the first electronic device 10 includes the first microphone 11 and the first speaker 13 and the second electronic device 20 includes the second microphone 21, the first electronic device 10 may perform the self-calibration.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

According to the embodiment shown in FIG. 54, since the second electronic device 20 includes only the second microphone 21, as a result, the second electronic device 20 cannot perform the self-calibration. It is necessary to determine a system delay value that occurs in the hardware area, which is included in the second electronic device 20, through a separate process.

However, since the first electronic device 10 includes both the first microphone 11 and the first speaker 13, the first electronic device 10 can perform the self-calibration, according to the embodiment of the present disclosure, and it is not necessary to determine a system delay value that occurs in the hardware area, which is included in the first electronic device 10, through a separate process.

In operation 5505, the second electronic device 20 may measure the distance between the first electronic device 10 and the second electronic device 20. Here, the distance-measuring operation 5505 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods.

In addition, in operation 5507, the first electronic device 10 and the second electronic device 20 may share the measurement result with each other. According to the embodiment of the present disclosure, in the measurement result sharing operation 5507, the second electronic device 20 may feed the distance value between the first electronic device 10 and the second electronic device 20, which has been measured by the second electronic device 20, back to the first electronic device 10.

Finally, in operation 5509, the first electronic device 10 and the second electronic device 20 may execute the function that is intended by the first electronic device 10 and the second electronic device 20. Here, the intended function executing operation 5509 includes an operation of providing the second electronic device 20 with data related to services performed by the first electronic device 10, or an operation of providing the first electronic device 10 with data related to services performed by the second electronic device 20. The intended function executing operation 5509 will be described below in FIGS. 58 to 72.

Figure 56:
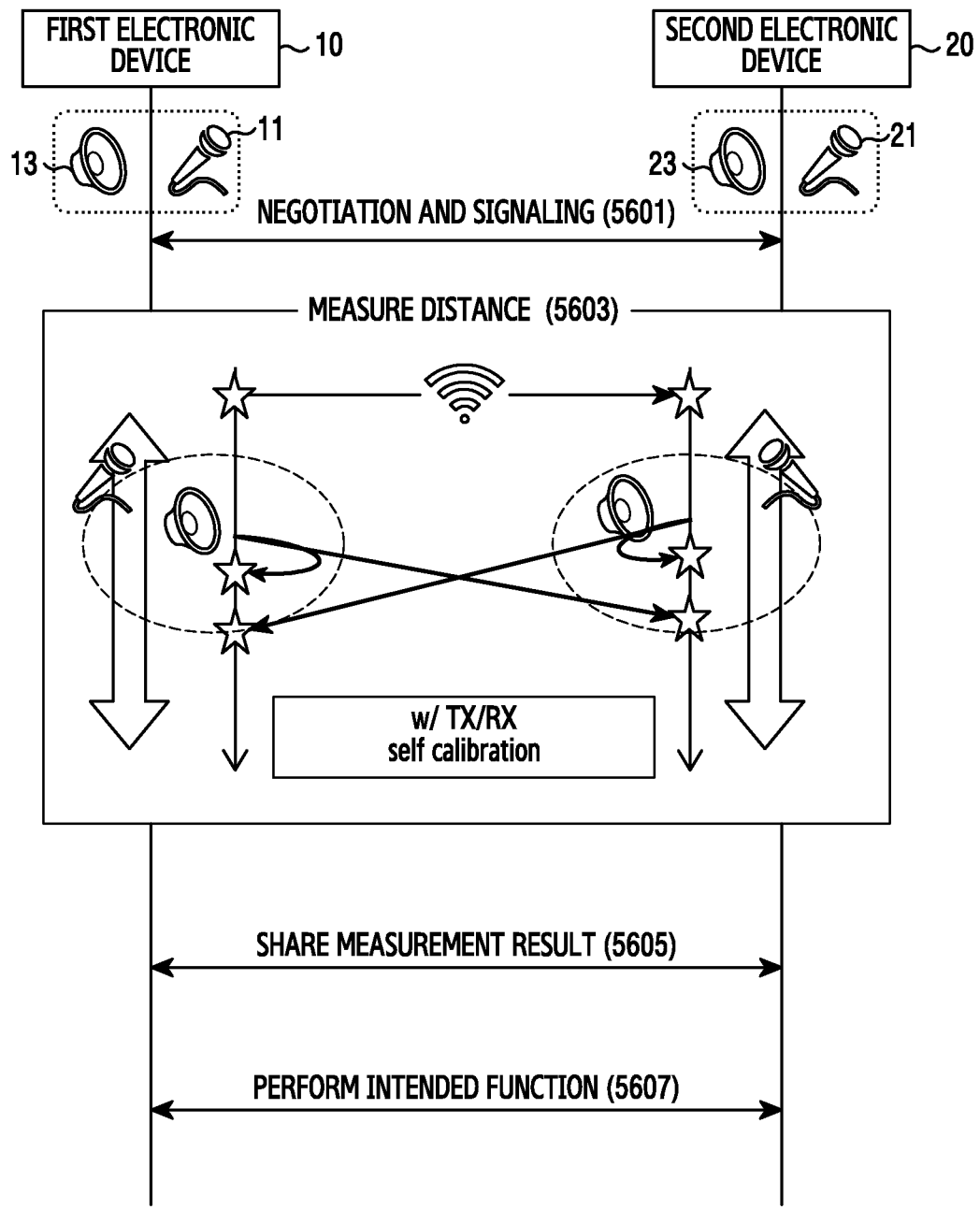
FIG. 56 illustrates a processing flow of a distance measuring method based on a self-calibration operation according to various embodiments of the present disclosure.

FIG. 56 illustrates a processing flow of a distance measuring method based on a self-calibration operation according to various embodiments of the present disclosure.

Referring to FIG. 56, the first electronic device (TX) 10 and the second electronic device (RX) 20 may perform, operation by operation, a negotiation and signalling operation 5601, a distance-measuring operation 5603, a measurement result sharing operation 5605, and an intended function executing operation 5607, respectively. In addition, according to the embodiment of the present disclosure, the first electronic device 10 may include the first microphone 11 and the first speaker 13, and the second electronic device 20 may include the second microphone 21 and the second speaker 23, respectively.

First, the negotiation and signalling operation 5601 may correspond to the negotiation and signalling operation 100 of FIG. 1A. In other words, the negotiation and signalling operation 5401 performed by the first electronic device 10 and the second electronic device 20 includes the operation in which the first electronic device 10 and the second electronic device 20 exchange characteristics.

In an embodiment of the present disclosure, the negotiation and signalling operation 5601 performed by the first electronic device 10 and the second electronic device 20 includes an operation in which the first electronic device 10 transmits distance measurement-related parameters to the second electronic device 20. In an embodiment of the present disclosure, the distance measurement-related parameters may contain at least one of a distance measurement cycle, a distance measurement start offset, the number of available speakers/microphones, the required measurement accuracy, the required distance measurement lead time, the recording time of a sound wave, identifier information of the first electronic device 10, or a generating method of a sound wave.

Referring to FIG. 56, in the case where the first speaker 13 included in the first electronic device 10 generates the first sound wave, the first microphone 11 included in the first electronic device 10 and the second microphone 21 included in the second electronic device 20 receive the first sound wave, and the second speaker 23 included in the second electronic device 20 generates the second sound wave in order for the first electronic device 10 and the second electronic device 20 to measure the distance between the first electronic device 10 and the second electronic device 20, the first electronic device 10 and the second electronic device 20 can perform the self-calibration according to the embodiment of the present disclosure.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

Since the first electronic device 10 includes both the first microphone 11 and the first speaker 13, and the second electronic device 20 includes both the second microphone 21 and the second speaker 23, the first electronic device 10 and the second electronic device 20 can perform the self-calibration, according to the embodiment of the present disclosure, and it is not necessary to determine a system delay value that occurs in the hardware area, which is included in each of the first electronic device 10 and the second electronic device 20, through a separate process.

In addition, the distance-measuring operation 5603 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods. For example, the distance between the first electronic device 10 and the second electronic device 20 may be determined based on the arrival time difference between a wireless signal and a sound wave.

Here, the operation in which the first electronic device 10 and the second electronic device 20 measure the distance between the first electronic device 10 and the second electronic device 20 may be implemented according to the principles described in FIGS. 4A to 46.

The measurement result sharing operation 5605 and the intended function executing operation 5607 may be included in the interworking operation 300 shown in FIG. 1B. In various embodiments of the present disclosure, in the measurement result sharing operation 5605, the second electronic device 20 may feed the distance value between the first electronic device 10 and the second electronic device 20, which has been measured by the second electronic device 20, back to the first electronic device 10, and the first electronic device 10 may feed the distance value between the first electronic device 10 and the second electronic device 20, which has been measured by the first electronic device 10, back to the second electronic device 20.

In addition, the intended function executing operation 5607 includes an operation of providing the second electronic device 20 with data related to services performed by the first electronic device 10, or an operation of providing the first electronic device 10 with data related to services performed by the second electronic device 20. The intended function executing operation 5607 will be described below in FIGS. 58 to 72.

Figure 57:
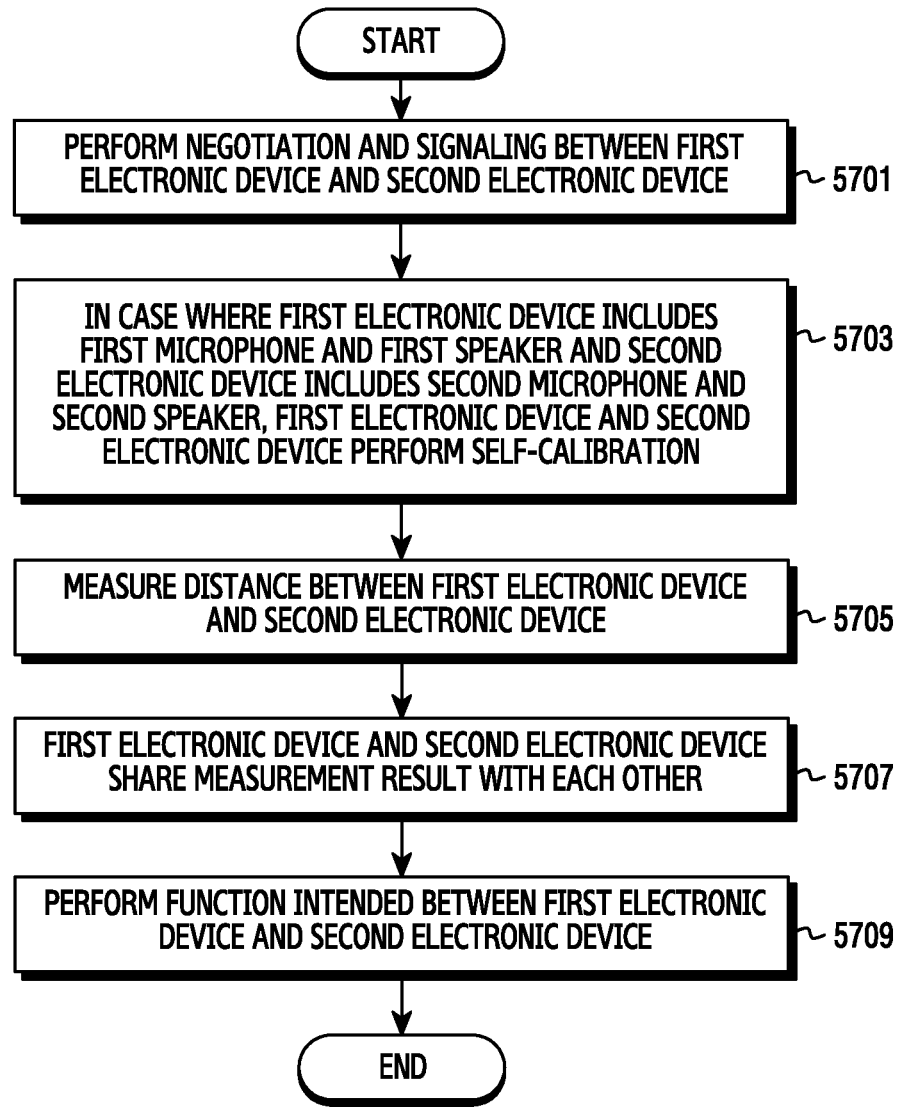
FIG. 57 is a flowchart illustrating a distance-measuring operation of a first electronic device based on a self-calibration operation according to various embodiments of the present disclosure.

FIG. 57 is a flowchart illustrating a distance-measuring operation of a first electronic device based on a self-calibration operation according to various embodiments of the present disclosure.

Referring to FIG. 57, first, in operation 5701, the negotiation and signalling operation between the first electronic device 10 and the second electronic device 20 may be performed. Here, the negotiation and signalling operation 5701 may correspond to the negotiation and signalling operation 100 of FIG. 1A. In other words, the negotiation and signalling operation 5701 performed by the first electronic device 10 and the second electronic device 20 includes the operation in which the first electronic device 10 and the second electronic device 20 exchange characteristics.

In operation 5703, in the case where the first electronic device 10 includes the first microphone 11 and the first speaker 13 and the second electronic device 20 includes the second microphone 21 and the second speaker 23, the first electronic device 10 and the second electronic device 20 may perform the self-calibration.

For example, according to the self-calibration method described in FIGS. 47 to 49, the first electronic device 10 or the second electronic device 20 can perform the self-calibration, respectively, only when the first electronic device 10 or the second electronic device 20 includes one or more speakers and one or more microphones, respectively.

Since the first electronic device 10 includes both the first microphone 11 and the first speaker 13 and the second electronic device 20 includes the second microphone 21 and the second speaker 23, the first electronic device 10 and the second electronic device 20 can perform the self-calibration, according to the embodiment of the present disclosure, and it is not necessary to determine the system delay value that occurs in the hardware area, which is included in each of the first electronic device 10 and the second electronic device 20, through a separate process.

In operation 5705, the first electronic device 10 and the second electronic device 20 may measure the distance between the first electronic device 10 and the second electronic device 20. Here, the distance-measuring operation 5705 may correspond to the distance-measuring operation 200 of FIGS. 1A and 1B. More specifically, the first electronic device 10 and the second electronic device 20 select one of a plurality of measuring methods based on the negotiation result, and measure the distance between the first electronic device 10 and the second electronic device 20 according to the one measuring method that is selected from the plurality of measuring methods.

In addition, in operation 5707, the first electronic device 10 and the second electronic device 20 may share the measurement result with each other. According to the embodiment of the present disclosure, in the measurement result sharing operation 5707, the second electronic device 20 may feed the distance value between the first electronic device 10 and the second electronic device 20, which has been measured by the second electronic device 20, back to the first electronic device 10, and the first electronic device 10 may feed the distance value between the first electronic device 10 and the second electronic device 20, which has been measured by the first electronic device 10, back to the second electronic device 20.

Finally, in operation 5709, the first electronic device 10 and the second electronic device 20 may execute the function that is intended by the first electronic device 10 and the second electronic device 20. Here, the intended function executing operation 5709 includes an operation of providing the second electronic device 20 with data related to services performed by the first electronic device 10, or an operation of providing the first electronic device 10 with data related to services performed by the second electronic device 20. The intended function executing operation 5709 will be described below in FIGS. 58 to 72.

Figure 58:
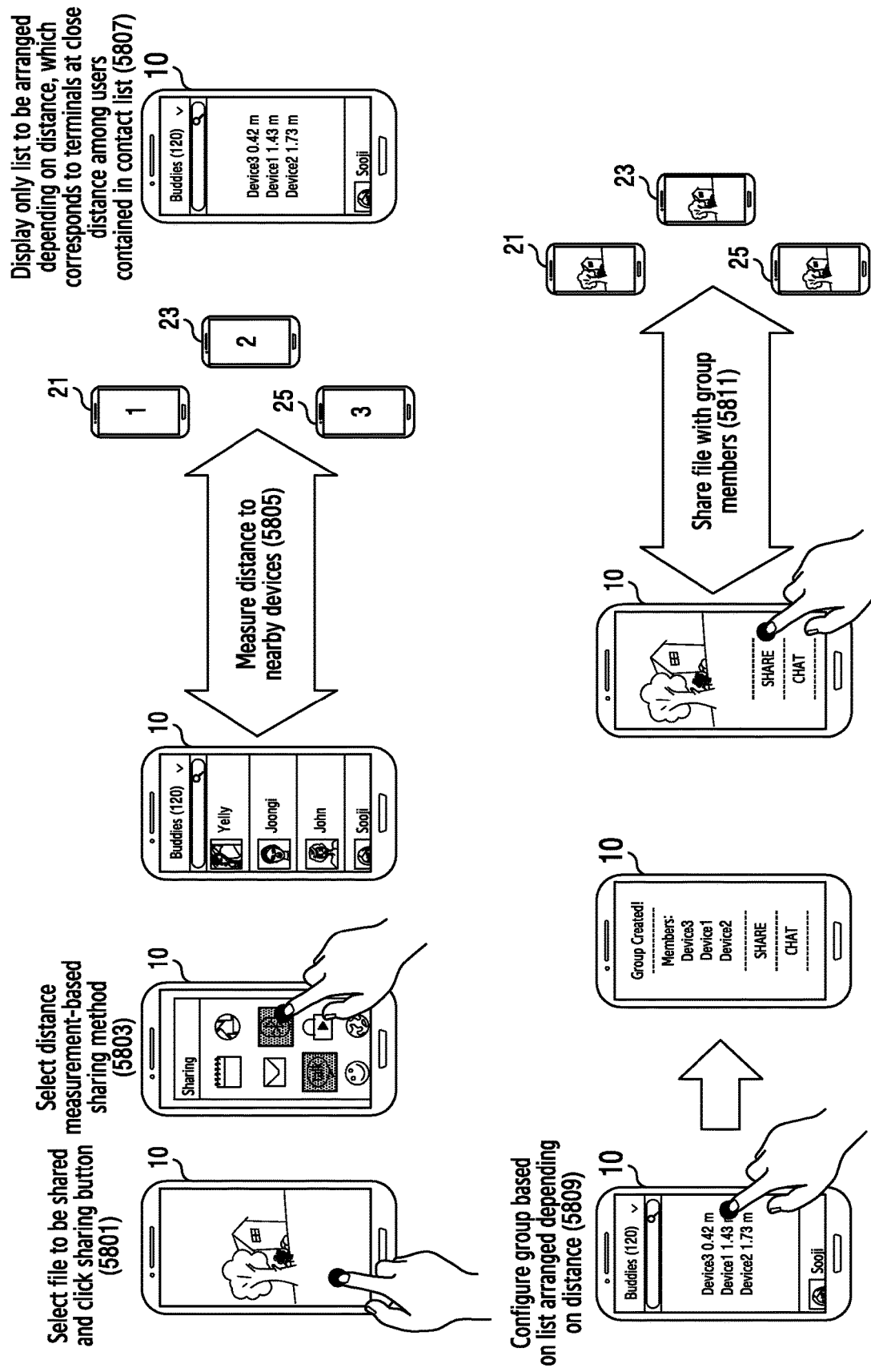
FIGS. 58 to 68 illustrate a first electronic device and a second electronic device interwork with each other based on a distance measurement result that is measured by a distance measuring method, and a processing flow of an interworking operation of a first electronic device according to various embodiments of the present disclosure.

FIG. 58 illustrates a first electronic device and a second electronic device interwork with each other based on a distance measurement result that is measured by a distance measuring method according to various embodiments of the present disclosure.

Referring to FIG. 58, the user of the first electronic device 10 may select a file that the user wishes to share with users of nearby electronic devices, and may click a sharing button that may be displayed on a display of the first electronic device 10 (5801). In addition, the user of the first electronic device 10 may select a distance measurement-based sharing method from among a plurality of sharing methods (5803). The first electronic device 10 may measure the distance to a nearby device by using the distance measurement method (5805). Here the distance measuring method may be determined to be one of a plurality of distance measuring methods that have been described in the FIGS. 1A to 46B.

In addition, the first electronic device 10 may display a contact list that is included in the first electronic device 10, and may arrange the nearby electronic devices, which correspond to the users contained in the list, depending on the distance (5807). For example, the first electronic device 10 may display the third electronic device 25 located 0.42 m away from the first electronic device 10, the first electronic device 21 located 1.43 m away from the first electronic device 10, and the second electronic device 23 located 1.73 m away from the first electronic device 10, in order of the distance closest to the first electronic device 10. In addition, the first electronic device 10 may group the nearby electronic devices that are arranged and displayed, depending on the distance, in the list (5809). The user of the first electronic device 10 may share the file with the members who are contained in the group (5811).

Figure 59:
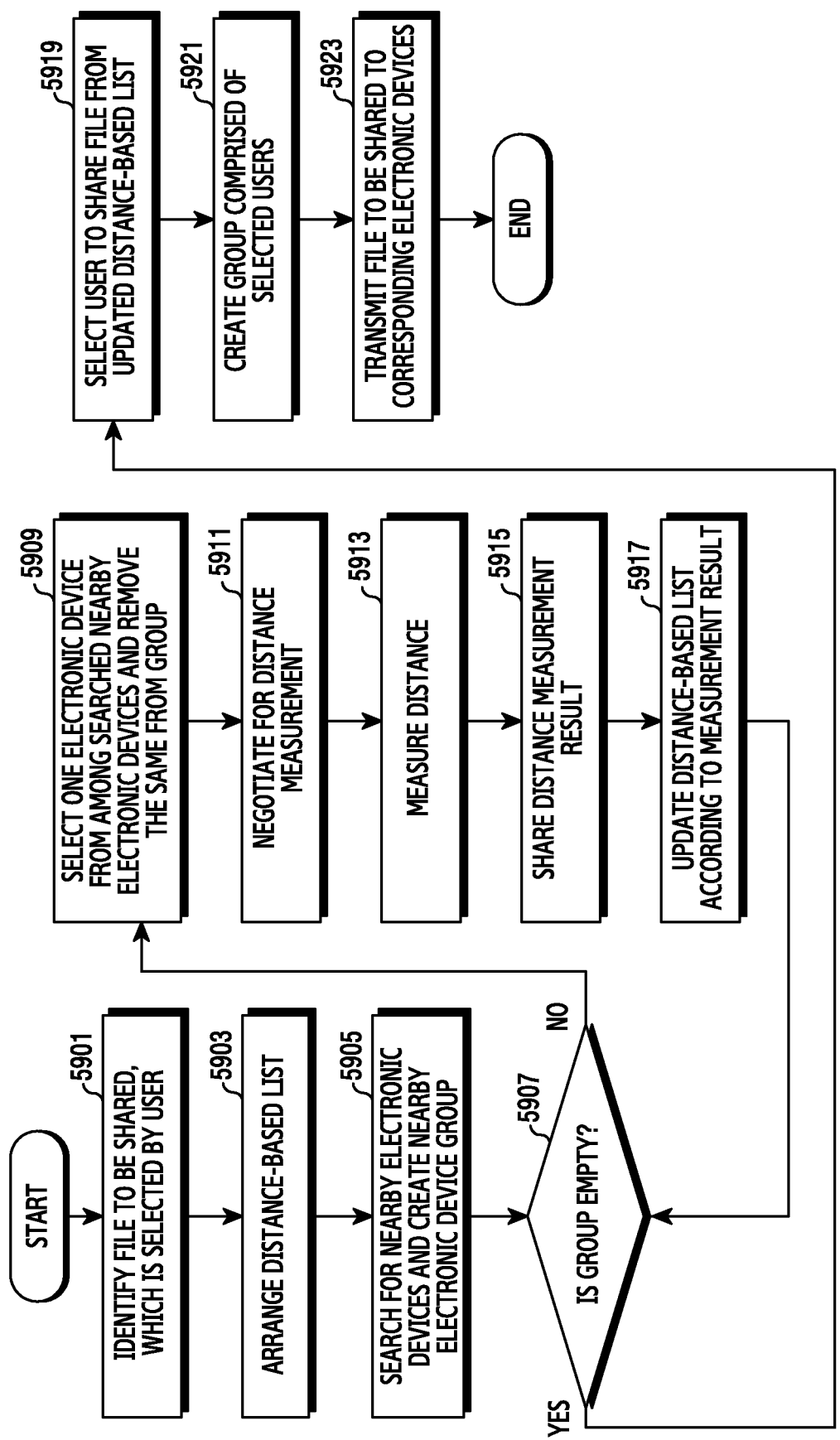

FIG. 59 is a flowchart illustrating an operation of a first electronic device for an interworking operation between a first electronic device and a second electronic device based on a distance measurement result that is measured by a distance measuring method according to embodiments of the present disclosure.

Referring to FIG. 59, first, in operation 5901, the first electronic device 10 identifies a file that is selected by the user, which is to be shared. For example, the user may select the file to be shared through a user interface (UI) that is provided by the first electronic device 10. For example, the selection may be made by clicking a button that is displayed on a display of the first electronic device 10. The button may be displayed while specific content is displayed, or while content is not specified.

In operation 5903, the first electronic device 10 arranges a list based on the distance. For example, the first electronic device 10 displays a list for one or more nearby electronic devices that can share the file, and arranges the one or more nearby electronic devices in the list depending on the distance. The list may contain nearby electronic devices that are located in a specific range of distance from the first electronic device 10.

In addition, in operation 5905, the first electronic device 10 may search for nearby electronic devices in order to thereby create a group of nearby electronic devices. In this case, if a new electronic device is discovered in the course of searching for the nearby electronic devices, the first electronic device 10 may include the same in the group of nearby electronic devices.

In operation 5907, the first electronic device 10 may determine whether the nearby electronic device group is empty. If the nearby electronic device group is not empty, the first electronic device 10 may proceed to operation 5909 to select one electronic device from among the found nearby electronic devices and to then remove the same from the group.

In addition, in operation 5911, the first electronic device 10 may negotiate with the selected nearby electronic device for the distance measurement. The negotiation operation may correspond to the negotiation and signalling operation 100 shown in FIGS. 1A and 1B.

In operation 5913, the first electronic device 10 may perform the distance measurement. Here, the distance measurement may correspond to the distance-measuring operation 200 shown in FIGS. 1A and 1B.

In addition, in operation 5915, the first electronic device 10 may share the distance measurement result with the selected nearby electronic device. The sharing operation may be included in the interworking operation 300 illustrated in FIG. 1B.

In operation 5917, the first electronic device 10 may update the distance-based list based on the distance measurement result. For example, if the distance value is less than a certain specific threshold value, the selected nearby electronic device may be contained in the distance-based list.

In addition, in operation 5907, if the nearby electronic device group is empty, the first electronic device 10 may proceed to operation 5919. Alternatively, the first electronic device 10 may proceed to operation 5919 through operation 5917. In this case, in operation 5919, the first electronic device 10 may select the user to share the file from among the updated distance-based list. For example, the first electronic device 10 may select one or more nearby electronic devices to share the file according to a user's input.

In operation 5921, the first electronic device 10 may create a group that is comprised of the selected users. For example, the first electronic device 10 determines a group that includes one or more nearby electronic devices to share the file.

Finally, in operation 5923, the first electronic device 10 may transmit the file to be shared to the corresponding electronic devices. In other words, the first electronic device 10 transmits the file to the one or more nearby electronic devices. At this time, the first electronic device 10 may transmit the file by using wireless access technology that is different from the wireless access technology that is used for the negotiation, the distance measurement, and the measurement result sharing.

Figure 60:
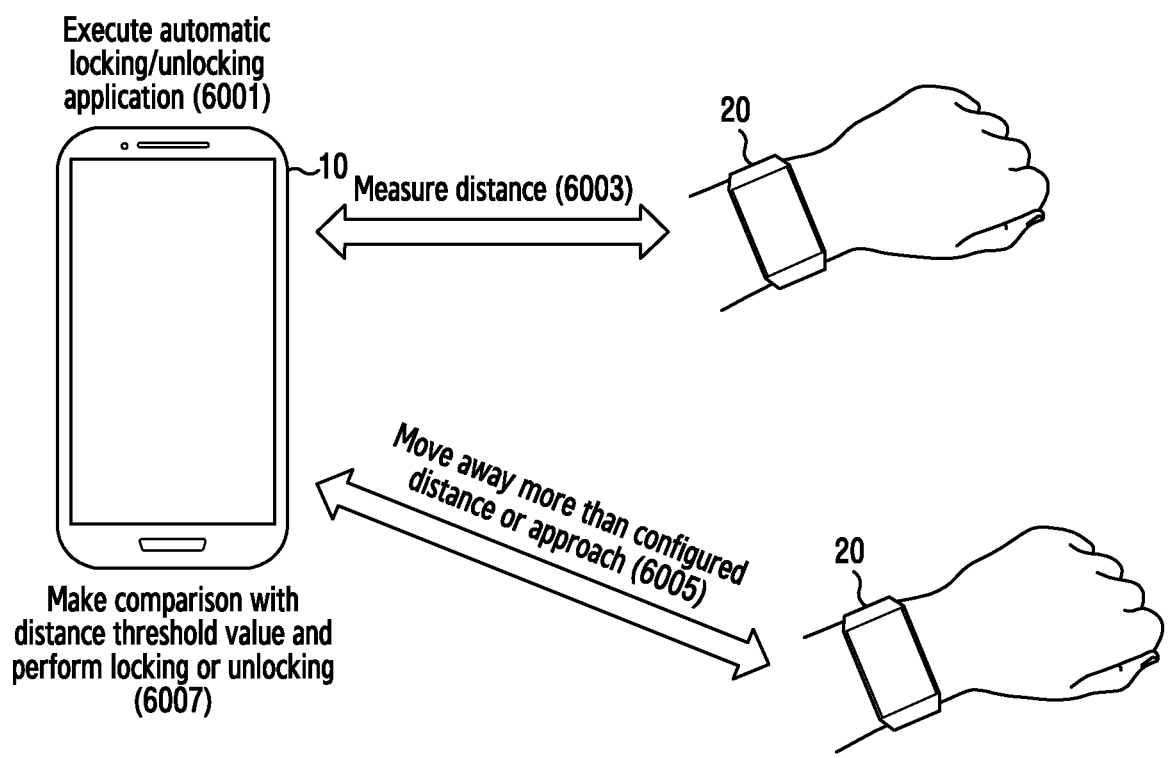

FIG. 60 illustrates a first electronic device and a second electronic device interwork with each other based on a distance measurement result that is measured by a distance measuring method according to various embodiments of the present disclosure.

Referring to FIG. 60, the user of the first electronic device 10 may execute an automatic locking/unlocking application that can be executed by the first electronic device 10 (6001). The automatic locking/unlocking application may deactivate all or some of the functions of the first electronic device 10 without the intervention of the user based on the distance between the first electronic device 10 and the second electronic device 20. The first electronic device 10 may perform the distance measurement with respect to the second electronic device 20 while the application is in progress (6003). In this case, the distance measurement may correspond to the distance-measuring operation 200 of FIGS. 1A and 1B, and may be determined by one of the distance measuring methods described in FIGS. 1A to 46B.

In addition, the second electronic device 20 may move more than a predefined threshold distance value away from the first electronic device 10, or may approach the first electronic device 10 within the predefined threshold distance value (6005). In this case, if the second electronic device 20 moves more than the predefined threshold distance value away from the first electronic device 10, the first electronic device 10 may determine that the user of the first electronic device 10 does not possess the second electronic device 20, and may switch to the locked state (6007).

On the contrary, if the second electronic device 20 approaches the first electronic device 10 within the predefined threshold distance value, the first electronic device 10 may determine that the user of the first electronic device 10 possesses the second electronic device, and may switch to the unlocked state (6007).

Figure 61:
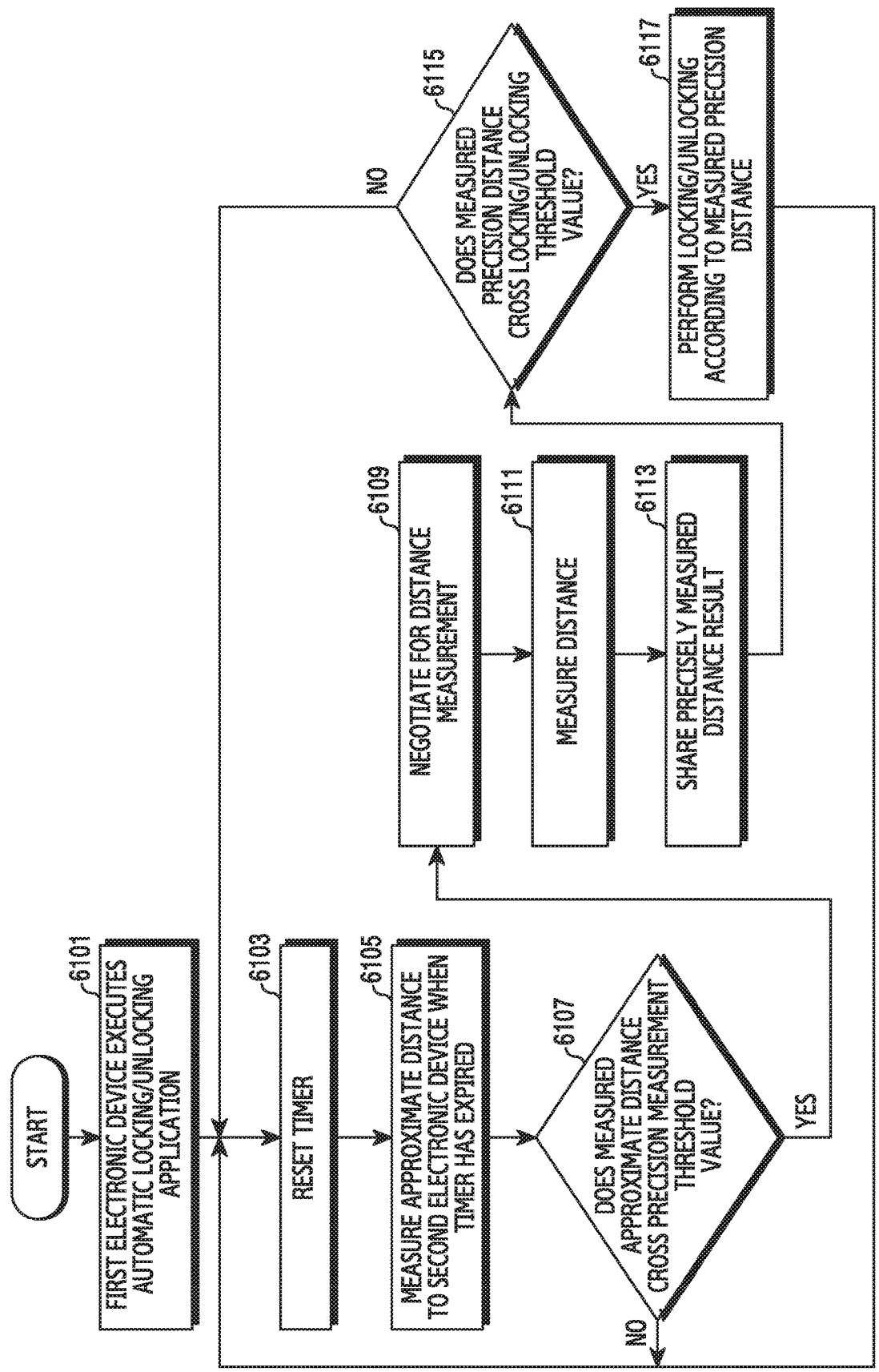

FIG. 61 is a flowchart illustrating an operation of a first electronic device for an interworking operation between a first electronic device and a second electronic device based on a distance measurement result that is measured by a distance measuring method according to various embodiments of the present disclosure.

Referring to FIG. 61, first, in operation 6101, the first electronic device 10 may execute an automatic locking/unlocking application. The automatic locking/unlocking application may deactivate all or some of the functions of the first electronic device 10 without the intervention of the user based on the distance between the first electronic device 10 and the second electronic device 20.

In addition, in operation 6103, the first electronic device 10 may reset a timer that is included in the first electronic device 10. The timer may be used in order to repeat operations 6105 to 6117 according to a constant cycle. According to this, the first electronic device 10 waits until the timer expires without proceeding to the following operation 6105.

In operation 6105, when the timer has expired, the first electronic device 10 may measure the approximate distance to the second electronic device 20. For example, the first electronic device 10 may measure the approximate distance by using the BLE. For example, the first electronic device 10 may determine the approximate distance based on the signal strength.

In addition, in operation 6107, the first electronic device 10 may determine whether the measured approximate distance crosses a precision measurement threshold value. The crossing of the threshold indicates that the dimensional relationship of the threshold value and the distance changes compared to before. For example, if the measured distance exceeds the threshold value prior to performing operation 6107, but the approximate distance is less than the threshold value as a result of the determination in operation 6107, the first electronic device 10 may determine that the measured approximate distance has been crossed. If the measured approximate distance crosses the precision measurement threshold value, the first electronic device 10 proceeds to operation 6109 in order to thereby perform the precision distance measurement to the second electronic device 20.

In operation 6109, the first electronic device 10 may perform the negotiation for the distance measurement. The negotiation operation may correspond to the negotiation and signalling operation 100 shown in FIGS. 1A and 1B.

In operation 6111, the first electronic device 10 may perform the distance measurement with respect to the second electronic device 20. Here, the distance measurement may correspond to the distance measurement operation 200 illustrated in FIGS. 1A and 1B.

In addition, in operation 6113, the first electronic device 10 may share the precisely measured distance measurement result with the second electronic device 20. The sharing operation may be included in the interlocking operation 300 shown in FIG. 1B.

In operation 6115, the first electronic device 10 may determine whether the measured precision distance crosses a locking/unlocking threshold value. At this time, if the precision distance does not cross the threshold value, the first electronic device 10 determines that the current locked/unlocked state does not need to be changed, and returns to operation 6103.

On the contrary, if the precise distance crosses the threshold value, the first electronic device 10 performs the locking or unlocking according to the measured precision distance in operation 6117. For example, if the precision distance crosses the threshold value while exceeding the threshold value, the first electronic device 10 switches from the unlocked state to the locked state (that is, all or some of the functions are deactivated). If the precision distance crosses the threshold value while it is less than the threshold value, the first electronic device 10 switches from the locked state to the unlocked state (that is, all or some of the functions are activated).

If the measured precision distance is equal to, or more than, the locking/unlocking threshold value in operation 6115, or if the measured approximate distance is equal to, or more than, the precision measurement threshold value, the first electronic device 10 may proceed to operation 6103 in order to thereby reset the timer.

Figure 62:
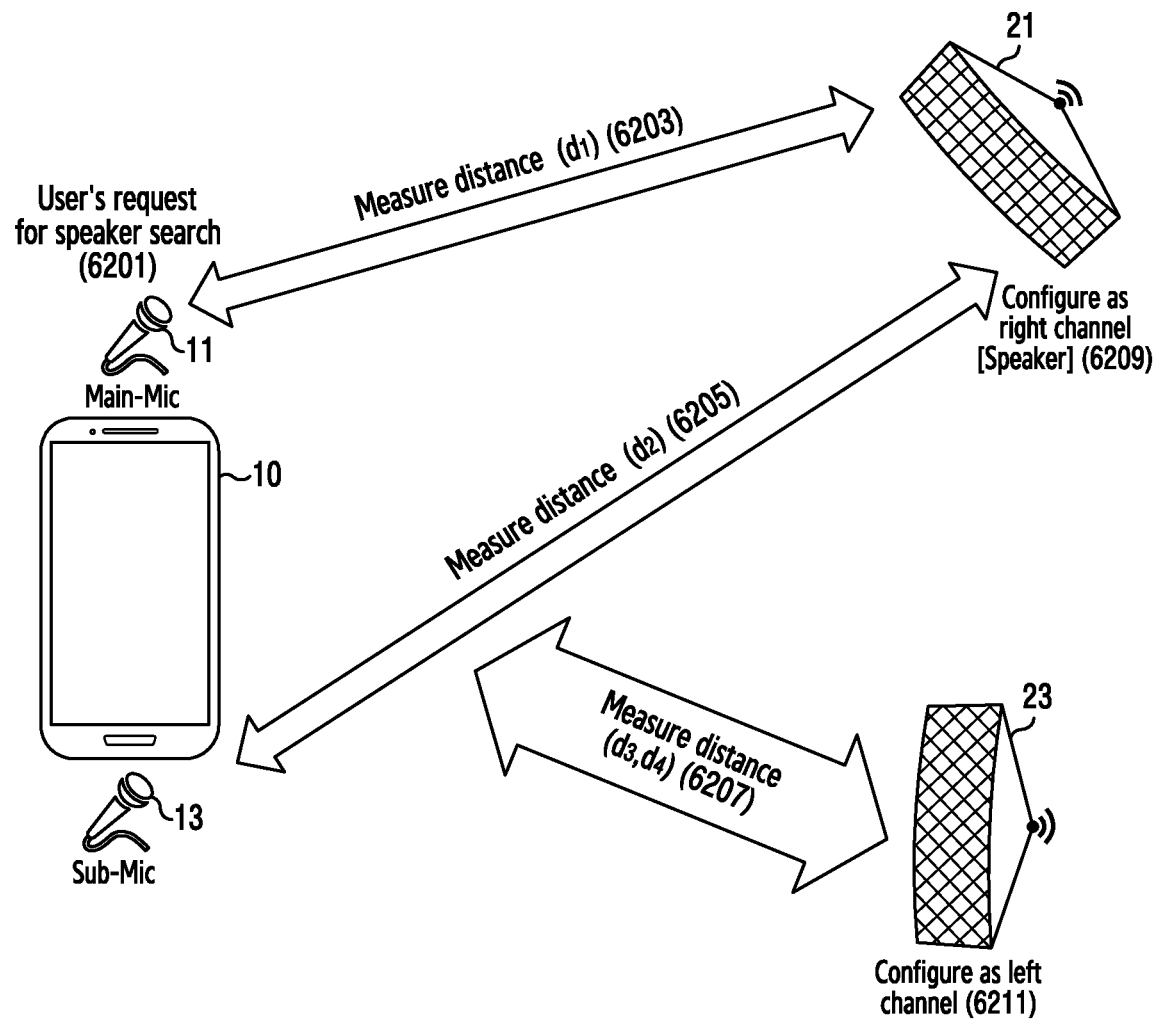

FIG. 62 illustrates a first electronic device and a second electronic device interwork with each other based on a distance measurement result that is measured by a distance measuring method according to various embodiments of the present disclosure. FIG. 62 illustrates the operation of allocating channels to the speakers by using the distance measurement result, according to the embodiment of the present disclosure.

Referring to FIG. 62, the user of the first electronic device 10 may make a request to the first electronic device 10 for a speaker search (6201). In response thereto, the first electronic device 10 and the first speaker 21 may start the distance measurement according to at least one method among the distance measurement methods described in FIGS. 1A to 15 (6203 and 6205).

Here, the first electronic device 10 may include the first microphone 11 and the second microphone 13. However, this is only an example, and, in some cases, three or more microphones may be included. More specifically, the first electronic device 10 may measure the distance $d_1$ between the first microphone 11 and the first speaker 21 (6203), and may measure the distance $d_2$ between the second microphone 13 and the first speaker 21 (6205). Finally, the first electronic device 10 may determine the distance between the first electronic device 10 and the first speaker 21, and the direction (e.g., angle) of the first speaker 21 with respect to the first electronic device 10, based on the value $d_1$ and the value $d_2$. At this time, the first electronic device 10 determines, based on the direction, that the first speaker 21 is positioned relative on the right side. According to this, the first electronic device 10 may configure the first speaker 21 to be a right channel (6209).

Similarly, the first electronic device 10 may measure the distance $d_3$ between the first microphone 11 and the second speaker 23, and may measure the distance $d_4$ between the second microphone 13 and the second speaker 23 (6207). Finally, the first electronic device 10 may determine the distance between the first electronic device 10 and the second speaker 23, and the direction of the second speaker 23 with respect to the first electronic device 10, based on the value $d_3$ and the value $d_4$. At this time, the first electronic device 10 determines, based on the direction, that the second speaker 23 is positioned relative on the left side. According to this, the first electronic device 10 may configure the second speaker 23 to be a left channel (6211).

Figure 63:
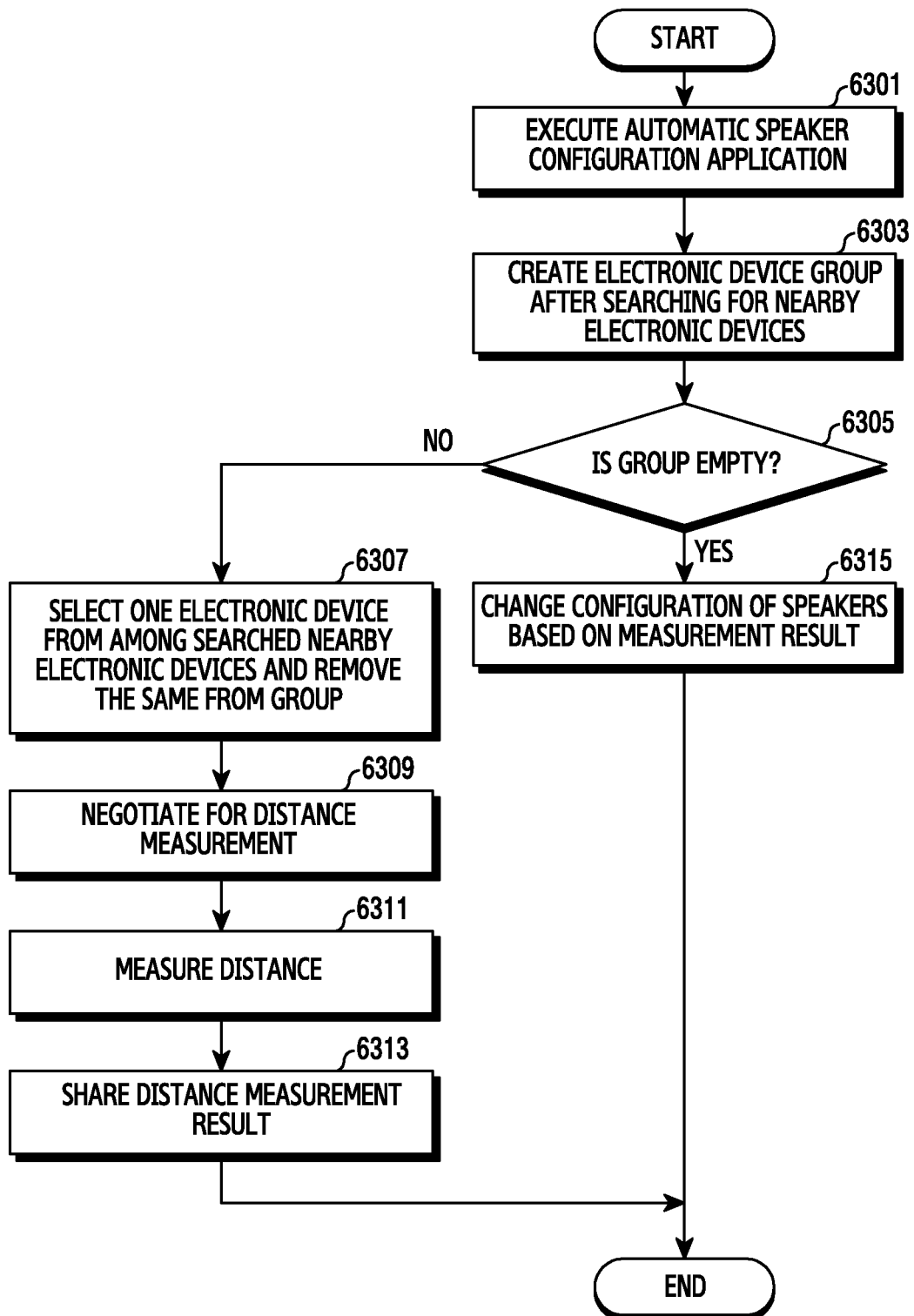

FIG. 63 is a flowchart illustrating an operation of a first electronic device for an interworking operation between a first electronic device and a second electronic device based on a distance measurement result that is measured by a distance measuring method according to various embodiments of the present disclosure.

Referring to FIG. 63, first, in operation 6301, the user of the first electronic device 10 may execute an automatic speaker configuration application. The automatic speaker configuration application provides a function of allocating channels to the speakers based on the distance and direction measurement result by using sound signals or wireless signals.

In operation 6303, the first electronic device 10 may search for nearby electronic devices in order to thereby create a group of nearby electronic devices. In this case, if a new electronic device is discovered in the course of searching for the nearby electronic devices, the first electronic device 10 may include the same in the group of nearby electronic devices, and, according to the embodiment of the present disclosure, the nearby electronic device may include speaker devices.

In addition, in operation 6305, the first electronic device 10 may determine whether the nearby electronic device group is empty. If the nearby electronic device group is not empty, the first electronic device 10 may proceed to operation 6307 to select one electronic device from among the found nearby electronic devices and to then remove the same from the group.

In operation 6309, the first electronic device 10 may perform the negotiation for the distance measurement. The negotiation operation may correspond to the negotiation and signalling operation 100 shown in FIGS. 1A and 1B.

In operation 6311, the first electronic device 10 may perform the distance measurement. Here, the distance measurement may correspond to the distance measurement operation 200 illustrated in FIGS. 1A and 1B.

In addition, in operation 6313, the first electronic device 10 may share the distance measurement result. The sharing operation may be included in the interlocking operation 300 shown in FIG. 1B. The first electronic device 10 may proceed to operation 6305 in order to thereby determine whether the nearby electronic device group is empty again.

Here, if the nearby electronic device group is empty, the first electronic device 10 may proceed to operation 6315 to change the configuration of the speakers based on the measurement result. For example, as described in FIG. 62, the first electronic device 10 may determine the channels of the speakers based on the distance information of the speakers and the direction information of the speakers with respect to the first electronic device 10.

Figure 64:
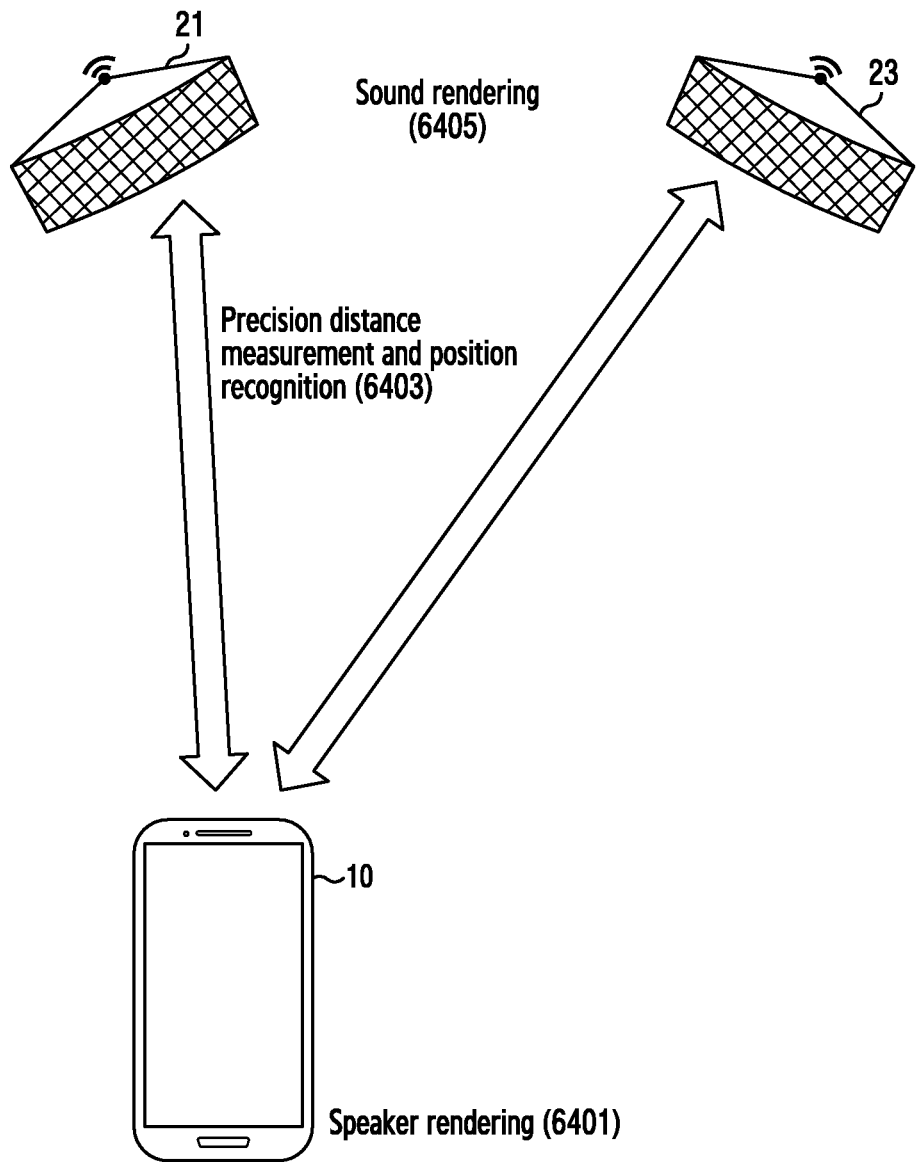

FIG. 64 illustrates a first electronic device and a second electronic device interwork with each other based on a distance measurement result that is measured by a distance measuring method according to various embodiments of the present disclosure.

Referring to FIG. 64, the user of the first electronic device 10 may execute a speaker sound field rendering application that is executable in the first electronic device 10 (6401). The user may form an optimal listening point at the current position by adjusting the sound waves or the sound fields of the sound waves that are generated by the speakers through the application.

When the speaker sound field rendering application is executed, the first electronic device 10 may perform the precision distance measurement to the first speaker 21 and to the second speaker 23 based on the distance measurement method according to the description in FIGS. 1A to 46B, and the first electronic device 10 may determine the direction or position of the first speaker 21 or the second speaker 23 with respect to the first electronic device 10 based on the distance measurement method (6403).

In addition, the first electronic device 10 may make a control to adjust the volume and direction of a sound or a sound wave that is generated from the first speaker 21, and may make a control to adjust the volume and direction of a sound or a sound wave that is generated from the second speaker 23 in order to thereby complete the sound rendering (6405).

Figure 65:
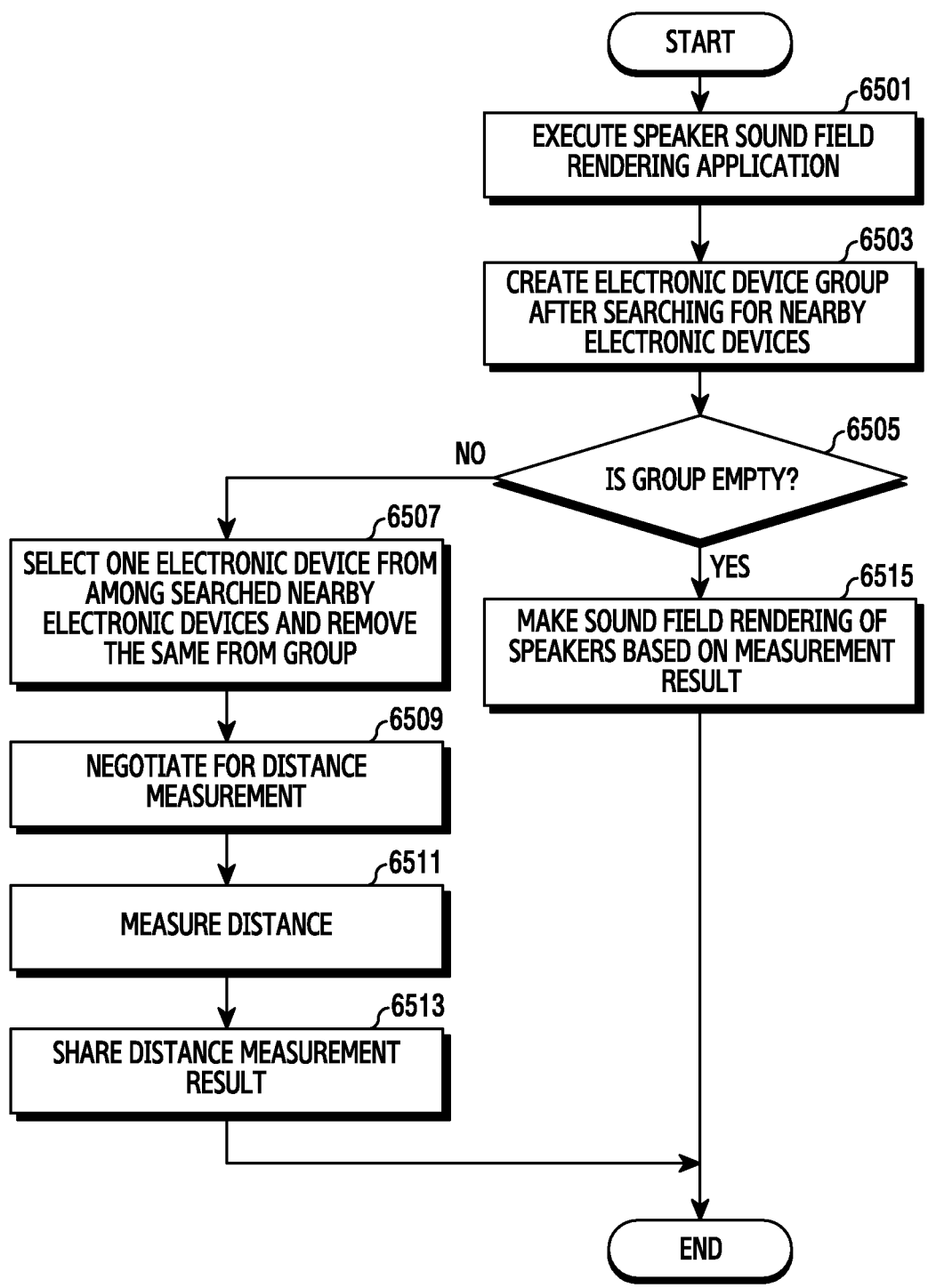

FIG. 65 is a flowchart illustrating an operation of a first electronic device for an interworking operation between a first electronic device and a second electronic device based on a distance measurement result that is measured by a distance measuring method according to various embodiments of the present disclosure.

Referring to FIG. 65, first, in operation 6501, the user of the first electronic device 10 may execute a speaker sound field rendering application. The user may form an optimal listening point at the current position by adjusting the sound waves or the sound fields of the sound waves that are generated by the speakers through the application.

In operation 6503, the first electronic device 10 may search for nearby electronic devices in order to thereby create a group of nearby electronic devices. In this case, if a new electronic device is discovered in the course of searching for the nearby electronic devices, the first electronic device 10 may include the same in the group of nearby electronic devices, and, according to the embodiment of the present disclosure, the nearby electronic device may include speaker devices.

In addition, in operation 6505, the first electronic device 10 may determine whether the nearby electronic device group is empty. If the nearby electronic device group is not empty, the first electronic device 10 may proceed to operation 6507 to select one electronic device from among the found nearby electronic devices and to then remove the same from the group.

In addition, in operation 6509, the first electronic device 10 may perform the negotiation for the distance measurement. Here, the negotiation operation may correspond to the negotiation and signalling operation 100 shown in FIGS. 1A and 1B.

In operation 6511, the first electronic device 10 may perform the distance measurement. Here, the distance measurement may correspond to the distance measurement operation 200 illustrated in FIGS. 1A and 1B.

In addition, in operation 6513, the first electronic device 10 may share the distance measurement result. The sharing operation may be included in the interlocking operation 300 shown in FIG. 1B. The first electronic device 10 may proceed to operation 6505 in order to thereby determine whether the nearby electronic device group is empty again.

Here, if the nearby electronic device group is empty, the first electronic device 10 may proceed to operation 6515 to make the rendering of the sound fields of the speakers based on the measurement result. For example, as shown in FIG. 33, the first electronic device 10 may make a control to adjust the volume and direction of a sound or a sound wave that is generated from the first speaker 21, and may make a control to adjust the volume and direction of a sound or a sound wave that is generated from the second speaker 23 in order to thereby complete the sound rendering.

Figure 66:
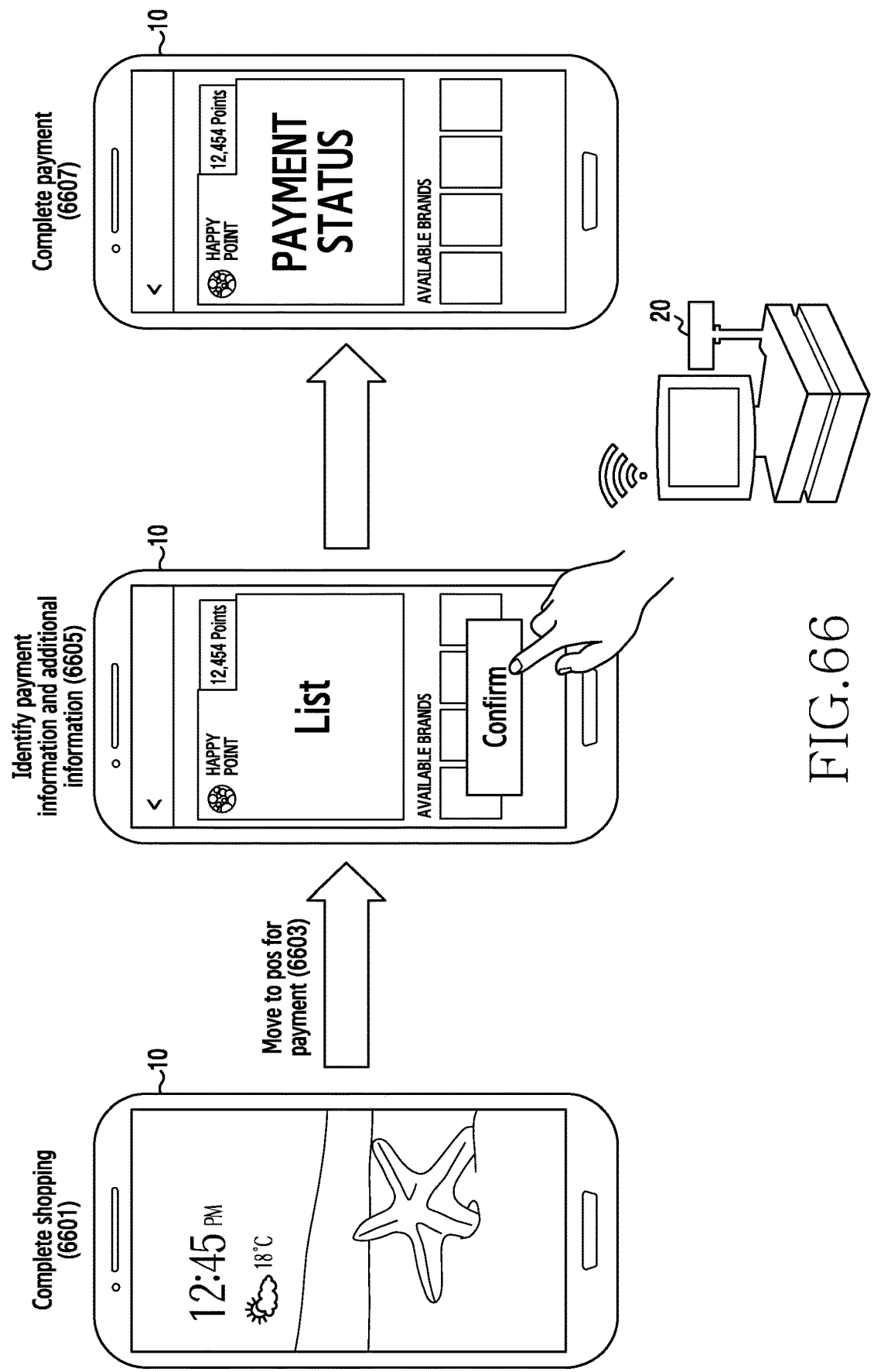

FIG. 66 illustrates a first electronic device and a second electronic device interwork with each other based on a distance measurement result that is measured by a distance measuring method according to various embodiments of the present disclosure.

Referring to FIG. 66, the user of the first electronic device 10 may complete shopping (6601), and may move to the second electronic device 20 for payment (6603). For example, the second electronic device 20 may include a POS (point of sales) system.

Here, the first electronic device 10 or the second electronic device 20 may measure the distance between the first electronic device 10 and the second electronic device 20. In the case where the second electronic device 20 directly measures the distance between the first electronic device 10 and the second electronic device 20 based on the second electronic device 20, the second electronic device 20 may determine whether the distance value is less than a payment start threshold value. If the distance value is less than the payment start threshold value, the second electronic device 20 may provide payment information and additional information to the first electronic device 10 (6605) in order to thereby allow the same to start the payment (6607). In this case, since the payment is induced based on the distance between the first electronic device 10 and the second electronic device 20, there may be an effect of improving the security. For example, in the case where the first electronic device 10 is located a certain distance away from the second electronic device 20, the payment may be prevented against the user's intention in order to thereby further strengthen the security for the payment.

In the case where the first electronic device 10 measures the distance between the first electronic device 10 and the second electronic device 20, the first electronic device 10 may provide the distance value to the second electronic device 20. In addition, as described above, if the distance value is less than the payment start threshold value, the second electronic device 20 may provide payment information and additional information to the first electronic device 10 (6605), and may allow the same to start the payment (6607).

Figure 67:
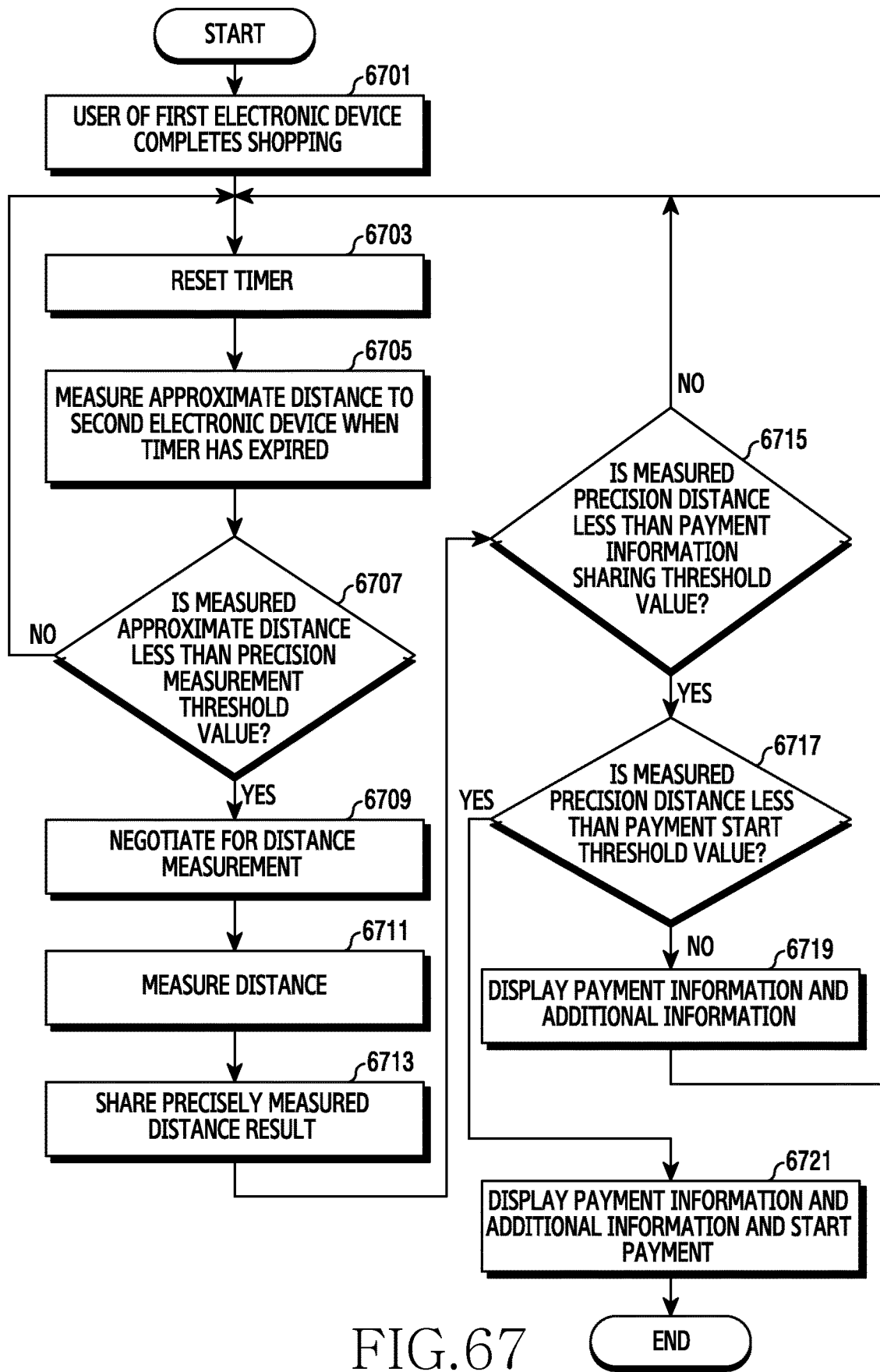

FIG. 67 is a flowchart illustrating an operation of a first electronic device for an interworking operation between a first electronic device and a second electronic device based on a distance measurement result that is measured by a distance measuring method according to various embodiments of the present disclosure.

Referring to FIG. 67, first, in operation 6701, the user of the first electronic device 10 may complete shopping.

In addition, in operation 6703, the first electronic device 10 may reset a timer that is included in the first electronic device 10. The timer may be used to repeat operations 6705 to 6721 according to a specific cycle.

In operation 6705, when the timer has expired, the first electronic device 10 may measure the approximate distance to the second electronic device 20. For example, the second electronic device 20 may include a POS device, and the first electronic device 10 may measure the approximate distance by using the BLE.

In addition, in operation 6707, the first electronic device 10 may determine whether the measured approximate distance is less than a precision measurement threshold value. If the measured approximate distance is less than the precision measurement threshold value, the first electronic device 10 may proceed to operation 6709 in order to thereby perform the precision distance-measuring operation with respect to the second electronic device 20.

For example, in operation 6709, the first electronic device 10 may perform the negotiation for the distance measurement. The negotiation operation may correspond to the negotiation and signalling operation 100 shown in FIGS. 1A and 1B.

In operation 6711, the first electronic device 10 may perform the distance measurement with respect to the second electronic device 20. Here, the distance measurement may correspond to the distance measurement operation 200 illustrated in FIGS. 1A and 1B.

In addition, in operation 6713, the first electronic device 10 may share the precisely measured distance measurement result with the second electronic device 20. The sharing operation may be included in the interlocking operation 300 shown in FIG. 1B.

In operation 6715, the first electronic device 10 may determine whether the measured precision distance is less than a payment information sharing threshold value. If the measured precision distance is less than the payment information sharing threshold value, the first electronic device 10 may proceed to operation 6717 in order to thereby determine whether the measured precision distance is less than the payment start threshold value. If the measured precision distance is less than the payment start threshold value, the first electronic device 10 may proceed to operation 6721 in which the user of the first electronic device 10 may be provided with the payment information and the additional information from the second electronic device 20. The user of the first electronic device 10 may start the payment by using the payment information and the additional information.

If the measured precision distance is not less than the payment start threshold value, the first electronic device 10 may proceed to operation 6719 in which the user of the first electronic device 10 may be provided with the payment information and the additional information from the second electronic device 20, but in which the payment is not actually conducted. Afterwards, the first electronic device 10 proceeds to operation 6703 in order to thereby reset the timer. As described above, since the payment is induced based on the distance between the first electronic device 10 and the second electronic device 20, there may be an effect of improving the security. For example, in the case where the first electronic device 10 is located a specific distance away from the second electronic device 20, the payment against the user's intention may be prevented in order to thereby further strengthen the security for the payment.

In addition, if the measured approximate distance is equal to, or more than, the precision measurement threshold value in operation 6707, or if the measured precision distance is equal to, or more than, the payment information sharing threshold value, the first electronic device 10 proceeds to operation 6703 in order to thereby reset the timer.

Figure 68:
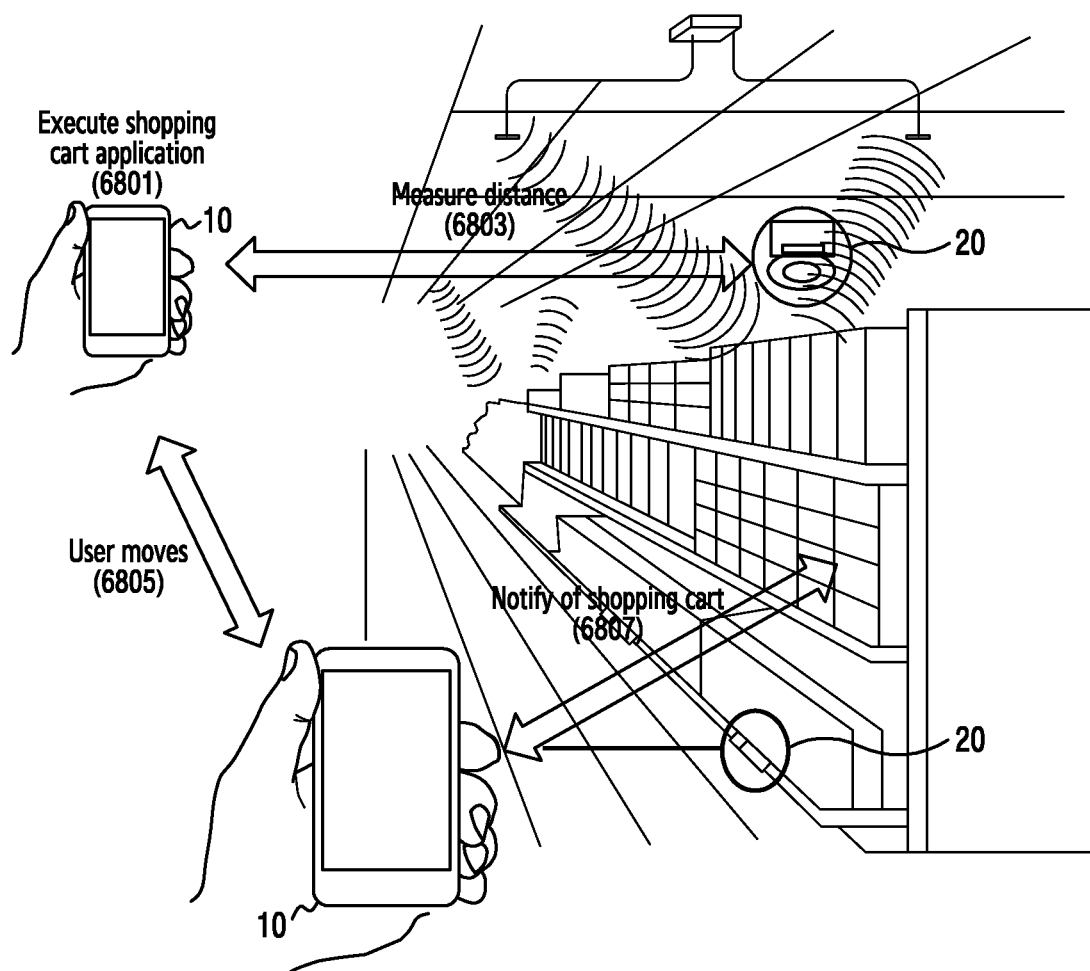

FIG. 68 illustrates a first electronic device and a second electronic device interwork with each other based on a distance measurement result that is measured by a distance measuring method according to various embodiments of the present disclosure.

Referring to FIG. 68, the user of the first electronic device may execute a shopping cart application of the first electronic device 10 (6801). The second electronic device 20 that is installed in each showcase of the store and the first electronic device 10 may periodically measure the distance (6803). More particularly, as the user moves (6805), the distance between the first electronic device 10 and the second electronic device 20 will vary. The second electronic device 20 determines whether the user approaches the product that is contained in the shopping cart, and if the user is close to the product that is contained in the shopping cart, the second electronic device 20 generates a notification (6807). This embodiment corresponds to an example in which the optimal advertisement may be provided based on the distance measurement result between the first electronic device 10 and the second electronic device 20 installed in the store.

Figure 69:
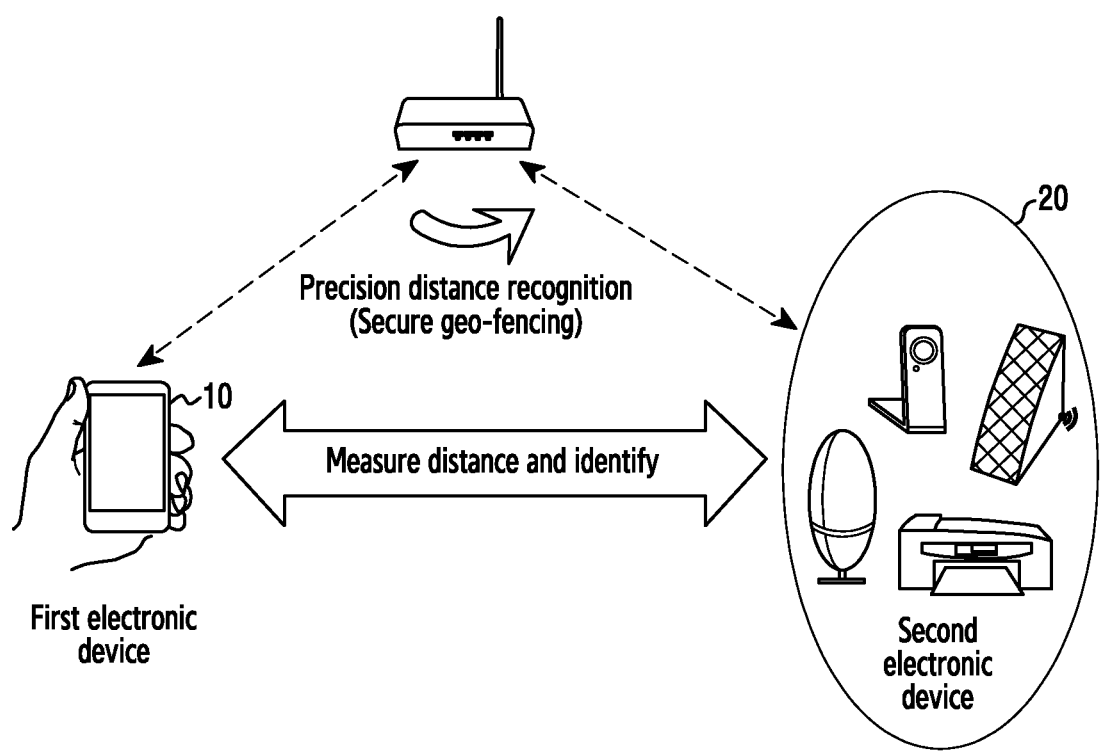
FIG. 69 illustrates an access point (AP) connection based on a distance measuring method according to various embodiments of the present disclosure.

FIG. 69 illustrates an access point (AP) connection based on a distance measuring method according to various embodiments of the present disclosure.

Referring to FIG. 69, the second electronic device 20 may be in the power-on state. The second electronic device 20 may not adopt the UI. The second electronic device 20 may search for electronic devices that are located within a distance of a threshold value by using the distance measuring method, according to various embodiments. It is assumed that the first electronic device 10 is within the threshold value of the second electronic device 20.

The second electronic device 20 may search for the first electronic device 10. The second electronic device 20 may transmit a wireless signal to the first electronic device 10. The first electronic device 10 may receive the wireless signal from the second electronic device 20. The second electronic device 20 may have a connection with the first electronic device. The connection may be made automatically. According to the connection with the second electronic device 20, a screen for inputting a personal identification number (PIN) code may be displayed on the user screen of the first electronic device 10. When the user of the first electronic device 10 inputs a PIN code, information related to an AP that the first electronic device 10 adopts may be transmitted to the second electronic device 20. For example, the first electronic device 10 may transmit the AP information to the second electronic device 20 through the input of the PIN code. The AP information may be used in order to exactly recognize the peripheral position of the second electronic device 20.

The second electronic device 20 may receive the AP information. The second electronic device 20 may recognize the surrounding environment or conditions of the second electronic device 20 by using the AP information. Since only the environment within the threshold value is considered, the second electronic device 20 may recognize the wireless connection status more accurately and quickly through the AP information. The second electronic device 20 may automatically configure the wireless connection through the recognized status.

Figure 70:
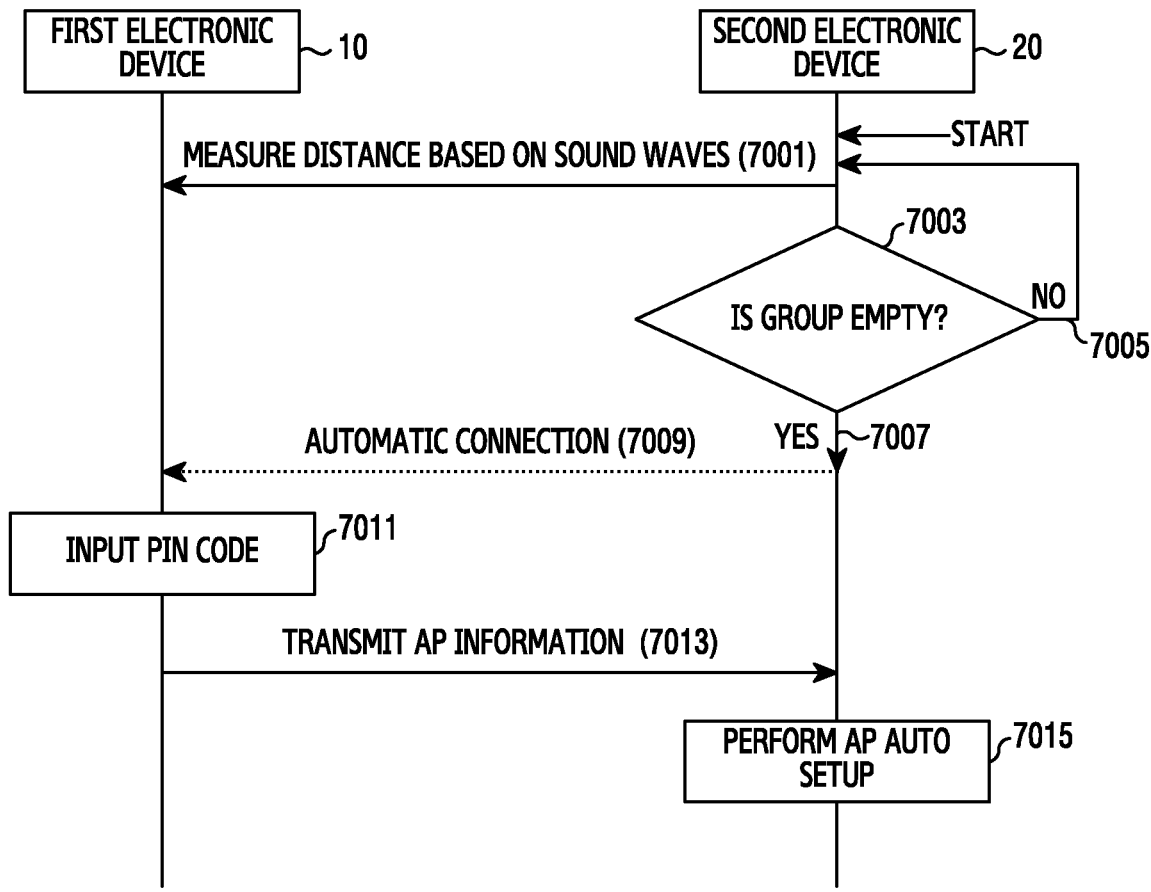
FIG. 70 is a flowchart illustrating an AP connection based on a distance measuring method according to various embodiments of the present disclosure.

FIG. 70 is a flowchart illustrating an AP connection based on a distance measuring method according to various embodiments of the present disclosure.

Referring to FIG. 70, in operation 7001, the second electronic device 20 may measure the distance based on sound waves. Although the second electronic device 20 is illustrated to perform the transmission with respect only to the first electronic device 10 in FIG. 70, the embodiment is not limited thereto. The second electronic device 20 may measure the distance with respect to other electronic devices as well as the first electronic device. The operation of measuring the distance with respect to a plurality of devices has been described in FIGS. 41A to 46B. The second electronic device 20 may measure the distance to the first electronic device 10 by using a certain value. In this case, the second electronic device 20 may be the first electronic device 10 of FIGS. 4A and 4B.

In operation 7003, the second electronic device 20 may determine whether a group is empty. The group may include at least one device. A distance between the second electronic device 20 and one of the at least one device is smaller than a threshold value. The second electronic device 20 may determine whether the distance between the first electronic device 10 and the second electronic device 20 is within the threshold value. The threshold value may be a certain value in the second electronic device 20. The threshold value may be randomly configured in the second electronic device 20. The second electronic device 20 may be provided with the geo-fencing effect by using the threshold value. The geo-fencing refers to technology of providing information when an object enters a specific area that is set up. In the case of using a sound wave, the second electronic device 20 may determine an appropriate threshold value in consideration of the properties in which a sound wave is diffracted and in which a sound wave is weakly transmitted from the enclosed space to the outside.

In operation 7005, if the second electronic device 20 has failed to search for the electronic device within the threshold value, the second electronic device 20 may return to the first operation. For example, the second electronic device 20 may search for nearby devices again. At this time, the devices to be searched for may be different from the first electronic device 10 that has been searched for at the beginning.

In operation 7007, if the second electronic device 20 has searched for the first electronic device 10 within the threshold value, the second electronic device 20 may establish a connection with the first electronic device 10 in operation 7009. In order to trigger the connection, for example, the second electronic device 20 may transmit a separate wireless signal to the first electronic device. As another example, the second electronic device 20 may receive a separate wireless signal from the first electronic device 10. As another example, the second electronic device 20 may transmit a signal for the connection to the first electronic device 10 in advance in operation 7001. The second electronic device 20 may be configured to be automatically connected with the first electronic device 10 after a specific period of time according to a rule specified by the first electronic device 10 and the second electronic device 20.

The first electronic device 10 may be provided with a screen for inputting a PIN code corresponding to the second electronic device 20 based on the connection. The PIN code may trigger the transmission of AP connection information of the first electronic device 10 to the second electronic device 20. In operation 7011, the first electronic device 10 may input the PIN code.

In operation 7013, the first electronic device 10 may transmit the AP information to the second electronic device 20 in response to the PIN code input. The AP information may contain the signal strength of nearby APs, the transmission/reception direction information of the signal, and the channel information of each AP.

In operation 7015, the second electronic device 20 may configure the AP auto-setup in response to the reception of the AP information. The second electronic device 20 may determine the state of the second electronic device 20 within the threshold value in response to the reception of the AP information. The state may include physical limitations (for example, a wall or an enclosed space) and the channel state. The second electronic device 20 may establish a connection with the AP desired to be connected, based on the state.

Figure 71:
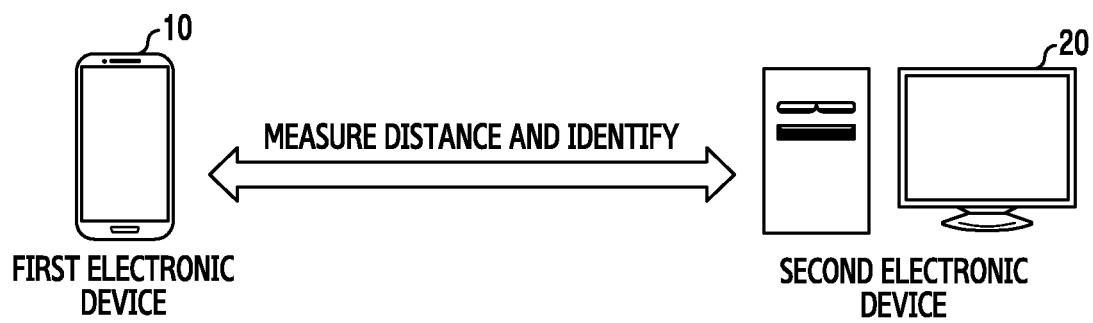
FIG. 71 illustrates an automatic logging-on operation based on a distance measuring method according to various embodiments of the present disclosure.

FIG. 71 illustrates an automatic logging-on operation based on a distance measuring method according to various embodiments of the present disclosure. The first electronic device 10 may be a terminal. The second electronic device 20 may be a PC.

Referring to FIG. 71, the user of the first electronic device 10 may execute an application that is executable in the first electronic device 10. The first electronic device may perform the distance measurement to the second electronic device 20 through the application.

The user of the first electronic device 10 may approach the second electronic device 20. If the first electronic device 10 is close to the second electronic device 20, the first electronic device 10 may determine whether the distance between the first electronic device 10 and the second electronic device 20 is within a threshold value. The determination may be made periodically.

The first electronic device 10 may share a specified value with the second electronic device 20 in the case of not using feedback. The first electronic device 10 may measure the distance to the second electronic device 20 by using the specified value. In the case of using the specified value, the first electronic device 10 is able to measure the distance even without a data network connection with the second electronic device 20.

If the first electronic device 10 determines that the distance between the first electronic device 10 and the second electronic device 20 is within the threshold value, the first electronic device 10 may transmit a wireless signal to the second electronic device 20. The wireless signals may be a signal to trigger automatic logging-on. The screen of the second electronic device 20 may be configured to be a screen after the logging-on in response to the wireless signal. However, if the second electronic device 20 has already been in the logging-on state, the first electronic device 10 may not transmit the wireless signal. The second electronic device 20 may maintain the current state.

If the first electronic device 10 determines that the distance between the first electronic device 10 and the second electronic device 20 is equal to, or more than, the threshold value, the first electronic device 10 may transmit a wireless signal to the second electronic device 20. The wireless signal may be a signal to trigger automatic logging-out. The screen of the second electronic device 20 may be configured to be a screen after the logging-out in response to the wireless signal. However, if the second electronic device 20 has already been in the logging-out state, the first electronic device 10 may not transmit the wireless signal. The second electronic device 20 may maintain the current state.

Figure 72:
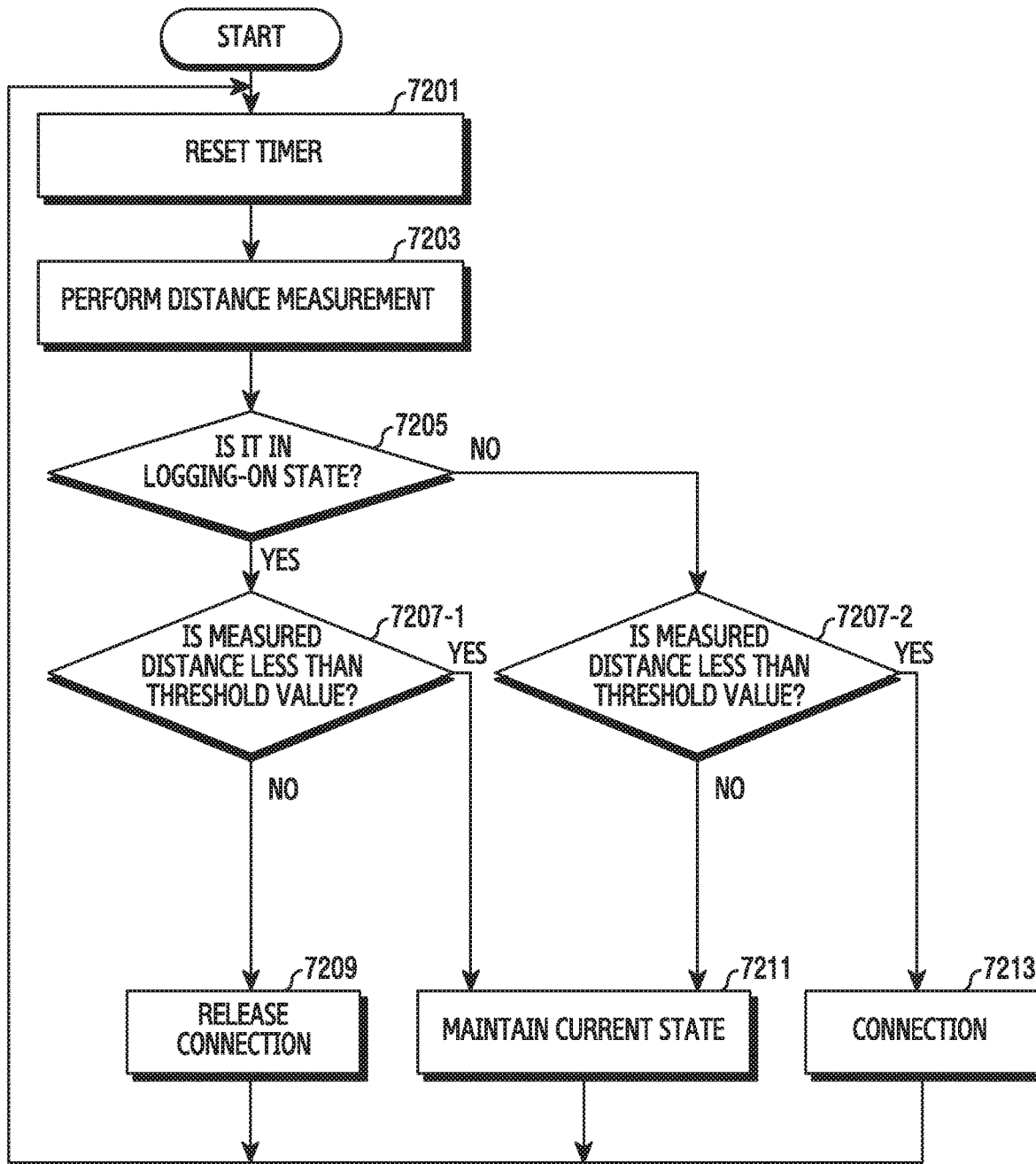
FIG. 72 is a flowchart illustrating an automatic logging-on operation based on a distance measuring method according to various embodiments of the present disclosure.

FIG. 72 is a flowchart illustrating an automatic logging-on operation based on a distance measuring method according to various embodiments of the present disclosure.

Referring to FIG. 72, in operation 7201, the first electronic device 10 may reset a timer that is included in the first electronic device 10. The timer may be used to repeat operations 7203 to 7213 according to a specific cycle.

In operation 7203, the first electronic device 10 may perform the distance measurement in order to determine the distance between the first electronic device 10 and the second electronic device 20. The first electronic device 10 may perform the distance measurement through an application that is included in the first electronic device 10.

Although FIG. 72 shows that the operation of determining the logging-on is performed prior to the operation of determining whether the measured distance is within the threshold value, the embodiment is not limited thereto. The example in which the operation of determining the logging-on is performed after the operation of determining whether the measured distance is within the threshold value has been described in FIG. 71.

In operation 7205, the first electronic device 10 may determine whether the second electronic device 20 is currently in the logging-on state. If it is determined that the second electronic device 20 is in the logging-on state, the first electronic device 10 may proceed to operation 7207-1. Otherwise, the first electronic device 10 may proceed to operation 7207-2.

In operation 7207-1, the first electronic device 10 may determine whether the measured distance is less than a threshold value. If the measured distance is less than the threshold value, the first electronic device 10 may maintain the current state in operation 7211. For example, the second electronic device 20 may remain in the logging-on state. However, if the measured distance is equal to, or more than, the threshold value, the first electronic device 10 may perform a logging-out (releasing the connection) operation in operation 7209. The first electronic device 10 may transmit a wireless signal for the logging-out to the second electronic device 20.

In operation 7207-2, the first electronic device 10 may determine whether the measured distance is less than the threshold value. If the measured distance is less than the threshold value, the first electronic device 10 may perform a logging-on operation (connection) in operation 7213. The first electronic device 10 may transmit a wireless signal for the logging-on to the second electronic device 20. However, if the measured distance is equal to, or more than, the threshold value, the first electronic device 10 may maintain the current state in operation 7211. For example, the second electronic device 20 may remain in the logging-out state.

An operating method of an electronic device, according to various embodiments of the present disclosure, may include transmitting the first sound wave by using an output unit, receiving, from the other electronic device that receives the first sound wave, the second sound wave by using an input unit, and determining the distance between the electronic device and the other electronic device based on the first value and the second value, wherein the first value corresponds to the difference between the timing of initiating the transmission of the first sound wave and the timing of receiving the second sound wave, and wherein the second value corresponds to the difference between the timing of when the other electronic device initiates the transmission of the second sound wave and the timing of when the other electronic device receives the first sound wave.

The operating method, according to various embodiments of the present disclosure, may further include transmitting, to the other electronic device, the first message that contains the second value by using a communication unit, wherein the second sound wave may be transmitted from the other electronic device if the other electronic device receives the first message.

The operating method, according to various embodiments of the present disclosure, may further include receiving, from the other electronic device, the second message that contains the second value by using the communication unit, wherein the second sound wave may be transmitted from the other electronic device if the other electronic device transmits the second message.

The operating method, according to various embodiments of the present disclosure, may further include receiving, from the other electronic device, the third message that contains the second value by using the communication unit.

According to various embodiments of the present disclosure, the first value may be determined by adding a first difference value to a second difference value, wherein the first difference value may correspond to the difference between the timing of initiating the transmission of the first sound wave and the timing of when the electronic device receives the first sound wave, and wherein the second difference value may correspond to the difference between the timing of when the electronic device receives the first sound wave and the timing of when the electronic device receives the second sound wave.

According to various embodiments of the present disclosure, the first difference value may be determined by compensating for a system delay through a hardware path. The system delay may be determined based on a distance value between the timing of when a controller of the electronic device initiates a command to transmit a reference signal through the hardware path and the timing of when the reference signal is provided to the controller of the electronic device through the hardware path, and based on a distance value between the input unit and the output unit.

The operating method, according to various embodiments of the present disclosure, may further include recording the received first sound wave and the received second sound wave, wherein the second difference value may correspond to the difference between the timing of when the first sound wave is recorded and the timing of when the second sound wave is recorded.

According to various embodiments of the present disclosure, the operation of determining the distance between the electronic device and the other electronic device may include determining the first distance value that indicates the distance between the output unit and the other electronic device based on the first value and the second value, transmitting the third sound wave by using another output unit, determining the second distance value that indicates the distance between another output unit and the other electronic device based on the third value and the fourth value, and determining the distance between the electronic device and the other electronic device based on the first distance value and the second distance value, wherein the third value may correspond to the difference between the timing of initiating the transmission of the third sound wave and the timing of receiving the second sound wave, and wherein the fourth value may correspond to the difference between the timing of initiating the transmission of the second sound wave and the timing of when the other electronic device receives the third sound wave.

The operating method, according to various embodiments of the present disclosure, may further include determining the relative direction of the other electronic device with respect to the electronic device based on the first distance value and the second distance value.

The operating method, according to various embodiments of the present disclosure, may further include transmitting, to the other electronic device, the fourth message that initiates the measurement of the other electronic device by using a communication unit before transmitting the first sound wave.

Figure 73:
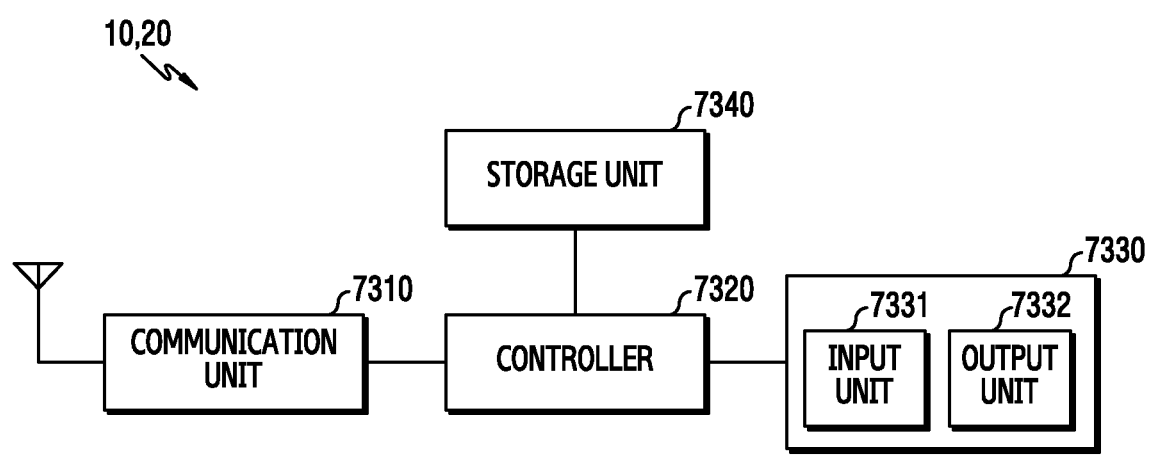
FIG. 73 is a functional block diagram of an electronic device according to various embodiments of the present disclosure.

FIG. 73 is a functional block diagram of an electronic device according to various embodiments of the present disclosure.

The embodiment illustrated in FIG. 73 is only an example in order to describe the present disclosure, and various modified embodiments may be provided. Therefore, the scope of the present disclosure should not be interpreted to be limited thereto. The electronic device may be the first electronic device 10 or the second electronic device 20 in FIG. 1A or 1B. Hereinafter, the description will be made based on the first electronic device 10.

Referring to FIG. 73, the first electronic device 10 may include a communication unit 7310, a controller 7320, an input unit 7331, an output unit 7332, and a storage unit 7340. The input unit 7331 and the output unit 7332 may be a hardware area 7330.

The communication unit 7310 may generate wireless signals to then be transmitted to the outside through an antenna, and may process wireless signals that are received from the outside. For example, the communication unit 7310 may transmit and receive low power wireless signals, such as a BT signal. As another example, the communication unit 7310 may transmit and receive wireless signals in the form of an advertising packet. As another example, the communication unit 7310 may transmit and receive wireless signals in the form of an LL data. In various embodiments of the present disclosure, the communication unit 7310 may transmit and receive a reference signal for the calibration. The first electronic device 10 may determine a system delay on the hardware path through the reference signal. In other embodiments of the present disclosure, when the input unit 7331 or the output unit 7332 is configured to be separate hardware, the communication unit 7310 may transmit a signal to trigger the output unit 7332. Alternatively, the communication unit 7310 may receive a triggering signal from the input unit 7331. In another embodiment of the present disclosure, the communication unit 7310 may transmit and receive a specific signal in order to record the timing or time information.

The controller 7320 may determine the distance to the second electronic device 20. The controller 7320 may determine the distance to the second electronic device 20 based on the first value and the second value. The controller 7320 may control the communication unit 7310 to perform signalling with the second electronic device 20 as the initial operation.

In various embodiments of the present disclosure, in the case where the first electronic device 10 does not use feedback, the controller 7320 may need to share, in advance, the second value with the second electronic device 20. Therefore, the controller 7320 may share the second value with the second electronic device 20 while being connected with the second electronic device 20. The second value may correspond to the difference between the output timing of the second sound wave that is transmitted from the second electronic device 20 and the transmission timing of the first sound wave that is received by the second electronic device 20. The first sound wave may be output by the controller 7320 of the first electronic device.

According to various embodiments of the present disclosure, the second value may be determined in various ways. For example, the controller 7320 may randomly determine the second value. Since the second value corresponds to data, the controller 7320 may transmit the determined second value to the second electronic device 20 through the communication unit 7310. As another example, the controller 7320 may receive the second value from the second electronic device 20 through the communication unit 7310. The second electronic device 20 may randomly determine the second value. As another example, the second value may be a determined value. The second value may be a value that is specified by using parameters that are determined in the hardware layer. Alternatively, the second value may be a parameter that is determined when an application is executed or installed. The application may be software that is operationally combined with the controller 7320. The application may be a program to execute the distance measuring method based on the sound wave. As another example, the controller 7320 may determine the second value based on the characteristics of the first electronic device 10. The characteristics may be parameters for measuring the distance, a cycle of the distance measurement, the channel state between the first electronic device 10 and the second electronic device 20, or the temperature of the first electronic device.

When the connection with the second electronic device 20 is established, the controller 7320 may transmit the first sound wave through the output unit 7332. The first sound wave, as a sonic wave, may have different properties from the wireless signal. In the case of using the air as the medium, the first sound wave may have a transmission speed of approximately 340 m/s.

The controller 7320 may determine the first value. The first value may correspond to the difference between the timing of when the output unit 7332 initiates the transmission of the first sound wave and the timing of when the input unit 7331 receives the second sound wave. The controller 7320 may determine the first value to be the sum of the first difference value and the second difference value.

The controller 7320 may determine the first difference value. For example, the controller 7320 may determine the first difference value to be a specified value. The distance between the input unit 7331 and the output unit 7332 may be determined during manufacturing. The transmission speed of a sound wave may be a constant value (i.e., 340 m/s). The distance between the input unit 7331 and the output unit 7332 may be determined by multiplying the distance between the input unit 7331 and the output unit 7332 by the transmission speed of a sound wave. The storage unit 7340 may store the determined value. The controller 7320 may determine the first difference value by using the determined value that is stored in the storage unit 7340. As another example, the controller 7320 may determine the first difference value by recording the timing of instructing the transmission of the first sound wave through the output unit 7332 and the timing of receiving the second sound wave through the input unit 7331. The controller 7320 may correct the determined first difference value through the calibration operation.

The controller 7320 may determine the second difference value. The controller 7320 may record, through the input unit 7331, the timing of receiving the second sound wave and the timing of receiving the first sound wave. The controller 7320 may determine the second difference value to be the difference between the recording timing of the reception of the second sound wave and the recording timing of the reception of the first sound wave. The second difference value may vary depending on the sampling rate of the recording device that is included in the controller 7320.

The controller 7320 may determine the first value by adding the first difference value and the second difference value. The controller 7320 may determine the distance between the first electronic device 10 and the second electronic device 20 based on the second value, which is shared with the second electronic device 20, and the first value. When the first electronic device 10 does not use feedback, the controller 7320 may subtract the second value from the first value in the case where the second value is a positive value. The subtracted value may correspond to the RTT value of the sound wave. The controller 7320 may determine the distance between the first electronic device 10 and the second electronic device 20 by multiplying the subtracted value and the transmission speed of a sound wave.

In another embodiment of the present disclosure, when the first electronic device 10 uses feedback, the controller 7320 may not share the second value with the second electronic device 20 in advance.

The controller 7320 may receive a message that contains the second value through the input unit 7331. The second value may be determined by the second electronic device 20. The second electronic device 20 may determine the second value to be the difference between the timing of when the second electronic device 20 receives the first sound wave and the timing of when the second electronic device 20 transmits the second sound wave. The second electronic device 20 may determine the second value in the same manner as the method by which the first electronic device 10 has determined the first value. The second electronic device 20 may determine the second value by subtracting the transmission timing of the second sound wave from the reception timing of the first sound wave. In the case where the transmission of the second sound wave is followed by the reception of the first sound wave, the second electronic device 20 may determine the second value to be a positive value. However, in the case where the reception of the first sound wave is followed by the transmission of the second sound wave, the second electronic device 20 may determine the second value to be a negative value.

The controller 7320 may determine the distance between the first electronic device 10 and the second electronic device 20 based on the first value and the second value. In the case of not using feedback, the controller 7320 may determine the first value in the same manner as the method for determining the first value.

In the case where the first electronic device 10 uses feedback, no matter whether the second value is positive or negative, the controller 7320 may calculate an average value of the first value and the second value. The calculated average value may correspond to the RTT value of the sound wave. The controller 7320 may determine the distance between the first electronic device 10 and the second electronic device 20 by multiplying the average value by the transmission speed of a sound wave.

The input unit 7331 may include one or more microphones. The output unit 7332 may include one or more speakers. In various embodiments of the present disclosure, if there are two or more microphones or two or more speakers, the first electronic device 10 may determine the direction of the second electronic device 20.

Although it is not shown in FIG. 73, the first electronic device 10 may include an interface for a user. The user may control the command in order for the first electronic device 10 to measure the distance through the interface.

Although it is not shown in FIG. 73, the controller 7320 may include an audio module. The audio module may generate sound waves and transmit the same through the output unit 7332. The audio module may process the sound waves that are received through the input unit 7331. The output unit 7332 may transmit the sound signals that are generated by the audio module to the outside. The input unit 7331 may receive the sound signals from the outside.

The controller 7320 of the first electronic device 10 in FIG. 1A or 1B negotiates with the second electronic device, and measures the distance between the first electronic device 10 and the second electronic device 20 according to a measuring method that is selected from among a plurality of measuring methods, based on the negotiation result.

The controller 7320 may further perform the interlocking operation between the first electronic device 10 and the second electronic device 20 based on the measurement result.

In an embodiment of the present disclosure, the controller 7320 provides the second electronic device 20 with data related to services performed in the first electronic device 10 in order to thereby allow the first electronic device 10 and the second electronic device 20 to interwork with each other.

In another embodiment of the present disclosure, the controller 7320 receives data related to services performed in the second electronic device 20 in order to thereby allow the first electronic device 10 and the second electronic device 20 to interwork with each other.

In an embodiment of the present disclosure, the controller 7320 performs a negotiating operation with the second electronic device 20, which includes an operation in which the characteristics of the first electronic device 10 and the second electronic device 20 are exchanged.

In an embodiment of the present disclosure, the controller 7320 selects one measuring method from among a plurality of measuring methods based on at least one of the characteristics of the first electronic device 10 and the second electronic device 20, the distance measurement type, or the distance measurement scenario.

In an embodiment of the present disclosure, the characteristics of the first electronic device 10 and the second electronic device 20 include at least one of the type of electronic device, the presence or absence of microphones/speakers and the number of the same, the type of wireless connectivity, or the presence or absence of a power source.

In an embodiment of the present disclosure, the distance measurement type includes at least one of one-to-one distance measurement, one-to-n distance measurement, one-time distance measurement, or periodic distance measurement.

In an embodiment of the present disclosure, the distance measurement scenario includes at least one of TV screen mirroring, speaker music streaming, the installation of room speaker, the configuration of a TV/home theater, a payment trigger service, or a position-based service.

In an embodiment of the present disclosure, the controller 7320 performs a negotiation operation with the second electronic device 20, which further includes an operation of transmitting distance measurement-related parameters to the second electronic device 20. In an embodiment of the present disclosure, the distance measurement-related parameters contain at least one of a distance measurement cycle, a distance measurement start offset, the number of available speakers/microphones, the required measurement accuracy, the required distance measurement lead time, the recording time of a sound wave, identifier information of the first electronic device 10, or a generating method of a sound wave.

In an embodiment of the present disclosure, the controller 7320 may receive the sound wave that is transmitted from the output unit 7332 through the input unit 7331 in order to thereby perform the self-calibration.

In an embodiment of the present disclosure, the selected distance measuring method includes a method for measuring the distance between the first electronic device 10 and the second electronic device 20 by using one or more wireless signals and sound waves that are generated by the first electronic device 10.

In an embodiment of the present disclosure, the controller 7320 transmits the wireless signal to the second electronic device 20, and transmits the sound wave to the second electronic device 20. In response thereto, the second electronic device measures the distance between the first electronic device 10 and the second electronic device 20 based on the reception of the wireless signal or based on the reception of the sound wave.

In another embodiment of the present disclosure, the controller 7320 transmits the wireless signal to the second electronic device 20, and transmits the sound wave to the second electronic device 20. In response thereto, the second electronic device measures the distance and direction between the first electronic device 10 and the second electronic device 20 based on the reception of the wireless signal and the reception of the sound wave through a plurality of microphones.

In another embodiment of the present disclosure, the controller 7320 transmits the wireless signal to the second electronic device 20, and transmits the sound wave to the second electronic device 20 through a plurality of speakers. In response thereto, the second electronic device measures the distance and direction between the first electronic device 10 and the second electronic device 20 based on the reception of the wireless signal and the reception of the sound wave by the plurality of speakers.

In another embodiment of the present disclosure, the controller 7320 transmits the wireless signal to the second electronic device 20, or periodically transmits the sound wave to the second electronic device 20. In response thereto, the second electronic device measures the distance between the first electronic device 10 and the second electronic device 20, and a change in the distance, based on the reception of the wireless signal and the periodic reception of the sound wave.

In another embodiment of the present disclosure, the selected measuring method includes a method for measuring the distance between the first electronic device 10 and the second electronic device 20 by using one of the wireless signal and the sound wave that is generated by the first electronic device 10.

In an embodiment of the present disclosure, the controller 7320 transmits the sound wave to the second electronic device 20, and receives a wireless signal corresponding to the sound wave from the second electronic device. In response thereto, the second electronic device measures the distance between the first electronic device 10 and the second electronic device 20 based on the reception of the sound wave and the transmission of the wireless signal.

In another embodiment of the present disclosure, the controller 7320: transmits the wireless signal to the second electronic device, receives a sound wave corresponding to the wireless signal from the second electronic device, and measures the distance between the first electronic device 10 and the second electronic device 20 based on the transmission of the wireless signal and the reception of the sound wave.

In another embodiment of the present disclosure, the controller 7320 periodically transmits the sound wave to the second electronic device 20. In response thereto, the second electronic device measures a change in the distance between the first electronic device 10 and the second electronic device 20 based on the periodic reception of the sound wave.

In an embodiment of the present disclosure, the first electronic device 10 and the second electronic device 20 include at least one of portable electronic devices that adopt a wireless access function, media devices, wearable electronic devices, POS equipment, or beacon devices.

In an embodiment of the present disclosure, the wireless signal includes a low power wireless signal.

An electronic device, according to various embodiments of the present disclosure, may include an output unit, an input unit, and a controller. The output unit may be configured to transmit the first sound wave, and the input unit may be configured to receive the second sound wave from the other electronic device that receives the first sound wave. The controller may be configured to determine the distance between the electronic device and the other electronic device based on the first value and the second value. The first value may correspond to the difference between the timing of initiating the transmission of the first sound wave and the timing of receiving the second sound wave, and the second value may correspond to the difference between the timing of when the other electronic device initiates the transmission of the second sound wave and the timing of when the other electronic device receives the first sound wave.

The electronic device may further include a communication unit. The communication unit may be configured to transmit, to the other electronic device, the first message that contains the second value, and the second sound wave may be transmitted from the other electronic device if the other electronic device receives the message.

The electronic device may further include a communication unit. The communication unit may be configured to receive, from the other electronic device, the second message that contains the second value, and the second sound wave may be transmitted from the other electronic device if the other electronic device transmits the second message.

The electronic device may further include a communication unit, and the communication unit may be configured to receive, from the other electronic device, the third message that contains the second value.

According to various embodiments of the present disclosure, the first value may be determined by adding a first difference value to a second difference value, wherein the first difference value may correspond to the difference between the timing of initiating the transmission of the first sound wave and the timing of when the electronic device receives the first sound wave, and wherein the second difference value may correspond to the difference between the timing of when the electronic device receives the first sound wave and the timing of when the electronic device receives the second sound wave.

According to various embodiments of the present disclosure, the first difference value may be determined by compensating for a system delay through a hardware path. The system delay may be determined based on a distance value between the timing of when a controller of the electronic device initiates a command to transmit a reference signal through the hardware path and the timing of when the reference signal is provided to the controller of the electronic device through the hardware path, and based on a distance value between the input unit and the output unit.

The controller may be further configured to record the received first sound wave and the received second sound wave. The second difference value may correspond to the difference between the timing of when the first sound wave is recorded and the timing of when the second sound wave is recorded.

The electronic device may further include another output unit. The controller may be configured to determine the first distance value that indicates the distance between the output unit and the other electronic device based on the first value and the second value. Another output unit may be configured to transmit the third sound wave. The controller may be configured to determine the second distance value that indicates the distance between another output unit and the other electronic device based on the third value and the fourth value, and may be configured to determine the distance between the electronic device and the other electronic device based on the first distance value and the second distance value. The third value may correspond to the difference between the timing of initiating the transmission of the third sound wave and the timing of receiving the second sound wave, and the fourth value may correspond to the difference between the timing of initiating the transmission of the second sound wave and the timing of when the other electronic device receives the third sound wave.

The controller may be further configured to determine a relative direction of the other electronic device with respect to the electronic device based on the first distance value and the second distance value.

The electronic device may further include a communication unit, and the communication unit may be configured to transmit the fourth message for initiating the measurement to the other electronic device before transmitting the first sound wave.

Figure 74:
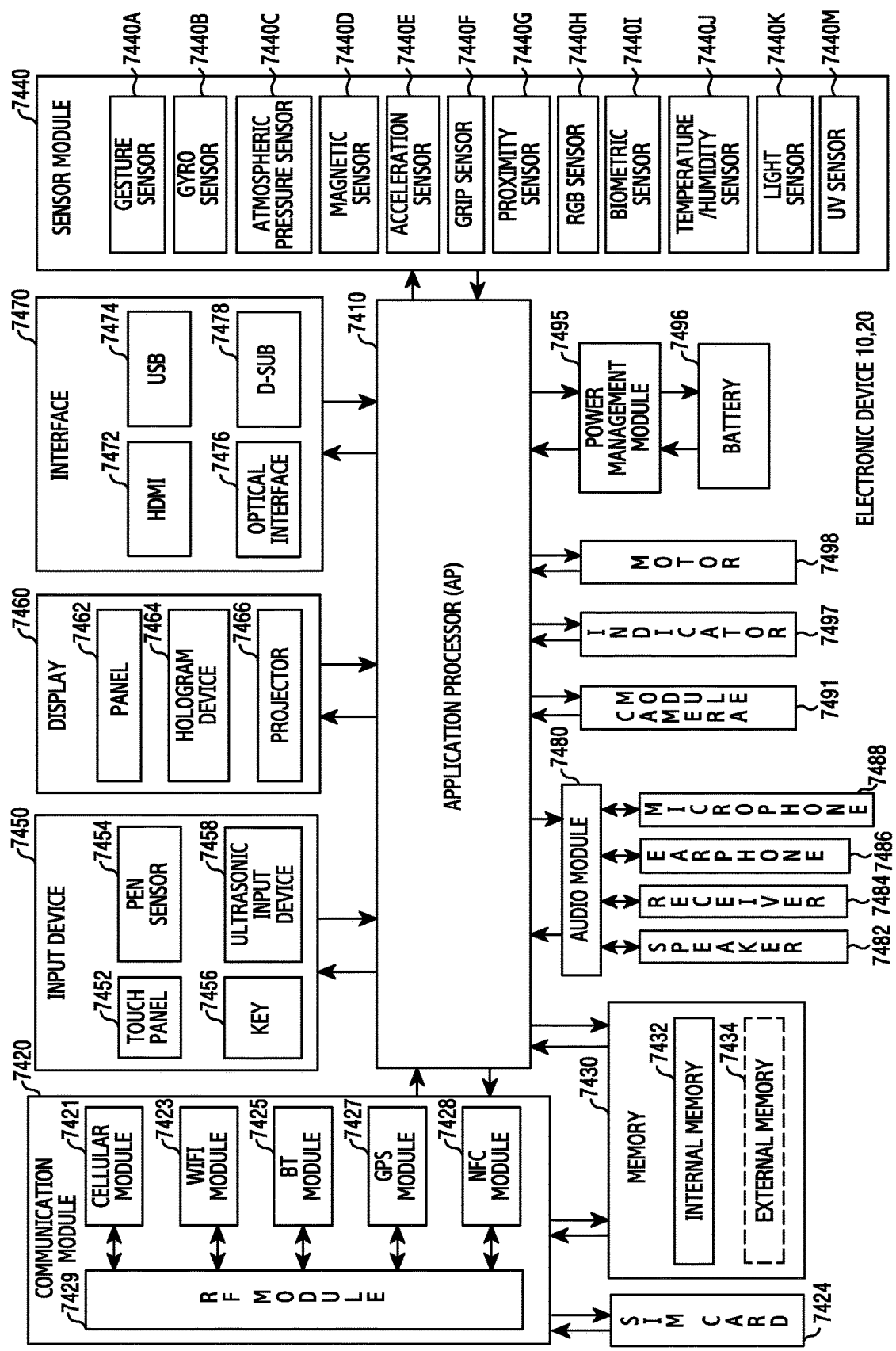
FIG. 74 illustrates a configuration of an electronic device according to various embodiments of the present disclosure.

FIG. 74 illustrates a configuration of an electronic device according to various embodiments of the present disclosure.

FIG. 74 illustrates the configuration of the first electronic device 10 or the second electronic device 20, which is shown in FIG. 73. The embodiment illustrated in FIG. 74 is only an example in order to describe the present disclosure, and various modified embodiments may be provided. Therefore, the scope of the present disclosure should not be interpreted to be limited thereto.

Referring to FIG. 74, the electronic device may include one or more APs 7410, a communication module 7420, a subscriber identification module (SIM) card 7424, a memory 7430, a sensor module 7440, an input device 7450, a display 7460, an interface 7470, an audio module 7480, a camera module 7491, a power management module 7495, a battery 7496, an indicator 7497, and a motor 7498.

The AP 7410 may control a multitude of hardware or software elements connected with the AP 7410, and may perform processing of various pieces of data including multimedia data and a calculation by executing an operating system or application programs. The AP 7410 may be implemented by, for example, a system on chip (SoC). According to an embodiment of the present disclosure, the AP 7410 may further include a graphics processing unit (GPU).

The communication module 7420 may transmit and receive data in the communication between other electronic devices that are connected with the electronic device through a network. According to an embodiment of the present disclosure, the communication module 7420 may include a cellular module 7421, a Wi-Fi module 7423, a BT module 7425, a global positioning system (GPS) module 7427, a near field communication (NFC) module 7428, and a radio frequency (RF) module 7429.

The cellular module 7421 may provide services of voice calls, video calls, text messaging, or the Internet through communication networks (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like). In addition, the cellular module 7421, for example, may perform ID and authentication of the electronic device in communication networks by using the subscriber ID module. According to an embodiment of the present disclosure, the cellular module 7421 may perform at least some of the functions provided by the AP 7410. For example, the cellular module 7421 may perform at least some of the multimedia control functions.

According to an embodiment of the present disclosure, the cellular module 7421 may include a communication processor (CP). The cellular module 7421 may be implemented by, for example, the SoC. According to an embodiment of the present disclosure, the AP 7410 may be configured to include at least some (e.g., the cellular module 7421) of the elements described above.

According to an embodiment of the present disclosure, the AP 7410 or the cellular module 7421 (e.g., the CP) may load instructions or data received from at least one of non-volatile memories, or one or more other elements, which are connected to the AP 7410 or the cellular module 7421, respectively, to a volatile memory to then process the same. In addition, the AP 7410 or the cellular module 7421 may store, in a non-volatile memory, data that is received from at least one of other elements or is created by at least one of other elements.

For example, each of the Wi-Fi module 7423, the BT module 7425, the GPS module 7427, or the NFC module 7428 may include a processor for processing data transmitted and received through the corresponding module. According to an embodiment of the present disclosure, at least some (e.g., two or more) of the cellular module 7421, the Wi-Fi module 7423, the BT module 7425, the GPS module 7427, or the NFC module 7428 may be included in one integrated chip (IC) or one IC package. For example, at least some (e.g., the CP corresponding to the cellular module 7421 and a Wi-Fi processor corresponding to the Wi-Fi module 7423) of the processors corresponding to the cellular module 7421, the Wi-Fi module 7423, the BT module 7425, the GPS module 7427, or the NFC module 7428 may be implemented in a single SoC.

The RF module 7429 may transmit and receive data (e.g., RF signals). Although it is not shown in the drawing, the RF module 7429 may include, for example, a transceiver, a power amp module (PAM), a frequency filter, a low noise amplifier (LNA), and the like. In addition, the RF module 7429 may further include components, such as conductors or cables, for transmitting and receiving electromagnetic waves through free space in wireless communication. According to an embodiment of the present disclosure, at least one of the cellular module 7421, the Wi-Fi module 7423, the BT module 7425, the GPS module 7427, or the NFC module 7428 may transmit and receive RF signals through separated modules.

The SIM card 7424 may be a card adopting a SIM, and may be inserted into a slot formed at a certain position of the electronic device. The SIM card 7424 may include inherent ID information (e.g., an integrated circuit card identifier (ICCID)) or subscriber information (e.g., an international mobile subscriber identity (IMSI)).

The memory 7430 may include an internal memory 7432 or an external memory 7434. The internal memory 7432, for example, may include at least one of volatile memories (e.g., a dynamic random access memory (DRAM), a static RAM (SRAM), a synchronous dynamic RAM (SDRAM), and the like) or non-volatile memories (e.g., an one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment of the present disclosure, the internal memory 7432 may be a solid state drive (SSD). The external memory 7434 may further include a flash drive, for example, compact flash (CF), secure digital (SD), micro-SD, mini-SD, extreme digital (xD), a memory stick, and the like. The external memory 7434 may be functionally connected with the electronic device through various interfaces. According to an embodiment of the present disclosure, the electronic device may further include a storage device (or medium), such as a hard drive.

The sensor module 7440, for example, may measure physical quantities and may detect the operation state of the electronic device to thereby convert the measured or detected information into electric signals. The sensor module 7440 may include at least one of, for example, a gesture sensor 7440A, a gyro-sensor 7440B, an air-pressure sensor 7440C, a magnetic sensor 7440D, an acceleration sensor 7440E, a grip sensor 7440F, a proximity sensor 7440G, a color sensor 7440H (e.g., a red-green-blue (RGB) sensor), a biometric sensor 7440I, a temperature/humidity sensor 7440J, an illuminance sensor 7440K, or an ultraviolet (UV) sensor 7440M. Alternatively or additionally, the sensor module 7440 may further include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown). The sensor module 7440 may further include a control circuit for controlling one or more sensors included therein.

The input device 7450, for example, may include a touch panel 7452, a (digital) pen sensor 7454, keys 7456, or an ultrasonic input device 7458. The touch panel 7452 may recognize a touch input by using at least one of, for example, a capacitive type, a pressure-sensitive type, an infrared type, or an ultrasonic type. In addition, the touch panel 7452 may further include a control circuit. In the case of the capacitive type, physical contact or proximity may be detected. The touch panel 7452 may further include a tactile layer. In this case, the touch panel 7452 may provide a user with a tactile reaction.

For example, the (digital) pen sensor 7454 may be implemented in the same, or a similar, manner as the method of receiving the touch input of the user, or may be implemented by using a separate recognition sheet. The keys 7456, for example, may include physical buttons, optical keys, or a keypad. The ultrasonic input device 7458 detects sound waves with a microphone (e.g., a microphone 7488) of the electronic device through input equipment that generates ultrasonic signals in order to thereby recognize data, which can perform wireless recognition. According to an embodiment of the present disclosure, the electronic device may receive the user input from external devices (e.g., computers or servers) that are connected with the electronic device by using the communication module 7420.

The display 7460 may include a panel 7462, a hologram device 7464, or a projector 7466. The panel 7462 may be, for example, a liquid crystal display (LCD), an active-matrix organic light-emitting diode (AM-OLED), and the like. The panel 7462, for example, may be implemented to be flexible, transparent, or wearable. The panel 7462 may be configured with the touch panel 7452 as a single module. The hologram device 7464 may display 3-dimensional (3D) images in the air by using the interference of light. The projector 7466 may display images by projecting light onto a screen. The screen may be positioned, for example, inside or outside the electronic device. According to an embodiment of the present disclosure, the display 7460 may further include a control circuit for controlling the panel 7462, the hologram device 7464, or the projector 7466.

The interface 7470 may include, for example, a high-definition multimedia interface (HDMI) 7472, a universal serial bus (USB) 7474, an optical interface 7476, or a D-subminiature (D-sub) 7478. Additionally or alternatively, the interface 7470 may include, for example, a mobile high-definition link (MHL) interface, an SD card/multi-media card (MMC) interface, or an infrared data association (IrDA) standard interface.

The audio module 7480 may convert a sound into an electric signal, and vice versa. For example, the audio module 7480 may process voice information that is input or output through a speaker 7482, a receiver 7484, earphones 7486, or the microphone 7488.

The camera module 7491 is a device for photographing still and moving images, and, according to an embodiment of the present disclosure, the camera module 7491 may include one or more image sensors (e.g., a front sensor or a rear sensor), lenses (not shown), an image signal processor (ISP) (not shown), or a flash (e.g., an LED or a xenon lamp) (not shown).

The power management module 7495 may manage the power of the electronic device. Although it is not shown in the drawing, the power management module 7495, for example, may include a power management integrated circuit (PMIC), a charger IC, or a battery or fuel gauge.

The PMIC may be mounted, for example, in integrated circuits or SoC semiconductors. The charging may be conducted by a wired type or a wireless type. The charger IC may charge a battery, and may prevent the inflow of an excessive voltage or current from the charger. According to an embodiment of the present disclosure, the charger IC may include a charger IC for at least one of the wired charging type or the wireless charging type. The wireless charging type may encompass, for example, a magnetic resonance type, a magnetic induction type, or an electromagnetic wave type, and additional circuits for wireless charging, for example, coil loops, resonance circuits, rectifiers, and the like, may be provided.

The battery gauge may measure, for example, the remaining amount of the battery 7496, a charging voltage and current, or temperature. The battery 7496 may store or generate electric power, and may supply power to the electronic device by using the stored or generated electric power. The battery 7496 may include, for example, a rechargeable battery or a solar battery.

The indicator 7497 may display a specific state, for example, a booting state, a message state, or a charging state of the electronic device or a part (e.g., the AP 7410) thereof. The motor 7498 may convert an electric signal into a mechanical vibration. Although it is not shown in the drawing, the electronic device may include a processing device (e.g., a GPU) for supporting mobile TV. The processing device for supporting the mobile TV may process media data according to standards, such as, for example, digital multimedia broadcasting (DMB), digital video broadcasting (DVB), or media flow.

Each of the above described elements of the electronic device according to one embodiment of the present disclosure may be formed of one or more components, and the name of a corresponding element may vary according to the type of an electronic device. The electronic device according to one embodiment of the present disclosure may include at least one of the above described elements and may exclude some of the elements or further include other additional elements. Further, some of the elements of the electronic device according to one embodiment of the present disclosure may be coupled to form a single entity while performing the same functions as those of the corresponding elements before the coupling.

As described above, according to the various embodiments of the present disclosure, the wireless devices negotiate with each other for the distance measurement in the wireless communication system in order to thereby select an optimal distance measuring method from among a plurality of distance measuring methods, and measure the distance between the wireless devices by using wireless signals and sound signals. According to the various embodiments of the present disclosure, the distance between the wireless devices can be accurately measured within an effective error range according to a distance measuring method that is most proper to the distance measurement intention in consideration of the characteristics of the wireless devices. In addition, according to the various embodiments of the present disclosure, the subsequent functions according to the user's intention can be executed based on the distance measurement result between the wireless devices.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first apparatus, the method comprising:
   determining, by the first apparatus, a delay period based on diffraction effect caused by a wavelength of a first sound wave and a wavelength of a second sound wave in a measurement cycle of a distance between the first apparatus and a second apparatus, wherein the delay period is a difference period between a timing when the first sound wave is received by the second apparatus and a timing when the second sound wave is transmitted by the second apparatus;

transmitting, from the first apparatus to the second apparatus, information for the delay period;

transmitting, from the first apparatus to the second apparatus, the first sound wave;

receiving, by the first apparatus from the second apparatus, the second sound wave that is transmitted at when the delay period elapses after the first sound wave is received by the second apparatus;

determining, by the first apparatus, the distance between the first apparatus and the second apparatus based on the delay period and a difference between a timing when the first sound wave is transmitted by the first apparatus and a timing when the second sound wave is received by the first apparatus in the measurement cycle, wherein an error of the distance between the first apparatus and the second apparatus is within one meter;

determining, by the first apparatus, whether the determined distance is within a threshold during the measurement cycle; and when the determined distance is within the threshold during the measurement cycle, transmitting, from the first apparatus to the second apparatus, a wireless signal to control the second apparatus to log on.

2. The method of claim 1, further comprising:
recording the received first sound wave and the received second sound wave,
wherein the difference is determined by adding a first difference value to a second difference value,
wherein the first difference value corresponds to a difference between a timing when the first apparatus initiates a transmission of the first sound wave and a timing when the first apparatus receives the first sound wave, and
wherein the second difference value corresponds to a difference between a timing when the first sound wave is recorded and a timing when the second sound wave is recorded.

3. The method of claim 2,
wherein the first difference value is determined by compensating a system delay through a hardware path,
wherein the system delay is determined based on a distance and a difference between a timing when a controller of the first apparatus initiates a command to transmit a reference signal through the hardware path and a timing when the reference signal is provided to the controller through the hardware path, and
wherein the distance is a distance between an output unit for transmitting the first sound wave and an input unit for receiving the second sound wave.

4. The method of claim 1,
wherein the determining of the distance between the first apparatus and the second apparatus comprises:
determining a first distance value between a first output unit and the second apparatus based on the difference and the delay period;
transmitting a third sound wave by using a second output unit;
determining a second distance value between the second output unit and the second apparatus based on a first value and a second value;
determining the distance between the first apparatus and the second apparatus based on the first distance value and the second distance value; and
determining a direction from the first apparatus to the second apparatus based on the first distance value and the second distance value,
wherein the first value corresponds to a difference between a timing when the first apparatus initiates a transmission of the third sound wave and a timing when the first apparatus receives the second sound wave, and
wherein the second value corresponds to a difference between a timing when the second apparatus initiates a transmission of the second sound wave and a timing when the second apparatus receives the third sound wave.

5. The method of claim 1, further comprising:
transmitting, to the second apparatus, a signal for indicating an initialization of a measurement of the distance between the first apparatus and the second apparatus before transmitting the first sound wave.

6. The method of claim 1, further comprising:
determining the delay period based on an application being executed in the first apparatus.

7. The method of claim 1, further comprising:
receiving, from a third apparatus receiving the first sound wave and the information, a third sound wave; and
determining another distance between the first apparatus and the third apparatus based on the delay period and a difference between a timing when the first sound wave is transmitted by the first apparatus and a timing when the third sound wave is received by the first apparatus,
wherein the third sound wave is transmitted at when the delay period elapses after the first sound wave is received by the third apparatus, and
wherein transmitting the information for the delay period comprises broadcasting the information for the delay period.

8. The method of claim 1, further comprising:
if the determined distance is not within the threshold, transmitting, to the second apparatus, another wireless signal to control the second apparatus to log out in the measurement cycle,
wherein the determination of the distance and the determination of whether the determined distance is within the threshold or not are performed periodically.

9. The method of claim 1, further comprising:
if the determined distance is within the threshold, transmitting, to the second apparatus, a first wireless signal to request information for an access point (AP) associated with the second apparatus; and
receiving, from the second apparatus, the information; and
performing an auto-setup with the AP based on the received information,
wherein the first apparatus is unavailable to display a user interface (UI) for connecting the AP.

10. A first apparatus comprising:
at least one processor configured to determine a delay period based on diffraction effect caused by a wavelength of a first sound wave and a wavelength of a second sound wave in a measurement cycle of a distance between the first apparatus and a second apparatus, wherein the delay period is a difference period between a timing when the first sound wave is received by the second apparatus and a timing when the second sound wave is transmitted by the second apparatus;
at least one transceiver configured to transmit, to the second apparatus, information for the delay period;

an output unit configured to transmit, to the second apparatus, the first sound wave; and an input unit configured to receive, from the second apparatus, the second sound wave that is transmitted at when the delay period elapses after the first sound wave is received by the second apparatus, wherein the at least one processor is configured to:
determine the distance between the first apparatus and the second apparatus based on the delay period and a difference between a timing when the first sound wave is transmitted by the first apparatus and a timing when the second sound wave is received by the first apparatus in the measurement cycle, wherein an error of the distance between the first apparatus and the second apparatus is within one meter, determine whether the determined distance is within a threshold during the measurement cycle, and control the transceiver to transmit, to the second apparatus, a wireless signal to control the second apparatus to log on when the determined distance is within the threshold during the measurement cycle.

11. The first apparatus of claim 10,
wherein the at least one processor is further configured to record the received first sound wave and the received second sound wave,
wherein the difference is determined by adding a first difference value to a second difference value,
wherein the first difference value corresponds to a difference between a timing when the first apparatus initiates a transmission of the first sound wave and a timing when the first apparatus receives the first sound wave, and
wherein the second difference value corresponds to a difference between a timing when the first sound wave is recorded and a timing when the second sound wave is recorded.

12. The first apparatus of claim 11,
wherein the first difference value is determined by compensating a system delay through a hardware path,
wherein the system delay is determined based on a distance and a difference between a timing when the at least one processor initiates a command to transmit a reference signal through the hardware path and a timing when the reference signal is provided to the at least one processor through the hardware path, and
wherein the distance is a distance between the output unit and the input unit.

13. The first apparatus of claim 10, further comprising:
a second output unit configured to transmit a third sound wave,
wherein the at least one processor is further configured to:
determine a first distance value between the output unit and the second apparatus based on the difference and the delay period,
determine a second distance value between the second output unit and the second apparatus based on a first value and a second value,
determine the distance between the first apparatus and the second apparatus based on the first distance value and the second distance value, and determine a direction from the first apparatus to the second apparatus based on the first distance value and the second distance value, wherein the first value corresponds to a difference between a timing when the first apparatus initiates a transmission of the third sound wave and a timing when the first apparatus receives the second sound wave, and wherein the second value corresponds to a difference between a timing when the second apparatus initiates a transmission of the second sound wave and a timing when the second apparatus receives the third sound wave.

14. The first apparatus of claim 10, further comprising at least one transceiver,
wherein the at least one transceiver is configured to a signal for indicating an initialization of a measurement of the distance between the first apparatus and the second apparatus before transmitting the first sound wave.

15. The first apparatus of claim 10, wherein the at least one processor is further configured to:
determine the delay period based on an application being executed in the first apparatus.

16. The first apparatus of claim 10,
wherein the input unit is further configured to receive, from a third apparatus receiving the first sound wave and the information, a third sound wave, wherein the at least one processor is configured to determine another distance between the first apparatus and the third apparatus based on the delay period and a difference between a timing when the first sound wave is transmitted by the first apparatus and a timing when the third sound wave is received by the first apparatus,
wherein the third sound wave is transmitted at when the delay period elapses after the first sound wave is received by the third apparatus, and
wherein transmitting the information for the delay period comprises broadcasting the information for the delay period.

17. The first apparatus of claim 10,
wherein the at least one transceiver is further configured to transmit another wireless signal to control the second apparatus to log out if the determined distance is not within the threshold, and
wherein the determination of the distance and the determination of whether the determined distance is within the threshold or not are performed periodically.

18. The first apparatus of claim 10,
wherein the at least one transceiver is further configured to:
transmit, to the second apparatus, a first wireless signal to request information for an access point (AP) associated with the second apparatus if the determined distance is within the threshold; and
receive, from the second apparatus, the information,
wherein the at least one processor is further configured to perform an auto-setup with the AP based on the received information, and
wherein the first apparatus is unavailable to display a user interface (UI) for connecting the AP.

* * * * *